(12) United States Patent
Chauvel et al.

(10) Patent No.: US 6,369,855 B1
(45) Date of Patent: Apr. 9, 2002

(54) AUDIO AND VIDEO DECODER CIRCUIT AND SYSTEM

(75) Inventors: Gerard Chauvel, Antibes; Serge Lasserre, Frejus; Mario Giani, Cagnes sur Mer, all of (FR); Tiemen Spits, North Richland Hills, TX (US); Gerard Benbassat, St-Paul-de-Vence (FR); Frank L. Laczko, Sr., Allen; Y. Paul Chiang, Richardson, both of TX (US); Karen L. Walker, Topeka, KS (US); Mark E. Paley, Dallas; Brian O. Chae, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/962,514

(22) Filed: Oct. 31, 1997

Related U.S. Application Data

(60) Provisional application No. 60/030,107, filed on Nov. 1, 1996, provisional application No. 60/030,106, filed on Nov. 1, 1996, provisional application No. 60/030,105, filed on Nov. 1, 1996, provisional application No. 60/030,104, filed on Nov. 1, 1996, provisional application No. 60/030,108, filed on Nov. 1, 1996, and provisional application No. 60/029,923, filed on Nov. 1, 1996.

(51) Int. Cl.[7] ................................................. H04N 7/26
(52) U.S. Cl. ..................... 348/423.1; 348/558; 370/474
(58) Field of Search .......................... 370/474; 348/558, 348/553, 423, 461, 569, 564, 423.1

(56) References Cited

U.S. PATENT DOCUMENTS

| | | | | |
|---|---|---|---|---|
| 4,962,427 A | * | 10/1990 | Lunn et al. | 348/558 |
| 5,668,601 A | * | 9/1997 | Okada et al. | 348/423 |
| 5,686,965 A | * | 11/1997 | Auld | 348/423 |
| 5,689,509 A | * | 11/1997 | Gaytan et al. | 370/474 |
| 5,712,853 A | * | 1/1998 | Mathur et al. | 370/474 |
| 5,745,488 A | * | 4/1998 | Thompson et al. | 370/395 |
| 5,781,549 A | * | 7/1998 | Dai | 370/474 |
| 5,784,277 A | * | 7/1998 | Meyer | 370/474 |
| 5,796,743 A | * | 8/1998 | Bunting et al. | 370/474 |

* cited by examiner

*Primary Examiner*—Victor R. Kostak
(74) *Attorney, Agent, or Firm*—Gerald E. Laws; W. James Brady, III; Frederick J. Telecky, Jr.

(57) ABSTRACT

An improved audio-visual circuit is provided that includes a transport packet parsing circuit for receiving a transport data packet stream, a CPU circuit for initializing said integrated circuit and for processing portions of said data packet stream, a ROM circuit for storing data, a RAM circuit for storing data, an audio decoder circuit for decoding audio portions of said data packet stream, a video decoder circuit for decoding video portions of said data packet stream, an NTSC/PAL encoding circuit for encoding video portions of said data packet stream, an OSD coprocessor circuit for processing OSD portions of said data packets, a traffic controller circuit moving portions of said data packet stream between portions of said integrated circuit, an extension bus interface circuit, a P1394 interface circuit, a communication coprocessors circuit, an address bus connected to said circuits, and a data bus connected to said circuits.

12 Claims, 76 Drawing Sheets

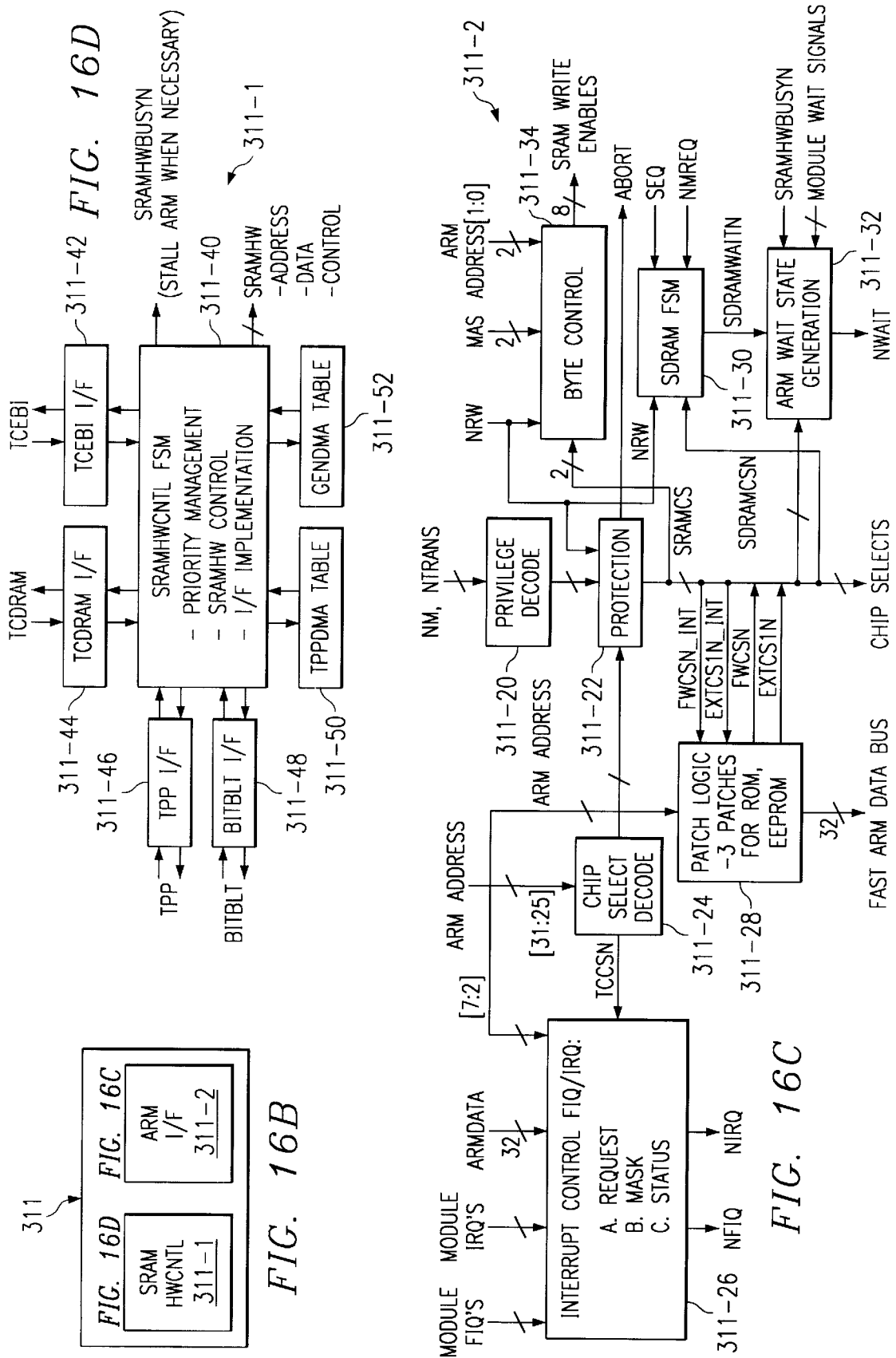

FIG. 16E

| SRAM HW STATES | |
|---|---|
| IDLE | IN PRIORITIZED ORDER<br><br>1. Respond to TCDRAM (SDRAM) acknowledge – GOTO DMA_SDRAMRD0 or DMA_SDRAMWRT0<br>2. Respond to TCEBI acknowledge – GOTO DMA_EXTRD0 or DMA_EXTWRT0<br>3. TCEBI hasn't acknowledged, but we made a request, remain in IDLE<br>4. Attribute request from TPP. GOTO TPP_ATTRREQ0<br>5. Dataword write request from TPP, GOTO TPP_DATAWORD0<br>6. TPP wrote back updated attribute GOTO TPP_ATTRWRBACK<br>7. DMA was completed, want to issue interrupt at end. GOTO DMA_DONEINT0<br>8. TC setup for auto packet (in incoming TPP) GOTO TPP_AUTOSETUP0<br>9. Complete BITBLT DMA GOTO BLT_DMADONE0<br>10. If no DMA (TPP or GEN) has been "prepared", and if GEN DMA is ready, go prepare GEN DMA [unless GEN DMA masked because TPP buffers full] GOTO GEN_DMAINIT0<br>11. If no DMA TPP/GEN prepared & TPP DMA ready, GOTO TPP_DMAINIT0 |
| IDLE – Con't | 12. If BITBLT single request<br>    If TPP REQ to TCDRAM pending remain IDLE<br>    Else if DMAREQ (GEN DMA) and ARBITRDY remain IDLE<br>    Else if SRAM REQ GOTO BLT_SRAM0<br>    Else if GEN DMA table full remain IDLE<br>    Else BLT_SNGLINIT0<br>13. If BITBLT burst request<br>    If TPP REQ to TCDRAM pending remain IDLE<br>    Else if DMAREQ (GEN DMA) and ARBITRDY remain IDLE<br>    Else if GEN DMA table full remain IDLE<br>    Else GOTO BLT_BURSTINIT0 |
| DMA_SDRAMRD0 | DMA_SDRAMRD0 Send size Xfer to TCDRAM, GOTO DMA_SDRAMRD1<br>DMA_SDRAMRD1 If word sent, put it in SRAM (SRC)<br>    Else if address writeback, grab it, put SRAM<br>        GOTO TPP_ATTRREQ0 or<br>        TPP_DATAWORD0 or<br>        DMA_SDRAMRD2<br>    Else remain in DMA_SDRAMRD1<br>DMA_SDRAMRD2 Update SRAM address (DST) in DMA table, GOTO DMA_SDRAMRD3<br>DMA_SDRAMRD3 Update Xfer size in table GOTO IDLE |

FIG. 16F

| | |
|---|---|
| DMA_SDRAMWRT0 | DMA_SDRAMWRT0 Send size Xfer to TCDRAM GOTO DMA_SDRAMWRT1<br>DMA_SDRAMWRT1 Send word to SDRAM (Increment Pointers)<br>    If TCDRAM stalls us, stay here<br>        Else if Xfer done GOTO TPP_ATTRREQ0 or<br>                TPP_DATAWORD0 or DMA_SDRAMWRT2<br>        Else Stay here<br>DMA_SDRAMWRT2 Update SRAM address (SRC) in DMA table<br>    GOTO DMA_SDRAMWRT3<br>DMA_SDRAMWRT3 If address writeback done, update SDRAM<br>    address (DST) in DMA table GOTO DMA_SDRAMWRT4<br>        Else remain<br>DMA_SDRAMWRT4 Clean up GOTO IDLE |

FIG. 16G

| | |
|---|---|
| DMA_EXTRD0 | DMA_EXTRD0 Send Xfer size to TCEBI, GOTO DMA_EXTRD1<br>DMA_EXTRD1 If ATTRREQ GOTO TPP_ATTRREQ0<br>        Else if data write request TPP_DATAWORD0<br>        Else if attribute (e.g., CC#) ready to writeback<br>            GOTO TPP_ATTRWRBACK<br>        Else if valid data from TCEBI, put it in SRAM<br>        remain DMA_EXTRD1<br>      Else if address writeback, update SRC in DMA table<br>          GOTO DMA_EXTRD2<br>      Else remain<br>DMA_EXTRD2 Update SRAM address (DST) in DMA table, GOTO<br>    DMA_EXTRD3<br>DMA_EXTRD3 Update Xfer size GOTO IDLE |
| DMA_EXTWRT0 | DMA_EXTWRT0 Send size Xfer to TCEBI, GOTO DMA_EXTWRT1<br>DMA_EXTWRT1 If TPP attribute request GOTO TPP_ATTRREQ0<br>        Else if data word write GOTO TPP_DATAWORD0<br>        Else if attribute ready to write back<br>            GOTO TPP_ATTRWRBACK<br>        Else if TCEBI needs another word send it.<br>        Else if Xfer done, GOTO DMA_EXTWRT2<br>        Else remain in DMA_EXTWRT1<br>DMA_EXTWRT2 If TPP ATTR REQ GOTO TPP_ATTRREQ0<br>        Else if data word TPP_DATAWORD0<br>        Else if ATTR ready to write TPP_ATTRWRBACK<br>        Else if WRITEBACKDONE update DST in DMA table<br>           GOTO DMA_EXTWRT3<br>        Else remain here<br>DMA_EXTWRT3 Update SRC (SRAM) ADDR in DMA table, GOTO<br>    DMA_EXTWRT4<br>DMA_EXTWRT4 Update Xfer size in DMA table GOTO IDLE |

FIG. 16H

| | |
|---|---|
| TPP_ATTRREQ0 | TPP_ATTRREQ0 Pull out attribute<br>    If decrypted packet GOTO TPP_ATTRREQDEC1 |
| TCDRAM/TCEBI<br>DMA Requests Masked<br>in this State!! |     Else GOTO TPP_ATTRREQ1<br>TPP_ATTRREQ1 Acknowledge TPP ATTR REQ (allow SRAMHW<br>    Pipelining) GOTO TPP_ATTRREQ2<br>TPP_ATTREQ2 Attribute valid. Return to calling point IDLE,<br>    DMA_EXTWRT1, DMA_EXTWRT2, DMA_EXTRD1,<br>    DMA_SDRAMWRT2 or DMA_SDRAMRD2<br>TPP_ATTRREQDEC1 Acknowledge TPP ATTR REQ<br>TPP_ATTRREQDEC2 Begin fetching key for decryption from key<br>    table in SRAM<br>TPP_ATTRREQDEC3 Attribute valid. Continue fetching key.<br>TPP_ATTRREQDEC4 4 bytes of key valid. Return to calling point<br>    IDLE, DMA_EXTWRT1, DMA_EXTWRT2, DMA_EXTRD1,<br>    DMA_SDRAMWRT2 or DMA_SDRAMRD2 in that next state,<br>    the other 3 bytes of key are valid. |
| TPP_DATAWORD0 | TPP_DATAWORD0 Write dataword, if first word, GOTO<br>    TPP_DATAWORD1<br>    Else GOTO IDLE or other calling point<br>        DMA_EXTWRT1, DMA_EXTRD1,<br>        DMA_EXTWRT2, DMA_SDRAMWRT2<br>        or DMA_SDRAMRD2<br>TPP_DATAWORD1 Write dataword (first write required TPP<br>    header write) GOTO TPP_DATAWORD2 |
| TCDRAM/TCEBI DMA requests<br>masked in this state | TPP_DATAWORD2 Allows pipeline to complete. Return to calling<br>    point. |

FIG. 16I

| | |
|---|---|
| TPP_ATTRWRBACK<br>TCDRAM/TCEBI DMA requests<br>masked in this state<br>DMA_DONEINT0 | TPP_ATTRWRBACK Write the attribute, return to calling point<br>    IDLE, DMA_EXTWRT1, DMA_EXTRWRT2,<br>    DMA_EXTRD1 or TPP_ATTRWRBACK<br>DMA_DONEINT0 Pull the INT's out of the DMA table in SRAM,<br>    GOTO DMA_DONEINT1 |
| TCDRAM/TCEBI DMA requests<br>masked in this state<br>TPP_AUTOSETUP0<br>TCDRAM/TCEBI DMA requests<br>masked in this state | DMA-DONEINT1 Continue pipelining GOTO IDLE<br><br>TPP_AUTOSETUP0 Setup TPP DMA SRC, GOTO<br>    TPP_AUTOSETUP1<br>TPP_AUTOSETUP1 Setup TPP DMA DST (from SCID given by<br>    TPP) GOTO TPP_AUTOSETUP2<br>TPP_AUTOSETUP2 Setup TPP DMA size GOTO IDLE |

FIG. 16J

BLT_DMADONE0  
TCDRAM/TCEBI DMA requests masked in this state

BLT_DMADONE0 If DMA was for a single fetch read GOTO BLT_DMADONE1
    Else if single fetch write, GOTO IDLE (and clear single Xfer flag)
    Else if burst, provide writeback address to BITBLT, GOTO IDLE
BLT_DMADONE1 Pipelining, GOTO BLT_DMADONE2
BLT_DMADONE2 Send single word to BITBLT GOTO IDLE

GEN_DMAINIT0

GEN_DMAINIT0 Fetch DMA size, GOTO GEN_DMAINIT1
GEN_DMAINIT1 Fetch SCR ADDR, GOTO GEN_DMAINIT2
GEN_DMAINIT2 Fetch DST ADDR − 2 cycle delay from pipeline
    (figure out if FIQ/IRQ requested at DMA completion).
    Load Size GOTO GEN_DMAINIT3
GEN_DMAINIT3 If DMASIZE is zero, Xfer done already
    GOTO IDLE
    Load SRC
    Else GOTO GEN_DMAINIT4
GEN_DMAINIT4
    Load DST
    Make request for RD/WR TCEBI/TCDRAM
    GOTO IDLE

FIG. 16K

TPP_DMAINIT0

TPP_DMAINIT0 Fetch size, GOTO TPP_DMAINIT1
TPP_DMAINIT1 Fetch DST, GOTO TPP_DMAINIT2
TPP_DMAINIT2 Fetch SRC, see if FIQ/IRQ requested
    Load Size, GOTO TPP_DMAINIT3
TPP_DDMAINIT3 LD DST If size=0, DMA done GOTO IDLE
    Else if DST address is 32 bit address GOTO TPP_DMAINIT7
    Else fetch SCID attribute (GOTO TPP_DMAINIT4)
TPP_DMAINIT4 Fetch DST address, GOTO TPP_DMAINIT5
TPP_DMAINIT5 Determining if packet is Audio, Video, or other, GOTO TPP_DMAINIT6
TPP_DMAINIT6 LD DST, GOTO TPP_DMAINIT7
TPP_DMAINIT7 LD SRC, GOTO TPP_DMAINIT8
TPP_DMAINIT8 Issue request for WRT to TCEBI/TCDRAM
    GOTO TPP_DMAINIT9 or IDLE, depending on bytepacking needs
TPP_DMAINIT9 Finish up bytepacking initialization, GOTO IDLE

FIG. 16L

| | |
|---|---|
| BLT_SRAM0 | BLT_SRAM0 Acknowledge BITBLT fetch word for read, GOTO BLT_SRAM1 |
| | BLT_SRAM1 If read GOTO BLT_SRAM2 |
| TCDRAM/TCEBI DMA requests masked in this state | Else put word in SRAM GOTO IDLE |
| | BLT_SRAM2 Word valid GOTO IDLE |
| BLT_SNGLINIT0 | BLT_SNGLINIT0 Setup SRC, GOTO BLT_SNGLINIT1 |
| | BLT_SNGLINIT1 Setup DST, GOTO BLT_SNGLINIT2 |
| TCDRAM/TCEBI DMA requests masked in this state | BLT_SNGLINIT2 Setup size. If read GOTO IDLE |
| | Else GOTO BLT_SNGLINIT2 |
| | BLT_SNGLINIT2 Place word for write in SRAM temp location (pointed to by SRC) GOTO DILE |
| BLT_BURSTINIT0 | BLT_BURSTINIT0 Setup SRC/DST (SDRAM/EBI address), GOTO BLT_BURSTINIT1 |
| TCDRAM/TCEBI DMA requests masked in this state | BLT_BURSTINIT1 Setup size, GOTO BLT_BURSTINIT2 |
| | BLT_BURSTINIT2 Setup DST/SRC (SRAM HW address), GOTO IDLE |

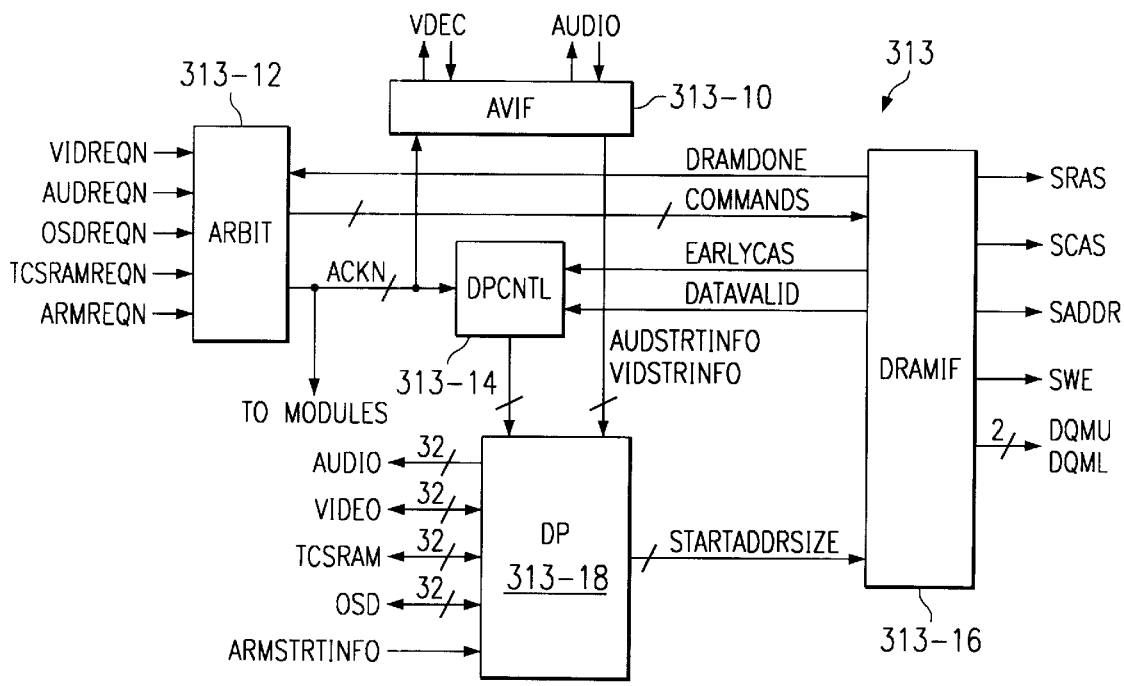

FIG. 16M wait_timer_cnt ++ when ARM_H|ARM_L
wait_timer_cnt<=0 when ELSE prior_chg_cnt<=0 when XFER|ARM_H|IDLE_H
prior_chg_cnt++ when ELSE

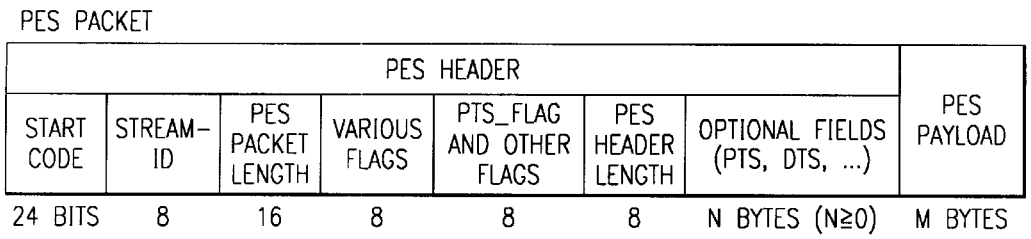

FIG. 17H

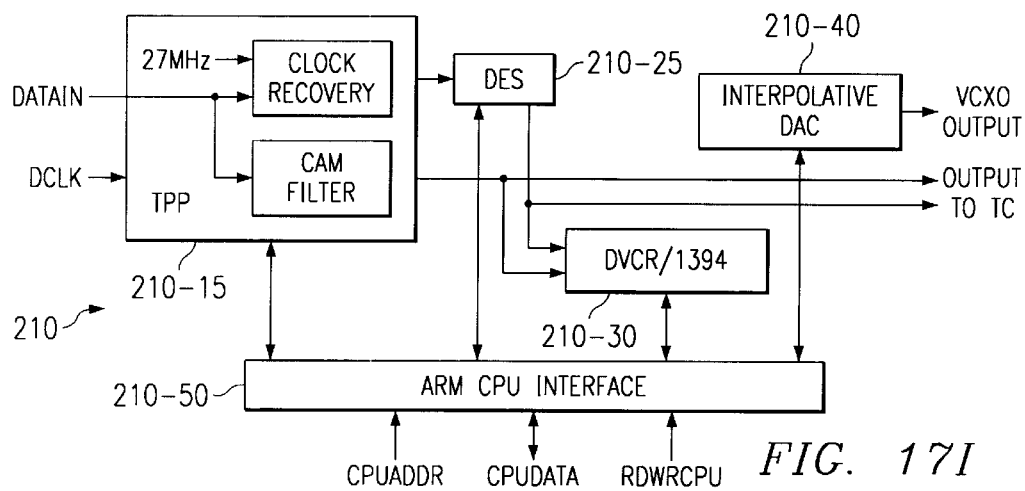

FIG. 17I

PREFIX

| P | BB | CF | CS | SCID |

1. AUXILIARY PACKETS

| PREFIX | 0000 | 00 | 00 | MF | CFF | AFID | AFS | DATA |

2. BASIC SERVICE PACKETS

| PREFIX | CC | 01 | X0 | PAYLOAD |

3. REDUNDANT VIDEO PACKETS

| PREFIX | CC | 10 | ?0 | PAYLOAD |

4. AUDIO AND VIDEO PACKETS CONTAINING NON-MPEG DATA

| PREFIX | CC | 11 | ?0 | NB | NON-MPEG | MPEG DATA |

P-PACKET FRAMING BIT
BB-SET TO 1 ON EVERY REDUNDANT SEQUENCE HEADER
CF-0=ENCRYPTED, 1=CLEAN
CS-0=EVEN, 1=ODD
SCID-SERVICE CHANNEL ID
CC-CONTINUITY COUNTER

MF-MODIFIABLE FLAG
CFF-1=VALID AUX DATA
AFID-0=SCR, 1=CWP, 2=B OTH
AFS=AUX DATA SIZE
NB=BYTES OF NON-MPEG DATA

FIG. 17J

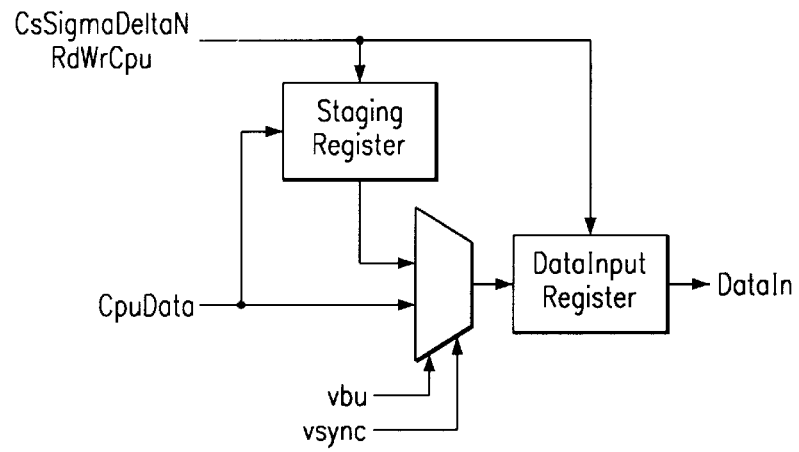
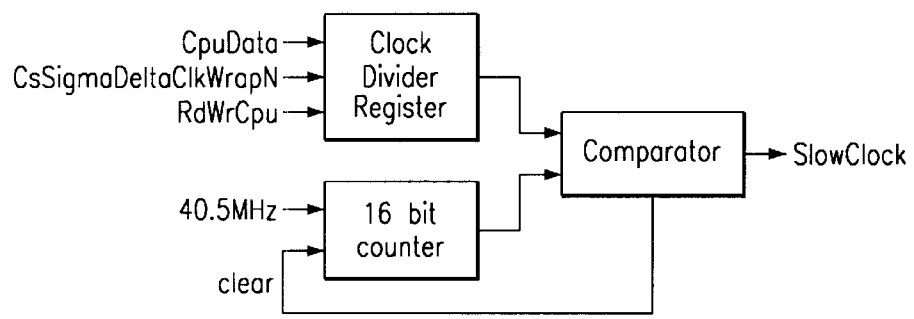
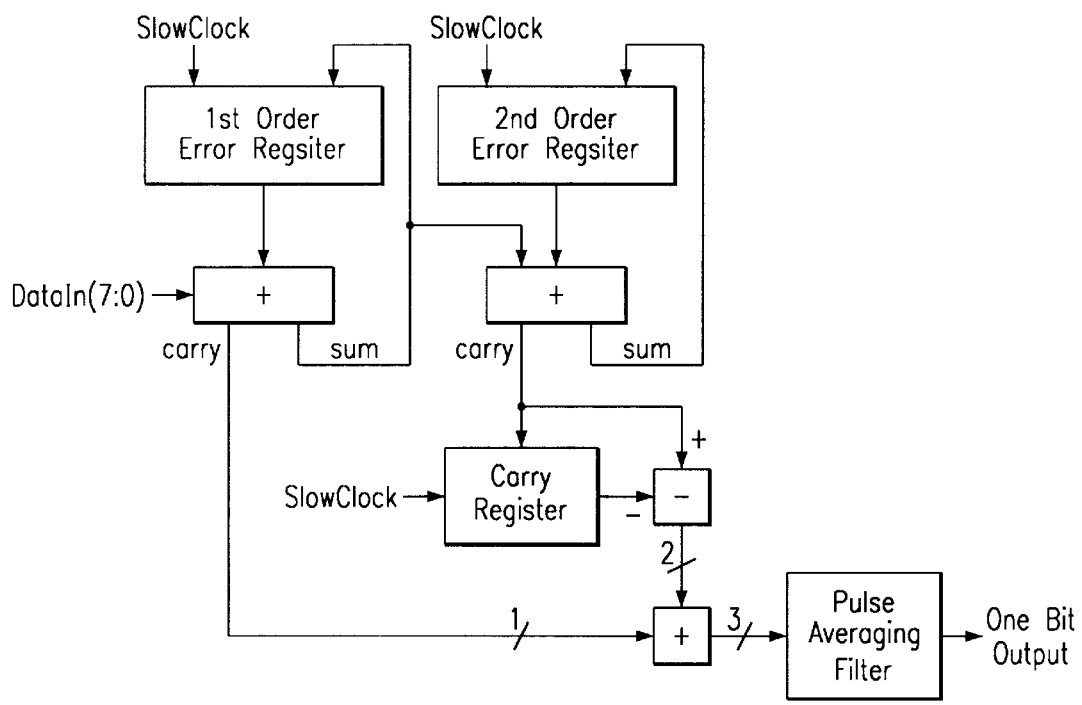
*FIG. 17N*

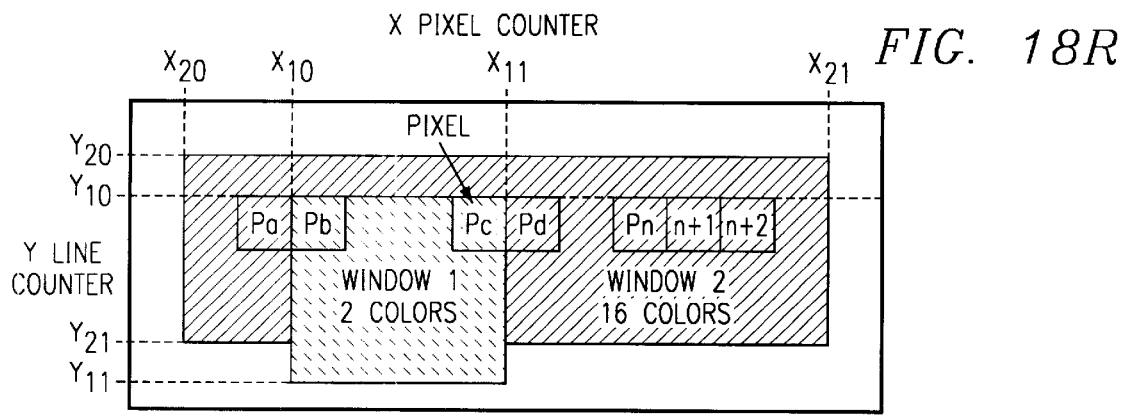
FIG. 18R
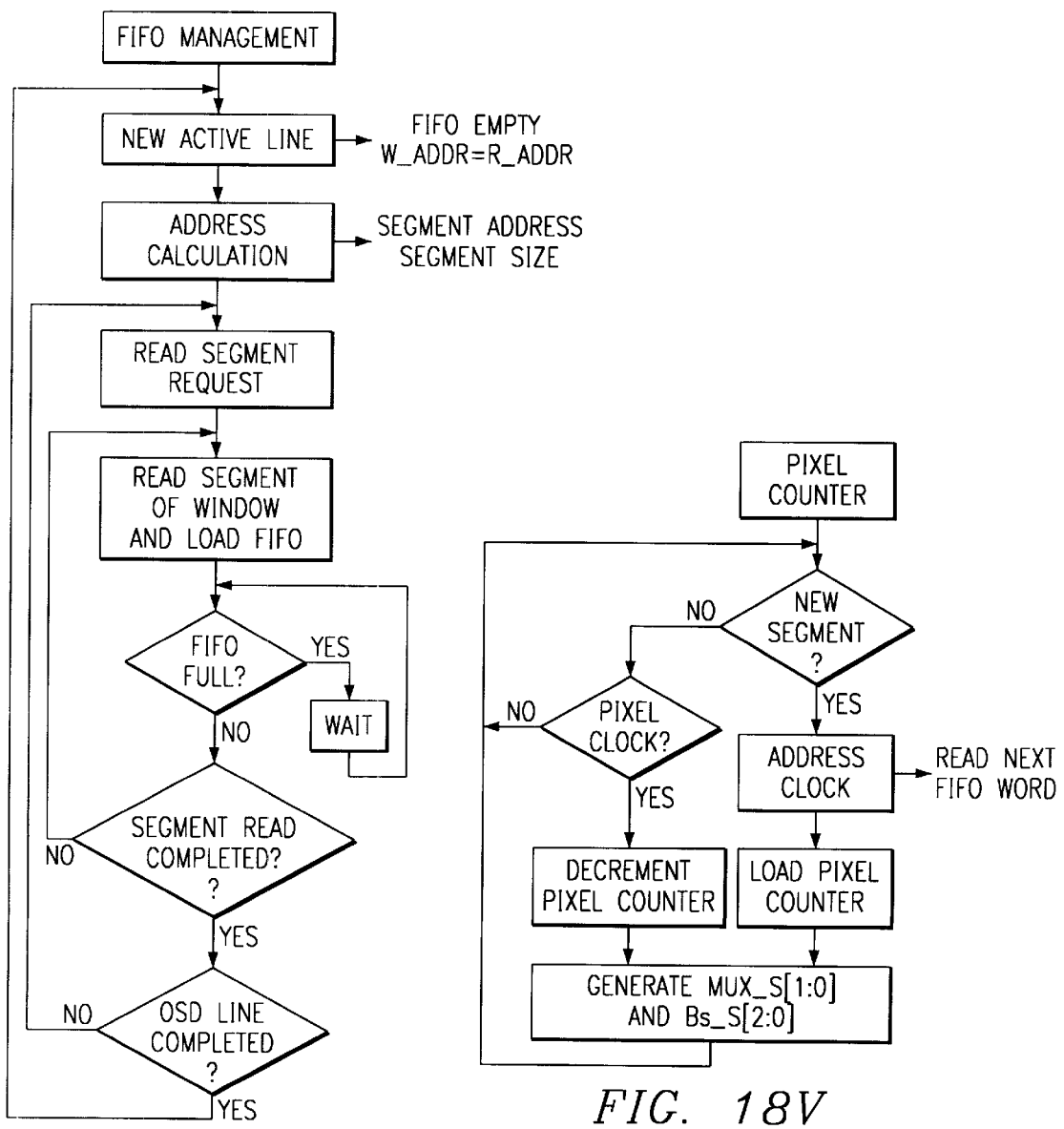
FIG. 18U
FIG. 18V

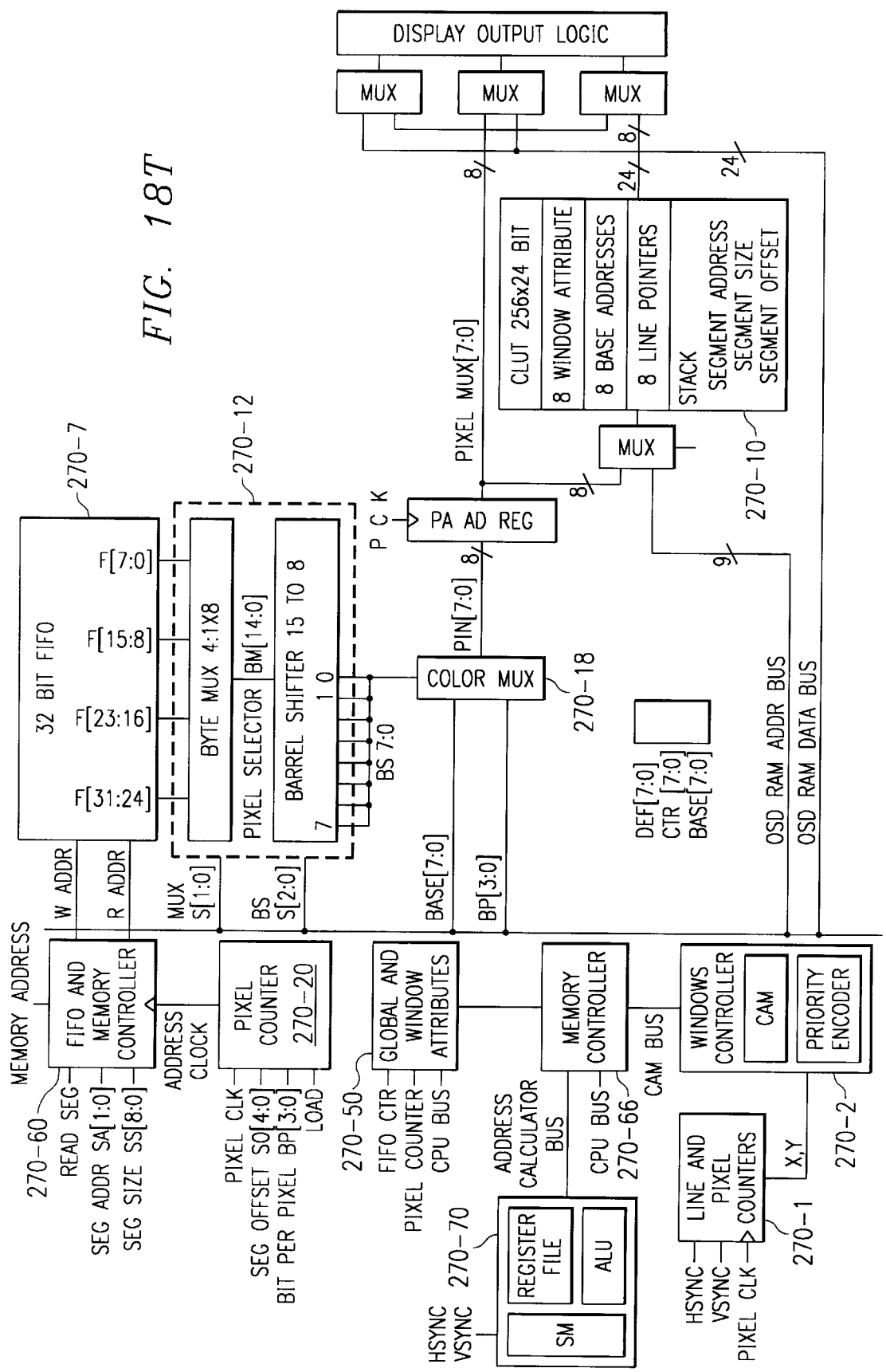

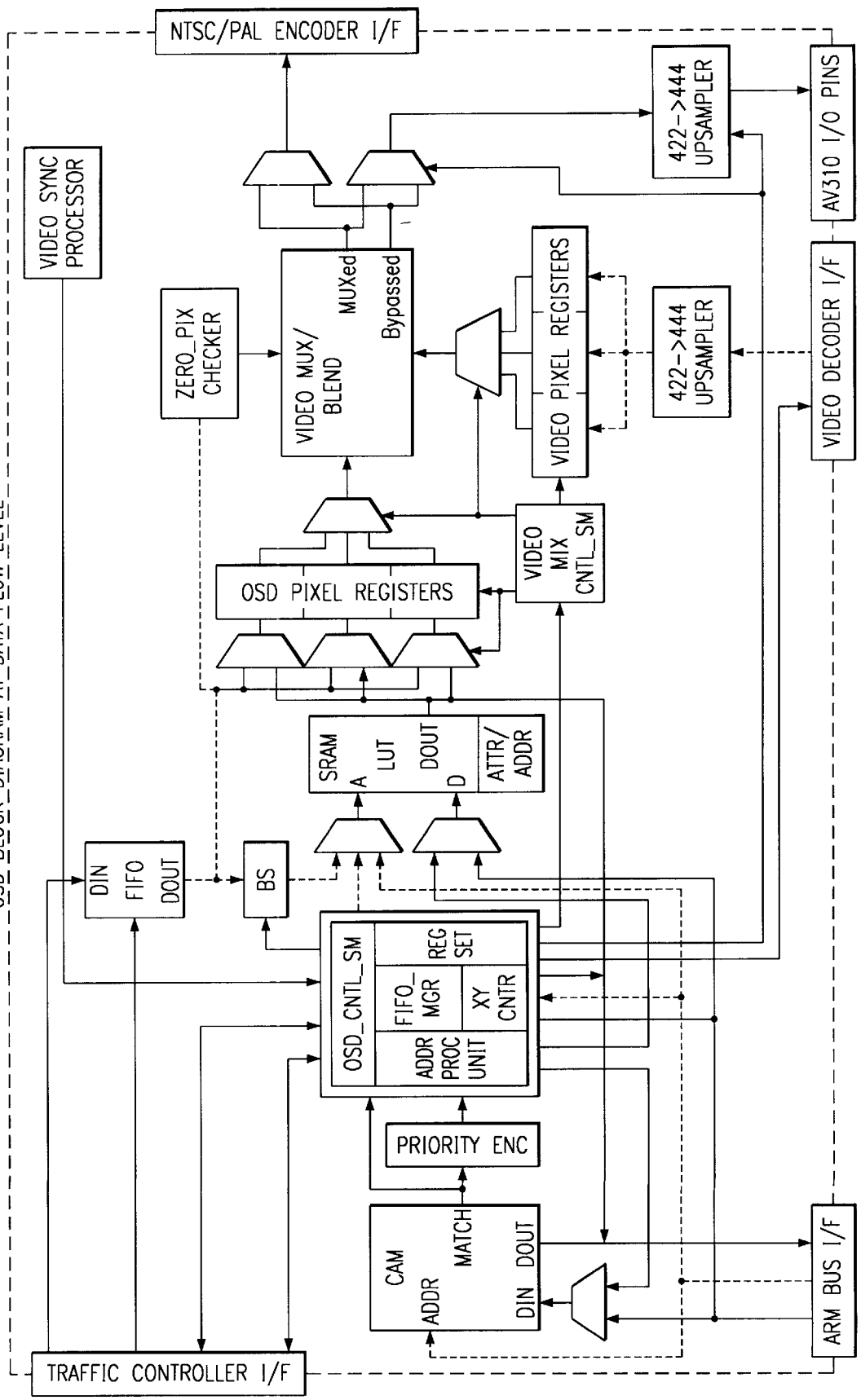
FIG. 18AA   OSD BLOCK DIAGRAM AT DATA FLOW LEVEL

OUTPUT RESULT

AREA 1 : BM
AREA 2 : 444
AREA 3 : VIDEO
AREA 4 : BM BLENDED WITH BACKGROUND
AREA 5 : BM BLENDED WITH VIDEO
AREA 6 : 444 BLENDED WITH VIDEO
AREA 7 : BACKGROUND

| CH1 NTSC/PAL ENCODER OUTPUTS / CH2 DIGITAL VIDEO OUTPUT | VIDEO ONLY | FULL OSD PICTURE | NON-OVERLAPPED OSD | BOTTOM OF OVERLAPPED OSD |
|---|---|---|---|---|
| VIDEO ONLY | YES | YES | YES | YES |
| FULL OSD PICTURE | YES | YES | YES | NO |
| NON-OVERLAPPED OSD | YES | YES | YES | NO |
| TOP OF OVERLAPPED OSD | YES | YES | YES | NO |
FIG. 19
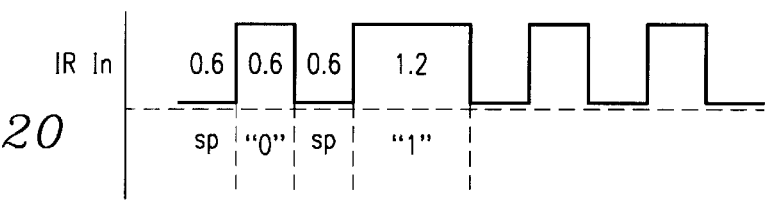
FIG. 20
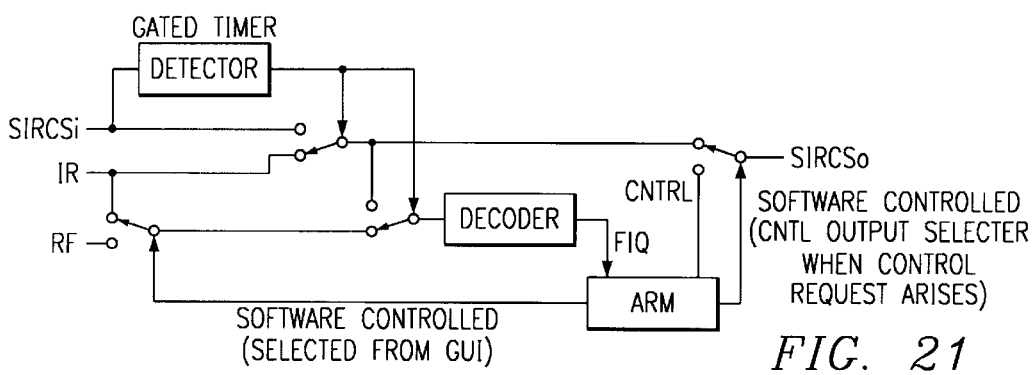
FIG. 21

- MEMORY PROTECTION LEVEL 1 CAN ONLY WRITE TO LEVEL 1 DATA SPACE
- MEMORY PROTECTION LEVEL 2 CAN WRITE TO LEVEL 1 AND 2 DATA SPACE
- MEMORY PROTECTION LEVEL 3 CAN WRITE TO LEVEL 1, 2 AND 3 DATA SPACE

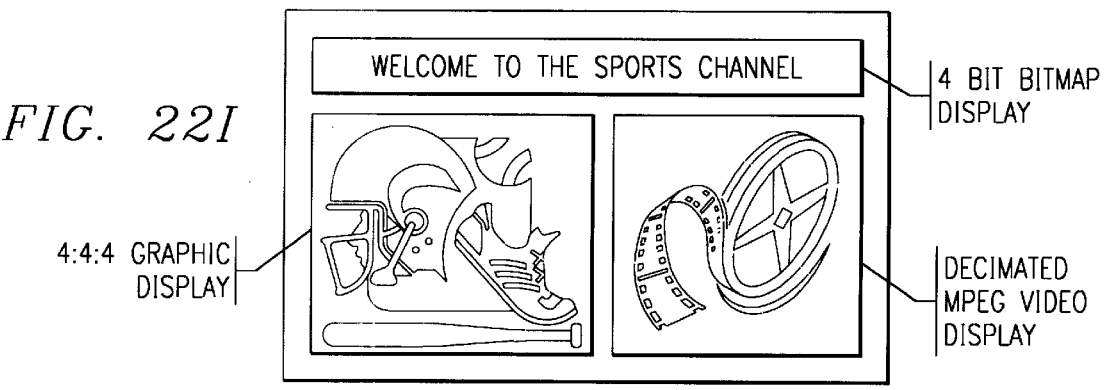
FIG. 22I
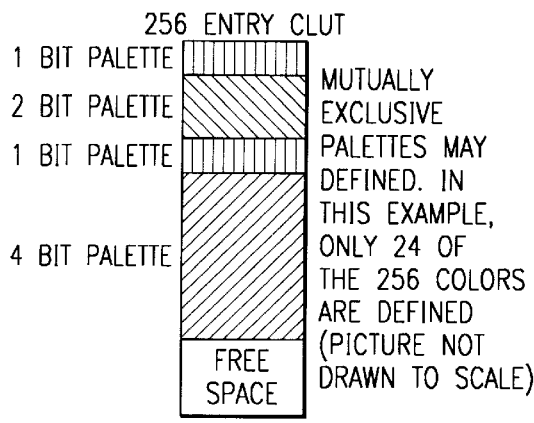
FIG. 22JA
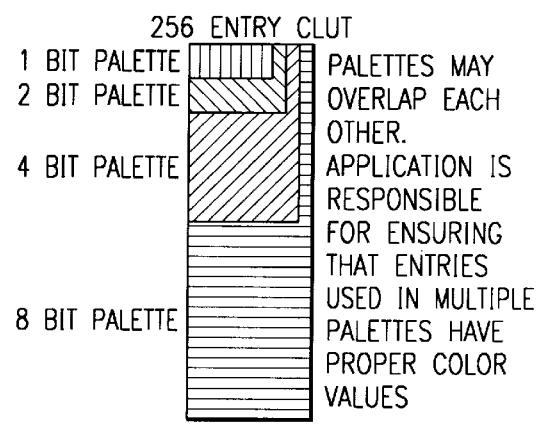
FIG. 22JB
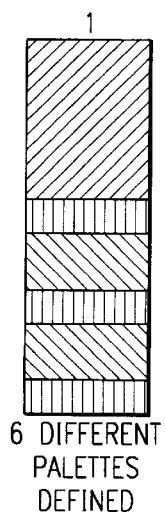 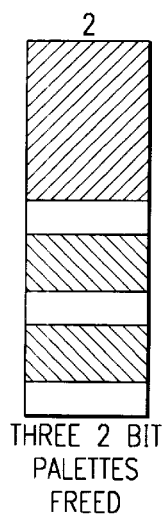 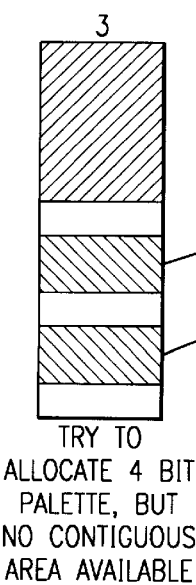 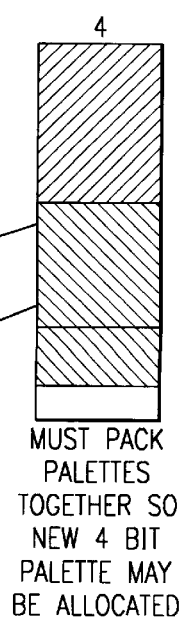
FIG. 22K

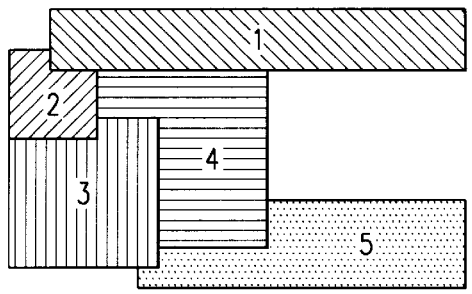
FIG. 22L
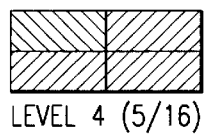
LEVEL 4 (5/16)
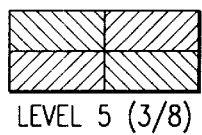
LEVEL 5 (3/8)
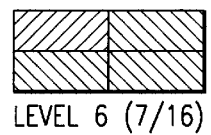
LEVEL 6 (7/16)
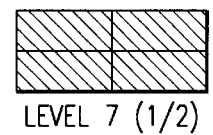
LEVEL 7 (1/2)
▨ 50% BLENDED   ▧ 25% BLENDED
FIG. 22M
| 31 | 23 | 15 | 7 | 0 |
|---|---|---|---|---|
| UNDEFINED[7..0] | CB[7..0] | Y[7..0] | CR[7..0] | |
FIG. 22N
| CURRENT Z PLANE | NEW Z PLANE |
|---|---|
| 0 | 0 |
| 1 | 1 |
| 2 | 5 |
| 3 | 2 |
| 4 | 3 |
| 5 | 4 |
| 6 | 6 |
| 7 | 7 |
FIG. 22O
| CURRENT Z PLANE | NEW Z PLANE |
|---|---|
| 0 | 0 |
| 1 | 2 |
| 2 | 3 |
| 3 | 4 |
| 4 | 5 |
| 5 | 6 |
| 6 | 1 |
| 7 | 7 |
FIG. 22P

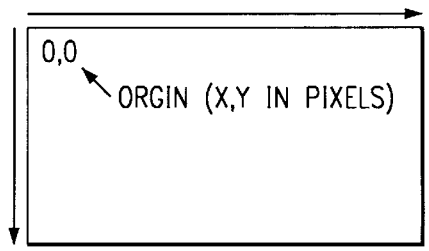
FIG. 22Q
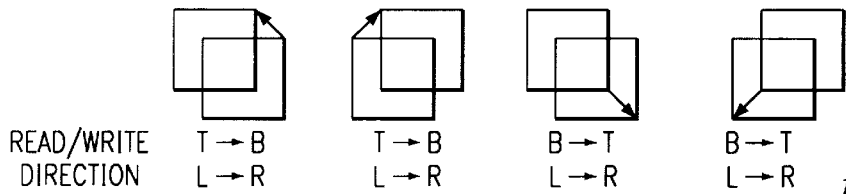
FIG. 22R
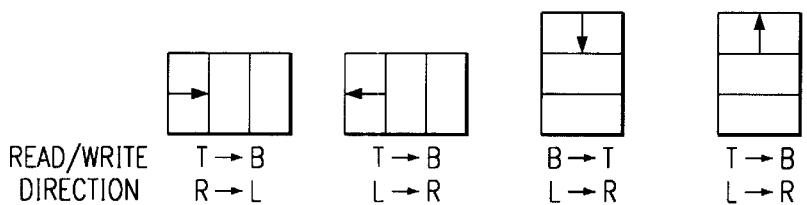
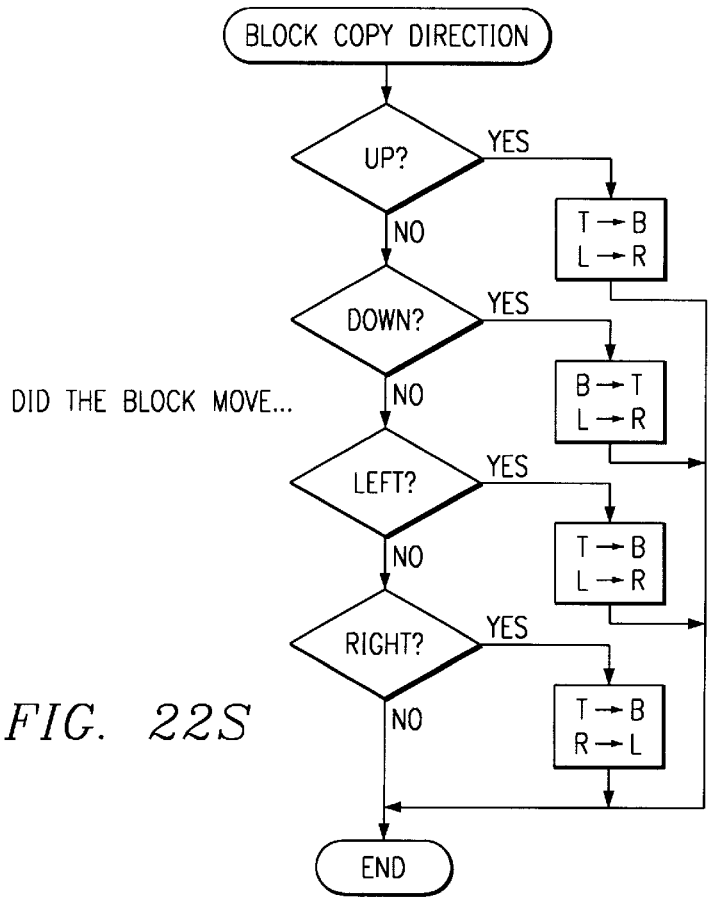
FIG. 22S

AUDIO AND VIDEO DECODER CIRCUIT AND SYSTEM

CROSS-REFERENCE TO INCORPORATED PROVISIONAL APPLICATIONS

Provisional Application Ser. Nos. 60/030,107, 60/030,106, 60/030,105, 60/030,104, 60/030,108 and 60/029,923, all filed Nov. 1, 1996; and application Ser. No. 08/691,731, filed Aug. 2, 1996; are incorporated herein by reference. All of the foregoing applications have a common Assignee.

This application claims priority under 35 USC §119(e)(1) of Provisional Application Numbers: Ser. Nos. 60/030,107, 60/030,106, 60/030,105, 60/030,104, 60/030,108 and 60/029,923, all filed Nov. 1, 1996.

NOTICE (C) Copyright 1996 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD OF THE INVENTION

This invention generally relates to audio-visual systems and integrated circuits used therein, and more particularly, to improved audio-visual systems and improved integrated circuits used therein.

BACKGROUND OF THE INVENTION

Currently, digital television DSS/DVB signals are transmitted in an MPEG format. In the MPEG format, the signals are transmitted in the form of data packets, with each packet including a useful signal or data and a header signal or data containing information about the contents of the useful signal or data.

Such a digital signal generally consists of packets of various types, such as audio data packets, video data packets and packets containing information pertaining to the program transmitted.

In general, the decoding of such digital signals takes place in a decoder in a reception station, which identifies and selects, in the incoming signals, desired audio and video data packets and then decodes these packets to form data trains, of the audio and video types, respectively. The audio data trains are decoded by means of an audio decoder for forming an analog acoustic signal. Similarly, the video data trains are used to form an image as well as chrominance and luminance signals.

There are known devices for the identification of packets. These devices extract a piece of data from each header signal, which is representative of the type of the corresponding useful signal. They include a means for storing reference data in a memory, at addresses each corresponding to one packet type, and a means for comparing the piece of data extracted from each header signal with said reference data (stored in the memory) then delivering to a data processing unit for further processing, an address signal indicating the nature of the corresponding packet. The processing unit then selects the identified packets for decoding and for forming corresponding data trains.

For this type of identification device, the comparison between the piece of data extracted from the header signal and the reference data stored in memory is conducted successively; that is, at a transition of a synchronization clock, an extracted piece of data is compared to a reference piece of data.

However, since the transmission rate of the packets is very high, the packet being identified must be stored, for example, in a memory of the FIFO type, associated with a piloting circuit and then further processed by the data processing unit.

Consequently, this type of identification device is relatively slow, requires a large number of components, and requires a large amount of memory and/or local storage buffers.

International standardization committees have been working on the specification of the coding methods and transmission formats for several compression algorithms to facilitate world wide interchange of digitally encoded audiovisual data. The Joint Photographic experts Group (JPEG) of the International Standards Organization (ISO) specified an algorithm for compression of still images. The ITU (formerly CCITT) proposed the H.261 standard for video telephony and video conference. The Motion Pictures Experts Group (MPEG) of ISO specified a first standard, MPEG-1, which is used for interactive video and provides a picture quality comparable to VCR quality. MPEG has also specified a second standard, MPEG-2, which provides audiovisual quality of both broadcast TV and HDTV. Because of the wide field of applications MPEG-2 is a family of standards with different profiles and levels.

The JPEG coding scheme could be in principal also used for coding of images sequences, sometimes described as motion JPEG. However, this intraframe coding is not very efficient because the redundancy between successive frames is not exploited. The redundancy between succeeding frames can be reduced by predictive coding. The simplest predictive coding is differential interframe coding where the difference between a current pixel of the present frame and the corresponding pixel of the previous frame is quantized, coded and transmitted. To perform such interframe prediction a frame memory for storing one or more frames is required to allow for this pixel by pixel comparison. Higher efficiency than the simple differential interframe coding can be achieved by a combination of discrete cosine transform (DCT) and interframe prediction. For so-called hybrid coding the interframe difference, which is similar to JPEG, is obtained, DCT coded and then transmitted. In order to have the same prediction at both the receiver and transmitter the decoder is incorporated into the coder. This results in a special feedback structure at the transmitter which avoids coder-decoder divergence.

Variable word length coding results in a variable bit rate which depends on image content, sequence change, etc. Transmission of the coded information over a constant rate channel requires a FIFO buffer at the output to smooth the data rate. The average video rate has to be adjusted to the constant channel rate. This is performed by controlling the quantizer according to the buffer content. If the buffer is nearly full, the quantization is made more sever and thus the coded bitrate is reduced. Conversely, if the buffer is nearly empty, the quantization is relaxed.

In general, the MPEG coding use a special predictive coding strategy. The coding starts with a frame which is not differentially coded; it is called an Intraframe (I). Then prediction is performed for coding one frame out of every M frames. This allows computation of a series of predicted frames (P), while "skipping" M-1 frames between coded frames. Finally, the "skipped" frames are coded in either a forward prediction mode, backward prediction mode, or bi-directional prediction mode. These frames are called bi-directionally interpolated (B) frames. The most efficient prediction mode, in terms of bitrate, is determined by the encoder and its selected mode is associated with the coded data. Thus the decoder can perform the necessary operations in order to reconstruct the image sequence. A main difference between MPEG-1 and MPEG-2 is that MPEG-1 has been optimized for non-interlaced (progressive) format while MPEG-2 is a generic standard for both interlaced and progressive formats. Thus, MPEG-2 includes more sophisticated prediction schemes.

In more detail, motion pictures are provided at thirty frames per second to create the illusion of continuous motion. Since each picture is made up of thousands of pixels, the amount of storage necessary for storing even a short motion sequence is enormous. As higher and higher definitions are desired, the number of pixels in each picture grows also. This means that the frame memory used to store each picture for interframe prediction also grows; current MPEG systems use about 16 megabits (MB) of reference memory for this function. Fortunately, lossy compression techniques have been developed to achieve very high data compression without loss of perceived picture quality by taking advantage of special properties of the human visual system. (A lossy compression technique involves discarding information not essential to achieve the target picture quality to the human visual system). An MPEG decoder is then required to reconstruct in real time or nearly real time every pixel of the stored motion sequence; current MPEG decoders use at least about 16 MB of frame memory for reconstruction of frames using the encoded interframe prediction data.

The MPEG standard specifies both the coded digital representation of video signal for the storage media, and the method for decoding to achieve compatibility between compression and decompression equipment. The standard supports normal speed playback, as well as other play modes of color motion pictures, and reproduction of still pictures. The standard covers the common 525- and 625-line television, personal computer and workstation display formats. The MPEG-1 standard is intended for equipment supporting continuous transfer rate of up to 1.5 Mbits per second, such as compact disks, digital audio tapes, or magnetic hard disks. The MPEG-2 standard supports bit rates from 4 Mbits/sec (Mbits) to 15 Mbits and is targeted for equipment that complies with the International Radio Consultative Committee (CCIR) recommendation 601 (CCIR-601). The MPEG standard is intended to support picture frames at a rate between 24 Hz and 30 Hz. ISO-11171 entitled *Coding for Moving Pictures and Associated Audio for digital storage medium at 1.5 Mbit/s*, provides the details of the MPEG-1 standard. ISO-13838 entitled *Generic Coding of Moving Pictures and Associated Audio* provides the details of the MPEG-2 standard.

Under the MPEG standard, the picture frame is divided into a series of "Macroblock slices" (MBS), each MBS containing a number of picture areas (called "macroblocks") each covering an area of 16×16 pixels. Each of these picture areas is represented by one or more 8×8 matrices which elements are the spatial luminance and chrominance values. In one representation (4:2:2) of the macroblock, a luminance value (Y type) is provided for every pixel in the 16×16 pixels picture area (in four 8×8 "Y" matrices), and chrominance values of the U and V (i.e., blue and red chrominance) types, each covering the same 16×16 picture area, are respectively provided in two 8×8 "U" and two 8×8 "V" matrices. That is, each 8×8 U or V matrix covers an area of 8×16 pixels. In another representation (4:2:0), a luminance value is provided for every pixel in the 16×16 pixels picture area, and one 8×8 matrix for each of the U and V types is provided to represent the chrominance values of the 16×16 pixels picture area. A group of four continuous pixels in a 2×2 configuration is called a "quad pixel"; hence, the macroblock can also be thought of as comprising 64 quad pixels in an 8×8 configuration.

The MPEG standard adopts a model of compression and decompression. Initially, interframe redundancy is first removed from the color motion picture frames. To achieve interframe redundancy removal, each frame is designated either "intra" "predicted" or "interpolated" for coding purpose. Intraframes are least frequently provided, the predicted frames are provided more frequently than the intraframes, and all the remaining frames are interpolated frames. The values of every pixel in an intraframe ("I-picture") is independently provided. In a prediction frame ("P-picture"), only the incremental changes in pixel values from the last I-picture or P-picture are coded. In an interpolation frame ("B-picture"), the pixel values are coded with respect to both an earlier frame and a later frame. Again, large (16 MB) frame or reference memories are required to store frames of video to allow for this type of coding.

The MPEG standard does not require frames to be stored in strict time sequence, so that the intraframe from which a predicted frame is coded can be provided in the picture sequence either earlier or later in time from the predicted frame. By coding frames incrementally, using predicted and interpolated frames, much interframe redundancy can be eliminated which results in tremendous savings in storage requirements. Further, motion of an entire macroblock can be coded by a motion vector, rather than at the pixel level, thereby providing further data compression.

The next steps in compression under the MPEG standard remove intraframe redundancy. In the first step, a 2-dimensional discrete cosine transform (DCT) is performed on each of the 8×8 values matrices to map the spatial luminance or chrominance values into the frequency domain.

Next, a process called "quantization" weights each element of the 8×8 matrix in accordance with its chrominance or luminance type and its frequency. In an I-picture, the quantization weights are intended to reduce to one many high frequency components to which the human eye is not sensitive. In P- and B- pictures, which contain mostly higher frequency components, the weights are not related to visual perception. Having created many zero elements in the 8×8 matrix, each matrix can now be represented without information loss as an ordered list of a "DC" value, and alternating pairs of a non-zero "AC" value and a length of zero elements following the non-zero value. The list is ordered such that the elements of the matrix are presented as if the matrix is read in a zigzag manner (i.e., the elements of a matrix A are read in the order A00, A01, A10, A20, A11, A02, etc.). The representation is space efficient because zero elements are not represented individually.

Finally, an entropy encoding scheme is used to further compress the representations of the DC block coefficients and the AC value-run length pairs using variable length codes. Under the entropy encoding scheme, the more frequently occurring symbols are represented by shorter codes. Further efficiency in storage is thereby achieved.

In decompression, under MPEG, the processes of entropy encoding, quantization and DCT are reversed. The final step, called "absolute pixel generation", provides the actual pixels for reproduction, in accordance to the play mode (forward, reverse, slow motion e.g.), and the physical dimensions and attributes of the display used. Again, large (16 MB) frame or reference memories are required to store frames of video to allow for this type of reproduction.

Since the steps involved in compression (coding) and decompression (decoding), such as illustrated for the MPEG standard discussed above, are very computationally intensive and require large amounts of memory, for such a compression scheme to be practical and widely accepted, the decompression processor must be designed to provide decompression in real time, and allow economical implementation using today's computer or integrated circuit technology.

The purpose of the present invention is to overcome these short-comings and drawbacks. Improvements in circuits, integrated circuit devices, computer systems of all types, and methods to address all the just-mentioned challenges, among others, are desirable, as described herein.

SUMMARY OF THE PRESENT INVENTION

Generally, and in one form of the present invention, an improved audio-visual circuit is provided that includes a transport packet parsing circuit for receiving a transport data packet stream, a CPU circuit for initializing said integrated circuit and for processing portions of said data packet stream, a ROM circuit for storing data, a RAM circuit for storing data, an audio decoder circuit for decoding audio portions of said data packet stream, a video decoder circuit for decoding video portions of said data packet stream, an NTSC/PAL encoding circuit for encoding video portions of said data packet stream, an OSD coprocessor circuit for processing OSD portions of said data packets, a traffic controller circuit moving portions of said data packet stream between portions of said integrated circuit, an extension bus interface circuit, a P1394 interface circuit, a communication coprocessors circuit, an address bus connected to said circuits, and a data bus connected to said circuits.

The present invention provides a fully functional decoder using a single 16 Mbit external SDRAM.

The present invention provides a decoder that accepts transport bitstreams up to 40 Mbits per second.

The present invention provides an on-chip DES module for descrambling.

The present invention provides a video decoder that decodes MPEG-1 and MPEG-2 Main Profile and Main Level bitstreams.

The present invention provides an audio decoder that decodes MPEG-1 Layer I and II and MPEG-2 Multichannel bitstreams.

The present invention provides an audio output in both PCM and SPDIF formats.

The present invention provides an OSD processor that enables mixture of OSD and video data with transparent BitBLT hardware that accelerates memory block move.

The present invention provides a 32/16 bit ARM/Thumb processor that removes the need of another CPU in the set-top box.

The present invention provides a firmware that controls device operation and provides application access to hardware resources.

The present invention provides an on-chip NTSC/PAL encoder that incorporates Closed Caption and Video Aspect Ratio Identification Signal encoding and the MacroVision logic for anti-taping protection.

The present invention provides an analog Y, C, and Composite video outputs with 9-bit precision.

The present invention provides an internally or externally generated sync signals.

The present invention provides a digital video component output that also contains Aspect Ratio ID.

The present invention provides an on-chip SDRAM controller for 16, 20, 24, or 32 Mbit SDRAM.

The present invention provides a general purpose 16-bit extension bus.

The present invention provides a 1394 interface that allows connection to external 1394 devices.

The present invention provides two 2-wire UART data ports.

The present invention provides a Smart Card interface.

The present invention provides an $I^2C$ master/slave interface.

The present invention provides one IR, one SIRCSI, and one RF input data port.

The present invention provides two general purpose I/O pins.

The present invention provides a JTAG interface.

The present invention provides a 3.3 volt device with some 5 volt tolerant pins for interfacing to the 5 volt devices.

It is an object of the present invention to provide a fully functional decoder using a single 16 Mbit external SDRAM.

It is an object of the present invention to provide a decoder that accepts transport bitstreams up to 40 Mbits per second.

It is an object of the present invention to provide an on-chip DES module for descrambling.

It is an object of the present invention to provide a video decoder that decodes MPEG-1 and MPEG-2 Main Profile and Main Level bitstreams.

It is an object of the present invention to provide an audio decoder that decodes MPEG-1 Layer I and II and MPEG-2 Multichannel bitstreams.

It is an object of the present invention to provide an audio output in both PCM and SPDIF formats.

It is an object of the present invention to provide an OSD processor that enables mixture of OSD and video data with transparent BitBLT hardware that accelerates memory block move.

It is an object of the present invention to provide a 32/16 bit ARM/Thumb processor that removes the need of another CPU in the set-top box.

It is an object of the present invention to provide a firmware that controls device operation and provides application access to hardware resources.

It is an object of the present invention to provide an on-chip NTSC/PAL encoder that incorporates Closed Caption and Video Aspect Ratio Identification Signal encoding and the MacroVision logic for anti-taping protection.

It is an object of the present invention to provide an analog Y, C, and Composite video outputs with 9-bit precision.

It is an object of the present invention to provide an internally or externally generated sync signals.

It is an object of the present invention to provide a digital video component output that also contains Aspect Ratio ID.

It is an object of the present invention to provide an on-chip SDRAM controller for 16, 20, 24, or 32 Mbit SDRAM.

It is an object of the present invention to provide a general purpose 16-bit extension bus.

It is an object of the present invention to provide a 1394 interface that allows connection to external 1394 devices.

It is an object of the present invention to provide two 2-wire UART data ports.

It is an object of the present invention to provide a Smart Card interface.

It is an object of the present invention to provide an I²C master/slave interface.

It is an object of the present invention to provide one IR, one SIRCSI, and one RF input data port.

It is an object of the present invention to provide two general purpose I/O pins.

It is an object of the present invention to provide a JTAG interface.

It is an object of the present invention to provide a 3.3 volt device with some 5 volt tolerant pins for interfacing to the 5 volt devices.

BRIEF DESCRIPTION OF THE DRAWINGS

The invention may be understood by referring to the detailed description which follows, read in conjunction with the accompanying drawings in which:

FIGS. 16B through 16Q depict details of the traffic controller of FIG. 1B;

FIGS. 16R and 16Q illustrate details of the arbiter block 313-12 of FIG. 16N;

FIG. 17H describes the structure of the PES packet;

FIGS. 17I–17P depicts the details of a presently preferred embodiment of the TPP of FIG. 1B;

FIGS. 18Z to 18AR depict details of OSD portions of the presently preferred OSD block of FIG. 1B;

FIGS. 18AS to 18BA depict details of BitBLT portions of the presently preferred OSD block of FIG. 1B;

FIG. 19 shows example displays of two OSD output channels for the circuit of FIG. 1B;

FIG. 20 show an example of the IR input bitstream for the circuit of FIG. 1B;

FIG. 21 shows a model of the hardware interface for the circuit of FIG. 1B; and

Corresponding numerals and symbols in the different Figures refer to corresponding parts unless otherwise indicated.

DETAILED DESCRIPTION

Figure 1A:
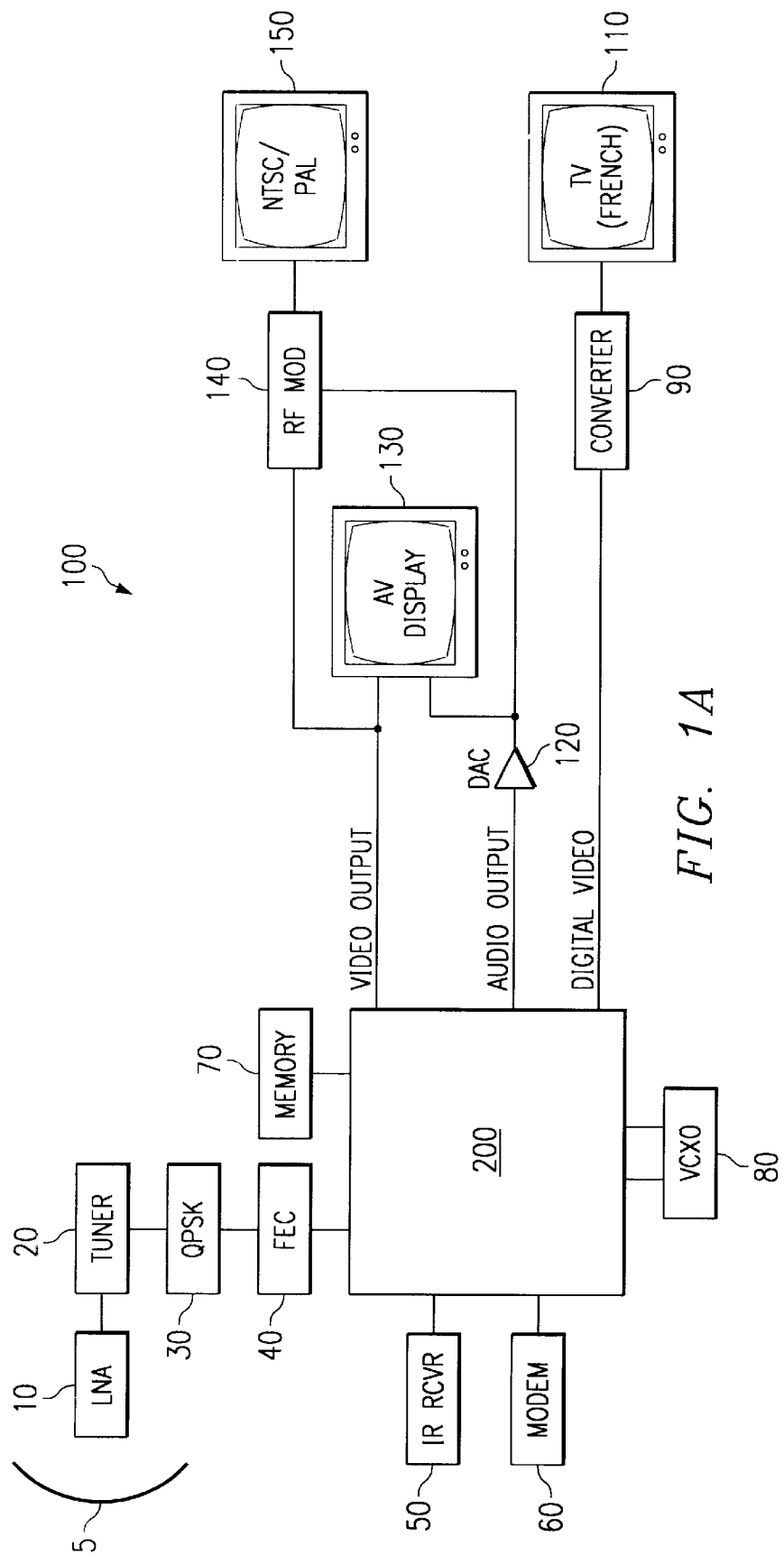
FIG. 1A depicts a communication system of the present invention.

The present invention provides an improved communications system 100. FIG. 1A depicts an improved communications system 100 of the present invention. More particularly, there may be seen a satellite reception dish 5 that receives signals from a satellite and provides them to a low noise amplifier 10. The low noise amplifier provides its signals to a tuner 20. The tuner 20 is employed to select the signals a user wishes to watch. The tuner 20 is connected to a quadrature phase-shift keying (QPSK) circuit 30 that recovers the digital data in the selected signal. This data is then error corrected by a forward error correction (FEC) circuit 40 using Viterbi, Reed-Solomon, or other techniques to compensate for data errors. The corrected received data is then passed to the circuit 200 of the present invention. The circuit 200 parses the packets of data and converts the data to video, audio and OSD, which may be appropriately displayed on an audio/visual display 130 or after RF modulation 110, on an NTSC/PAL TV 150. Alternatively, the digital video output may be converted, via a converter 90 and displayed on other types of TV's 110, for example, a French TV.

The audio output is converted to an analogue signal by DAC 120. The circuit 200 is also shown connected to a memory 70, an infrared (IR) receiver 50, a modem 60 and a voltage controlled oscillator (VCXO) 80 that provides circuit 200 with a precise but adjustable clock. The clock is adjusted to be synchronized with the clock signals found in the received digital data.

Figure 1B:
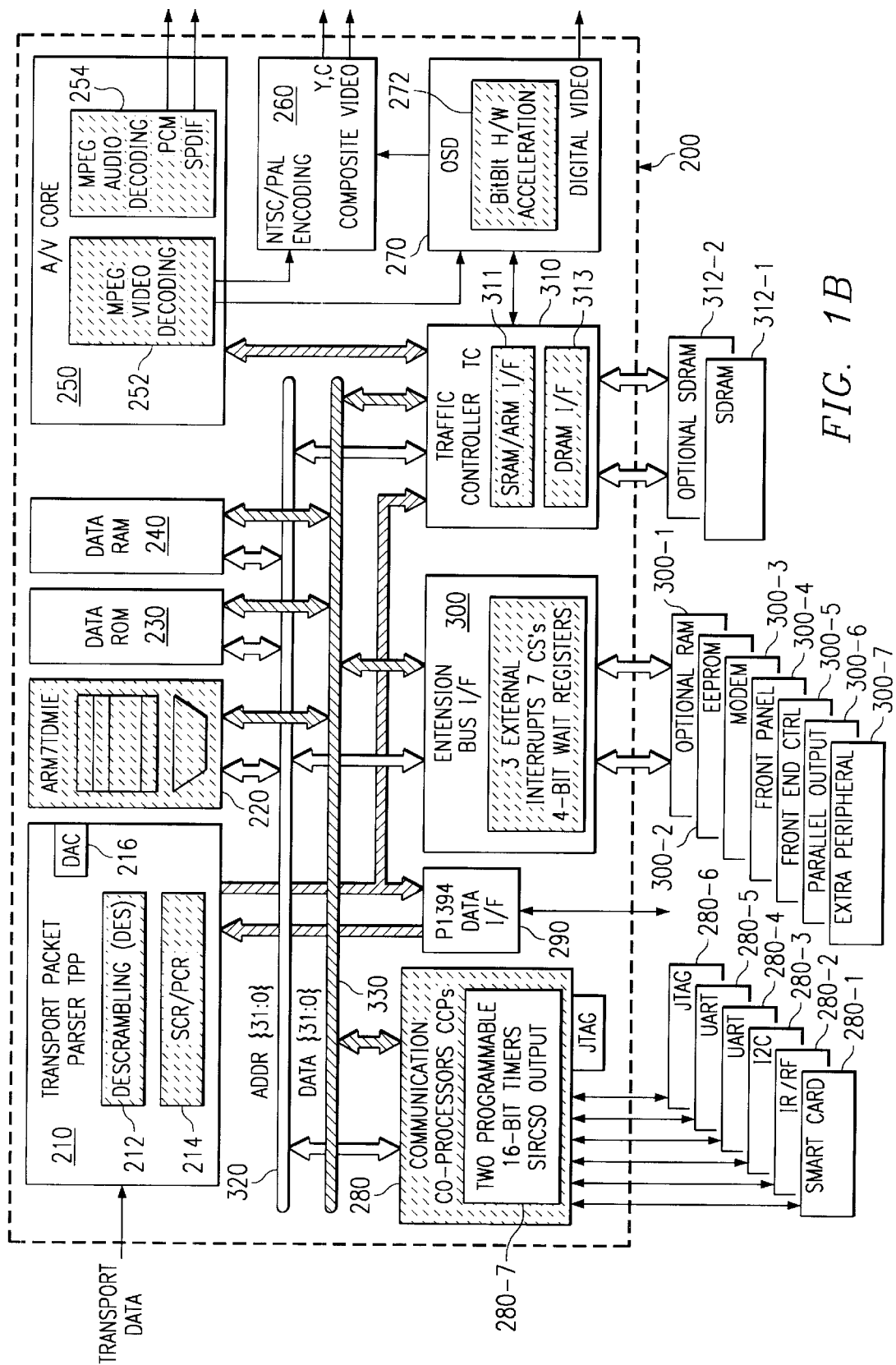
FIG. 1B depicts a high level functional block diagram of a circuit that forms a portion of the communications system of the present invention.

Referring now to FIG. 1B, there may be seen a high level functional block diagram of a circuit 200 that forms a portion of a communications system 100 of the present invention and its interfaces with off-chip devices and/or circuitry. More particularly, there may be seen the high level architecture of a circuit, including on-chip interconnections, that is preferably implemented on a single chip as depicted by the dashed line portion of FIG. 1B.

As depicted inside the dashed line portion of FIG. 1B, this circuit consists of a transport packet parser (TPP) block or module 210 that includes a bitstream decoder or descrambler 212 and clock recovery circuitry 214, an ARM CPU block 220, a data ROM block 230, a data RAM block 240, an audio/video (A/V) core block 250 that includes an MPEG-2 audio decoder 254 and an MPEG-2 video decoder 252, an NTSC/ PAL video encoder block 260, an on screen display (OSD) controller block 270 to mix graphics and video that includes a bitblt hardware (H/W) accelerator 272, a communication coprocressors (CCP) block 280 that includes connections for two UART serial data interfaces 280-4, 280-5, infrared (IR) and radio frequency (RF) inputs 280-2, SIRCS input and output 280-7, an I2C port 280-3 and a Smart Card interface 280-1, a P1394 interface (I/F) block 290 for connection to an external 1394 device, an extension bus interface (I/F) block 300 to connect peripherals such as additional RS232 ports 300-6, display and control panels 300-4, 300-5, external ROM, DRAM 300-1, or EEPROM memory 300-2, a modem 300-3 and an extra peripheral 300-7, and a traffic controller (TC) block 310 that includes an SRAM/ARM (on-chip memory (CPU)) interface (I/F) 311 and a (memory) DRAM I/F 313.

There may also be seen an internal 32 bit address bus 320 that interconnects the blocks and an internal 32 bit data bus 330 that interconnects the blocks. The TPP receives a high speed bit stream of transport data that requires it to analyze the bit stream and direct the data to the right destination. The TPP discards packets not selected by an application and routes as many packets as possible without real-time help from either the ARM CPU 220 or software running on the ARM CPU. External program and data memory expansion 310-2, 300-1, 300-2, allows the circuit to support a wide range of audio/video systems, especially, for example, but not limited to, set-top boxes, from low end to high end.

The consolidation of all these functions onto a single chip with a large number of inputs and outputs allows for removal of excess circuitry and/or logic needed for control and/or communications when these functions are distributed among several chips and allows for simplification of the circuitry remaining after consolidation onto a single chip. More particularly, this consolidation results in the elimination of the need for an external CPU to control, or coordinate control, of all these functions. This results in a simpler and cost-reduced single chip implementation of the functionality currently available only by combining many different chips and/or by using special chipsets. However, this circuit, by its very function, requires a large number of inputs and outputs, entailing a high number of pins for the chip.

In addition, a JTAG block 280-6 is depicted that allows for testing of this circuit using a standard JTAG interface that is interconnected with this JTAG block.

In addition, FIG. 1B depicts that the circuit is interconnected to a plurality of other external blocks. More particularly, FIG. 1B depicts a set of external memory blocks. Preferably, the external memory is SDRAM 312, although clearly, other types of RAM may be so employed. The external memory 312 is described more fully later herein. The incorporation of any or all of these external blocks and/or all or portions of the external memories onto the chip is contemplated by and within the scope of the present invention.

Figure 2:
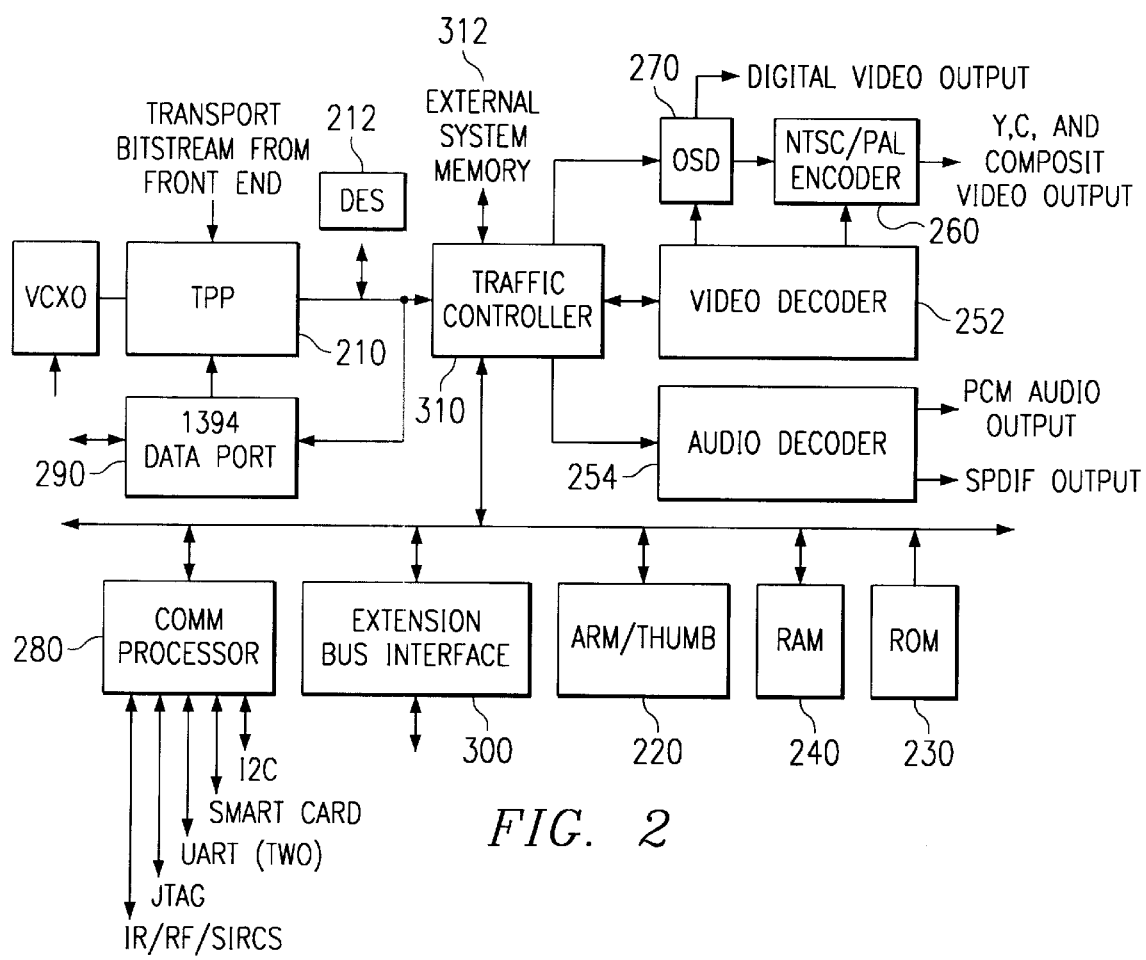
FIG. 2 depicts a portion of FIG. 1B and data flow between these portions.

Referring now to FIG. 2, there may be seen a portion of the components of FIG. 1B. The components depicted in FIG. 2, serve as the basis for an initial discussion of data flows between the components to help understand the functionality provided by each block or module and the overall circuit 200. Continuing to refer to FIG. 2, it may be seen how the circuit 200 accepts a transport bitstream from the output of a forward error correction (FEC) device (not depicted) with a maximum throughput of 40 Mbits/s or 7.5 Mbytes/s. The Transport Packet Parser (TPP) 210 in the circuit 200 processes the header of each packet and determines whether the packet should be discarded, further processed by ARM CPU 220, or if the packet contains relevant data and may be stored without any intervention from the ARM 220. The TPP 210 sends all packets requiring further processing or containing relevant data to the internal RAM 240 via the traffic controller (TC) 310. The TPP 210 also activates or deactivates the decryption engine (DES) 212 based on the content of an individual packet. Conditional access keys for decryption (or encryption) are stored in RAM 240 or off-chip memory locations, such as, for example, a smart-card, and managed by special firmware running on the ARM CPU 220. The data transfer from TPP 210 to SDRAM 312 is done via DMA set up by the traffic controller (TC) 310.

Further processing on the packet is done by the ARM firmware, which is activated by an interrupt from the TPP 210 after the completion of the packet data transfer. Two types of transport packets are stored in the RAM 240 which is managed as a first-in first-out buffer (FIFO). One type is for pure data which will be routed to SDRAM 312 without intervention from the ARM 220, and the other type is for packets that need further processing by the ARM 220. Within the interrupt service routine, the ARM 220 checks the FIFO for packets that need further processing, performs necessary parsing, removes the header portion, and establishes DMA for transferring payload data from RAM 240 to SDRAM 312. The traffic controller 310 repacks the data and gets rid of the voids created by any header removal.

Together with the ARM 220, the TPP 210 also handles System Clock Reference (SCR) recovery with an external VCXO 80. The TPP 210 will latch and transfer to the ARM 220 its internal system clock upon the arrival of any packet which may contain system clock information. After further processing on the packet and identifying the system clock, the ARM 220 calculates the difference between the system clock from a bitstream and the actual system clock at the time the packet arrives. Then, the ARM 220 filters the difference and sends it through a Sigma-Delta DAC 216 in the TPP 210 to control the external voltage controlled oscillator (VCXO) 80. During start-up when there is no incoming SCR, the ARM will drive the VCXO 80 to its center frequency.

The TPP 210 will also detect packets lost from the transport stream. With error concealment by the audio/video decoder and the redundant header from DSS bitstream, the circuit 200 minimizes the effect of lost data.

After removing packet headers and other system related information, both audio and video data is stored in external SDRAM 312. The video 252 and audio 254 decoders then read the bitstream from SDRAM 312 and process it according to the ISO standards. The circuit 200 decodes MPEG-1 and MPEG-2 main profile at main level for video and Layer I and II MPEG-1 and MPEG-2 for audio. Both video 252 and audio 254 decoders synchronize their presentation using the transmitted Presentation Time Stamps (PTS). In a Digital Satellite System (DSS), the PTS is transmitted as picture user data in the video bitstream and an MPEG-1 system packet bitstream for audio. Dedicated hardware decodes the PTS if it is in the MPEG-1 system packet and forwards it to the audio decoder 254. The video decoder 252 decodes PTS from picture user data. Both video 252 and audio 254 decoders compare PTS to the local system clock in order to synchronize presentation of the reconstructed data. The local system clock is continuously updated by the ARM 220. That is, every time the System Clock Reference (SCR) of a selected SCID is received and processed, the ARM 220 will update the decoder system clock.

The video decoder 252 is capable of producing decimated pictures using ½ or ¼ decimation per dimension, which results in reduced areas of ¼ or ¹⁄₁₆. The decimated picture can be viewed in real time. Decimation is achieved by using field data out of a frame, skipping lines, and performing vertical filtering to smooth out the decimated image.

When decoding a picture from a digital recorder, the decoder can handle trick modes (decode and display I frame only), with the limitation that the data has to be a whole picture instead of several intra slices. Random bits are allowed in between trick mode pictures. However, if the random bits emulate any start code, it will cause unpredictable decoding and display errors.

Closed Caption (CC) and Extended Data Services (EDS) are transmitted as picture layer user data. The video decoder 252 extracts the CC and EDS information from the video bitstream and sends it to the NTSC/PAL encoder module 260.

The video decoder 252 also extracts the aspect ratio from the bitstream and sends it to the ARM 220 which prepares data according to the Video Aspect Ratio Identification Signal (VARIS) standard, EIAJ CPX-1204. The ARM 220 then sends it to the NTSC/PAL encoder 260 and OSD module 270.

The OSD data may come from the user data in the bitstream or may be generated by an application executed on the ARM 220. Regardless of the source, the OSD data will be stored in the SDRAM 312 and managed by the ARM 220. However, there may be limited space in the SDRAM 312 for OSD. Applications that require large quantities of OSD data preferably store them in an external memory attached to the extension bus 300. Based on a request from a user application, the ARM 220 will turn the OSD function on and specify how and where the OSD will be mixed and displayed along with the normal video sequence. The OSD data can be represented in one of the following forms: bitmap, graphics 4:4:4 component, CCIR 601 4:2:2 component, or just background color. A special, dedicated bitBLT hardware 272 expedites memory block moves between different windows.

DES 212 processing is signaled by the arrival of a control word packet. That is, a conditional access is triggered by the arrival of a control word packet (CWP). The ARM firmware recognizes a CWP has been received and hands it to the Verifier, which is NewsDataCom (NDC) application software running on the ARM 220. The Verifier reads the CWP and communicates with an external Smart Card through a Smart Card I/O interface in communication coprocessor 280. After verification, it passes the pointer to an 8 byte key back to the firmware, which then loads the key for the DES 212 to decrypt succeeding packets.

The ARM 220 is a 32-bit processor running at 40.5 MHz and with its associated firmware provide the following: initialization and management of all hardware modules; service for selected interrupts generated by hardware modules and I/O ports; and application program interface (API) for users to develop their own applications.

The ARM firmware is stored in the on-chip ROM 230, except for OSD graphics and some generic run time support code. The ROM 230 is preferably 12K bytes, but other sizes may be so employed. The on-chip RAM 240 provides the space necessary for the circuit 200 to properly decode transport bitstreams without losing any packets. The RAM 240 is preferably 4.5K bytes, but other sizes may be so employed. The run-time support library (RTSL) and all user application software is presently preferred to be located in memory outside the circuit 200. Details of the firmware and RTSL are provided later herein.

There are two physical DMA channels managed by the traffic controller 310 to facilitate large block transfers between memories and buffers. That is, as long as there is no collision in the source and destination, it is possible to have two concurrent DMA transfers. A more detailed description of these DMA functions is provided later herein in subsequent discussions of the details of the traffic controller 310.

Figure 3:
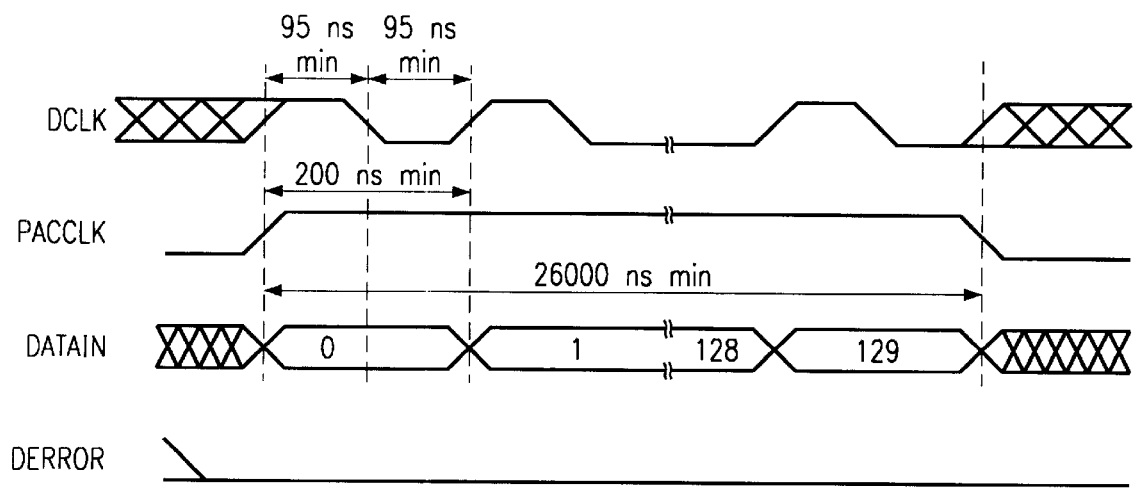
FIG. 3 shows the input timing for the circuit of FIG. 1B.

The circuit 200 accepts DSS transport packet data from a front end such as a forward error correction (FEC) unit. The data is input 8 bits at a time, using a byte clock, DCLK. PACCLK high signals valid packet data. DERROR is used to indicate a packet that has data errors. The timing diagram in FIG. 3 shows the input timings for such data.

As part of the communication coprocessor 280, the circuit 200 includes an interface to the Smart Card access control system. The interface consists of a high speed UART and logic to comply with the News Datacom specification (Document #HU-T052, Release E dated November 1994, and Release F dated January 1996) *Directv Project: Decoder-Smart Card Interface Requirements*. Applicable software drivers that control the interface are also included, and are described later herein.

It should be noted that the circuit 200 is preferably a 3.3 volt device, while the Smart Card requires a 5 volt interface. The circuit 200 will output control signals to turn the card's VCC and VPP on and off as required, but external switching will be required. It is also possible that external level shifters may be needed on some of the logic signals.

A NTSC/PAL pin selects between an NTSC or a PAL output from encoder 260. Changing between NTSC and PAL mode requires a hardware reset of the device 200.

The circuit 200 produces an analog S-video signal on two separate channels, the luminance (Y) and the chrominance (C). It also outputs the analog composite (Comp) signal. All three outputs conform to the RS170A standard.

The circuit 200 also supports Closed Caption and Extended Data Services. The analog output transmits CC data as ASCII code during the twenty-first video line. The NTSC/PAL encoder module inserts VARIS codes into the 20th video line for NTSC and 23rd line for PAL.

The digital output provides video in either 4:4:4 or 4:2:2 component format, plus the aspect ratio VARIS code at the beginning of each video frame. The video output format is programmable by the user but defaults to 4:2:2. The content of the video could be either pure video or the blended combination of video and OSD.

The pin assignments for the digital video output signals are:

YCOUT(8) 8-bit Cb/Y/Cr/Y and VARIS multiplexed data output

YCCLK(1) 27 MHz or 40.5 MHz clock output

YCCTRL(2) 2-bit control signals to distinguish between Y/Cb/Cr components and VARIS code The interpretation of YCCTRL is defined in the following table.

TABLE 1

Digital Output Control

| SIGNALS | YCCTRL[1] | YCCTRL[0] |
|---|---|---|
| Component Y | 0 | 0 |
| Component Cb | 0 | 1 |
| Component Cr | 1 | 0 |
| VARIS code | 1 | 1 |

The aspect ratio VARIS code includes 14 bits of data plus a 6-bit CRC, to make a total of 20 bits. In NTSC the 14-bit data is specified as shown in Table 2.

TABLE 2

VARIS Code Specification

| | Bit Number | Contents |
|---|---|---|
| Word0 A | 1 | Communication aspect ratio: 1 = full mode (16:9), 0 = 4:3 |
| | 2 | Picture display system: 1 = letter box, 0 = normal |
| | 3 | Not used |
| Word0 B | 4 | Identifying information for the picture and |
| | 5 | other signals (sound signals) that are related |
| | 6 | to the picture transmitted simultaneously |
| Word1 | 4-bit range | Identification code associated to Word0 |
| Word2 | 4-bit range | Identification code associated to Word0 and other information |

The 6-bit CRC is calculated, with the preset value to be all 1, based on the equation $G(X)=X^6+X+1$.

The 20-bit code is further packaged into 3 bytes according to the following format illustrated in Table 3.

TABLE 3

Three Byte VARIS Code

| | b7 | b6 | b5 | b4 | b3 | b2 | b1 | b0 |
|---|---|---|---|---|---|---|---|---|
| 1st Byte | — | — | Word0 B | | | Word0 A | | |
| 2nd Byte | | Word2 | | | | Word1 | | |
| 3rd Byte | VID_EN | — | | | CRC | | | |

The three byte VARIS code is constructed by the ARM 220 as part of the initialization process. The ARM 220 calculates two VARIS codes corresponding to the two possible aspect ratios. The proper code is selected based on the aspect ratio from the bitstream extracted by the video decoder 252. The user can set VID_EN to signal the NTSC/PAL encoder to enable (1) or disable (0) the VARIS code. The transmission order is the 1st byte first and it is transmitted during the non-active video line and before the transmission of video data.

Figure 4:
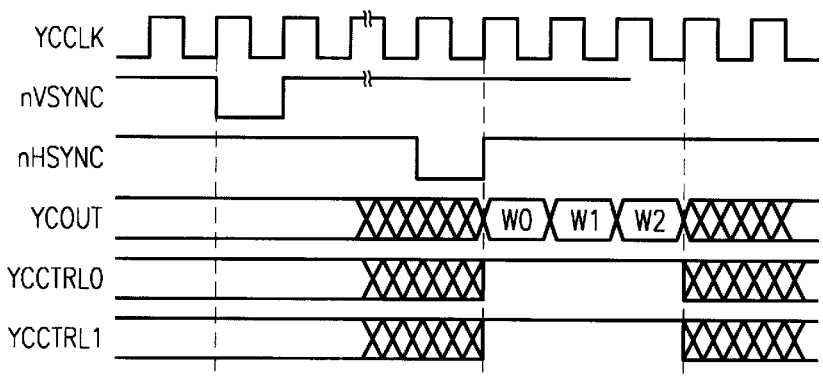
FIG. 4 shows the timing of the VARIS output for the circuit of FIG. 1B.
Figure 5:
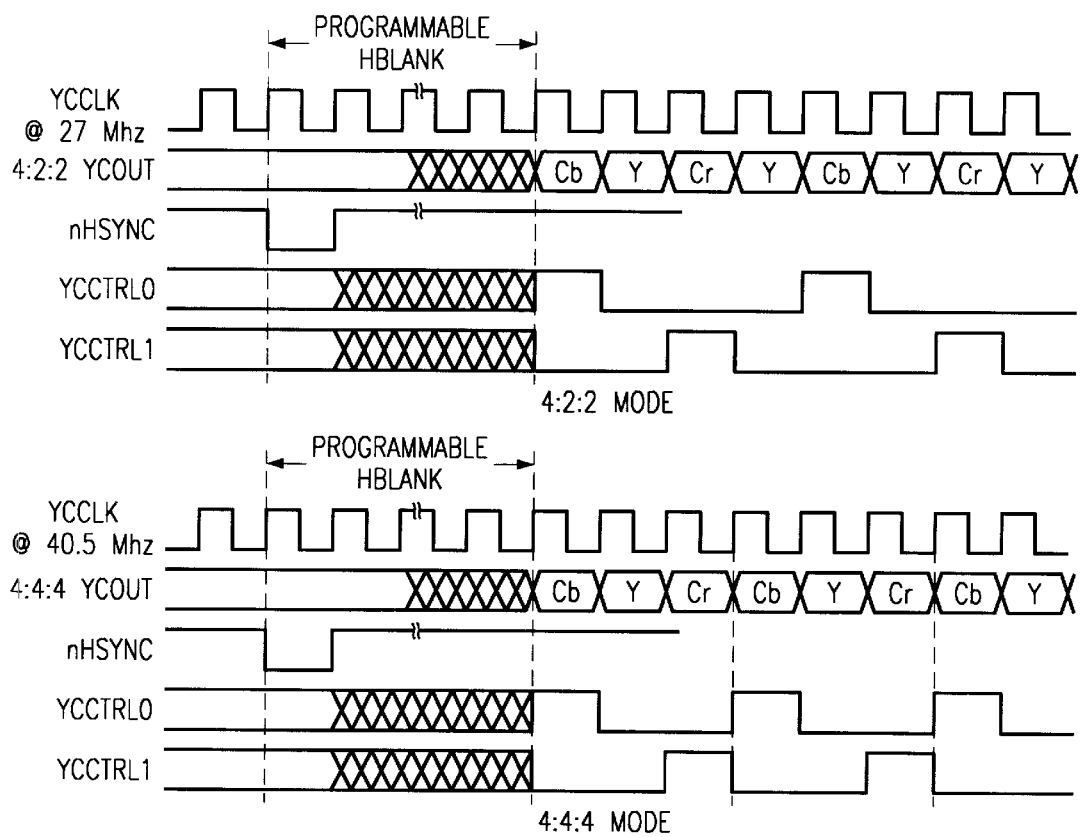
FIG. 5 shows the timing of 4:2:2 and 4:4:4 digital video output for the circuit of FIG. 1B.

The timing of the VARIS output is shown in the following FIG. 4. The timing of 4:2:2 and 4:4:4 digital video output is shown in FIG. 5.

The PCM audio output from the audio decoder 254 is a serial PCM data line, with associated bit and left/right clocks.

Figure 6:
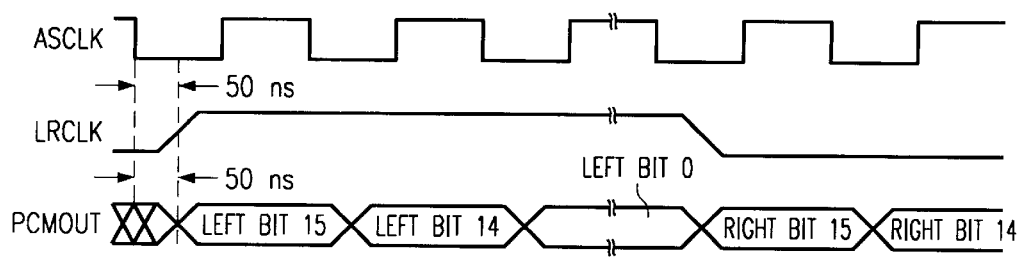
FIG. 6 depicts the data output of PCMOUT alternates between the two channels, as designated by LRCLK for the circuit of FIG. 1B.

PCM data is output serially on PCMOUT using the serial clock ASCLK. ASCLK is derived from the PCM clock, PCMCLK, according to the PCM Select bits in the control register. PCM clock must be the proper multiple of the sampling frequency of the bitstream. The PCMCLK may be input to the device or internally derived from an 18.432 MHz clock, depending on the state of the PCM_SRC pin. The data output of PCMOUT alternates between the two channels, as designated by LRCLK as depicted in FIG. 6. The data is output most significant bit first. In the case of 18-bit output, the PCM word size is 24 bits. The first six bits are zero, followed by the 18-bit PCM value.

The SPDIF output conforms to a subset of the AES3 standard for serial transmission of digital audio data. The SPDIF format is a subset of the minimum implementation of AES3.

When the PCM_SRC pin is low, the circuit 200 generates the necessary output clocks for the audio data, phase locked to the input bitstream. However, the clock generator requires an additional 18.432 MHz external VCXO 254-1 and outputs a control voltage that can be applied to the external loop filter and VCXO to produce the required input. The clock generator derives the correct output clocks, based on the contents of the audio control register bits PCMSEL1-0, as shown in the following table.

TABLE 4

Audio Clock Frequencies

| PCMSEL1-0 | Description | LRCLK (KHz) | ASCLK (MHz) | PCMCLK (MHz) |
|---|---|---|---|---|
| 00 | 16 bit PCM, no oversampling | 48 | 1.5360 | 1.5360 |
| 01 | 16 bit PCM, 256 x oversampling | 48 | 1.5360 | 12.288 |
| 10 | 18 bit PCM, no oversampling | 48 | 2.304 | 2.304 |
| 11 | 18 bit PCM, 384 x oversampling | 48 | 2.304 | 18.432 |

Figure 7:
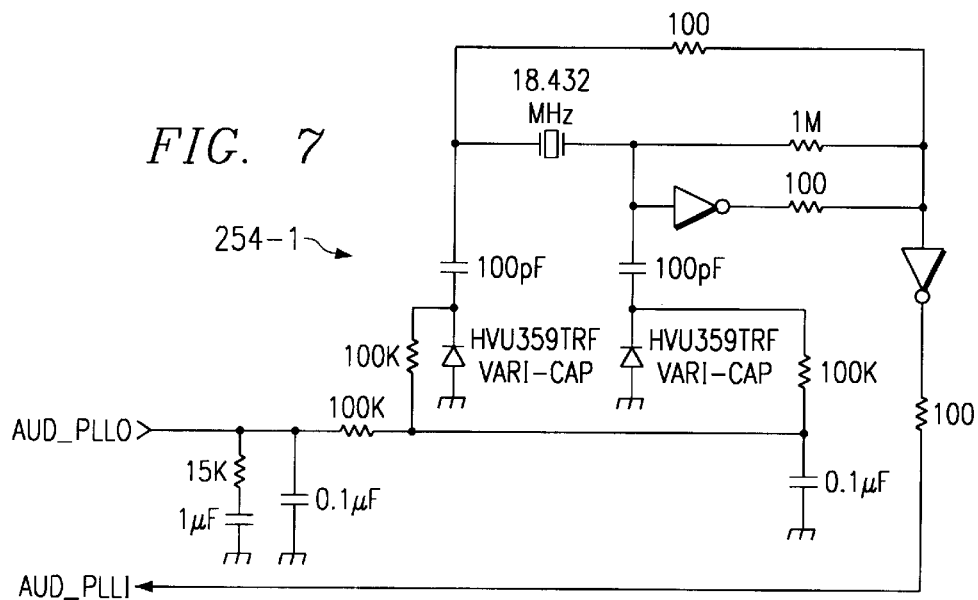
FIG. 7 shows an example circuit where maximum clock jitter will not exceed 200 ps RMS for the circuit of FIG. 1B.

Maximum clock jitter will not exceed 200 ps RMS. A representative VCXO circuit is shown in FIG. 7.

When PCM_SRC is high, the circuit 200 expects the correct PCM oversampling clock frequency to be input on PCMCLK.

The SDRAM 312 is preferably 16-bit wide SDRAM. The DRAM I/F 313 of the TC 310 is presently preferably configured for this type of bit width; clearly other widths may be selected and so employed. The circuit 200 provides control signals for up to two SDRAMs. Any combination of 4, 8, or 16 Mbit SDRAMs may be used, provided they total at least 16 Mbits. The SDRAM must operate at an 81 MHz clock frequency and have the timing parameters described later herein.

The extension bus interface 300 is a 16-bit bi-directional data bus with a 25-bit address for byte access. It also provides 3 external interrupts, each with it's own acknowledge signal, and a wait line. All the external memories or I/O devices are mapped to the 32-bit address space of the ARM. There are seven internally generated Chip Selects (CSx) for EEPROM memory 300-2, DRAM 300-1, modem 300-3, front panel 300-4, front end control 300-5, parallel output port 300-6, and extra peripheral 300-7. Each CS has its own defined memory space and a programmable wait state register which has a default value 1. The number of wait states depends on the content of the register, with a minimum of one wait state. The EXTWAIT signal can also be used to lengthen the access time if a slower device exists in that memory space.

The extension bus 300 supports the connection of 7 devices using the pre-defined chip selects. Additional devices may be used by externally decoding the address bus. The following table shows the name of the device, its chip select, address range, and programmable wait state. Every device is required to have tri-stated data outputs within 1 clock cycle following the removal of its chip-select (CS).

TABLE 5

Extension Bus Chip Select

| Chip Select | Byte Address Range | Wait State | Device |
|---|---|---|---|
| CS1 | 0200 0000 - 03FF FFFF | 1 - 5 | EEPROM (up to 32 MBytes) |
| CS2 | 0400 0000 - 05FF FFFF | N/A | DRAM (up to 32 MBytes) |
| CS3 | 0600 0000 - 07FF FFFF | 1 - 7 | Modem |
| CS4 | 0800 0000 - 09FF FFFF | 1 - 7 | Front Panel |
| CS55 | 0A00 0000 - 0BFF FFFF | 1 - 7 | Front End Device |
| CS6 | 0C00 0000 - 0DFF FFFF | 1 - 7 | 1394 Link Device |
| CS7 | 0E00 0000 - 0FFF FFFF | 1 - 4 | Parallel Data Port |

CS1 is intended for ARM 220 application code, but writes will not be prevented.

CS2 is read/write accessible by the ARM 220. It is also accessed by the TC 310 for TPP 210 and bitBLT 272 DMA transfers.

CS3, CS4, CS5, and CS6 all have the same characteristics. The ARM 220 performs reads and writes to these devices through the extension bus.

CS7 is read and write accessible by the ARM 220. It is also accessed by the TC 310 for TPP 210 DMAs, and it is write only. The parallel port is one byte wide and it is accessed via the least significant byte.

Figure 8:
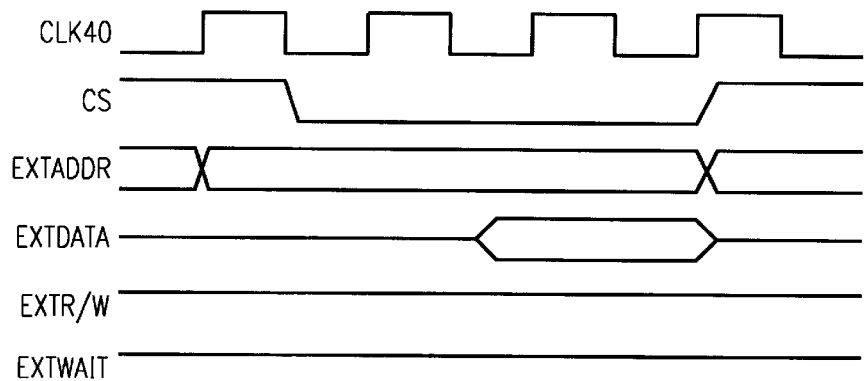
FIG. 8 (read) and FIG. 9 (write) show extension bus read and write timing, both with two programmable wait states for the circuit of FIG. 1B.
Figure 9:
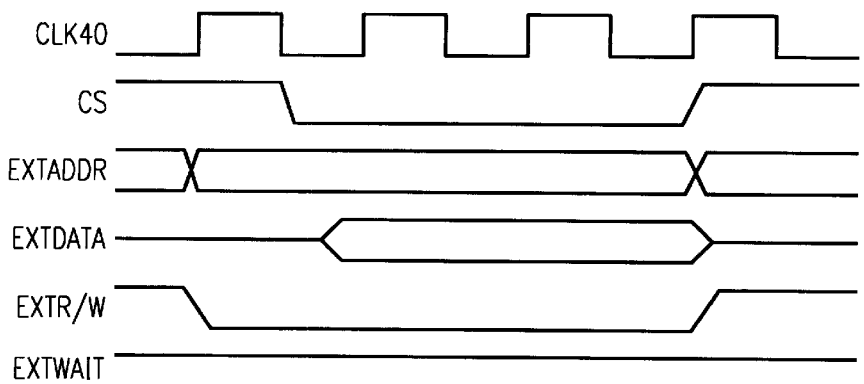

The extension bus 300 supports connection to external EEPROM, SRAM, or ROM 300-2 memory and DRAM 300-1 with its 16-bit data and 25-bit address. The extension bus 300 supports access to 70 ns DRAM with 2 wait states. The DRAM must have a column address that is 8-bits, 9-bits, or 10-bits wide. The DRAM preferably has a data width of 8 or 16 bits. Byte access is allowed even when the DRAM has a 16 bit data width. The system default DRAM configuration is 9-bit column address and 16-bit data width. The firmware will verify the configuration of DRAM during start up. The extension bus 300 also supports DMA transfers to/from the extension bus. DMA transfers within the extension bus are not supported. However, they may be accomplished by DMA to the SRAM, followed by DMA to the extension bus. Extension bus read and write timing are shown in FIG. 8 (read) and FIG. 9 (write), both with two programmable wait states. The number of wait states may be calculated by the following formula:

# of wait states=round_up[((CS_delay+device_cycle_time)/24)−1]

For example, the CS_delay on the chip is 20 nsec. A device with 80 nsec read timing will need 4 wait states.

There are three interrupt lines and three interrupt acknowledges in the circuit 200. These interrupts and interrupts from other modules are handled by a centralized interrupt handler. The interrupt mask and priority are managed by the firmware. The three extension bus interrupts are connected to three different IRQs. When the interrupt handler on the ARM 220 begins servicing one of these IRQs, it should first issue the corresponding EXTACK signal. At the completion of the IRQ, the ARM 220 should reset the EXTACK signal.

Figure 10:
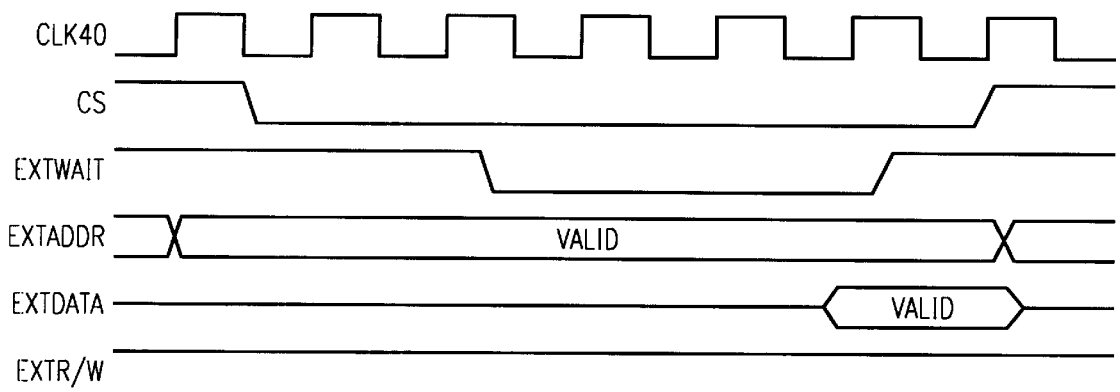
FIG. 10 shows the timing diagram of a read with EXT-WAIT signal on for the circuit of FIG. 1B.

The EXTWAIT signal is an alternative way for the ARM 220 to communicate with slower devices. It can be used together with the programmable wait state, but it has to become active before the programmable wait cycle expires. The total amount of wait states should not exceed the maximum allowed from Table 5. If the combined total wait states exceeds its maximum, the decoder is not guaranteed to function properly. When a device needs to use the EXTWAIT signal, it should set the programmable wait state to at least 2. Since the EXTWAIT signal has the potential to stall the whole decoding process, the ARM 220 will cap its waiting to 490 nanoseconds. Afterwards, the ARM 220 assumes the device that generated the EXTWAIT has failed and will ignore EXTWAIT from then on. Only a software or hardware reset can activate the EXTWAIT signal again. The timing diagram of a read with EXTWAIT signal on is shown in the FIG. 10.

The circuit 200 includes an Inter Integrated Circuit ($I^2C$) serial bus interface that can act as either a master (default) or slave. Only the 'standard mode' (100 kbit/s) $I^2C$-bus system is implemented; 'fast mode' is not supported. The interface uses 7-bit addressing. When in slave mode, the address of the circuit 200 is programmed by the API.

Timing for this interface matches the standard timing definition of the $I^2C$ bus.

The circuit 200 includes two general purpose 2-wire UARTs that are memory mapped and fully accessible by application programs. The UARTs operate in asynchronous mode only and support baud rates of 1200, 2400, 4800, 9600, 14400, 19200 and 28800 kbps. The outputs of the UARTs are digital and require external level shifters for RS232 compliance.

The IR, RF, and SIRCSI ports require a square wave input with no false transitions; therefore, the signal must be thresholded prior to being applied to the pins. The interface will accept an IR, RF, or SIRCSI data stream up to a frequency of 1.3 KHz. Although more than one may be active at any given time, only one IR, RF, or SIRCSI input will be decoded. Decoding of the IR, RF, and SIRCSI signals will be done by a combination of hardware and software. A more detailed description of these IR, RF functions is provided later herein in subsequent discussions of the details of the module 280.

SIRCSO outputs the SIRCSI or IR input or application-generated SIRCSO codes.

Figure 11:
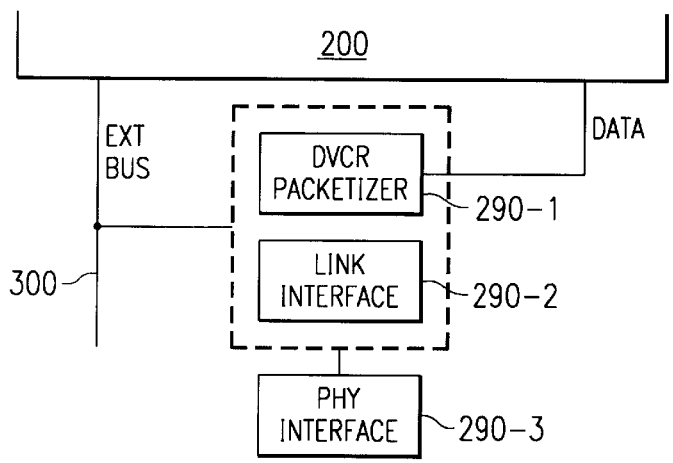
FIG. 11 depicts the connection between circuitry of the present invention, an external packetizer, Link layer, and Physical layer devices.

The circuit 200 provides a dedicated data interface for 1394 290. To complete the implementation, the circuit 200 requires an external packetizer 290-1, Link layer 290-2, and Physical layer 290-3 devices. FIG. 11 depicts the interconnection of these components.

The control/command to the packetizer or the Link layer interface device is transmitted via the extension bus 300. The 1394 data is transferred via the 1394 interface which has the following 14 signals:

TABLE 6

1394 Interface Signals

| Signal Name | I/O | Description |
| --- | --- | --- |
| PDATA (8) | I/O | 8 bit data |
| PWRITE (1) | O | if PWRITE is high (active) the circuit writes to the Link device |
| PPACEN (1) | I/O | asserted at the beginning of a packet and remains asserted during the time of packet transfer |
| PREADREQ (1) | I | asserted (active high) if the Link device is ready to output to the circuit and the stamped time comes |
| PREAD (1) | O | if PREAD is high (active) the circuit reads from the Link device |
| CLK40 (1) | O | 40.5 MHz clock. Wait states can be used to slow data transfer. |
| PERROR (1) | I/O | indicates a packet error |

Figure 12:
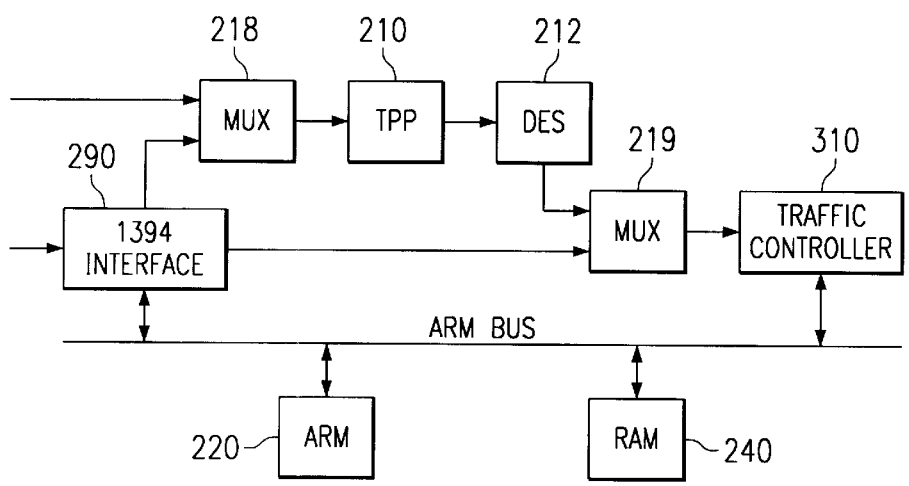
FIG. 12 shows a functional block diagram of the data flow between the TPP, DES, and 1394 interface.

In recording mode, the circuit 200 will send either encrypted or clean packets to the 1394 interface 290. The packet is transferred as it comes in. When recording encrypted data, the TPP 210 will send each byte directly to the 1394 290 interface and bypass the DES module 212. In the case of recording decrypted data, the TPP 210 will send the packet payload to the DES module 290, then forward a block of packets to the 1394 interface 290. The interface 290 sends the block of packets out byte by byte. No processing will be done to the packet during recording, except setting the encrypt bit to the proper state. In particular, the TPP 210 will not remove CWP from the Auxiliary packet. During playback mode, the packet coming from the interface will go directly into the TPP 210 module. FIG. 12 shows the functional block diagram of the data flow between the TPP 210, DES 212, and 1394 interface 290, via muxes 218 and 219. The packet coming out from TPP 210 can go either to the 1394 interface 290 or to the RAM 240 through traffic controller TC, or to both places at the same time. This allows the circuit 200 to decode one program while recording from 1 to all 32 possible services from a transponder.

Figure 13:
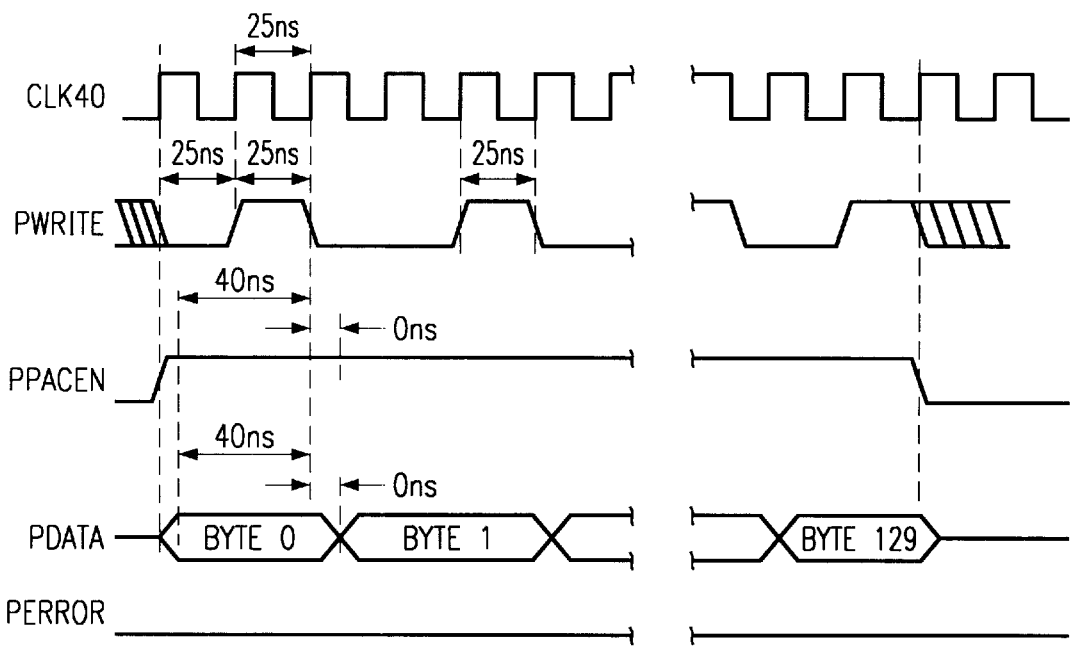
FIGS. 13 and 14 depict the read and write timing relationships on the 1394 interface for the circuit of FIG. 1B.
Figure 14:
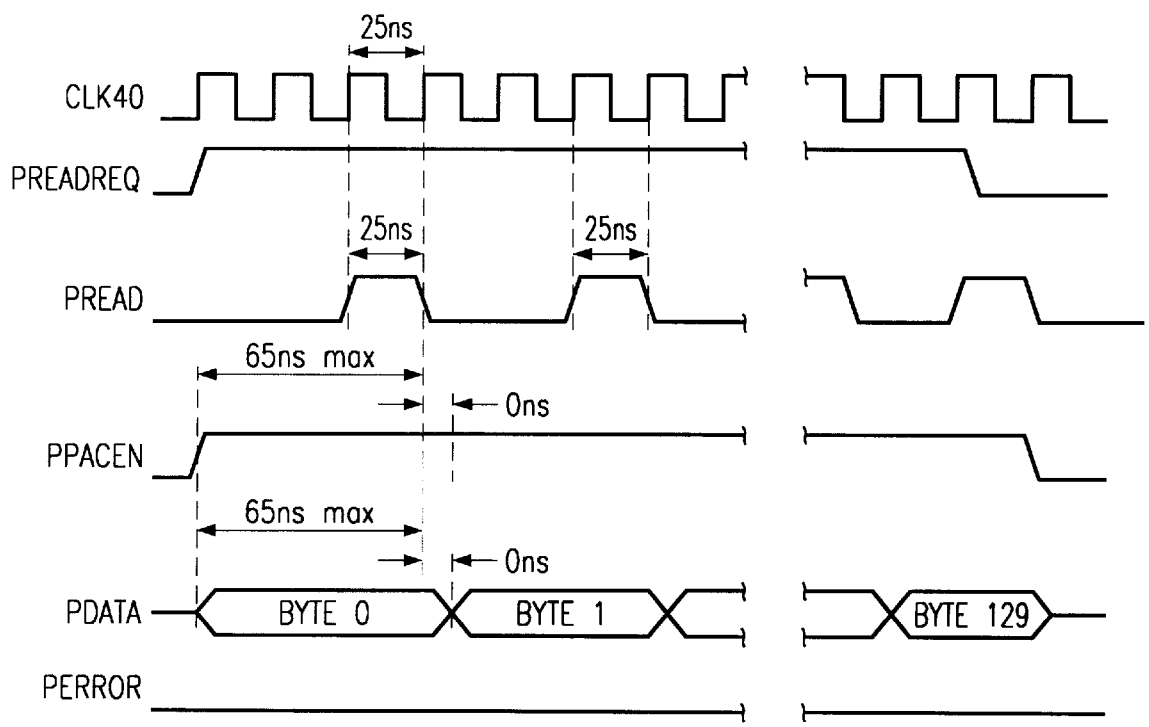

FIGS. 13 and 14 depict the read and write timing relationships on the 1394 interface 290. In FIG. 13, CLK40 is 40.5 MHz. When PPACEN is high, circuit 200 toggles PWRITE as needed to output data. There should preferably be at least one cycle between the time that PDATA is valid to the time PWRITE goes high. The duration of PWRITE is one cycle, 25 ns. In FIG. 14, PREADREQ can go high at any time before or coincident with the next packet and it should remain high at least one cycle. PPACEN goes high when PDATA ready and both are synchronized to CLK40. PREAD toggles for one cycle when PDATA will change.

During recording, if the DERROR signal from the front end interface goes high in the middle of a packet, it is forwarded to the PERROR pin. If DERROR becomes active in between packets, then a PERROR signal will be generated during the transfer of the next packet for at least one PDATA cycle.

During playback mode, the external 1394 device can only raise the PERROR signal when the PPACEN is active to indicate either error(s) in the current packet or that there are missing packet(s) prior to the current one. PERROR is ignored unless the PPACEN is active. The PERROR signal should stay high for at least two PCLK cycles. There should be at most one PERROR signal per packet.

The circuit 200 requires a hardware reset on power up. Reset of the device is initiated by pulling the RESET pin low, while the clock is running, for at least 100 ns. The following actions will then occur: input data on all ports will be ignored; external memory is sized; data pointers are reset; all modules are initialized and set to a default state: the TPP tables are initialized; the audio decoder is set for 16 bit output with 256× oversampling; the OSD background color is set to blue and video data is selected for both the analog and digital outputs; MacroVision is disabled; and the I$^2$C port is set to master mode.

When the reset sequence is finished, the device will begin to accept data. All data input prior to the end of the reset sequence will be ignored.

JTAG boundary scan is included in the circuit 200. Five pins (including a test reset) are used to implement the IEEE 1149.1 (JTAG) specification. The port includes an 8-bit instruction register used to select the instruction. This register is loaded serially via the TDI input. Four instructions (Bypass; Extest; Intest and Sample) are supported, all others are ignored. Timing for this interface conforms to the IEEE 1149.1 specification.

The ARM/CPU module runs at 40.5 MHz and supports byte (8-bit), half-word (16-bit), and word (32-bit) data types. It reads instructions from on-chip ROM or from the extension bus. It can switch between ARM (32-bit) or Thumb (16-bit) instruction mode and has a 32-bit data and 32-bit address lines. It has 7 processing modes and two interrupts, FIQ and IRQ.

Preferably, the CPU 220 in the circuit 200 is a 32 bit RISC processor, the ARM7TDMI/Thumb, which has the capability to execute instructions in 16 or 32 bit format at a clock frequency of 40.5 MHz. Other RISC processors may be employed. The regular ARM instructions are exactly one word (32-bit) long, and the data operations are only performed on word quantities. However, LOAD and STORE instructions can transfer either byte or word quantities.

The Thumb uses the same 32 bit architecture with an 16-bit instruction set. That is, it retains the 32-bit performance but reduces the code size with 16-bit instructions. With 16-bit instructions, the Thumb still gives 70–80% of the performance of the ARM when running ARM instructions from 32-bit memory. ARM and Thumb are used interchangeably herein.

Figure 15:
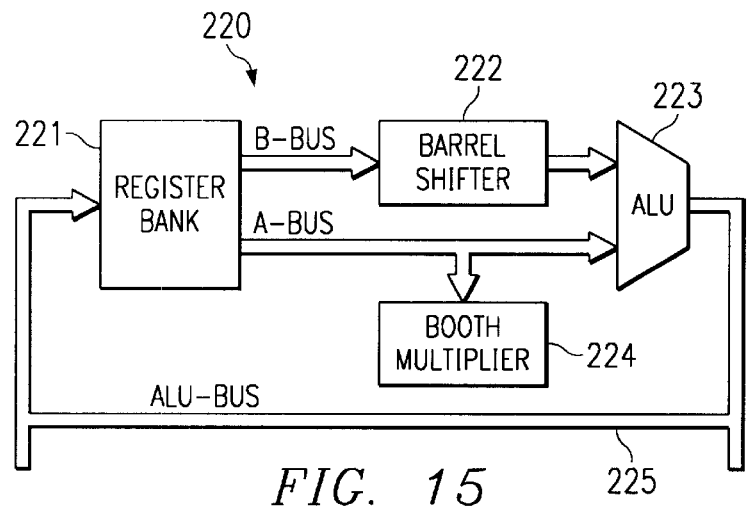
FIG. 15 shows the data path of ARM processor core for the circuit of FIG. 1B.

ARM uses a LOAD and STORE architecture, i.e. all operations are on the registers 221. ARM has 7 different processing modes, with 16 32-bit registers visible in user mode. In the Thumb state, there are only 8 registers available in user mode. However, the high registers may be accessed through special instructions. The instruction pipeline is three stage, fetch→decode→execute, and most instructions only take one cycle to execute. FIG. 15 shows the basic data path of ARM processor core.

The ARM CPU 220 is responsible for managing all the hardware and software resources in the circuit 200. At power up the ARM will verify the size of external memory. Following that, it will initialize all the hardware modules by setting up control registers, tables, and reset data pointers. It then executes the default firmware from internal ROM. A set of run-time library routines provides the access to the firmware and hardware for user application programs. The application programs are stored in external memory attached to the extension bus 300.

During normal operation the ARM constantly responds, based on a programmable priority, to interrupt requests from any of the hardware modules and devices on the extension bus. The kind of interrupt services include transport packet parsing, program clock recovery, traffic controller and OSD service requests, service or data transfer requests from the extension bus and Communication Co-Processor, and service requests from the audio/video decoders.

The traffic controller module 310 manages interrupt requests and authorizes and manages DMA transfers. It provides SDRAM interface and manages the extension bus 300. It provides memory access protection and manages the data flow between processors and memories such as: TPP/DES to/from internal Data RAM; Data RAM to/from extension bus; SDRAM to OSD; OSD to/from Data RAM; audio/video decoder to/from SDRAM; and SDRAM to/from Data RAM. It also generates chip selects (CS) for all the internal modules and devices on the extension bus 300 and generates programmable wait states for devices on the extension bus. It also provides 3 breakpoint registers and 64 32-bit patch RAM.

Figure 16A:
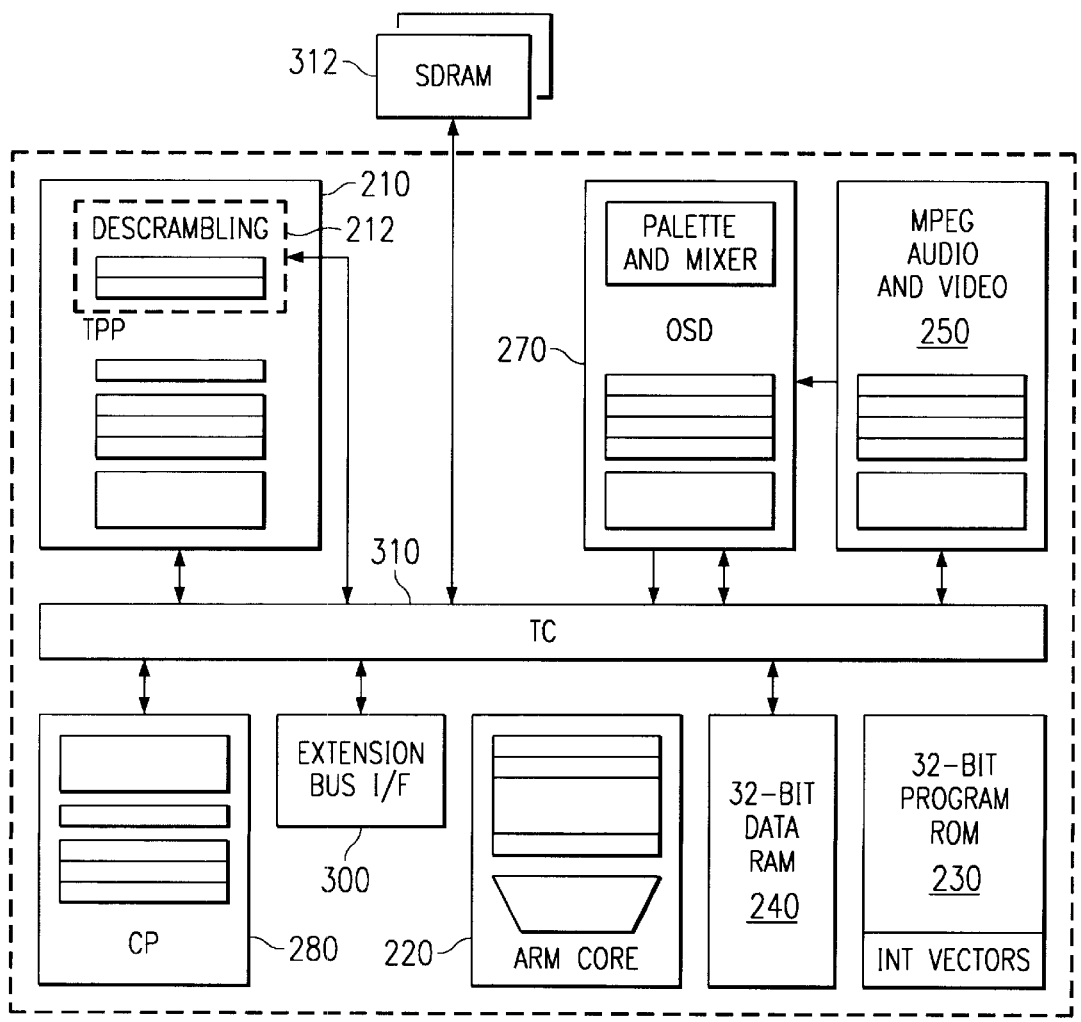
FIG. 16A depicts the data flow managed by the traffic controller for the circuit of FIG. 1B.

FIG. 16A depicts the various data flows managed by the traffic controller 310.

The SDRAM interface 313 supports 12 nanoseconds 16-bit data width SDRAM 312. It has two chip selects that allow connections to a maximum of two SDRAM chips. The minimum SDRAM size required for a fully functional video decoder is 16 Mbit. Other supported sizes and configurations are:

16 Mbit→one 16 Mbit SDRAM

20 Mbit→one 16 Mbit and one 4 Mbit SDRAM

24 Mbit→one 16 Mbit and one 8 Mbit SDRAM

32 Mbit→two 16 Mbit SDRAM

The access to the SDRAM can be by byte, half word, single word, continuous block, video line block, or 2D macroblock. The interface also supports decrement mode for bitBLT block transfer.

The two chip selects correspond to the following address ranges:

SCS1→0xFE00 0000–0xFE1F FFFF

SCS2→0xFE20 0000–0xFE3F FFFF

During decoding, the circuit 200 allocates the 16 Mbit SDRAM for NTSC mode according to Table 7.

TABLE 7

Memory Allocation of 16 Mbit SDRAM (NTSC)

| Starting Byte Address | Ending Byte Address | Usage |
|---|---|---|
| 0x000000 | 0x0003FF | Pointers |
| 0x000400 | 0x000FFF | Tables and FIFOs |
| 0x001000 | 0x009FFF | Video Microcode (36,864 bytes) |
| 0x00A000 | 0x0628FF | Video Buffer (2,902,008 bits) |
| 0x062900 | 0x0648FF | Audio Buffer (65,536 bits) |
| 0x064900 | 0x0E31FF | First Reference Frame (518,400 bytes) |
| 0x0E3200 | 0x161CFF | Second Reference Frame (518,400 bytes) |
| 0x161D00 | 0x1C9DFF | B Frame (426,240 bytes, 0.82 frames) |
| 0x1C9E00 | 0x1FFFFF | OSD or other use (222,210 bytes) |

However, it is also within the scope of the present invention to put the VBV buffer in optional memory on the extension bus 300 and thereby free up the SDRAM memory by the amount of the VBV buffer. This means that the SDRAM is allocated in a different manner than that of Table 7; that is the OSD memory size may be expanded or any of the other blocks expanded.

Interrupt requests are generated from internal modules like the TPP, OSD, A/V decoder and Communication Processor, and devices on the extension bus. Some of the requests are for data transfers to internal RAM, while others are true interrupts to the ARM CPU. The traffic controller handles data transfers, and the ARM provides services for true interrupts. The interrupts are grouped into FIQ and IRQ. The system software uses FIQ, while the application software uses IRQ. The priorities for FIQs and IRQs are managed by the firmware.

As noted in Table 7, the SDRAM 312 is used to store system level tables, video and audio bitstreams, reconstructed video images, OSD data, and video decoding codes, tables, and FIFOs. The internal Data RAM 240 stores temporary buffers, OSD window attributes, keys for conditional access, and other tables and buffers for firmware. The TC 310 manages two physical DMA channels, but only one of them, the General Purpose DMA, is visible to the user. The user has no knowledge of the DMAs initiated by the TPP, the video and audio decoders, and the OSD module. The General Purpose DMA includes ARM-generated and bitBLT-generated DMAs. The TC 310 can accept up to 4 general DMAs at any given time. Table 8 describes the allowable General Purpose DMA transfers.

TABLE 8

DMA Sources and Destinations
DMA Transfer

| | SDRAM | Data RAM | Extension Bus |
|---|---|---|---|
| SDRAM | NO | YES | NO |
| Data RAM | YES | NO | YES |
| Extension Bus | NO | YES | NO |

Note that there is no direct DMA transfer to/from the extension bus memories from/to the SDRAM. However, the user can use the bitBLT hardware which uses Data RAM 240 as intermediate step for this purpose. The only constraint is the block being transferred has to start at a 32-bit word boundary.

FIG. 16B depicts the two interior blocks of the SRAM/ARM I/F block 311 of TC 310. More particularly, FIG. 16B depicts the SRAM hardware control block 311-1 and the ARM I/F block 311-2. FIG. 16C provides the details of block 311-2. Similarly, FIG. 16D provides the details of block 311-1.

As may be seen from FIG. 16C, the ARM I/F 311-2 includes a privilege decoder block 311-20 connected to a protection block 311-22. The protection block implements three levels of protection for the memory space of the ARM CPU 220. That is, firmware is allowed access to any memory, while the OS is allowed access to most memory; the application software (user mode) is only allowed access to restricted portions of the DRAM 312 and SRAM 240, but is allowed access to all other external memory. The chip select decoder block 311-24 determines from the ARM bus address the module, register, device or memory that is being addressed and generates a chip select (CS) for that address. In a similar manner, an interrupt control block handle interrupts from the modules or blocks in circuit 200.

A patch logic block 311-28 provides a way to load preselected values onto the bus when a certain address is selected. That is, this circuitry provides a patch from a portion of memory to a different locations, e.g. a patch RAM.

An SDRAM finite state machine 311-30 controls accesses to the SRAM 240. If the ARM tries to access the SRAM while it is busy, the ARM wait state generator 311-32 generates a signal to the ARM that essentially turns off its internal clock signal until the SRAM is available.

The remaining block 311-34 handles byte control for the SRAM. That is, it evaluates an ARM request to determine if the ARM is reading or writing a word, a half word (upper or lower) or a byte of data. It does this by evaluating the ARM control signals and selected ARM address positions.

FIG. 16D depicts the SRAM control block 311-1 and it includes a state machine 311-40 that interfaces with an extension bus interface (I/F) 311-42, a TCDRAM I/F 311-44, a TPP I/F 311-46 and a BitBLT I/F 311-48. It has available to it a TPP DMA table stored in a register 311-50 and a GEN DMA table stored in register 311-52.

The various states for the state machine 311-40 are depicted in FIGS. 16E–16M.

Figure 16N:
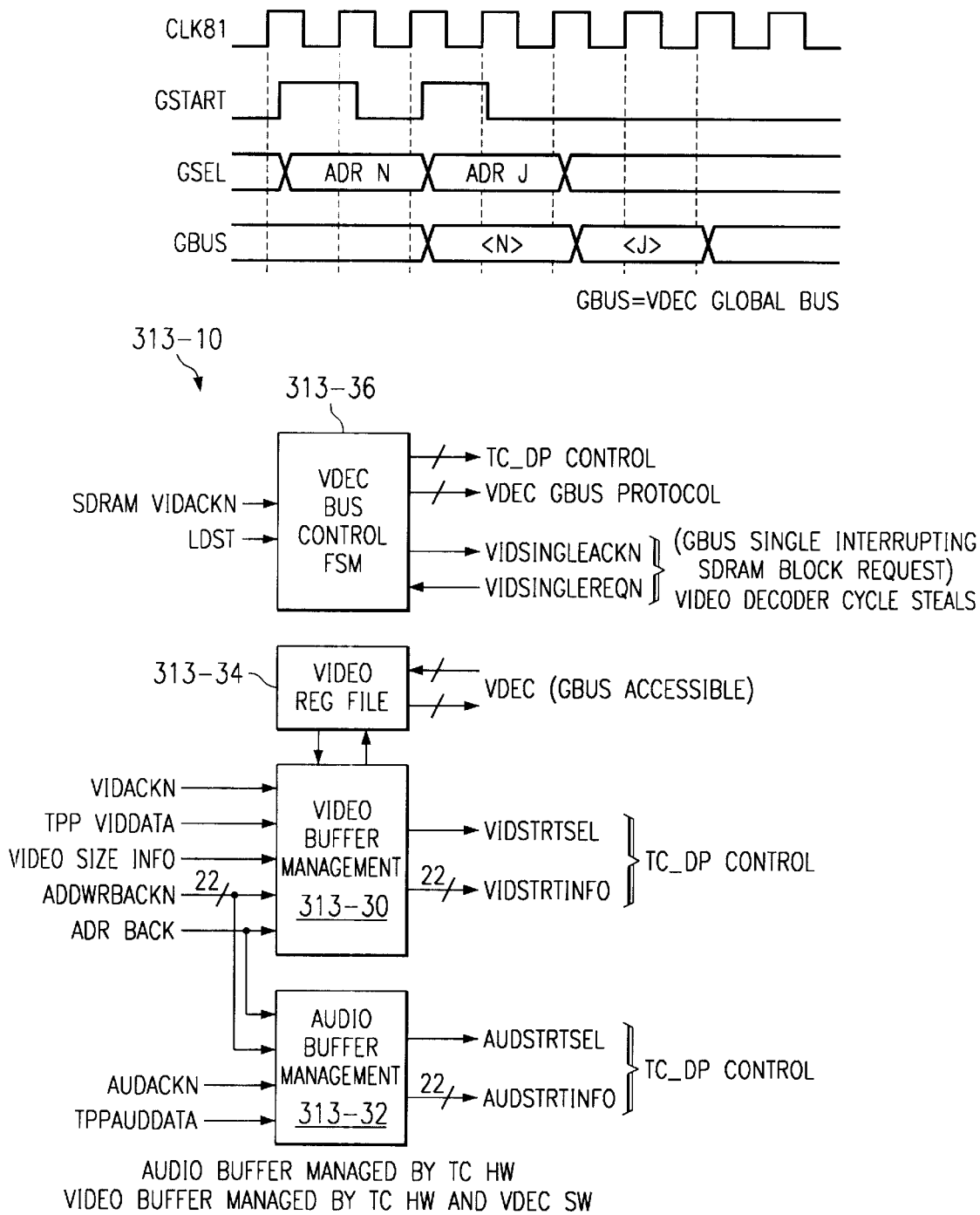
Figure 16O:
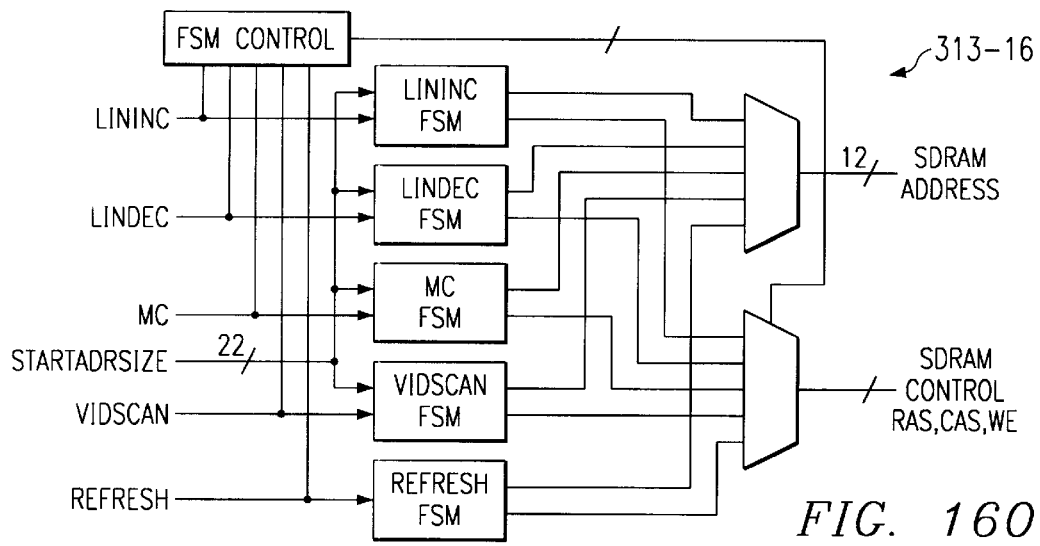

FIG. 16N depicts the interior blocks of the DRAM I/F 313 of the TC 310. More particularly, it may be seen that the DRAM I/F 313 includes an audio/visual I/F 313-10, an arbitration block 313-12, a data path control block 313-14, a data path block 313-10 and a DRAM I/F 313-16. FIG. 16O depicts the details of the A/V block 313-10. It depicts the video buffer and audio buffer management blocks, 313-30 and 313-32, respectively. The audio buffer is managed by the TC 310 hardware, while the video buffer is managed by the TC 310 hardware and video decoder 252 software. The video register file 313-34 allows the circuit 200 access to the video decoder busses and vice-versa. There is also depicted a video bus control state machine 313-36, that allows for single reads and writes and allows the video decoder 252 to cycle steal on the video decoder bus.

Figure 16R:
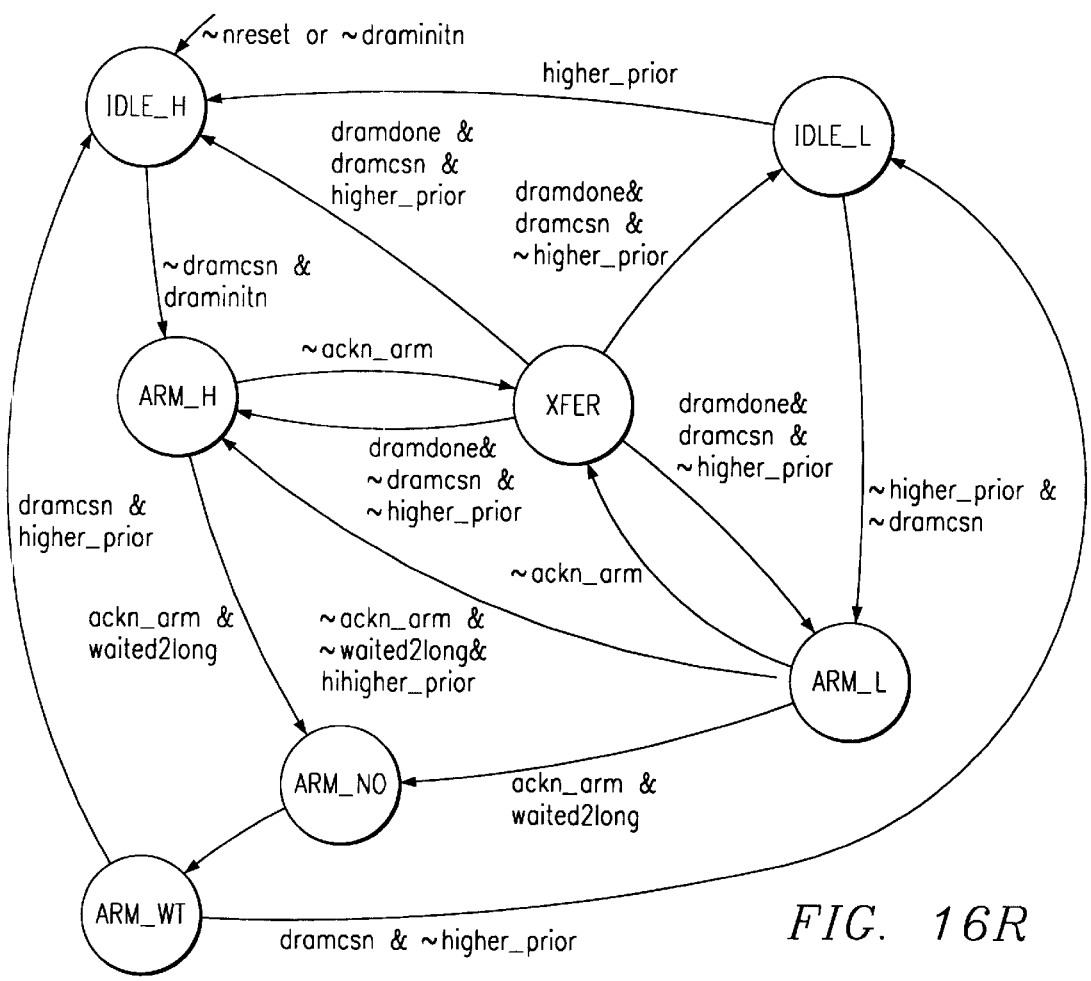
Figure 16P:
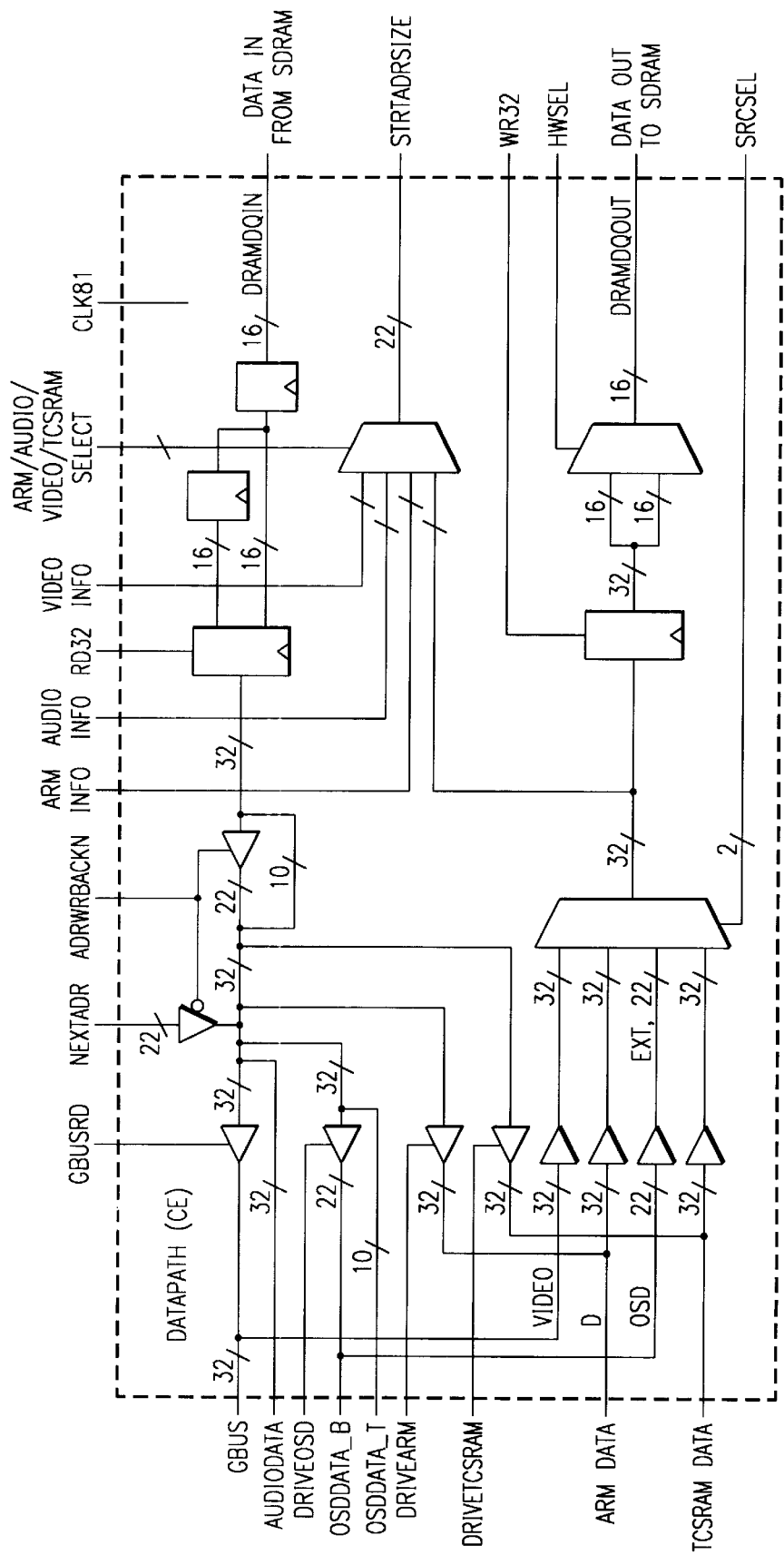

FIG. 16P depicts the various state machines in the DRAM I/F 313-16 of FIG. 16N that implement the various commands, line increment (lininc), line decrement (lindec) motion compensation (mc), video scan (vidscan) and refresh (refresh). These state machines generate the appropriate address and control signals to control the SDRAM 312.

Figure 16Q:
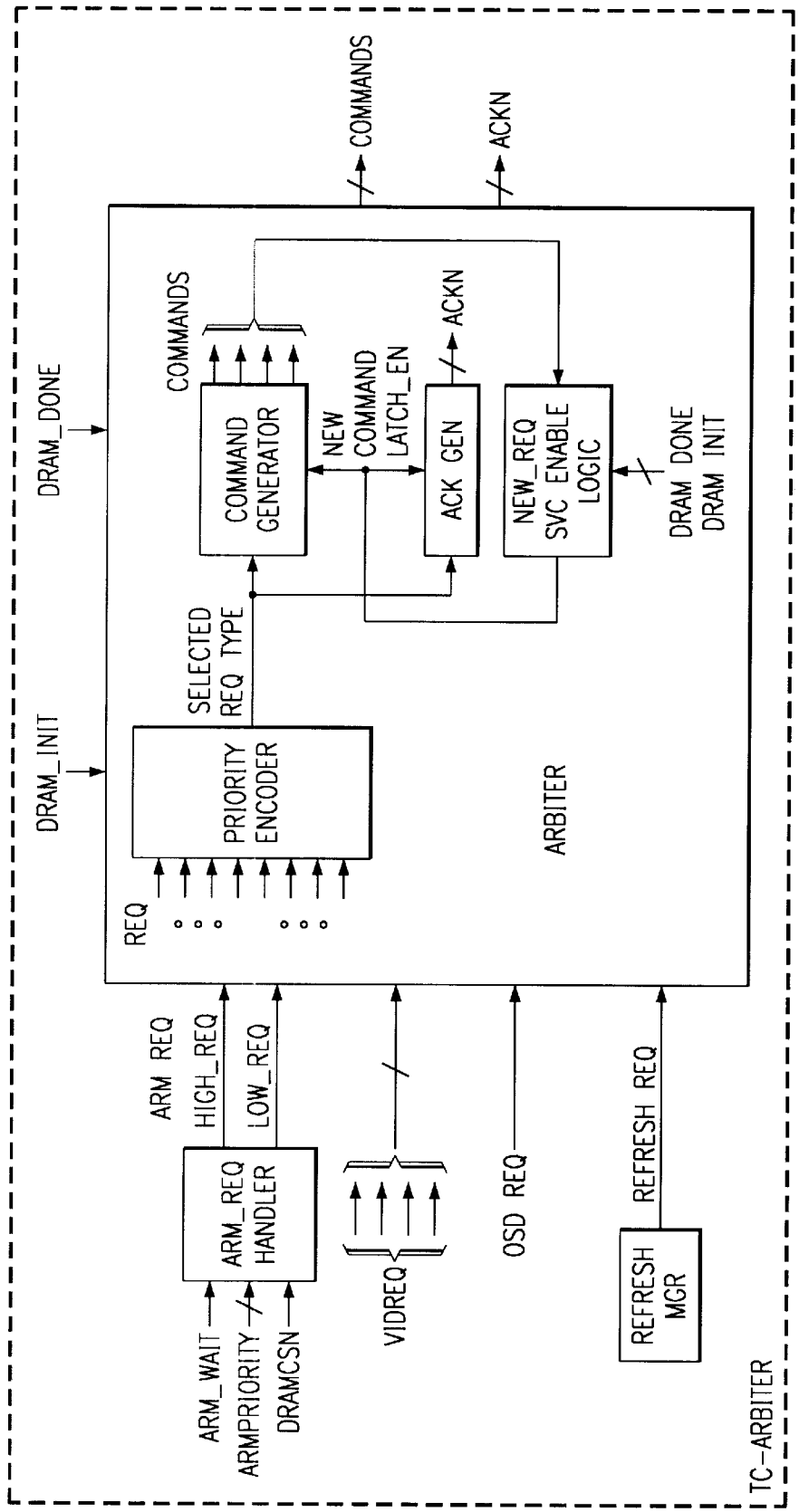

FIG. 16Q depicts the data path block 313-18 of FIG. 16N. It provides the details of how data is passed to and from the SDRAM.

The details of the DP control block 313-14 are provided in Appendix A hereto and incorporated by reference herein. The details of the arbitration block 313-12 are provided in Appendix B hereto and incorporated by reference herein.

Figure 16S:
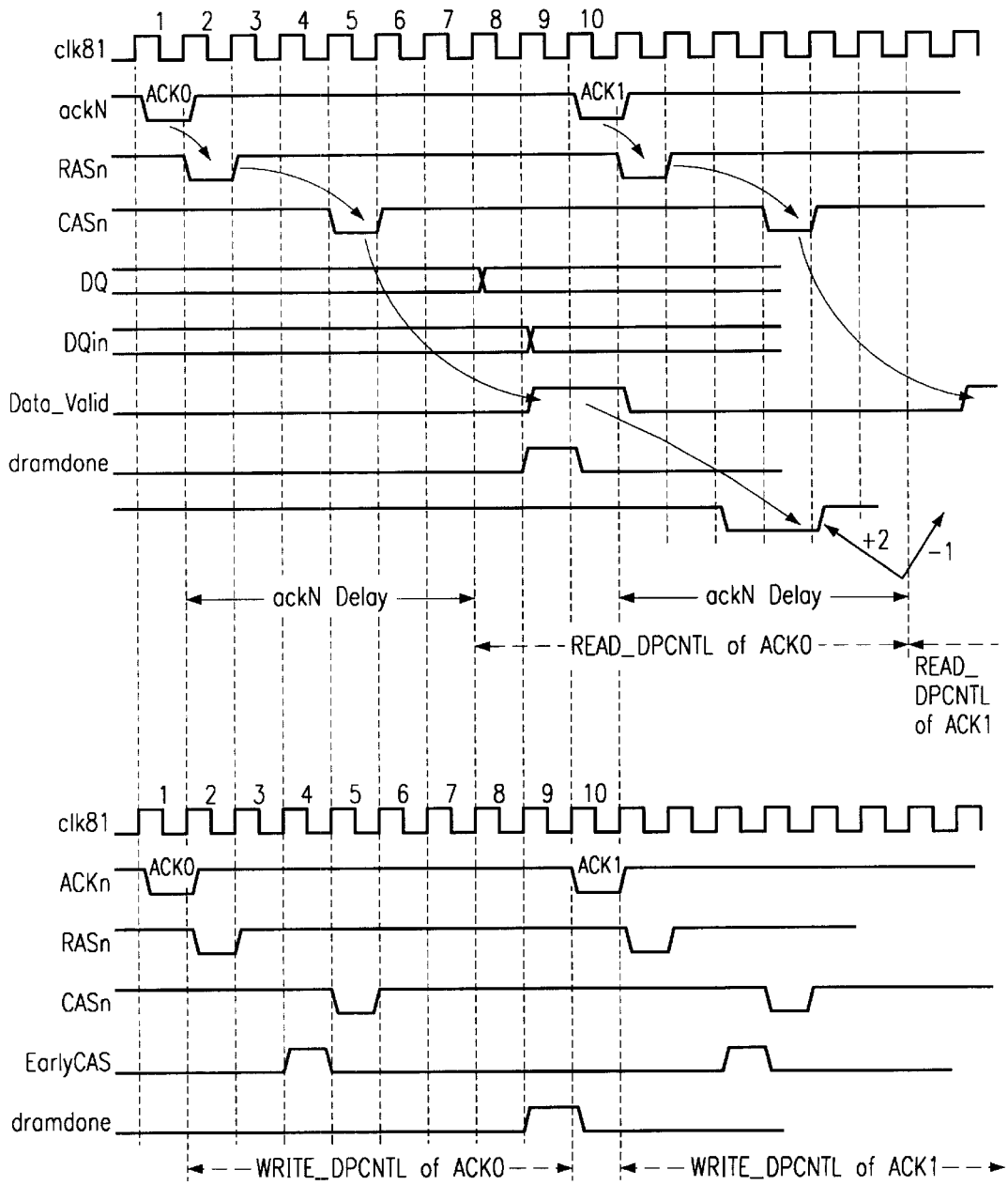
FIG. 16S illustrates timings.

FIG. 16R depicts a block diagram illustrating additional details about arbiter block 313-12 of FIG. 16N. FIG. 16S depicts the state machine states for the state mahcine of this block. FIG. 16T illustrates timings for data path control (313-18) read and writes.

The TPP Module 210 parses transport bitstreams and accepts bitstreams either from the front end device or from the 1394 interface. It performs System Clock Reference (SCR) recovery and supports transport streams up to 40 Mbits-per-second. It accepts 8-bit parallel input data and supports storage of 32 PID/SCIDs. It provides lost-packet detection and provides decrypted or encrypted packets directly to the 1394 interface. It also provides an internal descrambler 212 for DSS with the Data Encryption Standard (DES) implemented in hardware.

Figure 17A:
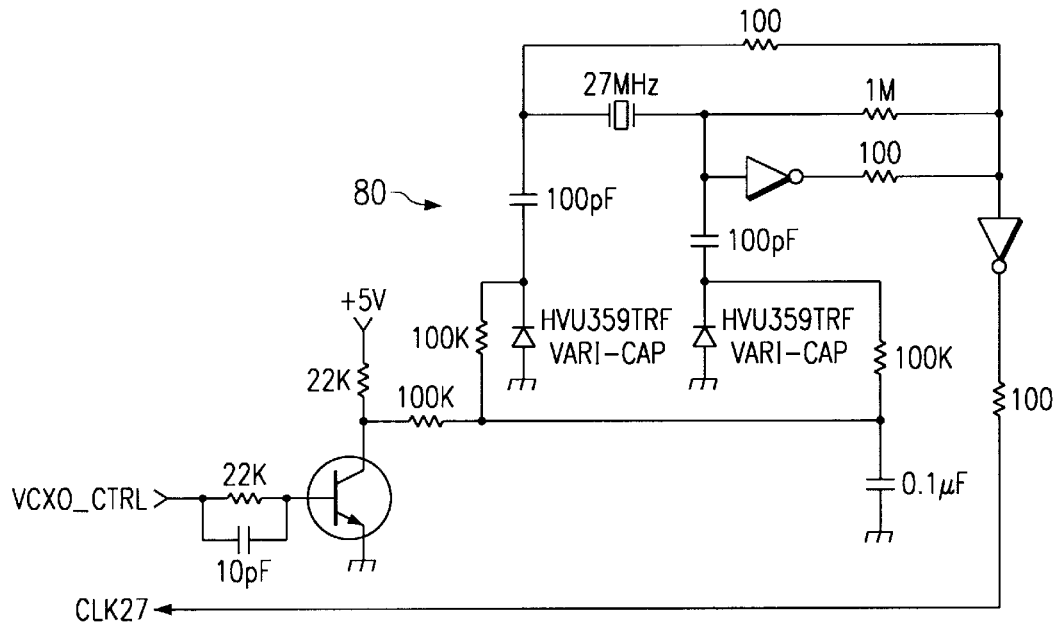
FIG. 17A is an example circuit for the external VCXO for the circuit of FIG. 1B.

The TPP 210 accepts packets on a byte by byte basis. Each packet contains a unique ID, PID/SCID, and the TPP extracts those packets containing the designated ID numbers. It processes the headers of transport packets and transfers the payload or auxiliary packets to the internal RAM 240 via the DES 212 hardware, if required. Special firmware running on the ARM 220 handles DES key extraction and activates DES operation. The ARM/CPU 220 performs further parsing on auxiliary packets stored in the internal RAM 240. The ARM 220 and TPP 210 together also perform SCR clock recovery. FIG. 17A is an example circuit for the external VCXO 80. The output from the circuit 200 is a digital pulse with 256 levels.

The conditional access and DES block 212 is part of the packet header parsing function. A CF bit in the header indicates whether the packet is clean or has been encrypted. The clean packet can be forwarded to the internal RAM 240 directly, while the encrypted one needs to go through the DES block 212 for decryption. The authorization and decryption key information are transmitted via control word packet (CWP). An external Smart Card 280-1 guards this information and provides the proper key for the DES 212 to work.

The 1394 interface 290 is directly connected to the TPP/DES module 210. At the command of the a program, the TPP/DES can send either clean or encrypted packets to the 1394 interface 290. The user can select up to 32 services to record. If the material is encrypted, the user also needs to specify whether to record clean or encrypted video. In a recording mode, the TPP 210 will appropriately modify the packet header if decrypted mode is selected; in encrypted mode, the packet headers will not be modified. During the playback mode, the 1394 interface 290 forwards each byte as it comes in to the TPP 210. The TPP 210 parses the bitstream the same way it does data from the front end.

The MPEG2 transport stream parser (TPP) receives the MPEG transport stream and selects video, audio or services information packets. After decoding, the packets are stored to memory buffers to form a data stream. The audio decoder 254 processes the MPEG audio stream and produces an analog audio signal. The video decoder 252 decompresses the MPEG video and generates a video sequence.

Figure 17C:
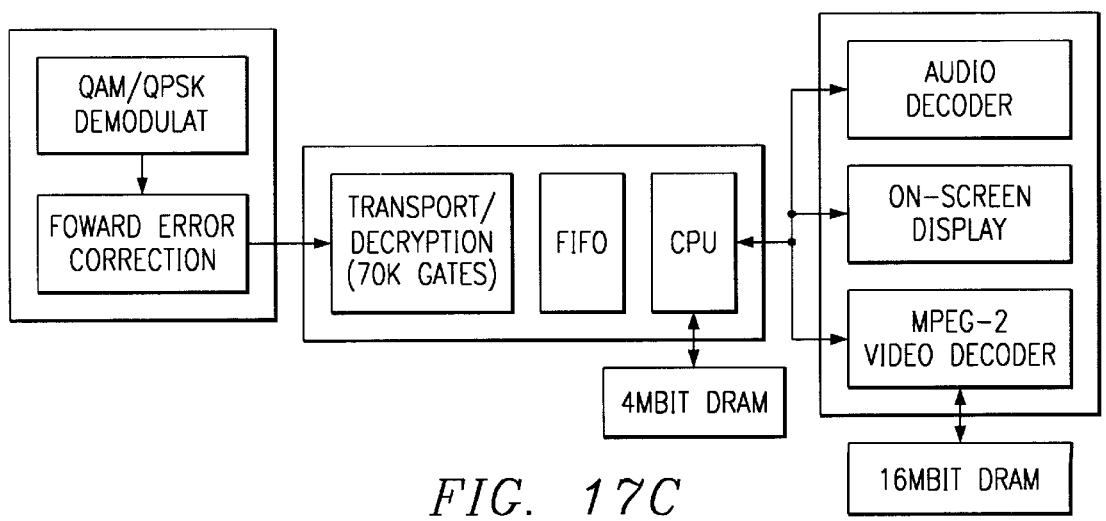
FIG. 17C depicts a system where the video and audio decoders are in a separate device.
Figure 17B:
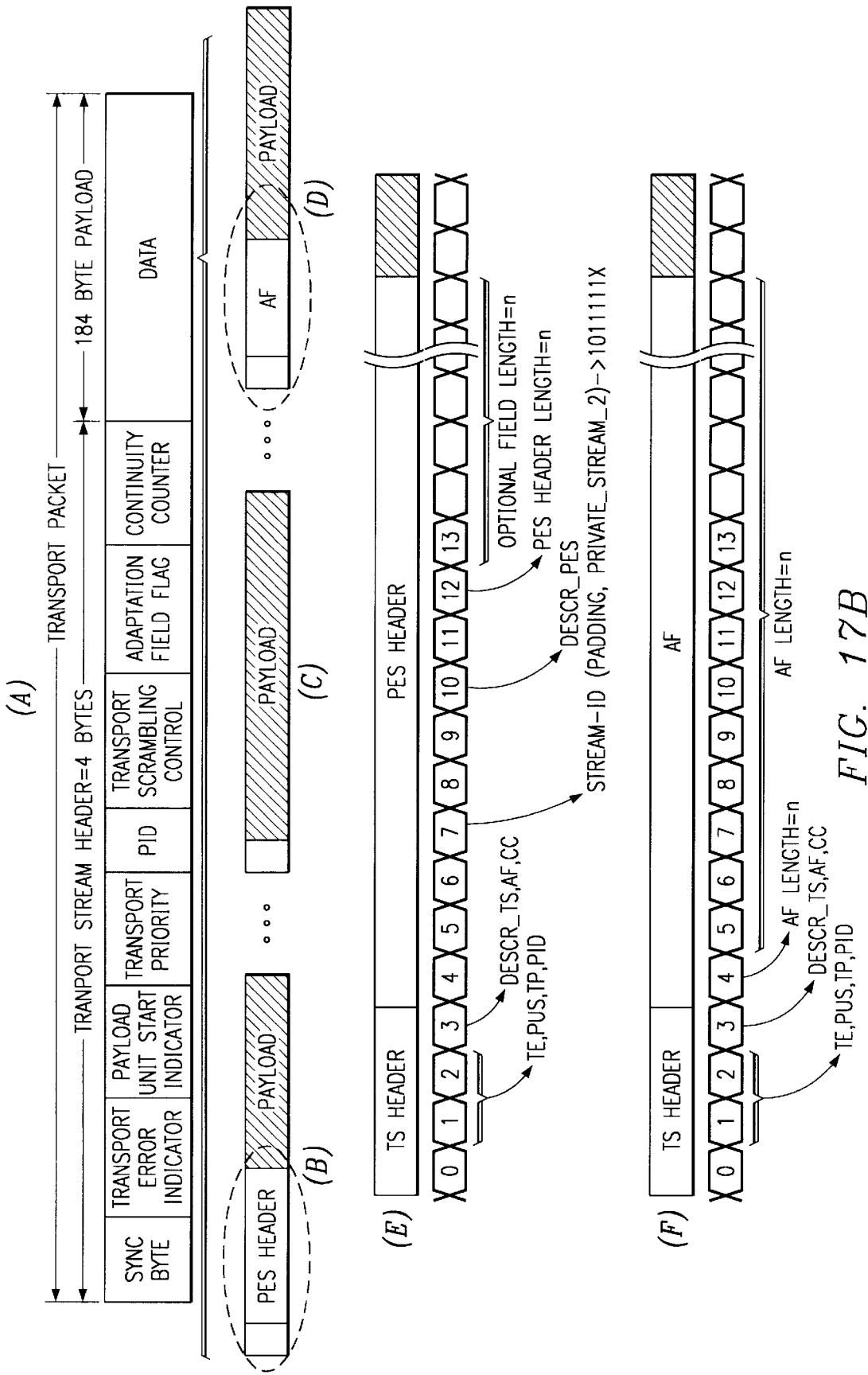
FIG. 17B depicts details of a transport packet containing 188 bytes.

As depicted in FIG. 17B, a transport packet (A) contains 188 bytes. The packet is divided in two parts, a 32-bit header and 184 bytes of payload. The transport header contains different fields (PID, payload unit start indicator, adaptation field flags, continuity counter index) that will allow the transport packet parser to do a coarse filter. After the transport header, the packet can contain an adaptation field of variable length for a payload. Some of these payloads will themselves start with a header (PES header) B which has also a variable length. The PES header in MPEG2 standard can be bigger than a packet (overflow on the next packet).

The current state of the art for MPEG2 transport stream system analyzer consists of chip set solution including a complete transport stream hardware analyzer and an associated micro-processor and memory. The video and audio decoder are separate devices, as shown in the FIG. 17C. The transport stream parser is in charge of the transport stream full analysis with the current approach leaving to the CPU the tasks of directing the data towards the right destination and controlling the different modules. Another solution would be to implement all the transport analysis in software; however, this solution would require much higher CPU processing power.

The approach for the transport stream parser of the present invention splits the load of the transport stream and MPEG2 analysis between hardware and software to make the analysis more effective. Hardware filtering allows an early decision to be taken based on PIDs recognition; it reduces the data stream very efficiently allowing the firmware to execute much more complex filtering algorithms on the reduced data stream. This approach optimizes the resources. The hardware stays simple while the firmware needs less CPU power because the bit rate it receives has been pre-processed by the hardware.

The parsing and routing of the packets are done with a PID recognition mechanism coupled with a set of attributes stored in a local memory for each PID. These attributes complete the information received from the different headers.

The transport parser module immediately discards all packets which are not selected by the application, and routes as many packets as possible without "real time" help from the firmware.

Once a packet with a valid PID has been detected, the parser checks the condition set which determines if the packet needs further processing by the CPU 220 (see description of EOP interrupt generation later herein). If one of these conditions is met, the packet is sent to a temporary buffer with an attached flag (indicating that further processing is required) and an interrupt EOP is sent to the CPU to indicate that a new packet has been received. Data stored in this temporary buffer is then processed by the firmware before it can be routed or discarded as shown in path (2) of FIG. 17D. Once the data have been processed, the CPU 220 transfers the data itself or initiates DMA transfers to the system buffer in memory 240. The software is also going to modify in some cases some of the PID attributes (ex: stream-id filter) to modify the routing of the following packet (e.g. one with the same PID). If none of the conditions are met, the attached flag indicates that no additional processing is required. The packet can then be automatically forwarded (via path (1) in FIG. 17D) to its final destination via automatic DMA transfers (e.g.: packets containing compressed video information can be sent directly to the system video buffer, . . . ). In this case, no EOP interrupt is sent to the CPU 220 and the packet transfer to the final destination does not require any CPU resource.

Figure 17D:
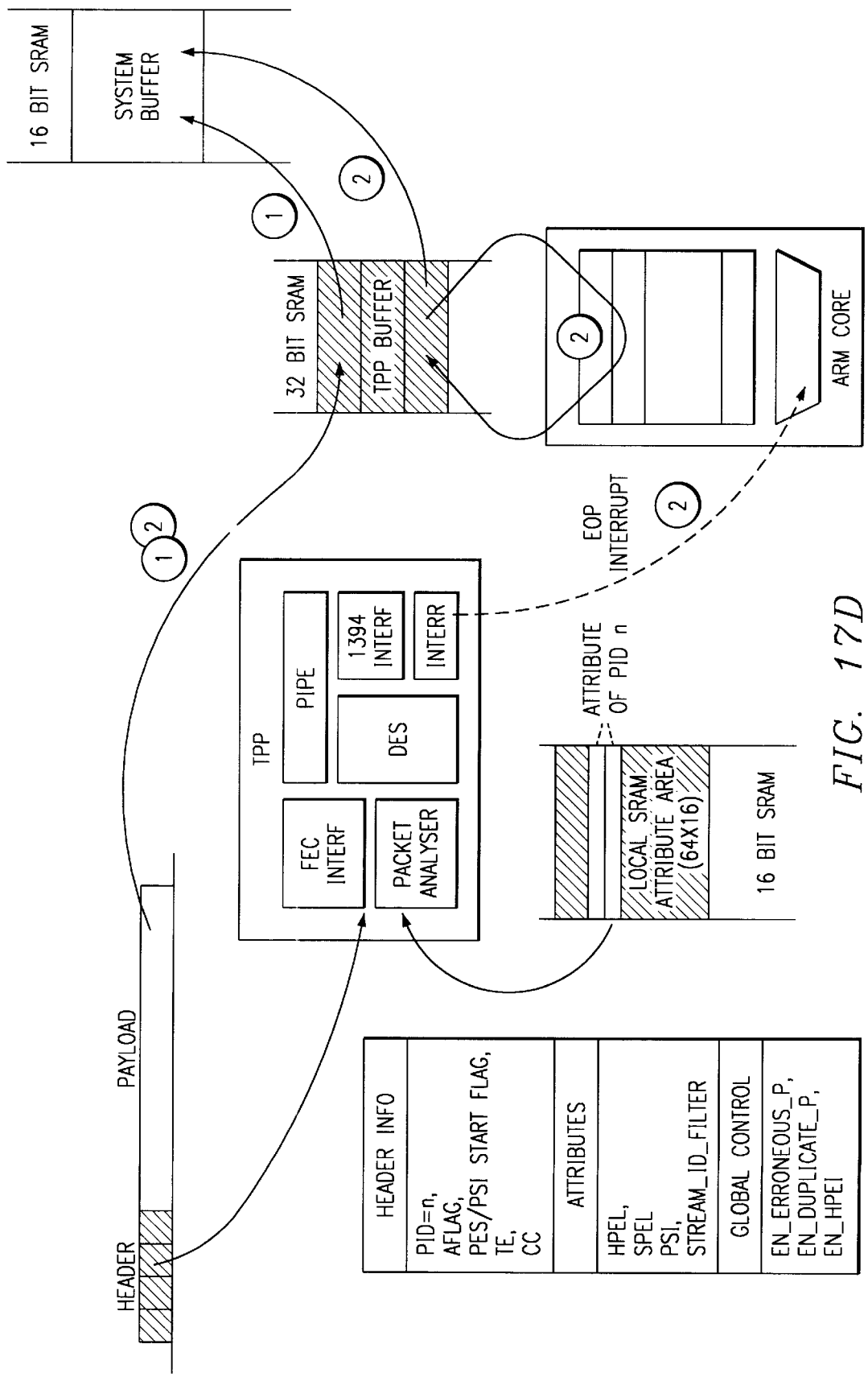
FIG. 17D depicts how header information is processed by the circuit of FIG. 1B.

FIG. 17D shows the two different data flows; one with CPU intervention, path (2), and one with no intervention, path (1).

FIG. 17D is the key for the trade-off between hardware and software. The transport stream parser can very easily route the packets and let the CPU do more complex analysis on some parts of the bit stream.

Figure 17E:
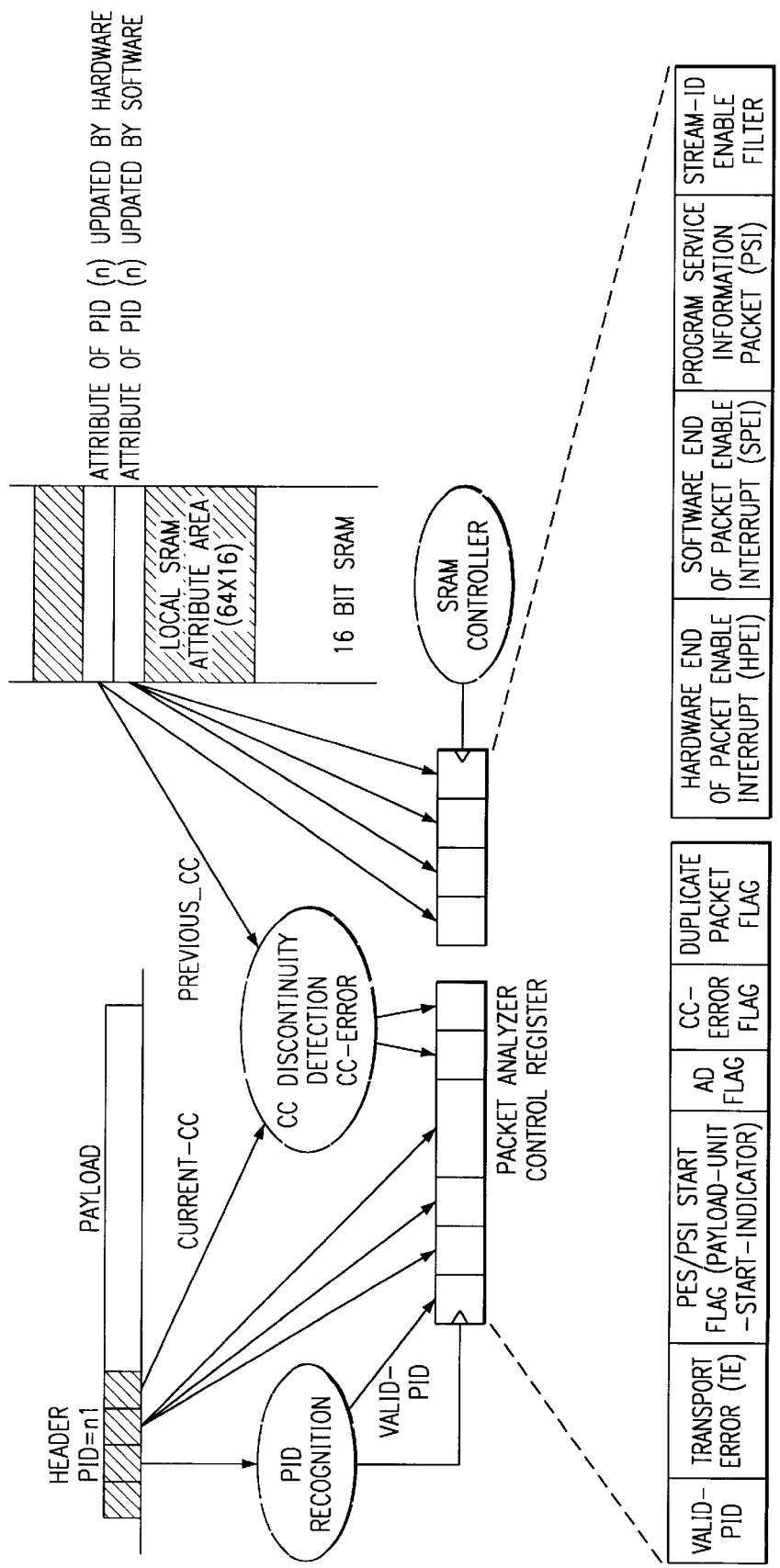
FIG. 17E depicts the contents of a packet analyzer control register.

Again, this selection is done by analyzing the header (PID, AF flag, PES/PSI start flag [payload unit start indicator], transport error flag, counter continuity index), and the PID attributes because the choice can not always be done by extracting information from the packet itself as depicted in FIG. 17E. Sometimes, the nature of the previous packet (same PID) will determine if the packet needs additional processing (PES header split between two packets). Sometimes, it is linked to the PID number. If a PID contains table information for instance that always require CPU processing then the attribute Spei is set (means that packets with this PID will always be sent to the CPU). The list of information used to generate the EOP interrupt is summarized in FIG. 17E and described below.

FIG. 17E shows where the information comes from. The conditions to generate the EOP are described later herein.

The following is a description of the bits in Packet Analyzer Control Register.

Valid PID

This bit is the result of the PID recognition function. The PID number is the packet identification number received in the transport stream header of each packet. It determines if a packet must be transmitted to the system or not. If the PID number has been selected, the Valid_PID bit goes active '1' when a packet with this PID number is received. It is the first level of packet filtering and the necessary condition for the other analysis steps.

Te (Transport Error Indicator)

This is retrieved from the Transport Stream packet header. The transport error indicator bit is active when the packet received contains some errors.

Pes/Psi Start Flag (Transport Stream Payload Start-unit-indicator)

This is retrieved from the Transport Stream packet header.

When the payload of the Transport stream contains a PES packet data. A '1' indicates that the payload of this Transport stream packet will commence with the first byte of the PES packet (PES header) and a '0' indicates that no PES packet starts in this Transport Stream Packet.

When the payload of the Transport Stream packet contains PSI data. A '1' means that the payload carries at least one beginning of a PSI section and a '0' if no start of a PSI section is carried is this Transport Stream packet.

AF Flag (Transport Stream Adaptation Field)

This two bit field of the Transport Stream header indicates whether the Transport Stream header is followed by an adaptation field or not.

TABLE 9

| AF Value | Description |
| --- | --- |
| 00 | reserved for future use by ISO/IEC |
| 01 | no adaptation field, payload only |
| 10 | adaptation field only, no payload |
| 11 | adaptation field followed by payload |

CC-error

This bit is the result of the hardware discontinuity counter detection function on the continuity counter (CC). The detection is done with a comparison between the CC (4-bits contained in the Transport Stream header) called the Current_CC and the CC from the previous packet of the same PID (called Previous_CC). The Previous_CC is an attribute modified by the hardware. Once the comparison is done, the hardware overwrites the Previous_CC with the Current_CC for the reception of the next packet and so on. If the comparison does not match Current_CC=Previous_CC or Current_CC=Previous_CC+1, the CC_error bit goes active.

Duplicate-packet Flag

If the comparison indicates that Current_CC=Previous_CC the Duplicate-packet goes active.

Hpei (Hardware End of Packet Enable Interrupt)

This is an attribute bit set by Hardware. At reception of a new packet (when packet unit start indicator is active and when it is not a packet with program service information PSI) the Hpei goes active and is reset on the following packet of the same PID. It forces the packet following a packet with a PES header to be temporarily stored in a buffer for further analysis in case the PES header would be split between two packets. This bit is necessary when the bit rate of the incoming bit stream is two high to fit within the EOP service routine latency.

Spei (Software End of Packet Enable Interrupt)

This attribute bit is set by software and covers two different purposes. First, the bit is set at initialization for PID which always requires CPU processing (PID with table information for instance). It is simply used in that case to force all the packets of this PID to be analyzed by the CPU.

The second usage is for audio and video packets whose PES header would be split between two packets. This is only valid for some given system, once the software has determined that its latency response is compatible with the bit stream rate. In that case the software sets the Spei as soon as it receives the EOP interrupt of a packet containing a PES header. It determines afterwards if the PES header overflows on the next packet. If it does not, it resets the Spei attribute bit. In this case the Spei can replace the Hpei which is disabled to gain in efficiency (see En_Hpei).

PSI (Program Service Information Packet Flag)

In MPEG2 transport stream, one flag in the transport stream header (payload unit start indicator) indicates the start of a new PES packet or the start of a section of a program service information. In order to differentiate these two types of data another attribute is needed (PSI). This attribute is set by the firmware at initialization for PIDs containing program service information(PSI).

It is used to generate Hpei and for the detection of the boundary between encrypted/clean bytes. Without this information tightly coupled with the PIDs, the controller could not timely find the encryption flags nor the boundary between encrypted/clean byte without some significant input buffers on the bit stream interface.

Stream-id-filter

This software attribute bit is set by software when it receives a packet containing a PES header with a non selected stream-id. Once this attribute is set, the hardware discards all the packets of this PID containing only payload (AF="1x") until it reaches a new PES header. The packet is sent to the CPU which analyzes the PES header and determines if the new stream-id is valid. If it is, it resets the stream-id-filter for the following packets.

En Hpei

This is a global control bit. The Hpei mechanism can be switched off/on depending on the constraint of the system. If the software determines that it has enough time to react and modify the Spei attribute bit before the reception of the next packet, it can disable the Hpei attribute. The bit stream parsing is more efficient in that case because the packet following a packet with a PES header is only sent to the CPU for further analysis when the PES header is not fully contained in one packet.

En Erroneous P

This global control bit enables transmission of erroneous packets to the temporary buffer. This is mainly to add some flexibility in case some new error concealment is found in the future.

En Duplicate P

This global control bit enables transmission of duplicate packet containing only payload. It is only used for test purposes.

Figure 17F:
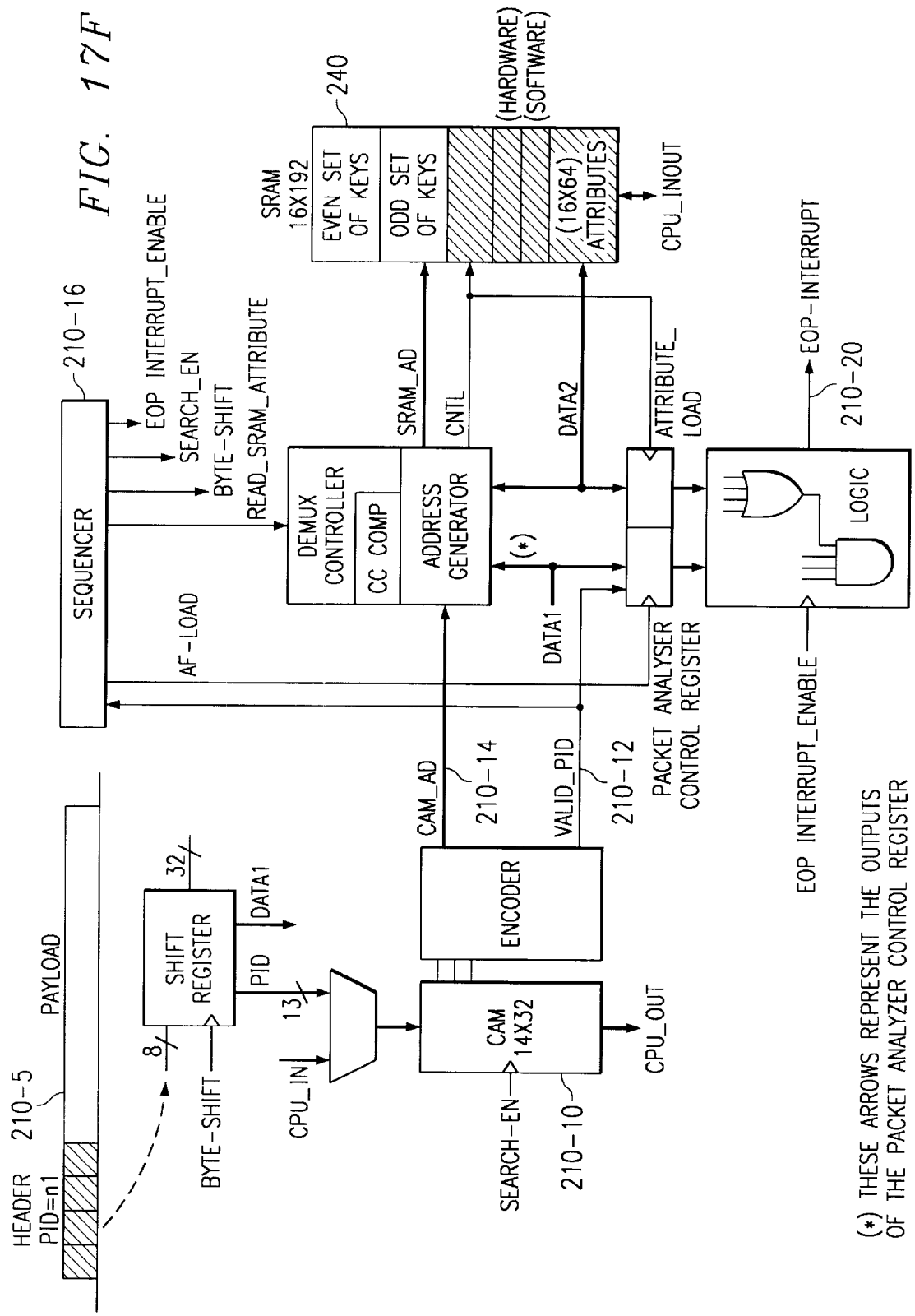
FIG. 17F depicts a block diagram for processing packet header information.

FIG. 17F shows the hardware implementation based on PID recognition. The PID from the Transport packet header 210-5 is compared in parallel with a set of PIDs (32) located in an associative memory 210-10. If the PID in the header corresponds to a PID stored in the associative memory, the CAM encoder outputs a "match" signal (Valid-PID) 210-12 and a CAM address (cam-ad) 210-14 in a single system clock period. The valid-PID is used to initiate the transport stream packet analysis and it enables the process to load the others bits coming from the transport stream headers: AF-load (transport-error, payload-unit-start-indicator, adaptation field flag, continuity counter index and other like encryption flags reserved for the control of the decryption module).

As soon as a valid PID is detected, the cam-ad 210-14 is used to look for the associated attributes. The sequencer 210-16 generates Read-SRAM-attributes to start the state machine controlling the SRAM address generator. The state machine creates the SRAM 240 address from the cam-ad, it reads the SRAM two times, once to retrieve the hardware attributes and a second time to read the software attributes (splitting hardware modified attributes and software modified attributes avoids the use of a complex protection mechanisms).

From both attributes and bit-stream information (bits from headers), the conditions required to generate a EOP interrupt are evaluated. The hardware attributes are then updated for the reception of the next packet (same PID). The software attributes can be updated as part of the EOP interrupt service routine but only for some very precise function (like stream-id-filter). If the attributes need to be modified before the start of the next packet, then the bit rate, the gap between packets and the interrupt routine service latency must respect some constraints to allow this to occur.

Depending on the Packet analyzer control bits (FIG. 17E), the packet is going to be discarded, automatically transmitted to its final destination or processed by the firmware. When one of these conditions to generate an EOP interrupt is met, the bit controlling the interrupt goes active and is reset on the first byte of the following packet. EOP interrupt enable controls the position of the interrupt relative to the end of the packet. The different conditions generating the EOP interrupt 210-20 (FIG. 17E: logic block) are described below.

1 - Erroneous packet

| | |
|---|---|
| If(Te = 1) | Normally packets including error are discarded |
|     if(En_erroneous_p = 1) | but in some cases it might be less disrupting for |
|         EOP it | the system to enable a small error than to delete |
|     else | a complete packet. In that case the packet is |
|         "discard packet" | transmitted to the buffer and the firmware |
|     end if | makes the final decision depending on the |
| | packet type (video, audio, etc. . . . ). |

2 - Discontinuity detection

| | |
|---|---|
| elsif(Current_CC = Previous_CC) | The EOP packet interrupt will be generated |
|     "duplicate packet" | after a discontinuity counter detection. In |
|         if((AF = "01") and | MPEG2 a CC discontinuity is possible when the |
|         (En_duplicate_p = 0) | discontinuity flas in the adaptation field is set. |
|     "discard packet" | As shown later, all packets with adaptation field |
|     else | generate an EOP interrupt. Normally duplicate |
|         EOP it | packets which contain only payload (AF = "01") |
|     end if | are discarded. They can be transmitted to let |
| elsif(Current_CC /= Previous_CC + 1) | the firmware make the final decision if the |
|     EOP it | global control bit "En_duplicate_p" is set. |

-continued

3 - List of other conditions

```
elsif(AF = "1x")                              An EOP interrupt is generated for:
    EOP it                                    - all packets containing an adaptation field,
elsif(Payload_unit_start_indicator = 1)       - all packets whose payload-unit-start-indicator
    EOP it                                    is set,
elsif( Hpei = 1) and (En_Hpei = 1)            - all packets following the packets with a
    EOP it                                    payload-unit-start-indicator set. This is
                                              important because the PES header can take
                                              more than one packet. This feature can be
                                              enabled or disabled if Spei can be set early
                                              enough (see FIG. 17G below).
elsif( Spei = 1)                              - all packets which the embedded software
    EOP it                                    wants to further analyze.
elsif(AF = "01" and (((Hpei = 0) and (En_Hpei = 1 )) or (Spei = 0)) and (stream-id = 1))
"discard packet"                              - all packets containing payload are only
    else                                      discarded if stream-id is active unless
"packet automatically transmitted"            attributes to force packets to be analyzed
    end if                                    by the embedded software are set (previous
                                              cases)
```

Note that all these conditions evaluated sequentially by the foregoing are in fact computed in parallel by the hardware.

Once the EOP interrupt conditions are met the CPU 220 takes on the analysis task. The microprocessor 220 can perform a more complex analysis than the Transport Packet Parser hardware module and will complete the hardware pre-processing. In addition, the processing can differ according on the type of data that corresponds to the packet; in fact, it is very easy to define a software table, based on the PID values, that associates the packet with the particular processing to be used.

The software processing of the transport packet is driven by interrupts; once an EOP interrupt is issued, the process that analyzes the packet is started. Two different methods of processing can be selected, according to the CPU latency response and the bit stream rate.

In first case the software sets the Spei flag in the TPP hardware module as soon as it receives the EOP interrupt of a packet containing a PES header. After processing the packet, the software can detect whether the PES header continues in the following transport packet or not; if the PES header ends in the current packet, the CPU resets the Spei bit in the Packet Analyzer Control Register, since it does not need to analyze the following packet. Otherwise the Spei bit is left unchanged. This method can be used only if the CPU latency, compared with the input bit rate, allows the Spei to be set before the arrival of the following packet.

The second method can be used in any case: If the En_Hpei bit is set in the Packet Analyzer Control Register, the CPU does not have to set the Spei bit after each PES header, because the TPP hardware already provides for sending to the ARM processor the packet including the PES header continuation.

Afterwards the reason of the interrupt is found by reading the flags in the registers of the TPP hardware module; if the adaptation field is present, it is processed.

After the adaptation field analysis the packet can be discarded if there is no payload or the payload is duplicated from the previous packet.

At this point the execution of the software process branches into separate routines, according on the packet type (audio, video, private data, service information, . . . ). Then the data are transferred via a DMA channel to a specific buffer.

Figure 17G:
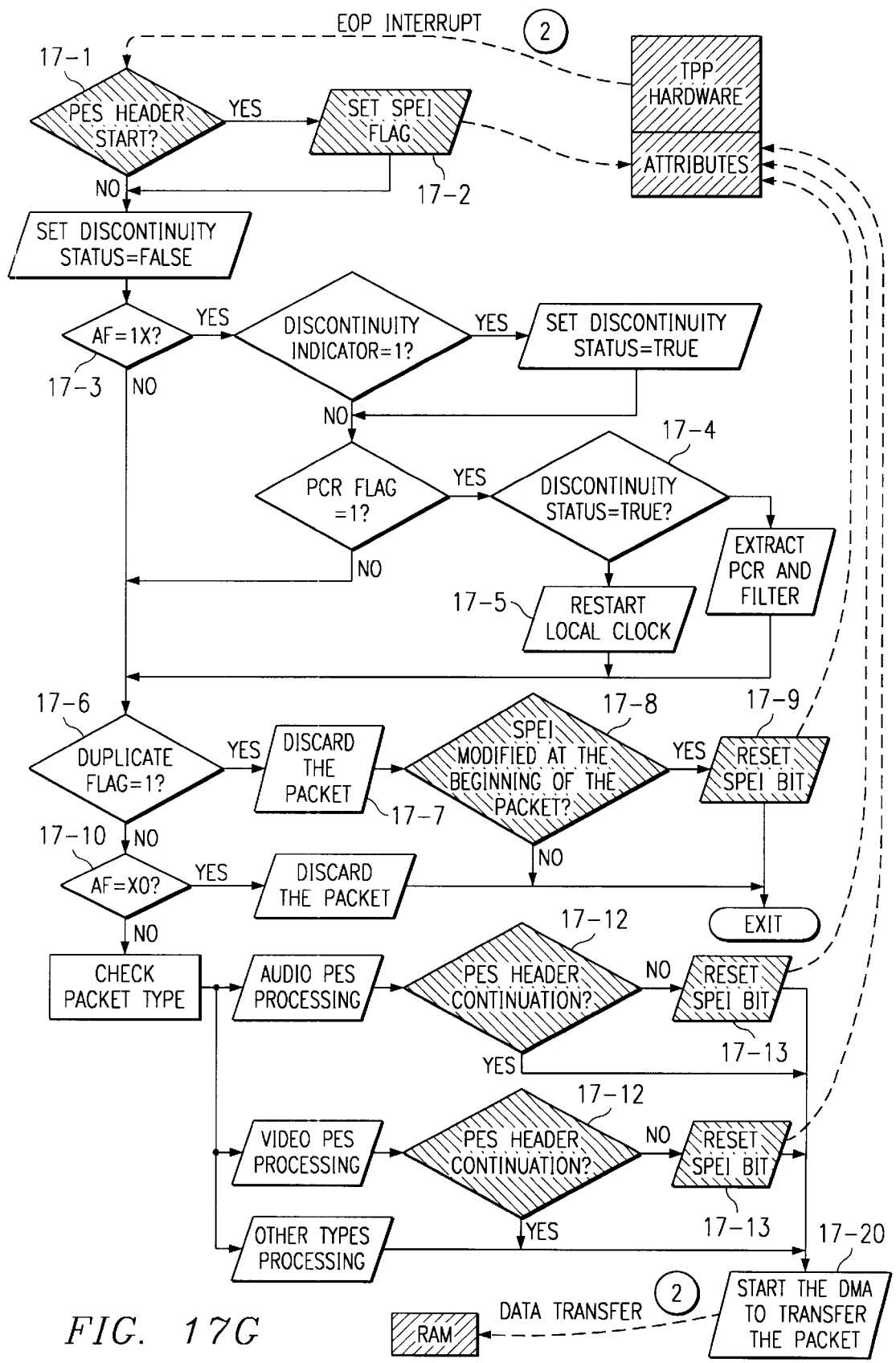
FIG. 17G is the flow diagram used to analyze a packet header.

FIG. 17G depicts a flowchart that can be used to analyze the packet. The first point in the following list (check of the Pes/Psi start flag and setting of the Spei flag) is optional.

In fact, as mentioned before, if the software latency is short enough to allow the Spei bit to be set before the TPP hardware module analyzes the following transport packet, this operation will minimize the CPU intervention; an EOP interrupt will be sent to the microprocessor only if the packet following a PES header start has to be processed indeed.

Otherwise, if the bit rate of the incoming stream and the CPU latency are too high, the Hpei mechanism can be enabled (En_Hpei=1); the next packet with the same PID following a PES header starting point will be always transmitted to the CPU.

Check if a PES header starts 17-1 in the current transport packet by reading the Pes/Psi start flag in the Packet Analyzer Control Register (Packet Status Word).

If a PES header starts in the current transport packet, the Spei bit 17-2 in the Packet Analyzer Control Register has to be set by the CPU in order to intercept the next packet with the same PID; further, the PES header could continue in the following transport packet.

Check the presence of the adaptation field 17-3 by reading the AF flag in the Packet Analyzer Control Register: Packet Status Word.

If the adaptation field is transmitted into the packet, the associated data have to be processed. In particular, the PCR has to be extracted and filtered in order to control the reconstruction of the reference clock. Another important part consists of the analysis of the discontinuity status 17-4; if the discontinuity status bit in the adaptation field is set, a discontinuity in the continuity counter value does not correspond to a missing packet. If the discontinuity status is set, the local clock has to be re-initialized 17-5 to the PCR value, if present.

Check if the packet is duplicated by reading the duplicate packet flag 17-6 in the Packet Analyzer Control Register.

If the packet is duplicated, it is discarded 17-7; since no other processing is required. If the Spei bit has been modified at the beginning of the packet 17-8 because there is a PES header and the Hpei method is not used, the Spei bit has to be cleared 17-9 before the end of the process.

Check if the packet contains a transport payload by reading the AF flag 17-10 in the Packet Analyzer Control Register.

If there is no payload (adaptation field only) the packet is discarded, since no other processing is required.

This "check the packet" part of the flow diagram is based on a table that associates each selected PID to a particular type of processing to be performed; in this way, the packet is processed by the related routine. The table contains 32 entries, one for each possible selected PID: each entry allows identification of the packet type (i.e. audio packet, video packet, PES private date, PSI, etc.) and the memory address where the data is to be stored. In particular, if the packet type corresponds to a video stream or to an audio stream (in general to an automatic DMA transfer) and the Hpei mechanism is not used, after the packet processing the Spei bit has to be cleared 17-13 if the PES header 17-12 is finished. The data after processing are finally transmitted, via DMA 17-20, to the specific memory buffer.

For the complete flow chart shown in FIG. 17G; the black modules correspond to the logical blocks of the flow chart that are executed only if the Hpei mechanism is disabled.

For example, if the transport stream for a video decoder does not analyze the PES syntax.

In this case only the video elementary stream is sent to the video decoder; the PTS value is extracted and written into a register of the video decoder. All the other fields that could be included in the PES header are not considered, as it is allowed by the DVB recommendations. FIG. 17H describes the structure of the PES packet.

The following steps are used to process the PES packet. The first part of the PES header is stored in a temporary buffer in order to process the interesting fields: if the header is split among different packets, the process continues after the second packet is received and the first bytes of the header have to be written into the temporary buffer.

This example explains only the part related to the PES analysis. For the other part of the CPU processing, the process described earlier herein applies.

Before enabling the PID selection of the TPP hardware module the flags of the TPP control register are initialized as follow:

| | |
|---|---|
| En_erroneous_p = 0 | the packets that contain an error are discarded. |
| En_duplicate_p = 0 | the duplicated packets that don't carry an adaptation field are discarded: in this case the payload is identical to the payload of the previous packet. |
| Spei = 0 | automatic transfer without the CPU intervention: the packet is intercepted by the CPU only when the conditions described in the previous sections occur. |
| stream-id filter flag = 0 | no filter on the stream-id field is required. |
| PSI flag = 0 | the video stream is not transmitted by PSI sections, but by using the PES syntax. |
| En_Hpei = 1 | the Hpei mechanism is enabled. |

The process can also be explained by the following pseudo-code.

PesStatus indicates the status of the PES header processing of the previous status (0=the PES header is finished; 1=the PES header continues from the previous packet and it has not been analyzed yet; 2=the PES header continues from the previous packet and all the useful fields have already been analyzed).

PreviousSize indicates the length of the PES header that has been analyzed in the previous packet and, after the update, the size of the PES packet that has been analyzed in the previous packet plus the size of the PES packet included in the current transport packet.

```
if(CC-error flag = 1) and                         There is a continuity counter error but the
    (discontinuity status = TRUE)                 discontinuity is not allowed: some of the
        "start error concealment"                 previous packets are missed. In this case an
                                                  appropriate method of error concealment has to be
                                                  started.
if(PES/PSI start flag = 0) and                    There is no PES header in this packet: all
    (PesStatus = 0)                               the payload has to be transferred.
        "arrange starting point of the data
         to be transferred"
elsif (PesStatus = 2)                             There is a PES header continuation but all the
                                                  useful fields have been analyzed in the previous
                                                  packet.
        PayloadLength = 184 – Aflength            Calculate the payload length in bytes: the payload
                                                  size is the transport packet size (184 Bytes) minus
                                                  the adaptation field length.
        PreviousSize = PreviousSize               Update the size.
         + PayloadLength
        if(PreviousSize <PES packet length)       The PES header does not end in this packet:
            "no operation"                        since the PES payload has not started yet, no data
                                                  have to be transferred.
        else
            PesStatus = 0                         The PES header ends in this packet: the PES
            "arrange starting point of the data to be    payload has to be transferred.
             transferred"
        else
            PesStatus is not equal to 2: the PES header
            has not been analyzed yet.
            PayloadLength = 184 – AFlength        Calculate the payload length in bytes: the payload
                                                  size is the transport packet size (184 Bytes) minus
                                                  the adaptation field length.

"append N bytes to temporary buffer"
            (N = 14 – PreviousSize)
            PreviousSize = PreviousSize           Update the size.
             + PayloadLength
            if(PreviousSize <9)                   The fixed part of the PES header is not fully
                                                  included in this packet.
                PesStatus = 1;
            else
```

-continued

```
            PreviousSize greater or equal to 9: all the
            flags of the fixed part of the PES header
            are in this packet.
            if(pts_flag = 0)                       No PTS is carried by the PES header.
            if(PreviousSize < PES header length)   No more useful fields but the PES header does
                PesStatus = 2;                     not end in this packet.
       else
            PesStatus = 0;
            "arrange starting point of the data to be
            transferred"
                The PES header ends in this packet: the
                PES payload has to be transferred.
       else           The PES header contains a PTS.
            if (PreviousSize < 14)                 The PTS is in the following packet
                PesStatus = 1;
            else      The PTS is in this packet.
            "write PTS to video decoder"
                if (PreviousSize <PES header length)
                                                   The header does not end in this packet.
                    PesStatus = 2;
            else      The header is finished.
            PesStatus = 0;
                "arrange starting point of the data
                to be transferred"
                    The PES header ends in this packet:
                    the PES payload has to be transferred.
```

In this case the packet is sent to the CPU only when the PES header is present: the occurrence can be easily found by checking the value of the PUS indicator in the transport packet header.

Suppose that the video stream is coded in frames with a bit rate of 15 Mbps, if the CPU has to process each packet, it will be interrupted about every 100 μsec.

On the contrary, by using the preliminary filter and routing performed by the TPP hardware, the CPU is interrupted only for each PES packet; if the PES packet length is equivalent at least to the frame size, the interrupts are generated, in the worst case, each 40 ms.

For example, the transport stream for an audio decoder analyzes the PES syntax and a filter on the stream-id field is performed. In this example, the audio decoder can analyze the PES packet but the CPU has to filter all the PES packet with a stream-id different from a specific value, if the stream-id is identical.

The general flow shown in FIG. 17G and described previously herein is used; the following part describes only the specific part of the processing related to the audio PES packet. In particular, the Hpei mechanism is disabled, so the CPU sets the Spei flag every time a transport packet containing the starting point of a PES header is received.

Before enabling the PID selection of the TPP hardware module the flags of the TPP control register are initialized as follow:

| | |
|---|---|
| En_erroneous_p = 0 | the packets that contain an error are discarded. |
| En_duplicate_p = 0 | the duplicated packets that don't carry an adaptation field are discarded: in this case the payload is identical to the payload of the previous packet. |
| Spei = 0 | automatic transfer without the CPU intervention: the packet is intercepted by the CPU only when the conditions described in the previous sections occur. |
| stream-id filter flag = 1 | a filter on the stream-id field is required. |
| PSI flag = 0 | the audio stream is not transmitted by PSI sections, but by using the PES syntax. |

-continued

| | |
|---|---|
| En_Hpei = 0 | the Hpei mechanism is disabled, the CPU has to set and reset the Spei bit. |

After the initialization, the TPP hardware module discards all the packets until the first PES header is received. At this point an EOP interrupt is issued and the CPU analyze the packet.

If the stream-id value matches a specific pattern, all the PES packet has to be sent to the audio decoder; as a consequence the CPU 220 clears the stream-id filter flag in the Packet Analyzer Control Register and all the transport packets are automatically transmitted to the audio decoder 254. When another PES header is found by the TPP hardware (the packet unit start indicator in the transport header is set), an interrupt is generated and the CPU can perform another filter operation on the stream-id value of the new PES packet.

If the stream-id value does not match the specified pattern, the CPU sets the stream-id flag in the TPP module and all the following transport packets with the same PID are automatically discarded by the hardware until the next PES header.

The process can also be explained by the following pseudo-code. The CPU does not analyze all the PES header, but only the stream-id field.

PesStatus indicates the status of the PES header processing of the previous status (0=the PES header is finished or the PES header continues from the previous packet but the stream-id value has been already filtered; 1=the PES header continues from the previous packet and the stream-id value has not been filtered yet).

PreviousSize indicates the length of the PES header that has been read in the previous packet.

```
if(stream-id filter flag = 0) and           The current packet does not match the
    (PES/PSI start flag = 0)                stream-id filter pattern and there is no
        "discard the packet"                PES header: the packet has to be discarded.
else
    if(CC-error flag = 1) and               There is a continuity counter error but the
        (discontinuity status = TRUE)       discontinuity is not allowed: some of the previous
        "start error concealment"           packets are missed. In this case an appropriate
                                            method of error concealment has to be started.
    if(PES/PSI start flag = 0) and          There is no PES header in this packet: all the
        (PesStatus = 0)                     payload has to be transferred.
        "arrange starting point of the data
        to be transferred"
    else            There is a PES header or a PES header
                    continuation.
        PayloadLength=184–AFlength          Calculate the payload length in bytes: the payload
                                            size is the transport packet size (184 Bytes) minus
                                            the adaptation field length.
        PreviousSize = PreviousSize         Update the size.
        + PayloadLength
            if(PreviousSize <4)             The stream-id is not included in this packet.
                                            The next transport has to be analyzed
                PesStatus = 1;
        else            PreviousSize greater or equal to 4: the stream-id field is included in this packet.
            PesStatus = 0;                  The CPU does not have to analyze the next packet
            if(stream-id = "pattern")       Filter the stream-id field: if the value is equal to a
                                            specific pattern, the PES packet is selected
                "clear stream-id filter flag"  Disable the automatic discarding of the packets by
                                            the TPP hardware
                "arrange starting point of the  The PES header ends in this packet: the
                data to be transferred"     PES payload has to be transferred.
            else
                The stream-id field is different from the
                specified pattern: the PES packet has to
                be discarded.
                    "set stream-id filter flag"  Enable the automatic discarding of the packets by
                                            the TPP hardware
                    "discard the packet"
```

At this point the Spei bit is cleared only if PesStatus is equal to zero, since the considered part of the PES header has been already processed.

In this case an interrupt is sent to the CPU only when the PES header is present in order to filter the stream-id value. If the stream-id matches the selected value, the following packets are automatically transmitted to the destination buffer; on the contrary, if the stream-id does not match the selected value all the following packets are discarded by the TPP hardware module until the next PES header.

Without this mechanism, the CPU would be forced to receive an interrupt to discard all the transport packets that are included in a PES packet with an unwanted value of stream-id.

FIG. 17I depicts a high-level block diagram of the presently preferred details of the TPP 210 of FIG. 1B. More particularly, it may be seen that the TPP 210 includes the TPP functional block 210-15, a DES functional block 210-25, a DVCR/1934 block 210-30, a DAC 210-40 and a CPU interface 210-50. The TPP block 210-15 performs the functions noted earlier herein. The DES block 210-25 performs any needed decryption. The DVCR/1394 block 210-30 provides data streams to the 1294 connections and/or a digital VCR. The DAC 210-40 is for controlling the VCXO.

FIG. 17J depicts various DSS bitstream packets and their contents.

Figure 17K:
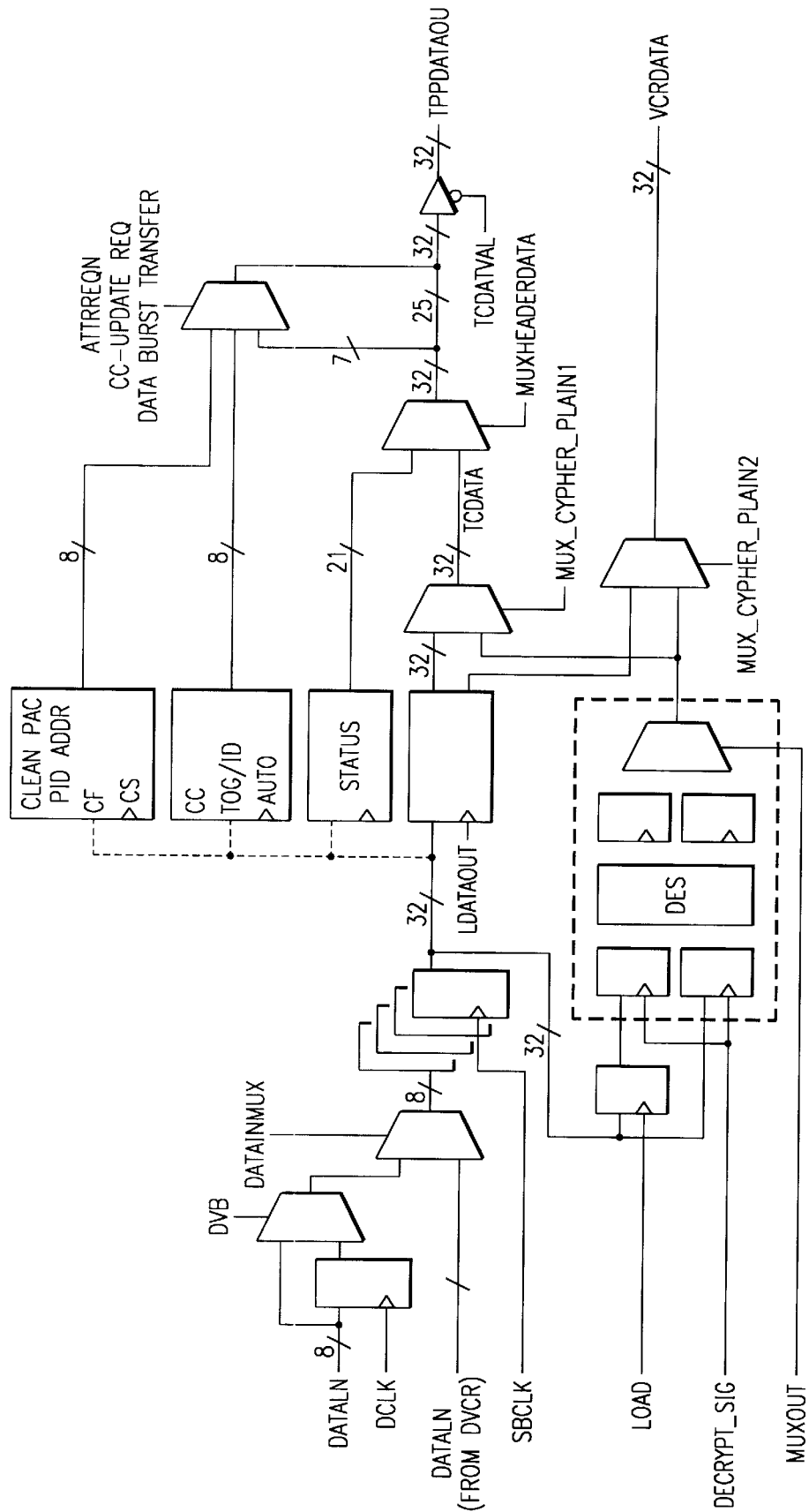

FIG. 17K depicts preferred circuit for implementing portions of the blocks depicted in FIG. 17I. More particularly, it may be seen how input multiplexors may be employed to switch the input between a DVB or DSS signal. It further illustrates how the header information/data may be temporarily stored in registers and shifted out to perform the header analysis described earlier herein. In addition, it may be seen how incoming data may be buffered in small registers before being sent out as valid data in "bursts" during and following the header analysis; this assumes the header analysis indicates the data is to be stored for subsequent processing.

Figure 17L:
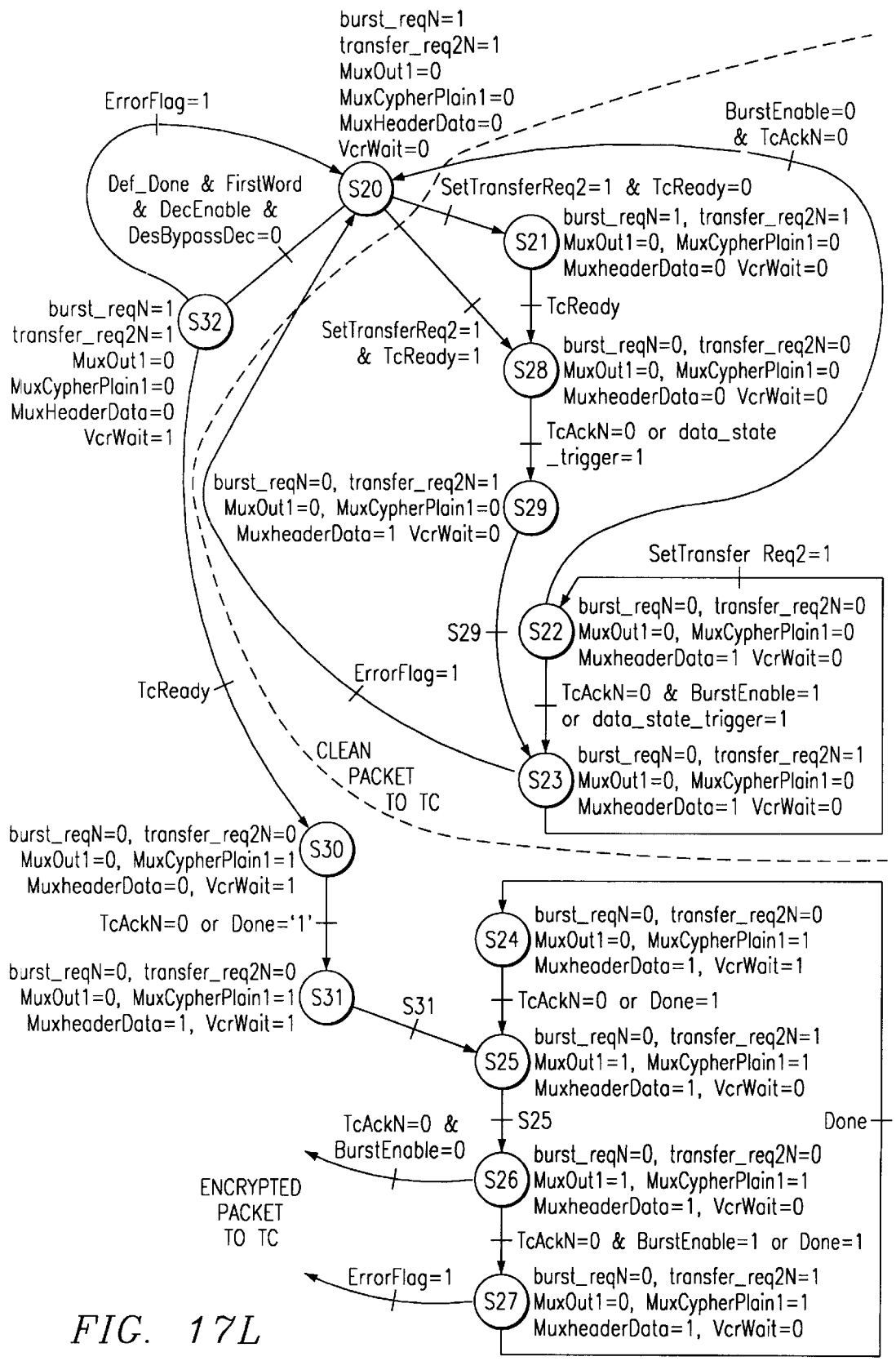
Figure 17M:
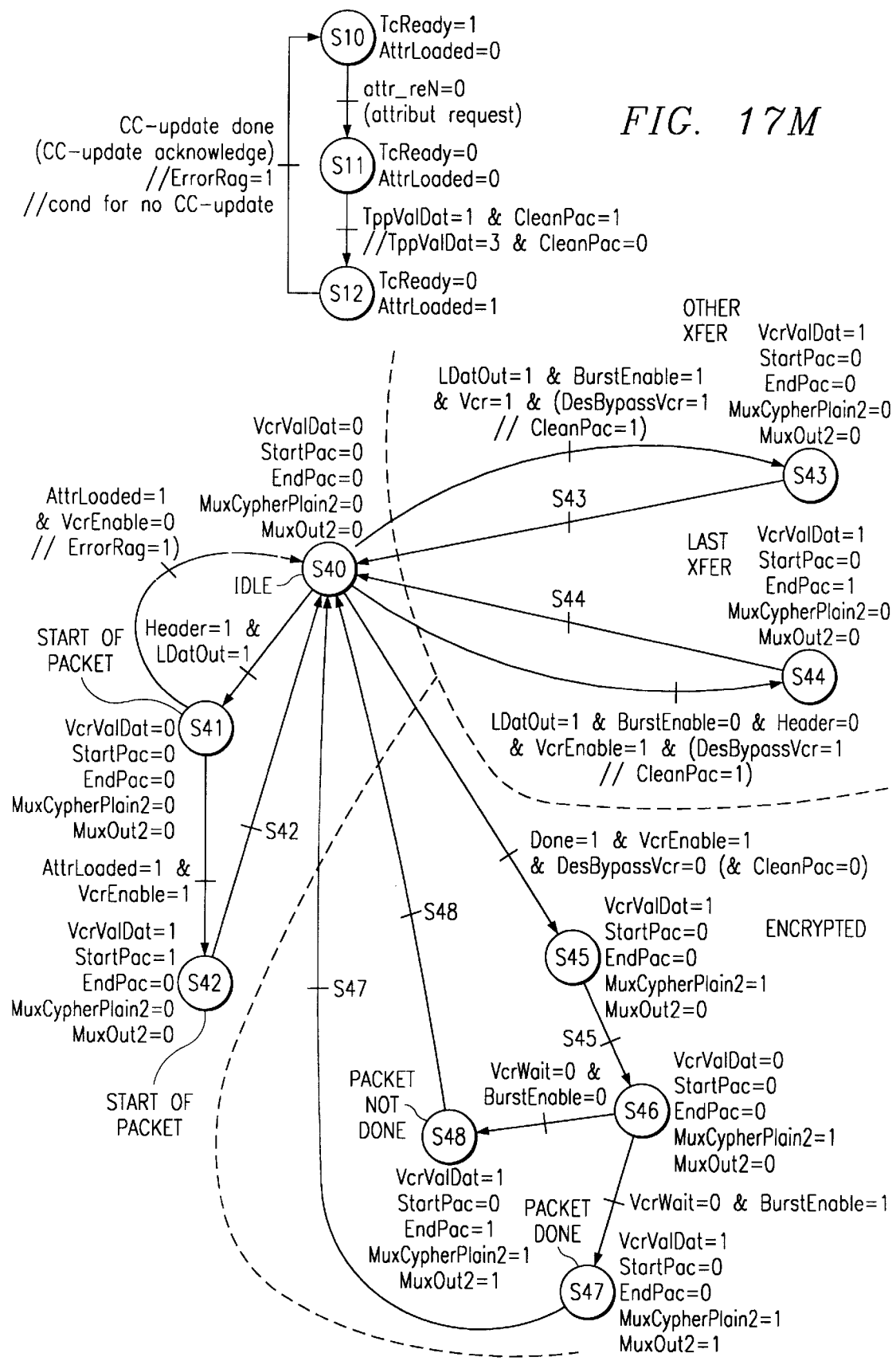
Figure 170:
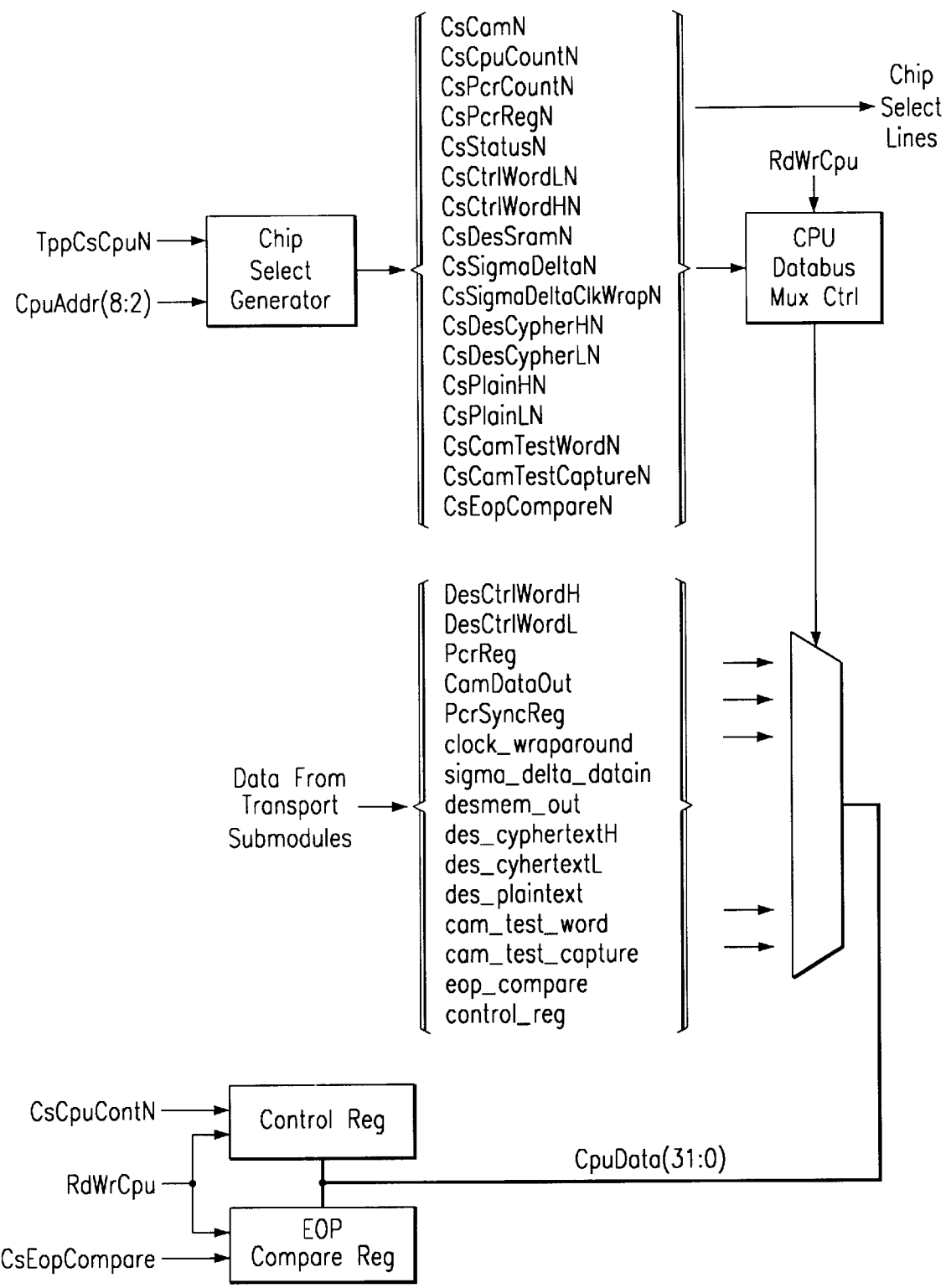

FIGS. 17L and 17M depict state machines that control the operations of the TPP block. More particularly, FIG. 17L depicts two basic operations; it depicts a "clean" packet to the TC in the upper right portion and an encrypted packet to the IT in the lower left portion. State S20 is the "idle" state of the state machine. In FIG. 17L, "muxheaderdata" controls the multiplexor between the TPP header and the first data word. FIG. 17M depicts an attribute request and writeback series of states that are in the upper left and start with S10. The remainder of FIG. 17M details other transfers.

FIG. 17N depicts the details of the DAC block 210-40 of FIG. 17I.

FIG. 17O depicts the various signals associated with the TPP and its interface with the CPU 220.

Figure 17P:
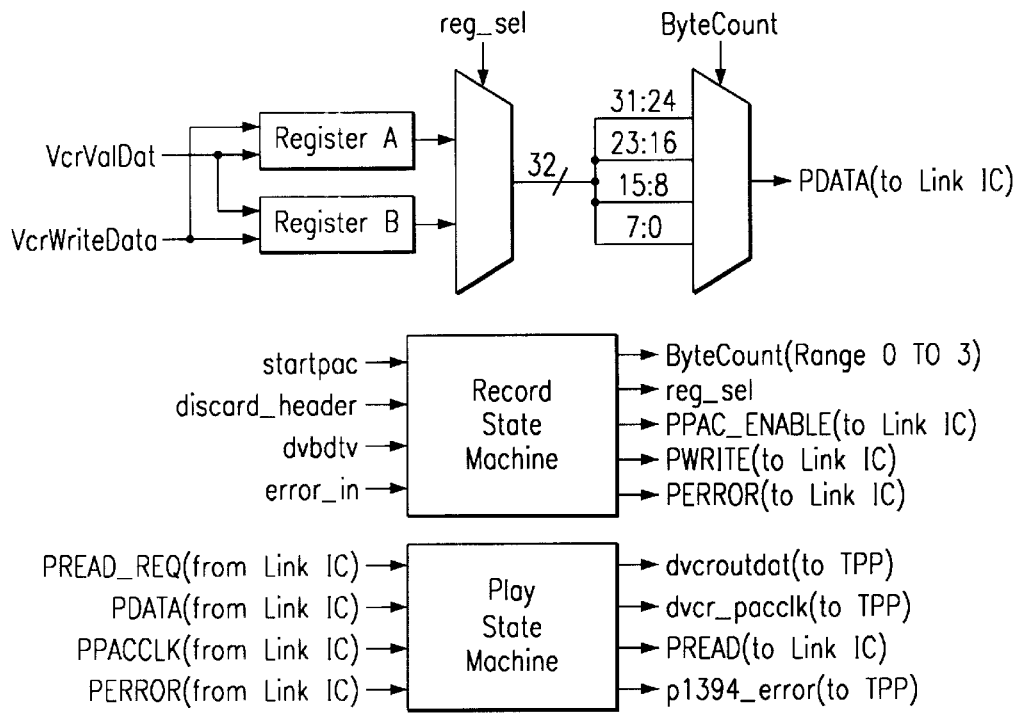

FIG. 17P depicts more details of the block 210-30 of FIG. 17I. More particularly, it illustrates the presence of a record and play state machine and registers that a VCR may write to.

The video decoder module 252 provides real-time video decoding of MPEG-2 Main Profile Main level and MPEG-1, error detection and concealment, an internal 90 KHz/27 MHz System Time Clock and a sustained input rate of 16 Mbps. It supports Trick Mode with full trick mode picture and provides ¼ and ¹⁄₁₆ decimated size picture. It extracts Closed Caption and other picture user data from the bitstream, has 3:2 pulldown in NTSC mode, and supports the display formats in Table 10 with polyphase horizontal resampling and vertical chrominance filtering

TABLE 10

Supported Video Resolutions

| NTSC (30 Hz) | | PAL (25 HZ) | |
|---|---|---|---|
| Source | Display | Source | Display |
| 720 × 480 | 720 × 480 | 720 × 576 | 720 × 576 |
| 704 × 480 | 720 × 480 | 704 × 576 | 720 × 576 |
| 544 × 480 | 720 × 480 | 544 × 576 | 720 × 576 |
| 480 × 480 | 720 × 480 | 480 × 576 | 720 × 576 |
| 352 × 480 | 720 × 480 | 352 × 576 | 720 × 576 |
| 352 × 240 | 720 × 480 | 352 × 288 | 720 × 576 |

Pan-and-scan for 16:9 source material according to both DSS and MPEG syntax; high level command interface; and synchronization using Presentation Time Stamps (PTS).

The video decoder module 252 receives a video bitstream from SDRAM 312. It also uses SDRAM as its working memory to store tables, buffers, and reconstructed images. The decoding process is controlled by an internal RISC processor which accepts high level commands from the ARM. A more detailed description of the decoder 252 is found in U.S. Pat. No. 5,379,356, which is incorporated herein by reference. In this fashion, the ARM is acting as an external host to initialize and control video decoder module. The output video is sent to the OSD module for further blending with OSD data. Exemplary video decoders are disclosed in U.S. Pat. Nos. 5,608,459, 5,270,832, 5,253,078, 5,196,946 and 5,191,548, which are incorporated by reference herein.

Besides normal bitstream decoding, the video decoder 252 also extracts from the picture layer user data the Closed Caption (CC), the Extended Data Services (EDS), the Presentation Time Stamps (PTS) and Decode Time Stamps, the pan_and_scan, the fields display flags, and the no_burst flag. These data fields are specified by the DSS. The CC and EDS are forwarded to the NTSC/PAL encoder module 260 and the PTS is used for presentation synchronization. The other data fields form a DSS-specific constraints on the normal MPEG bitstream, and they are used to update information obtained from the bitstream.

When the PTS and SCR (System Clock Reference) do not match within tolerance, the video decoder 252 will either redisplay or skip a frame. At that time, the CC/EDS will be handled as follows: if redisplaying a frame, the second display will not contain CC/EDS; if skipping a frame, the corresponding CC/EDS will also be skipped. During trick mode decoding, the video decoder repeats the following steps: searches for a sequence header followed by an I picture; ignores the video buffer underflow error; and continuously displays the decoded I frame.

Note that trick mode I frame data has to contain the whole frame instead of only several intra slices.

The video decoder 252 accepts the high level commands listed in Table 11.

TABLE 11

Video Decoder Commands

| | |
|---|---|
| Play | normal decoding |
| Freeze | normal decoding but continue to display the last picture |
| Stop | stops the decoding process. The display continue with the last picture |
| Scan | searches for the first I picture, decodes it, continuously displays it, and flushes the buffer |

TABLE 11-continued

Video Decoder Commands

| | |
|---|---|
| NewChannel | for channel change. This command should be preceded by a Stop command. |
| Reset | halts execution of the current command. The bitstream buffer is flushed and the video decoder performs an internal reset |
| Decimate1/2 | continue normal decoding and displaying of a 1/2 × 1/2 decimated picture (used by OSD API) |
| Decimate1/4 | continue normal decoding and displaying of a 1/4 × 1/4 decimated picture (used by OSD API) |

Table 12 shows the aspect ratio conversions that are presently preferred.

TABLE 12

Aspect Ratio Conversions

| | Display | |
|---|---|---|
| Source | 4:3 | 16:9 |
| 4:3 | YES | NO |
| 16:9 | PAN-SCAN | YES |

The Pan-Scan method is applied when displaying a 16:9 source video on a 4:3 device. The Pan-Scan location specifies the 1, ½, or ¼ sample if the source video has the full size, 720/704×480. If the sample size is smaller than full then the Pan-Scan location only specifies to an exact integer sample. Note that the default display format output from circuit 200 is 4:3. Outputting 16:9 video is only available when the image size is 720/704×480. A reset is also required when switching between a 4:3 display device and a 16:9 one.

The ½ and ¼ decimation, in each dimension, is supported for various size images in 4:3 or 16:9 format. Table 13 provides the details for the decimation modes.

TABLE 13

Decimation Modes

| | Source | | | | | |
|---|---|---|---|---|---|---|
| | 4:3 | | | 16:9 | | |
| Sample Size | Full | 1/2 | 1/4 | Full | 1/2 | 1/4 |
| 720/704 × 480 | YES | YES | YES | YES | YES | YES |
| 544 × 480 | YES | YES | YES | YES | YES | YES |
| 480 × 480 | YES | YES | YES | YES | YES | YES |
| 352 × 480 | YES | YES | YES | YES | YES | YES |
| 352 × 240 | YES | YES | YES | NO | NO | NO |

The audio decoder module 254 decodes MPEG audio layers 1 and 2 and supports all MPEG-1 and MPEG-2 data rates and sampling frequencies, except half frequency. It provides automatic audio synchronization and supports 16- and 18-bit PCM data. It outputs in both PCM and SPDIF formats and generates the PCM clock or accepts an external source. It provides error concealment (by muting) for synchronization or bit errors and provides frame-by-frame status information.

The audio module 254 receives MPEG compressed audio data from the traffic controller 310, decodes it, and outputs audio samples in PCM format. The ARM CPU 220 initializes/controls the audio decoder 254 via a control register and can read status information from the decoder's status register.

Audio frame data and PTS information are stored in the SDRAM 312 in packet form. The audio module 254 will decode the packet to extract the PTS and audio data. The details of the audio decoder may be found in co-pending and commonly-owned patent applications Ser. No. 08/021,007, filed Feb. 22, 1993; Ser. No. 08/054,127, filed Apr. 26, 1993; Ser. No. 08/054,126, filed Apr. 26, 1993; Ser. No. 08/107,098, filed Aug. 13, 1993; Ser. No. 08/054,768, filed Apr. 26, 1993; Ser. No. 08/100,591, filed Jul. 30, 1993; and U.S. Pat. No. 5,425,061, filed Jun. 7, 1993.

The ARM 220 can control the operation of the audio module via a 32-bit control register. The ARM may reset or mute the audio decoder, select the output precision and oversampling ratio, and choose the output format for dual channel mode. The ARM will also be able to read status information from the audio module. One (32-bit) register provides the MPEG header information and sync, CRC, and PCM status. Exemplary audio decoders are disclosed in U.S. Pat. Nos. 5,657,454 and 5,644,310, which are incorporated by reference herein.

The audio module has two registers: a read/write control register and a read-only status register. The registers are defined in Table 14 below.

TABLE 14

Audio Module Registers

| Register # | Location | Description |
|---|---|---|
| 0 (Control Register-R/W) | 31:6 | Reserved (set to 0) |
| | 5:4 | PCM Select |
| | | 00 = 16 bit, no oversampling |
| | | 01 = 16 bit, 256 × oversampling |
| | | 10 = 18 bits, no oversampling |
| | | 11 = 18 bits, 384 × oversampling |
| | 3:2 | Dual Channel Mode Output Mode Select |
| | | 00 = Ch 0 on left, Ch 1 on right |
| | | 01 = Ch 0 on both left and right |
| | | 10 = Ch 1 on both left and right |
| | | 11 = Reserved |
| | 1 | Mute |
| | | 0 = Normal operation |
| | | 1 = Mute audio output |
| | 0 | Reset |
| | | 0 = Normal operation |
| | | 1 = Reset audio module |
| | 31 | Stereo Mode |
| | | 0 = all other |
| | | 1 = dual mode |
| (Status Register - R only) | 30:29 | Sampling Frequency |
| | | 00 = 44.1 KHz |
| | | 01 = 48 KHz |
| | | 10 = 32 KHz |
| | | 11 = Reserved |
| | 28:27 | De-emphasis Mode |
| | | 00 = None |
| | | 01 = 50/15 microseconds |
| | | 10 = Reserved |
| | | 11 = CCITT J.17 |
| | 26 | Synchronization Mode |
| | | 0 = Normal operation |
| | | 1 = Sync recovery mode |
| | 25 | CRC Error |
| | | 0 = No CRC error or CRC not enabled in bitstream |
| | | 1 = CRC error found |
| | 24 | PCM Underflow |
| | | 0 = Normal operation |
| | | 1 = PCM output underflowed |
| | 23:4 | Bits 19–0 of the MPEG header |
| | 3:0 | Version number of the audio decoder |

The OSD module 270 supports up to 8 hardware windows, one of which can be used for a cursor and all the non-overlapped windows can be displayed simultaneously. The overlapped windows may be displayed obstructively with the highest priority window on top. The OSD provides a hardware window-based rectangle cursor with programmable size and blinking frequency and provides a programmable background color, which defaults to blue. It supports 4 window formats (empty window for decimated video; bitmap; YCrCb 4:4:4 graphics component; and YCrCb 4:2:2 CCIR 601 component) and supports blending of bitmap, YCrCb 4:4:4, or YCrCb 4:2:2 with motion video and with an empty window. It supports window mode and color mode blending and provides a programmable 256 entries color look up table. It outputs motion video or mixture with OSD in a programmable 422 or 444 digital component format and provides motion video or mixture with OSD to the on-chip NTSC/PAL encoder 260 and provides graphics acceleration capability with bitBLT hardware 272.

Each hardware window has the following attributes: window position (any even pixel horizontal position on screen; windows with decimated video have to start from an even numbered video line also); window size: from 2 to 720 pixel wide (even values only) and 1 to 576 lines; window base address; data format (bitmap, YCrCb 4:4:4, YCrCb 4:2:2, and empty); bitmap resolution (1, 2, 4, and 8 bits per pixel); full or half resolution for bitmap and YCrCb 4:4:4 windows; bitmap color palette base address; blend enable flag; 4 or 16 levels of blending; transparency enable flag for YCrCb 4:4:4 and YCrCb 4:2:2; and output channel control.

The OSD module 270 is responsible for managing OSD data from different OSD windows and blending them with the video. It accepts video from the video decoder 252, reads OSD data from SDRAM 312, and produces one set of video output to the on-chip NTSC/PAL encoder 260 and another set to the digital output that goes off-chip. The OSD module 270 defaults to standby mode, in which it simply sends video from the video decoder 252 to both outputs. After being activated by the ARM CPU 220, the OSD module 270, following the window attributes set up by the ARM, reads OSD data and mixes it with the video output. The ARM CPU 220 is responsible for turning on and off OSD operations. The bitBLT hardware 272 which is part of the OSD module 270 provides acceleration to memory block moves and graphics operations. FIG. 18 shows the block diagram of the OSD module. The various functions of the OSD module 270 are described later herein.

OSD data has a variable size. In the bitmap mode, each pixel can be 1, 2, 4, or 8 bits wide. In the graphics YCrCb 4:4:4 or CCIR 601 YCrCb 4:2:2 modes, it takes 8-bits per component, and the components are arranged according to 4:4:4 (Cb/Y/Cr/Cb/Y/Cr) or 4:2:2 (Cb/Y/Cr/Y) format. In the case where RGB graphics data needs to be used as OSD, the application should perform software conversion to Y/Cr/Cb before storing it. The OSD data is always packed into 32-bit words and left justified. Starting from the upper left corner of the OSD window, all data will be packed into adjacent 32-bit words. The dedicated bitBLT hardware 272 expedites the packing and unpacking of OSD data for the ARM to access individual pixels, and the OSD module 270 has an internal shifter that provides pixel access.

In NTSC mode, the available SDRAM 312 is able to store one of the following OSD windows with the size listed in Table 15, with the current and proposed VBV buffer size for DSS. Although as noted earlier herein, the VBV buffer may be placed in optional memory on the external bus 300, which provides more OSD room in the SDRAM 312.

TABLE 15

SDRAM OSD Window Size

720 × 480 frames

| bits/pixel | Current | Proposed |
|---|---|---|
| 24 | 0.21 | 0.34 |
| 8 | 0.64 | 1.03 |
| 4 | 1.29 | 2.06 |
| 2 | 2.58 | 4.12 |

An OSD window is defined by its attributes. Besides storing OSD data for a window in SDRAM 312, the application program also needs to update window attributes and other setups in the OSD module 270 as described below.

The CAM memory 270-40 contains X and Y locations of the upper left and lower right corners of each window. The application program needs to set up the CAM and enable selected OSD windows. The priority of each window is determined by its location in the CAM. That is, the lower address window always has higher priority. In order to swap the priority of windows, the ARM has to exchange the locations within the CAM.

The OSD module keeps a local copy of window attributes 270-110. These attributes allow the OSD module to calculate the address for the OSD data, extract pixels of the proper size, control the blending factor, and select the output channel.

Before using bitmap OSD the application program has to initialize the 256 entry color look up table (CLUT) 270-110. The CLUT is mainly used to convert bitmap data into Y/Cr/Cb components. Since bitmap pixels can have either 1, 2, 4, or 8 bits, the whole CLUT can also be programmed to contain segments of smaller size tables, such as sixteen separate, 16-entry CLUTs.

There are two blending modes. The window blending mode applies to the type of OSD window, e.g., YCrCb 4:4:4, and YCrCb 4:2:2. The color blending mode is pixel by pixel and is preferably only allowed for the bitmap OSD. Blending always blends OSD windows with real time motion video. That is, there is no blending among OSD windows except the empty window that contains decimated motion video. In case of overlapping OSD windows the blending only occurs between the top OSD window and the video. The blending is controlled by the window attributes, Blend_En (2-bit), Blend Level (4-bit), and Trans-En (1-bit). Blend_En activates blending as shown in Table 16.

In window mode all pixels are mixed with the video data based on the level defined by the attributes Blend Level. In the color mode the blending level is provided in the CLUT. That is, the least significant bit of Cb and Cr provides the 4 level blending, while the last two bits from Cb and Cr provide the 16-level blending. Transparency level, no OSD but only video, is achieved with the Trans_En bit on and the OSD pixel containing all 0s.

TABLE 16

OSD Blending Control

| Blend_En | Blending modes |
|---|---|
| 00 | Disable Blending |
| 01 | 4 Level Color Blending |
| 10 | 16 Level Color Blending |
| 11 | Window Mode Blending |

A rectangular blinking cursor is provided using hardware window 0. With window 0, the cursor always appears on top of other OSD Windows. The user can specify the size of the cursor via a window attribute. The activation of the cursor, its color, and blinking frequency are programmable via control registers. When hardware window 0 is designated as the cursor, only seven windows are available for an application. If the hardware cursor is not used, then the application can use window 0 as a regular hardware window.

After the OSD windows are activated, each of them has an attribute, Disp_Ch_Cntl[1,0], that defines the contents of the two output channels (the analog and digital video outputs) when the position of that window is currently being displayed. Table 17 shows the controls for the output channels.

TABLE 17

OSD Module Output Channel Control

| Disp_Ch_cntl [1] | Disp_Ch_cntl [0] | Channel 1 Digital Video Output | Channel 0 to NTSC/PAL Encoder |
|---|---|---|---|
| 0 | 0 | MPEG Video | MPEG Video |
| 0 | 1 | MPEG Video | Mixed OSD_Window |
| 1 | 0 | Mixed OSD_Window | MPEG Video |
| 1 | 1 | Mixed OSD_Window | Mixed OSD_Window |

Example displays of these two output channels are shown in FIG. 19.

The bitBLT hardware 272 provides a faster way to move a block of memory from one space to the other. It reads data from a source location, performs shift/mask/merge/expand operations on the data, and finally writes it to a destination location. This hardware enables the following graphics functions: Set/Get Pixel; Horizontal/Vertical Line Drawing; Block Fill; Font BitBLTing; Bitmap/graphic BitBLTing; and Transparency.

The allowable source and destination memories for bitBLT 272 are listed in Table 18.

TABLE 18

Source and Destination Memories for BitBLT

| | Destination Memory | |
|---|---|---|
| Source Memory | SDRAM | Ext_Bus Memory |
| SDRAM | YES | YES |
| Ext_Bus Memory | YES | YES |

The types of source and destination OSD windows supported by the bitBLT 272 are the given in the following table ("HR" stands for half resolution).

TABLE 19

Allowable BitBLT Window Formats

| Source OSD Window | Destination OSD Window | | | | |
|---|---|---|---|---|---|
| | YCrCb 4:4:4 | YCrCb 4:4:4_HR | YCrCb 4:2:2 | Bitmap | Bitmap_HR |
| YCrCb 4:4:4 | YES | YES | NO | NO | NO |
| YCrCb 4:4:4_HR | YES | YES | NO | NO | NO |
| YCrCb 4:2:2 | NO | NO | YES | NO | NO |
| Bitmap | YES | YES | NO | YES | YES |
| Bitmap_HR | YES | YES | NO | YES | YES |

Since the bitmap allows resolutions of 1, 2, 4, or 8 bits per pixel, the bitBLT will drop the MSB bits or pad it with 0s when swapping between windows of different resolution. For half-resolution OSD, the horizontal pixel dimension must be even numbers. For YCrCb 4:2:2 data, the drawing operation is always on 32-bit words and two adjacent pixels that align with the word boundary.

In a block move operation, the block of data may also be transparent to allow text or graphic overlay. The pixels of the source data will be combined with the pixels of the destination data. When transparency is turned on and the value of the source pixel is non-zero, the pixel will be written to the destination. When the value of the pixel is zero, the destination pixel will remain unchanged. Transparency is only allowed from bitmap to bitmap, and from bitmap to YCrCb 4:4:4.

The following describes how the OSD 270 may be employed to provide OSD with variable resolution. FIG. 18B shows the global flow to decode and display an OSD picture. The PSI buffer 312a contain the coded picture, for example: a Teletext data to be displayed within an OSD picture. The CPU 220 decodes (1) the Teletext data and build (2) the OSD picture using the Bitblt hardware 272 accelerator. The OSD controller 270 reads (3) the OSD buffer 312b and generates the OSD video that is mixed with MPEG video(4).

Different modes are displayed simultaneously on the screen: A bit-map window 1000 with 2 colors, a still video picture 1010, a 256 colors graphic window 1020, a decimated motion video picture 1030 and a Logo 1040 in true color. The OSD controller 270 minimizes the memory required to display service information. The OSD uses a new hardware windowing technique to mix different mode of display such as: Bit map with variable resolution, graphic plane, still video picture and decimated motion video.

Figure 18A:
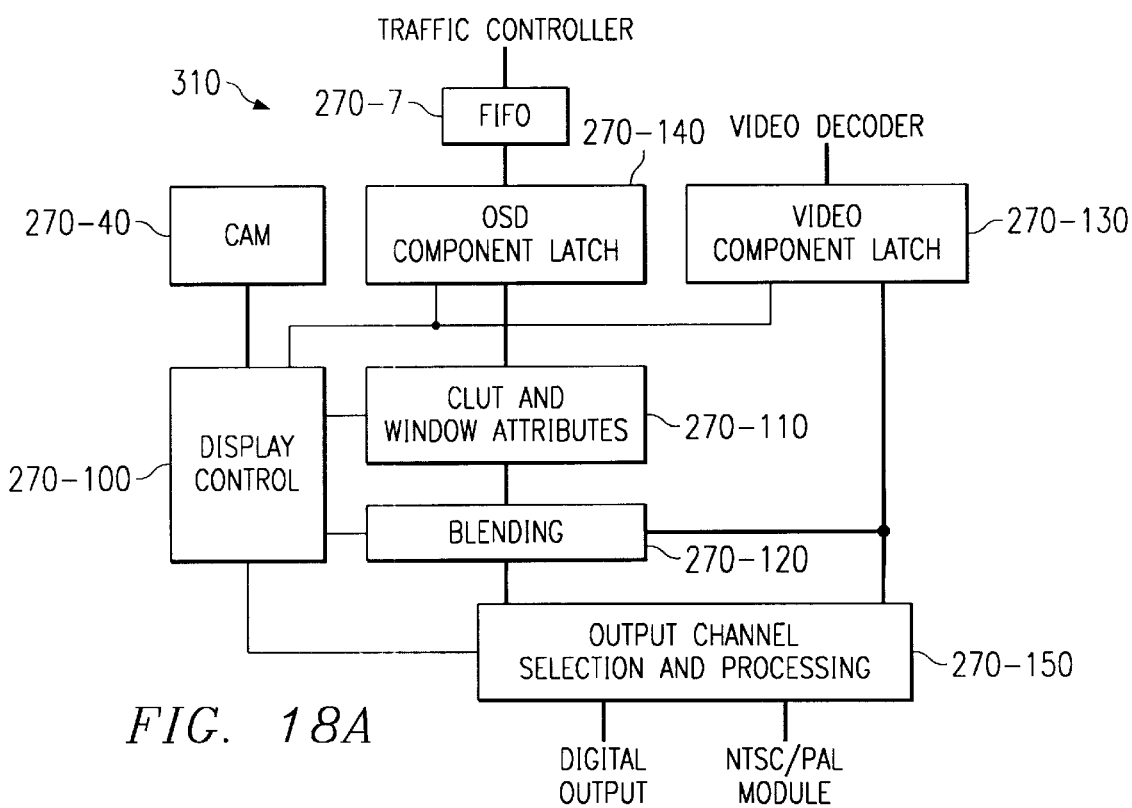
FIGS. 18A to 18Y depict details of the OSD module.
Figure 18B:
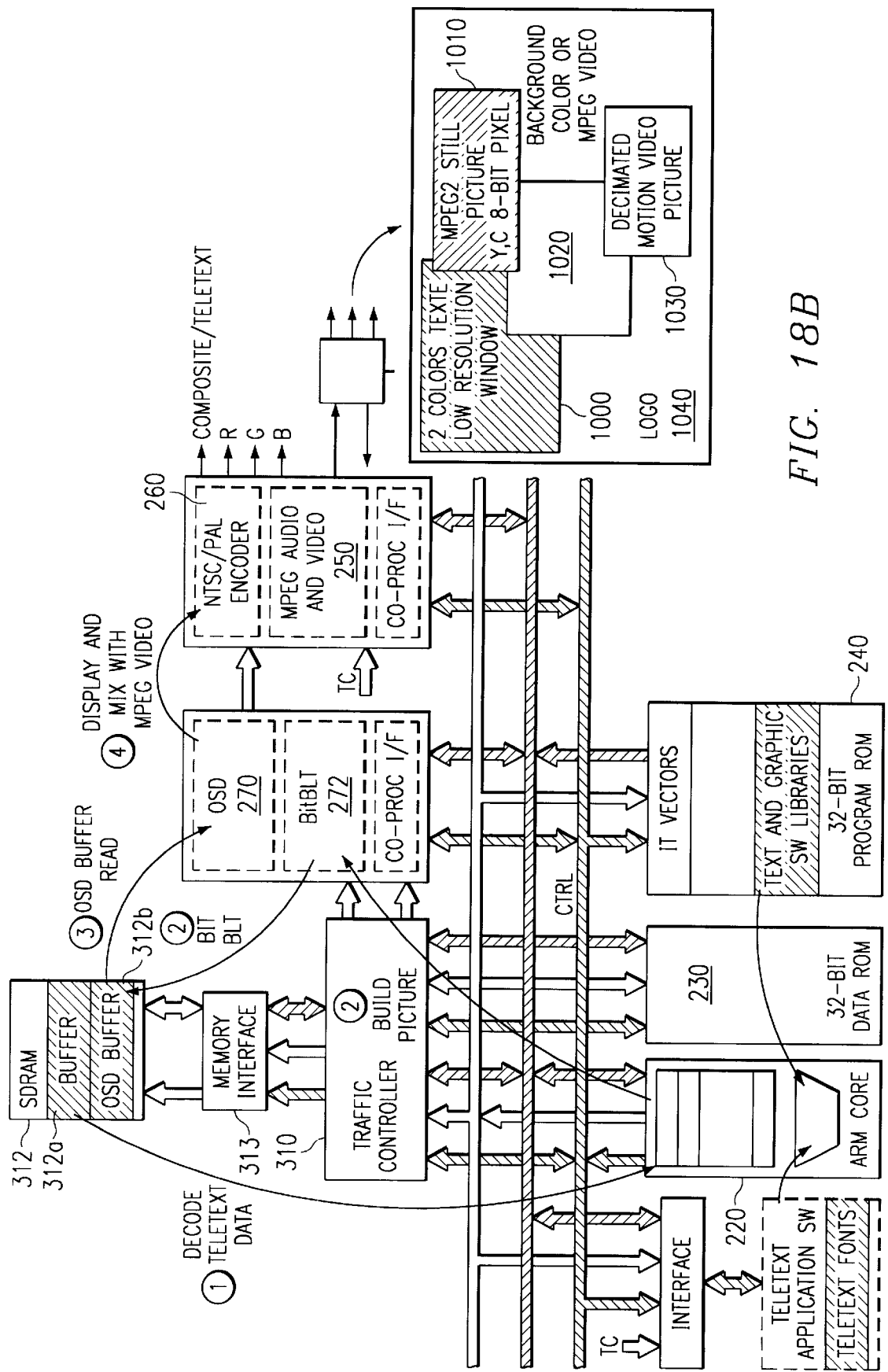
Figure 18C:
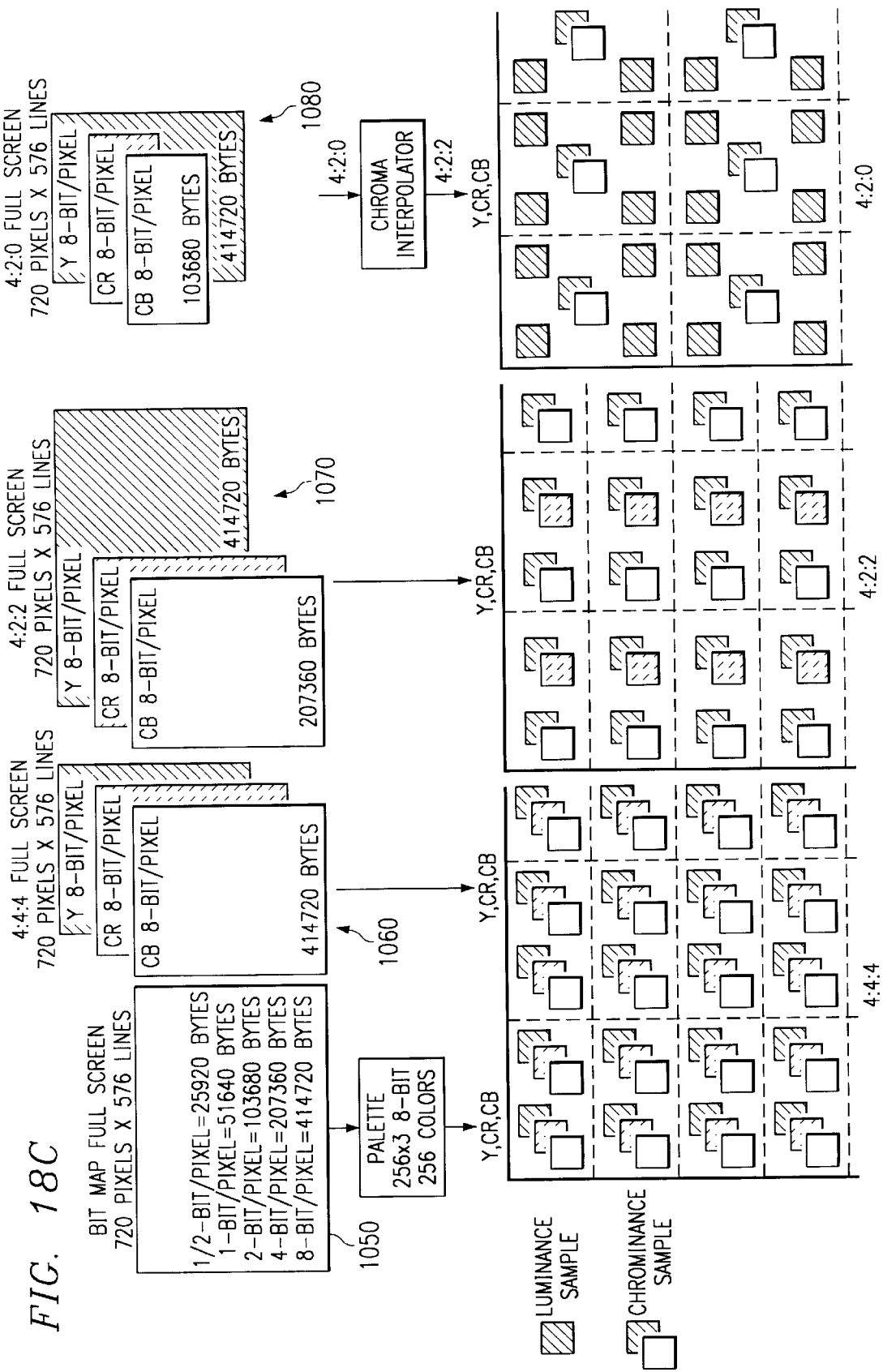

FIG. 18C shows the various modes of display that circuit 200 may employ.

In a bit map mode 1050, the frame buffer contains the code of the color of each pixel to be displayed. The number of bit per pixel defines the number of the colors that can be displayed on screen. Two colors require 1-bit per pixel and 256 colors require 8-bit per pixel. This mode is used to display graphic and text. The code of the color addresses the color look up table that contain the three color components with 8-bits each.

Graphic plane, 4:4:4 mode 1060, uses 8_bit per pixel for each color component R,G,B or Y,Cr,Cb. Each pixel requires 24-bit (16 million colors per pixel).

With the 4:2:2 mode 1070 the resolution of the chroma is divided horizontally by two. Each pixel has a luminance component Y and alternately a chrominance component Cr or Cb. This mode is used for video still or motion picture. Each pixel requires 16-bit.

With the 4:2:0 mode 1080 the resolution of the chroma is divided by two horizontally and vertically. Each pixel has a luminance component Y and a chrominance component Cr and Cb for 4 pixels. This mode is used by the MPEG video decoder to the size of the memory required to store a video motion picture. Each pixel requires 12-bit. The chroma interpolator generates the 4:2:2 output format.

Table 20 shows the number of bytes required to store a full screen picture 720 pixels×576 lines in different display modes for an OSD system that does not allows to mix several modes of display in real time on same screen. When one part of the screen requires 256 colors, the full screen must be 256 colors even if a part of the screen requires only 2 colors.

TABLE 20

Number of Byte for Full Screen Display

| Display mode | Number of bytes full screen |
|---|---|
| Bit map 1-bit per pixel | 51,840 |
| Bit map 2-bit per pixel | 103,680 |
| Bit map 4-bit per pixel | 207,360 |
| Bit map 8-bit per pixel | 414,720 |
| 4:4:4 graphic plane | 1,244,160 |
| 4:2:2 video mode | 829,440 |
| 4:2:0 video mode | 622,080 |

The OSD controller 270 can display several modes described above simultaneously on the same screen. Each part of the screen with different display modes uses a windows fully programmable in size, in position and priority level. The windows can be overlapped without limitations. The characteristic of each window is defined by a set of attributes stored in SRAM 240. Those attributes are used to calculate the memory address in real time during display and to control the hardware display system.

Figure 18D:
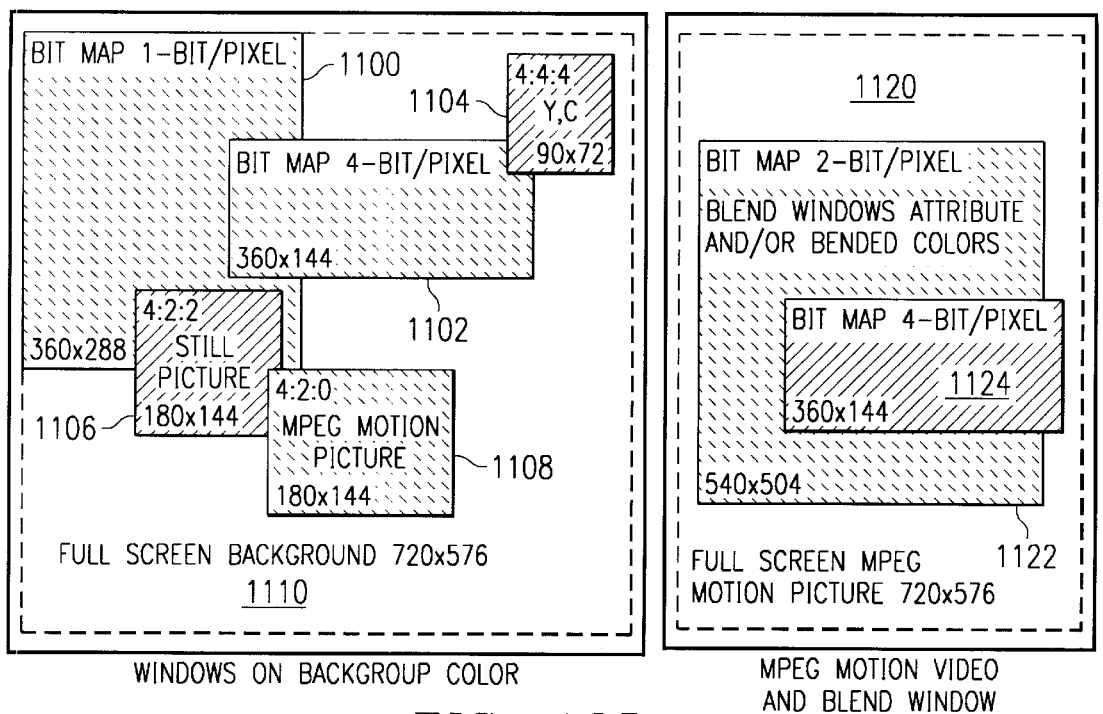

FIG. 18D shows typical OSD pictures. The left screen is composed of 5 OSD windows with different characteristics displayed on a full screen background color 1110:

a bit-map window 1100 having 360 pixels by 288 lines with two colors that requires 1-bit per pixel, a bit-map window 1102 having 360 pixels by 144 lines with 16 colors that requires 4-bit per pixel, a graphic window 1104 having 90 pixels by 72 lines with 16 million colors that requires 24-bit per pixel, a still video picture window 1106 having 180 pixels by 144 lines in 4:2:2 format using 24-bit per pixel, an MPEG motion video window 1108 having 180 pixels by 144 lines in 4:2:0 format. The window size and position is generated by the OSD system. The MPEG video decoder generates the content of the window by decimation of the full screen picture.

This OSD picture requires 110 Kbytes memory. Without the OSD controller 270 the memory requirement could be up to 1.24 Meg bytes.

The right screen of FIG. 3 shows an other picture composed of 2 OSD windows displayed over full screen motion video 1120:

a bit-map window 1122 having 540 pixels by 504 lines with two colors that requires 1-bit per pixel. The background color is blended over motion video; and a bit-map window 1124 having 360 pixels by 144 lines with 16 colors that requires 4-bit per pixel.

The memory size is 93 Kbytes using the OSD controller 270 compare to 207 Kbytes without it.

The following illustrates the memory needed for the examples in FIG. 18D.

| Windows on Background Color | | MPEG Motion Video and Blend Window | |
|---|---|---|---|
| Window size | Number of bytes | Window size | Number of bytes |
| 90 × 72 4:4:4 | 19440 | 540 × 504 2-bit/pixel | 68040 |
| 360 × 288 1-bit/pixel | 12960 | 360 × 144 4-bit/pixel | 25920 |
| 360 × 144 4-bit/pixel | 25920 | | |
| 180 × 144 4:2:2 | 51840 | | |
| 720 × 576 Background | 0 | | |
| Total | 110160 | Total | 93960 |
| 720 × 576 Full screen 4:4:4 | 1244160 | 720 × 576 Full screen 4-bit/pixel | 207360 |

Figure 18E:
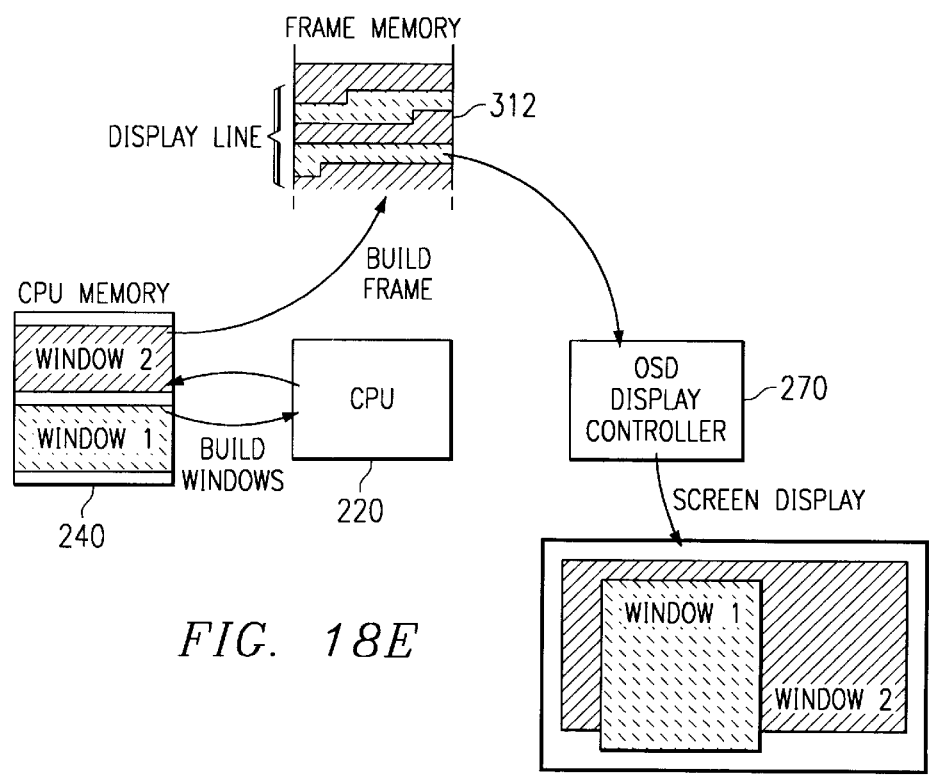

As depicted in FIG. 18E, in frame mode the CPU 220 and frame use different memory areas. The CPU 220 builds the windows separately in the CPU memory 240 and each window has its own display attributes i.e. display mode, resolution . . . . The new display picture is created by the CPU, by copying sequentially each segment of the window 1 and 2 in such way that the OSD display controller 270 reads the frame memory 312 sequentially and displays line by line from the left upper corner to the right lower corner. The display area that does not contain any OSD data, such as background color or motion video, is not included in the frame memory. Each transition of window, each line, the controller synchronously change the attribute in order to display the window with the corresponding mode. The number of bits to display a pixel of window 1 and 2 can be different.

Figure 18F:
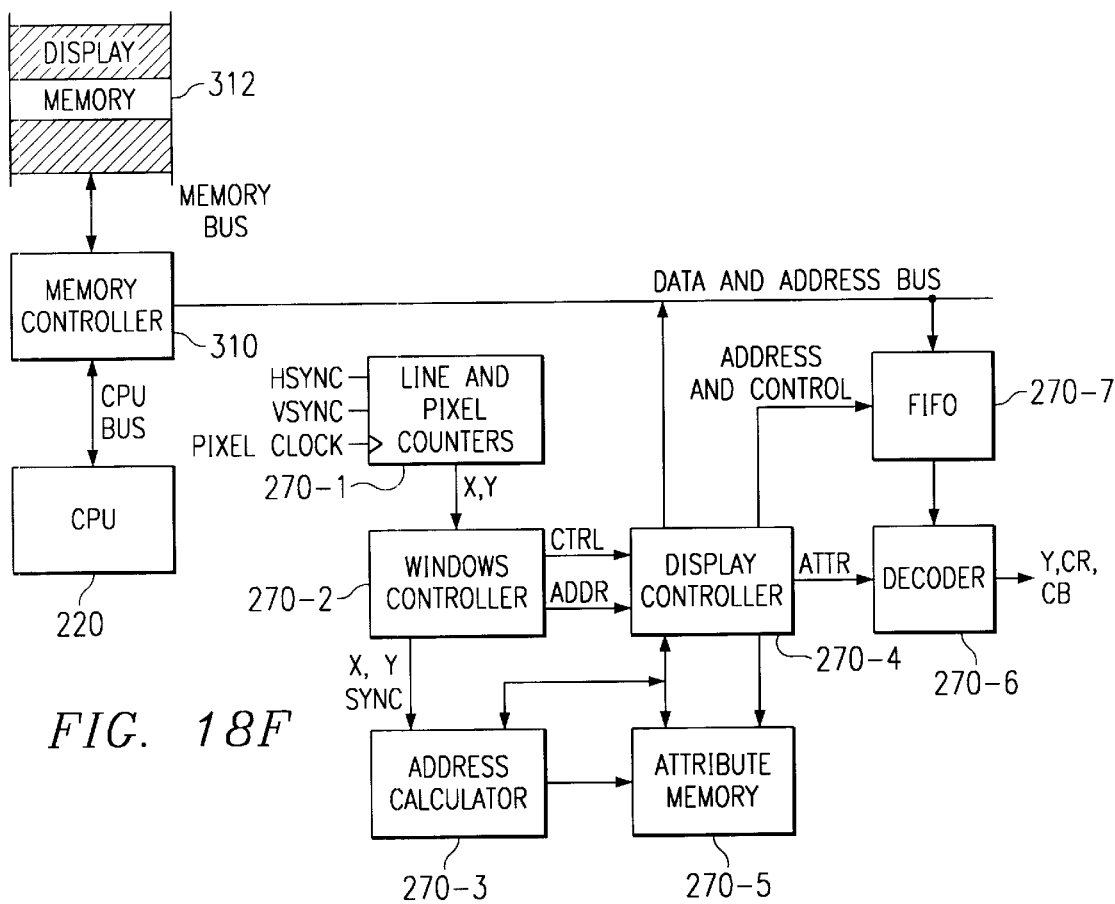

A block diagram of the OSD controller 270 is shown FIG. 18F.

The pixel and line counter 270-1 receives the pixel clock, generates X, Y that represent the pixel position on the screen and uses the synchronization signals Hsyn and Vsync to control screen display.

The windows controller 270-2 contains the position X and Y of each windows to be displayed on the screen. The controller 270-2 compares X, Y position and indicates to the display controller 270-4 each window transition and window number.

The address calculator 270-3 is not used in the frame mode.

For each new window transition the display controller 270-4 reads the new attribute from the attribute memory 270-5. It generates the address for the display memory 312 and loads the FIFO 270-7 with a new block of data. It then generates the attribute for the current window and sends it to the Decoder 270-6.

For each pixel, the decoder 270-6 extracts from the FIFO 270-7 the number of bits corresponding to the current pixel to be displayed. It transforms data bits into pixels.

Figure 18G:
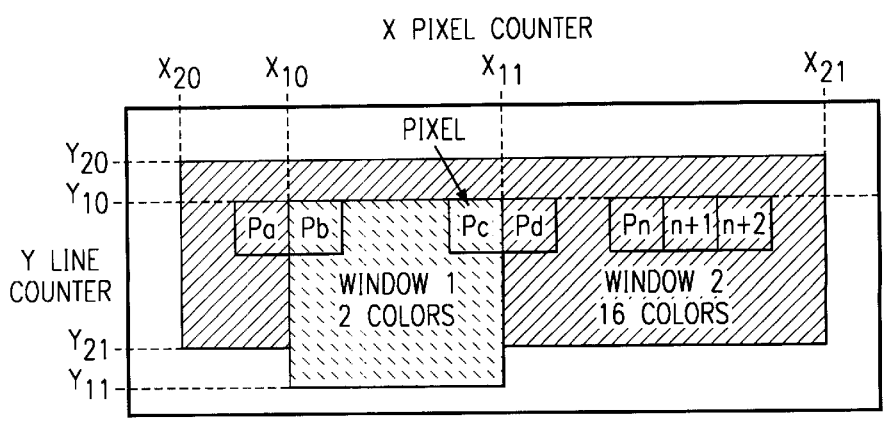

The windows attributes are as follows:
Display modes: empty window for decimated video. Bitmap, YCrCb 4:4:4 graphics component, YCrCb 4:2:2 CCIR 601 component and background color
Supports blending of bitmap, YCrCb 4:4:4, or YCrCb 4:2:2 with motion video and with an empty window
Supports window mode and color mode blending
Provides a programmable 256 entries color look up table
Outputs motion video or mixture with OSD in a programmable 422 or 444 digital component format
Provides motion video or mixture with OSD to the on-chip NTSC/PAL encoder Each hardware window has the following attributes:
window position: any even pixel horizontal position on screen; windows with decimated video have to start from an even numbered video line also
window size: from 2 to 720 pixel wide (even values only) and 1 to 576 lines
window base address
data format: bitmap, YCrCb 4:4:4, YCrCb 4:2:2, and empty
bitmap resolution: 1, 2, 4, and 8 bits per pixel
full or half resolution for bitmap and YCrCb 4:4:4 windows
bitmap color palette base address
blend enable flag
4 or 16 levels of blending
transparency enable flag for YCrCb 4:4:4 and YCrCb 4:2:2
output channel control FIG. 18G shows an example of display of two overlapped windows. Window 2 in back is a bit map with 16 colors per pixel. Each pixel require 4-bits into the frame memory to define the code of the color. The window 1 on top is a bit map with 2 colors per pixel. Each pixel require 1-bit in the frame memory 312 to define the code of the color. The position and dimension of the windows 1 is given by the attributes X_10, X_11, Y_10, Y_11. Horizontally the number of pixel is: X_11–X_10. Vertically the number of lines is: Y_11–Y_10. Same for window 2 with X_20, X_21, Y_20 and Y_21.

The display controller 270-4 access sequentially the display memory 312 (FIG. 7) from the first word containing the pixel X_20, X_21 to the last word containing the pixel X_11, Y_11. Details of the line 20 are shown FIG. 18H. The line begins with the pixels of the window 2, window 1 starts in X-10, Pa is the last pixel of window 2 with 4-bit per pixel and Pb is the first pixel of window 1 that uses 1-bit per pixel. Window 1 end on Pc and window 1 restarts in Pd until pixel position X_21.

The same word contain pixels of window 1 and 2. During display the window controller 270-4 detects the transition between Pa and Pb and controls the data processing after FIFO 270-7 access.

Figure 18H:
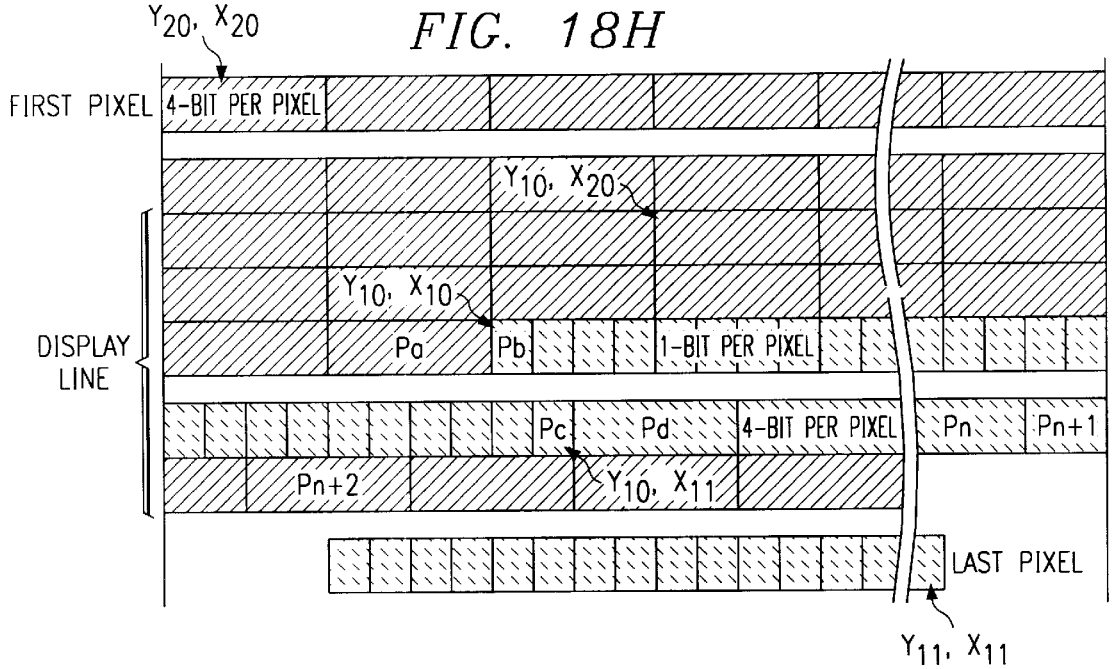
Figure 18J:
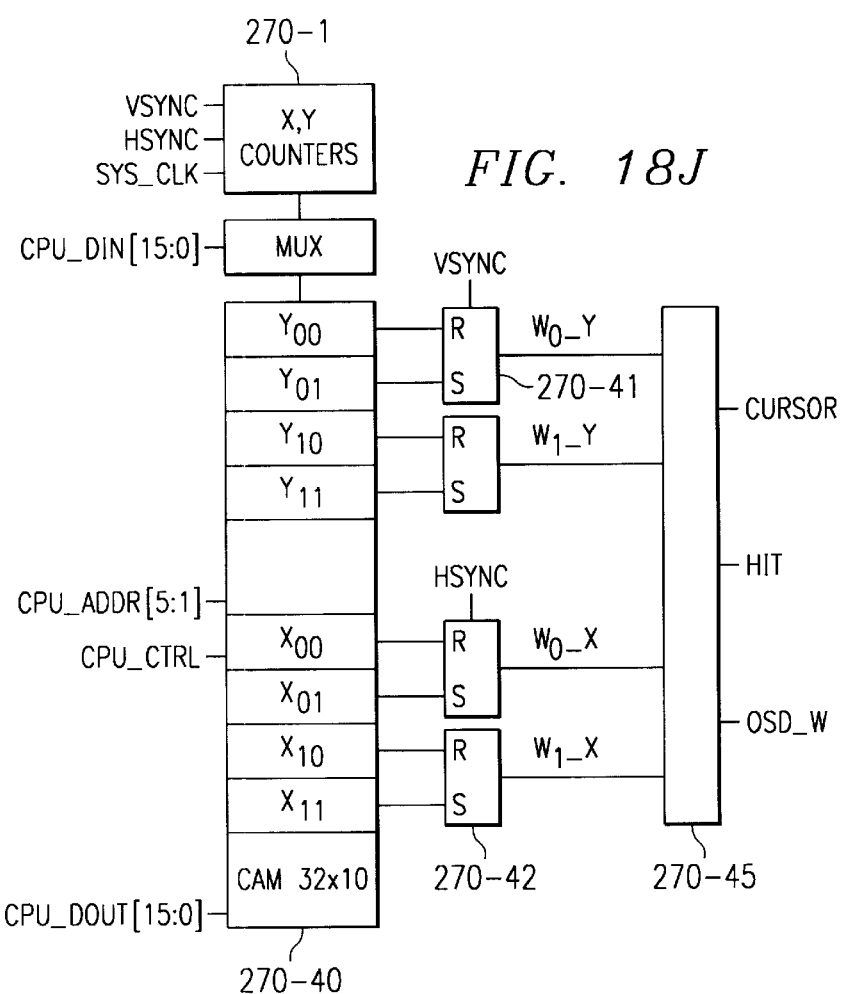
Figure 18I:
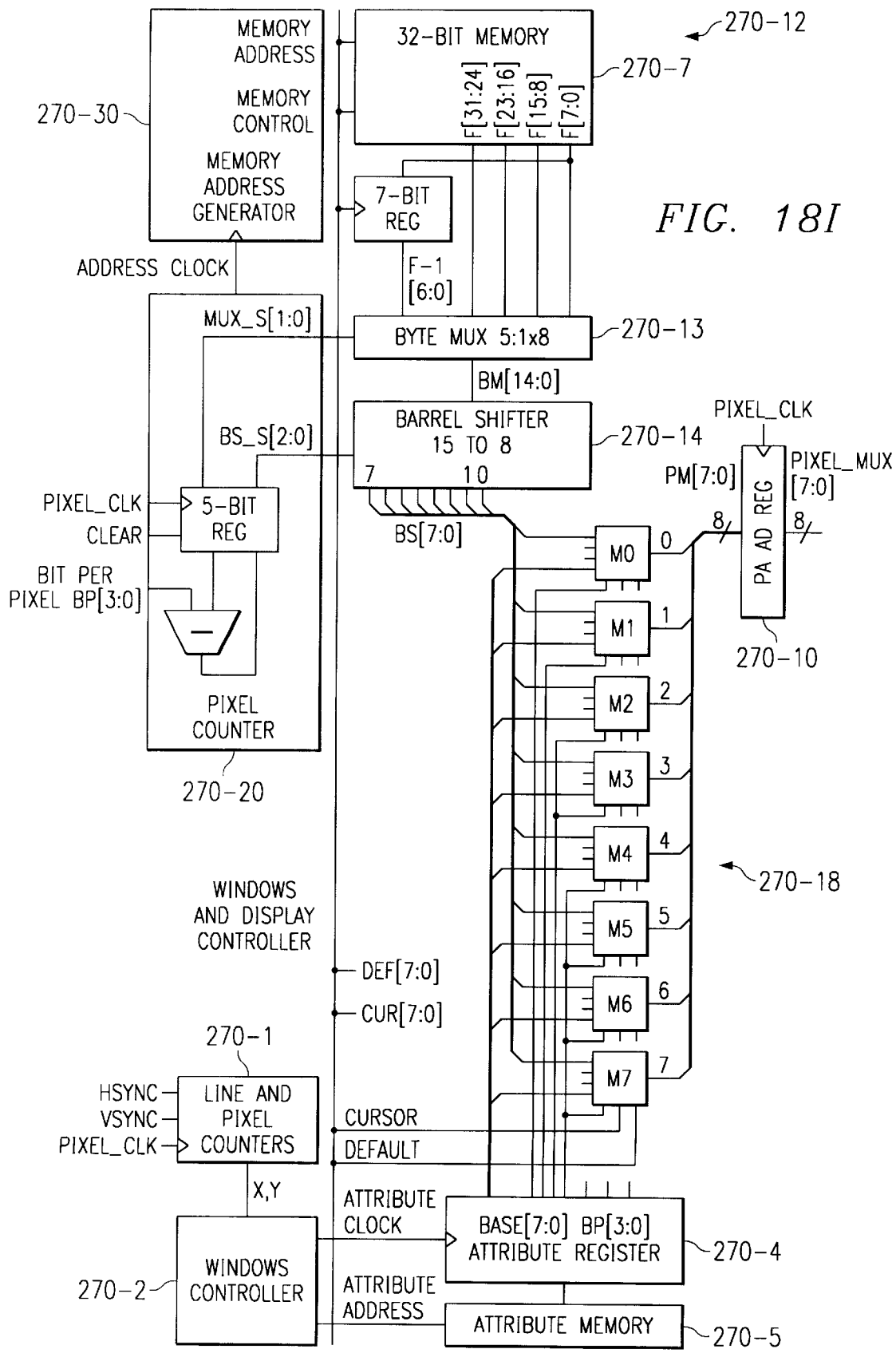

The pixel selector and multiplex 270-12 is the input of the decoder block 270-6 shown FIG. 18I. It receive the outputs of the FIFO 270-7 and the windows 270-5 attributes and control signals from the display controller 270-4. The basic function is to transform data stored in the frame memory 312 in pixel. In case of bit map display, the output, Pixel_Mux [7:0] 270-10 is the address of the CLUT (color look up table). For graphic or still video picture the output is one color component. Pixel_Mux[7:0] 270-10 output is produced by bits coming from the FIFO and bits from attribute memory.

The pixel selector 270-12 receives 32-bit data from the FIFO outputs F[31:0]. The first stage 270-13 select one of the five bytes F[31:24], F23:16], F[15:8], F[7:0] and F[6:0] delayed by one clock sample. The second stage 270-14 is a half barrel shifter that allows shifting right a 15-bit input data by 0 to 7 bit positions. The output of the barrel shifter 270-14 positions the LSB of the code of the pixel to be displayed in Bs[0]. The pixel counter 270-20 provides the control signals for the multiplexer 270-13 and barrel shifter 270-14. Table 21a shows the effect of the control Mux S[1:0] on the bytes selection and 21b shows the output of the barrel shifter in function of Bs_S[2:0]. Table 21c combines Tables 21a and 21b and shows the bits of the FIFO selected at the output of the barrel shifter as a function of the 5_bit pixel counter.

The multiplexer 270-18 receives data Bs[7:0] from the barrel shifter and Base[7:0] from the attribute register. It is controlled by 4 control bits coming from the attribute register 270-4, cursor and default signals from display controller 270-4 as shown Table 21d.

TABLES 21a, 21b and 21d

Pixel Selector and Multiplex Control

Mux 5:1 x 8

| Control | Byte Mux Outputs | |
|---|---|---|
| Mux_S[1:0] | Bm[14:8] | Bm[7:0] |
| 0 0 | F-1[6:0] | F[31:24] |
| 0 1 | F[30:24] | F[23:16] |
| 1 0 | F[22:16] | F[15:8] |
| 1 1 | F[14:8] | F[7:0] |

Barrel Shifter 15 to 8

| Control Bs_S[2:0] | Bs[7:0] Outputs |
|---|---|
| 0 0 0 | Bm[7:0] |
| 0 0 1 | Bm[8:1] |
| 0 1 0 | Bm[9:2] |
| 0 1 1 | Bm[10:3] |
| 1 0 0 | Bm[11:4] |
| 1 0 1 | Bm[12:5] |
| 1 1 0 | Bm[13:6] |
| 1 1 1 | Bm[14:7] |

Pixel Multipler outputs

| | | Bit per Pixel Bp[3:0] | | | | Mux output |
|---|---|---|---|---|---|---|
| Default | Cursor | 8 | 4 | 2 | 1 | Pm[7:0] |
| 1 | 0 | X | X | X | X | Def[7:0] |
| X | 1 | X | X | X | X | Cur[7:0] |
| 0 | 0 | 0 | 0 | 0 | 0 | Base[7:0] |
| 0 | 0 | 0 | 0 | 0 | 1 | Base[7:1] & Bs[0] |
| 0 | 0 | 0 | 0 | 1 | 1 | Base[7:2] & Bs[1:0] |
| 0 | 0 | 0 | 1 | 1 | 1 | Base[7:4] & Bs[3:0] |
| 0 | 0 | 1 | 1 | 1 | 1 | Bs[7:0] |

TABLE 21c

Pixel Selector Control Tables

| Mux_S[1:0] | | | | |
|---|---|---|---|---|
| 0 0 | | | | |
| 0 1 | | | | |
| 1 0 | | | | |
| 1 1 | | | | |

| Bs_S[2:0] | Bs[7:0] = | Bs[7:0] = | Bs[7:0] = | Bs[7:0] = |
|---|---|---|---|---|
| 1 1 1 | F-1[6:0] & F[31] | F[30:23] | F[22:15] | F[14:7] |
| 1 1 0 | F-1[5:0] & F[31:30] | F[29:22] | F[21:14] | F[13:6] |
| 1 0 1 | F-1[4:0] & F[31:29] | F[28:21] | F[20:13] | F[12:5] |
| 1 0 0 | F-1[3:0] & F[31:28] | F[27:20] | F[19:12] | F[11:4] |
| 0 1 1 | F-1[2:0] & F[31:27] | F[26:19] | F[18:11] | F[10:3] |
| 0 1 0 | F-1[1:0] & F[31:26] | F[25:18] | F[17:10] | F[9:2] |
| 0 0 1 | F-1[0] & F[31:25] | F[24:17] | F[16:9] | F[8:1] |
| 0 0 0 | | F[31:24] | F[23:16] | F[15:8] | F[7:0] |

When active Pm[7:0] is equal to the 8-bit default color provided by the general control register of the display controller, no data is read from the FIFO.

When active Pm[7:0] is equal to the 8-bit cursor color provided by the general control register of the display controller, no data is read from the FIFO.

Bp[3:0]=0000 indicates that the current window is empty and contains _bit per pixel or color component. Pm[7:0] is equal to Base[7:0] stored into the attribute register 270-4. In bit-map mode, the Base[7:0] selects one of the 256 colors of the CLUT as a background color.

Bp[3:0]=0001 indicates that the current window contains 1_bit per pixel or color component. Pm[7:0] is equal to Base[7:1] concatenated with Bs[0] from the barrel shifter. In bit-map mode, the Base[7:1] is the base address of a set of 2_colors of the 256 colors CLUT.

Bp[3:0]=0011 indicates that the current window contains 2_bit per pixel or color component. Pm[7:0] is equal to Base[7:2] concatenated with Bs[1:0] from the barrel shifter. In bit-map mode the Base[7:2] is the base address of a set of 4_colors of the 256 colors CLUT.

Bp[3:0]=0111 indicates that the current window contains 4_bit per pixel or color component. Pm[7:0] is equal to Base[7:4] concatenated with Bs[3:0] from the barrel shifter. In bit-map mode the Base[7:4] is the base address of a set of 16_colors of the 256 colors CLUT.

Bp[3:0]=1111 indicates that the current window contains 8_bit per pixel or color component. Pm[7:0] is equal to Bs[7:0] from the barrel shifter. In bit-map mode the 256 colors in the CLUT are used.

The pixel counter 270-20 provides the control for the pixel selector 270-13 Mux_S[1:0] concatenated with Bs_S [2:0]. Each beginning of frame the pixel counter is reset. It is decremented by 0, 1, 2, 4 or 8 depending on the current window attribute. An address clock signal is generated when the counter hits zero.

The memory address generator 270-30 generates the read address for the FIFO 270-7. Each address clock signal generated by the pixel counter 270-20 a new 32-bit word F[31:0] is sent to the pixel selector 270-12.

The attribute memory and register 270-4 contains the attributes of the windows to be displayed during the current frame. The attributes that control the pixel selector and multiplex are:

Display mode: bit-map, graphic, still video or empty

Number of bit per pixel or color component: 0, 1, 2, 4 or 8 bits

The bit-map CLUT base address

The attribute register 270-4 contains the attribute of the current window. The attribute clock transfers the content of attribute memory 270-5 to the register 270-4 when the window changes.

As depicted in FIG. 18J, the windows controller 270-2 is composed of a content addressable memory CAM 270-40, flip flops 270-41, 270-42and priority encoder 270-45. The CAM contain the attributes of position and size of the windows to be displayed in the current frame. FIG. 18J shows a 32-word CAM 270-40. Each window requires 4 words that indicate horizontally the coordinates of the first and last pixel and vertically the coordinates of the first and last line. A 32_word CAM supports 8 windows. Other sizes of CAM may be employed.

The CAM 270-40 compares the value of the pixel and line counters respectively X and Y. When Y counter matches a value Yn0, a new window starts vertically, and the corresponding RS flip-flop is set Wn_Y=1. When the Y counter matches a value Yn1, the corresponding window ends vertically and RS flip-flop Wn_Y is reset. The process is the same horizontally. Wn_Y and Wn_X are combined to indicate that the X, Y counter is in an active window. The indices "n" indicate the window number. Since several windows can be overlapped, the priority encoder 270-45 indicates the display order on the screen. The indices "n=0" correspond to the cursor that must be always on top. Outputs of priority encoder are HIT and OSD_W; HIT generates the attribute clock and OSD_W generates the memory attribute address corresponding to the active window.

Figure 18K:
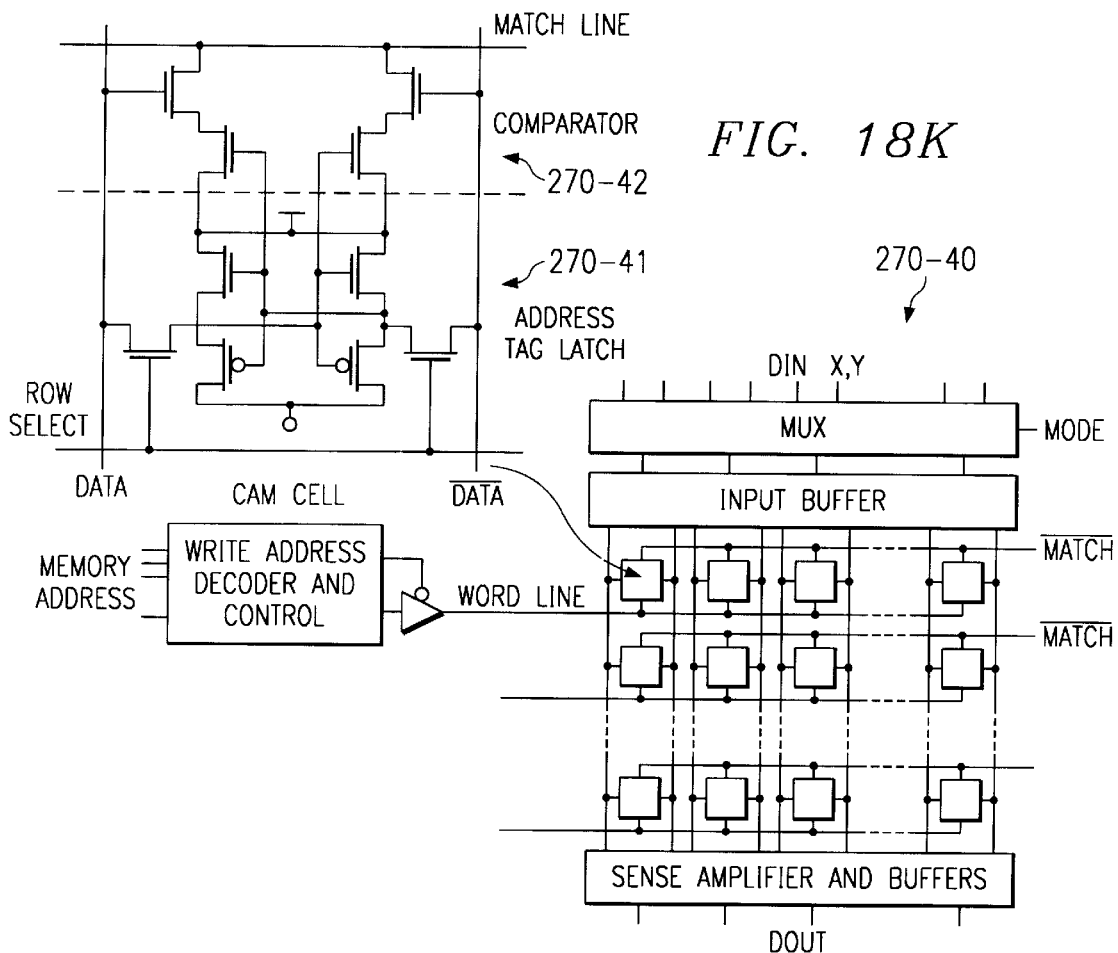

The details of a CAM cell is shown FIG. 18K. The cell contain 2 parts, a 6 Transistor RAM cell 270-41 and a 4 transistors comparator circuit 270-42. The CPU 220 loads the CAM with the attributes of position of the windows, memory mode is selected. During the display the associative mode is selected. The line counter Y and pixel counter X are compared to the contents of all Yn and Xn of the CAM. When X or Y is equal to one or several values the corresponding Match lines are active to set or reset a flip-flop as noted in FIG. 18J.

Figure 18N:
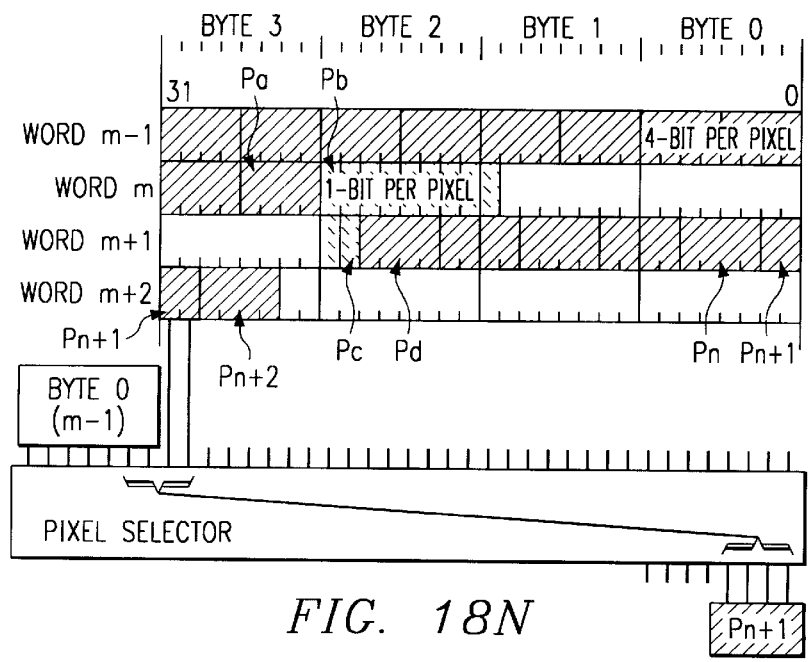
Figure 18L:
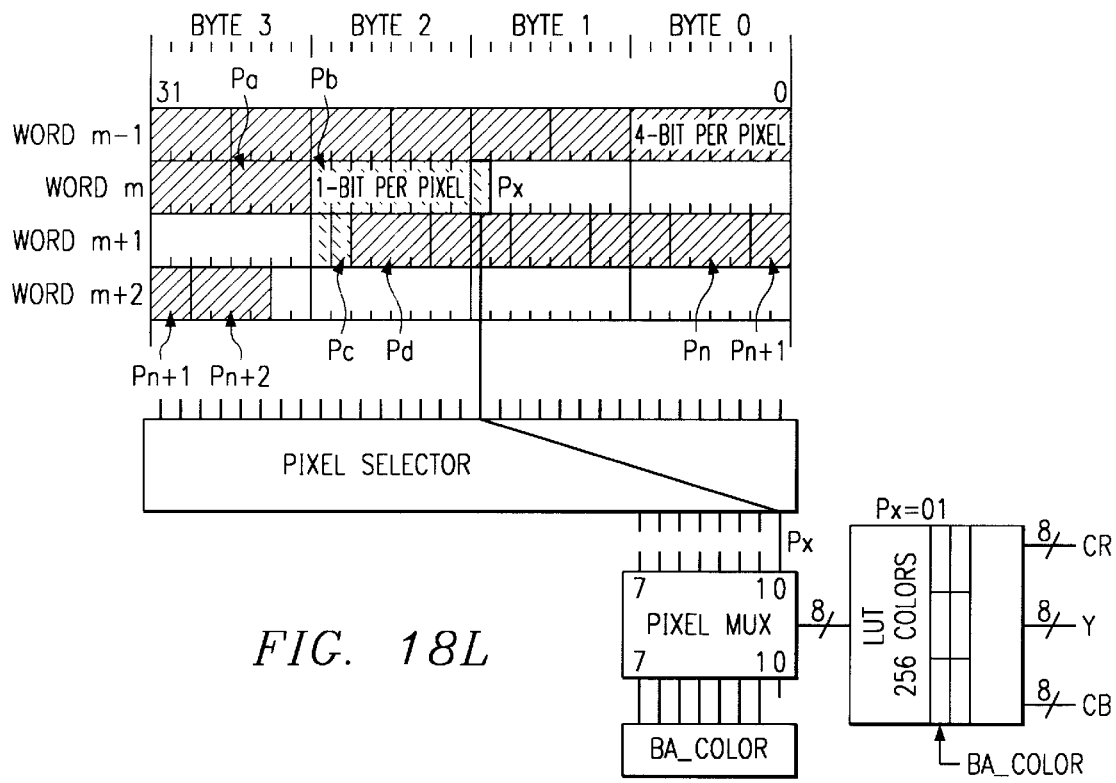
Figure 18M:
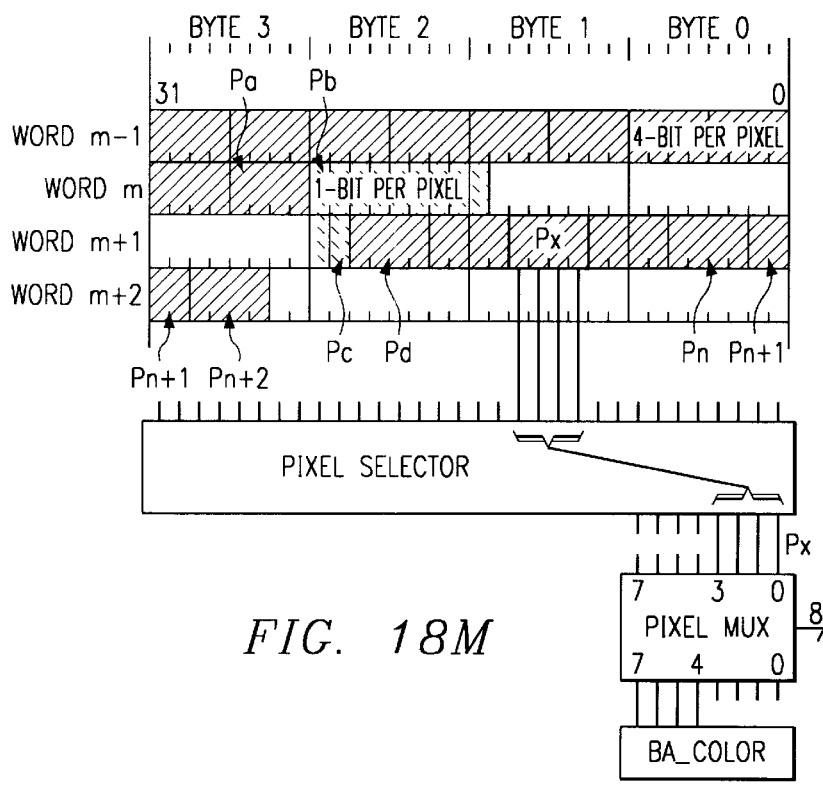

FIGS. 18L, 18M and 18N correspond to the generation of the display and frame memory represented FIGS. 18G and 18H.

In FIG. 18L, the pixel Px of the window 1 is selected in the 32_bit word "m". The pixel counter is decrement by one each access. The pixel selector places Px at the output Bs[0]. The current window attribute select 1_bit per pixel. The pixel multiplex selects Base[7:1] and concatenates with Px to form the output Pixel_Mux[7:0]. In bit-map mode Pixel_Mux[7:0] selects 2 colors of the CLUT. Base[7:1] is the base address of the CLUT.

FIG. 18M shows the generation of a pixel Px for the window 2 that use 4_bits per pixel in bit-map mode. The pixel selector places Px at the output Bs[3:0]. The pixel multiplex selects Base[7:4] and concatenates with Bs[3:0] to form the output Pixel_Mux[7:0] that select one of the 16 colors of the CLUT. Base[7:4] is the base address of the CLUT. 16 CLUT of 16 colors can be selected with the window attributes.

FIG. 18N shows a specific case of the window 2 where Pn+1 has its 2 msb bits into the word m+1 and 2 lsb into m+2. Word m+2 is currently selected at the output of the FIFO and the 7 lsb bits of word m+1 are maintained into the 7_bit register F-1[6:0]. Pixel selector take F-1[1:0] concatenated with F[31:30] to generate Bs[3:0]. The corresponding timing is shown FIG. 14b. At Pn+1 pixel counter equal 30. The barrel shifter output generate F-1[5:0] concatenated with F[31:30]. The current FIFO address is word m+2 and the Pixel_Mux output is Base[7:4] & F-1[1:0] & F[31:30]. Pixel Pn+2 the pixel counter is decrement by 4, the pixel selector select the next 4_bits of word m+2.

Figures 1, 180:
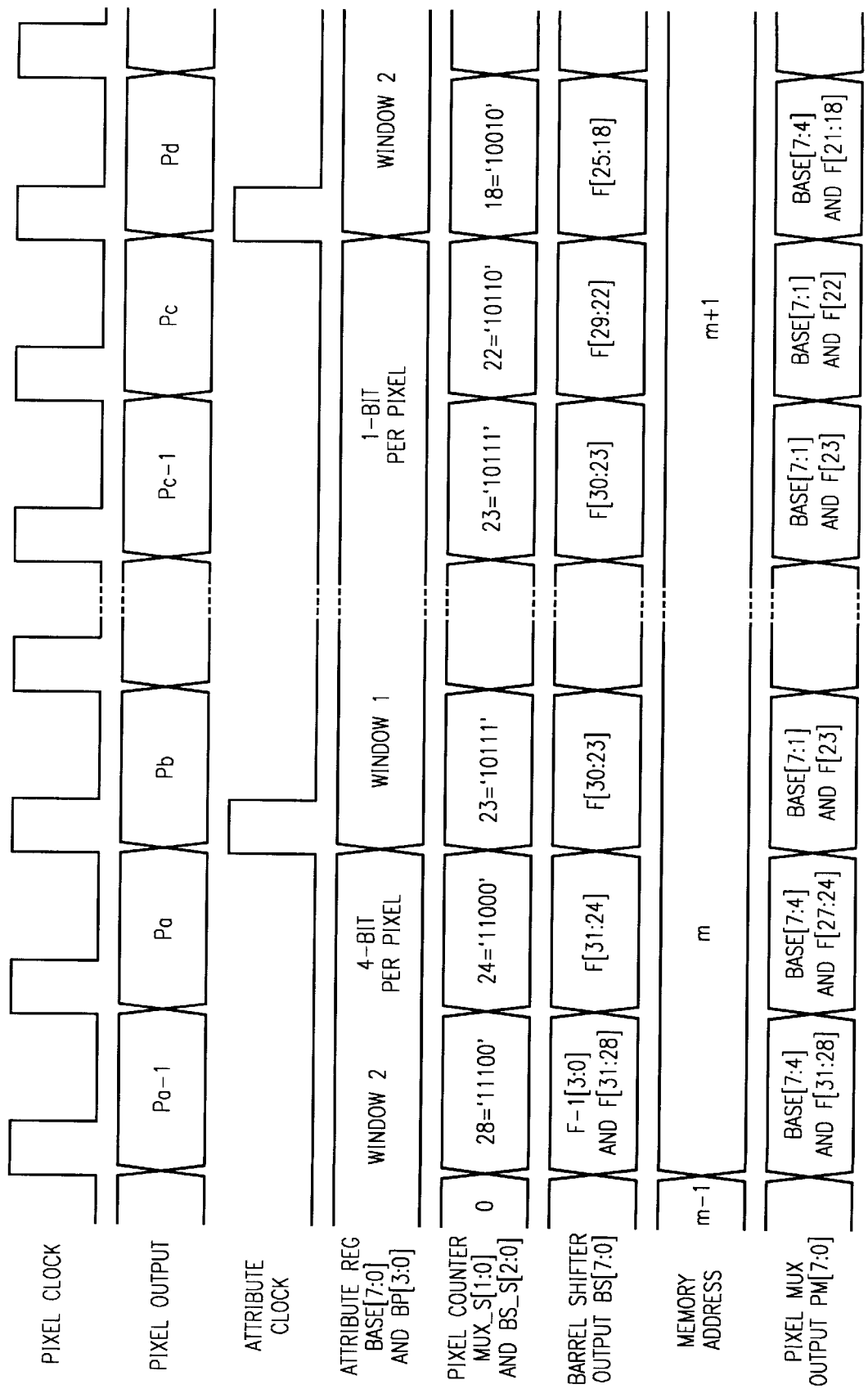
Figures 2, 180:
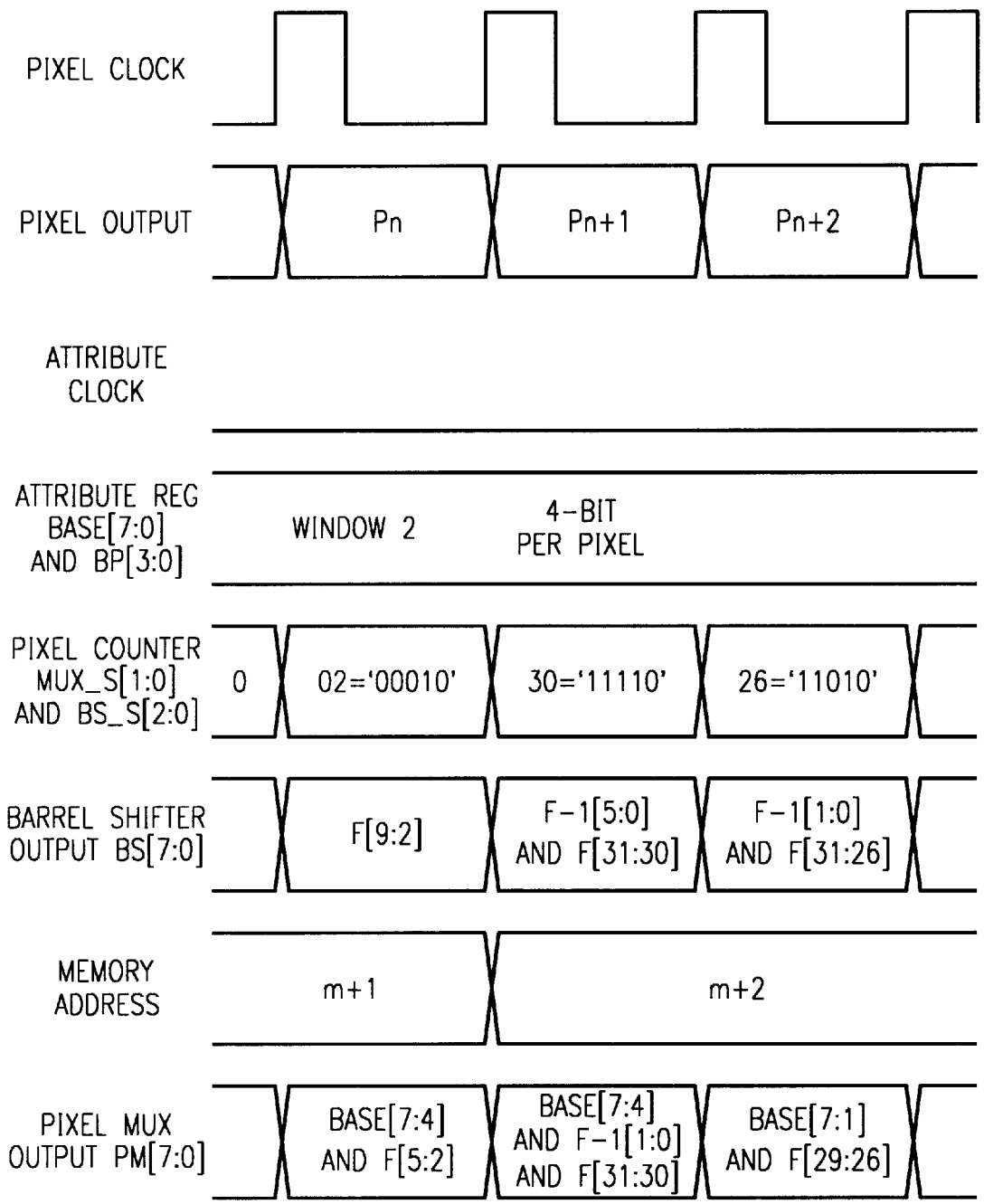

In FIG. 18G, the window 1 is on top of window 2. The CAM of the window controller is loaded with window 1 attributes position on top of window 2. The window displayed on top has the lower indices. Pixel Pa is last pixel for this portion of window 2 into the frame memory, the next bits contain the code of color of window 1, the first bit is Pb. During the same line window 1 end in Pc and window 2 restart in Pd. Each of this window transitions are detected by the window controller that generate the attribute clock to change the current display attribute stored in a register (see timing FIG. 18O-1). For Pa-1 and Pa the Pixel counter is decrement by 4 each pixel and after attribute clock Bp[3:0]=1 (FIG. 18I) decrements the counter by 1 each pixel.

In bit-map mode the frame memory contains the code of the color, 1,2,4 or 8 bits per color depending of the attributes. The code of the color concatenated with the CLUT color base attribute selects a color from the CLUT. The CLUT contain 3 color components, one component for Luma and two components for Chroma.

When the current window is graphic, the CLUT is not used. For each pixel there are 3 identical accesses to the bit-map mode to extract the 3 color components from the frame memory. There are 3 accesses during a pixel.

In still video picture the CLUT is not used. Still video reduces Chroma bandwidth. For each pixel there are 2 accesses identical to the bit-map mode to extract one Luma components and chroma component Cr or Cb (alternately each pixel) from the frame memory.

When the picture is empty, the mode is bit-map with 0_bit per pixel. This mode is used to generate a window with a background color or a decimated motion video picture coming from the MPEG video decoder.

The pixel selector allows the hardware to mix different modes of display. The pixel selector and multiplex hardware, its control, the window controller, window attribute generation and the flow of data from the frame memory to the Pixel_Mux output the different display modes for different resolution.

The frame memory contains a description of the current displayed picture. The description is done sequentially starting from the first upper left corner of a window "n" to the last lower right corner of a window "m". Only the active windows need to be described, not the full screen, background color or motion video.

The description is done pixel per pixel, the number of bits to describe one pixel can vary for each window. Each transition of a window is indicated by the attributes of position stored into the CAM. The window controller selects the attribute of the corresponding window in real time during display.

The pixel selector select the number of bits corresponding to the current pixel to be displayed. The complementary bits to form the 8_bit pixel output are obtained by concatenation of selected data bits from the frame and window attribute from the attribute memory.

When the current window is a bit-map, the Pixel_Mux output selects a color from the CLUT. The CLUT contains the 3 colors component.

When the current window is graphic, the CLUT is not used. For each pixel there are 3 accesses identical to the bit-map mode to extract the 3 colors components from the frame memory.

In still video picture the CLUT is not used. For each pixel there are 2 accesses identical to the bit-map mode to extract the 2 colors components from the frame memory. Luma is extracted each pixel and the chroma component Cr or Cb is alternately extracted for each pixel.

When the picture is empty the mode is bit-map with 0_bit per pixel. This mode is used to generate a window with a background color or a decimated motion video picture coming from the MPEG video decoder.

The following describes the use of the OSD 270 to provide a display flow with real-time address calculations. Most of the display system use a frame mode for OSD so that the CPU working space and display memory are separate. With a hardware windowing mode depicted in FIG. 18P; there is no duplication of memory space for the CPU 220 and OSD 270. Hardware windowing reduces memory transfer, power dissipation and system cost.

The CPU 220 builds each window separately in different portion of the SDRAM 312. Each window has its own display attributes, i.e. display mode, resolution and position; the number of bits to display a pixel of the window 1 and 2 can be different. The picture is composed directly by the hardware that reads the contents of the windows from the CPU memory space 312. The display controller 270 hardware reads only the data required to compose the current frame.

The OSD display controller 270 reads sequentially each segment of the window 1 and 2 line by line from the left upper corner to the right lower corner. Each new line the OSD controller 270 calculates the start address and block size for each segment of windows that make up the line. During display the OSD controller 270 transfers the contents of the windows from the CPU memory 312 segment by segment and changes the attribute of display for each transition of a window.

Figure 18P:
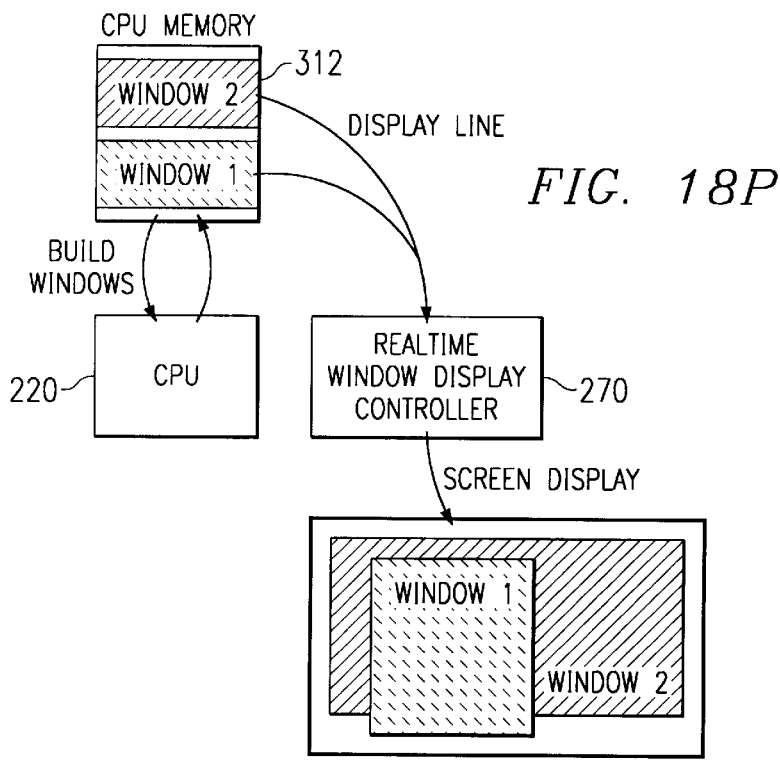
Figure 18Q:
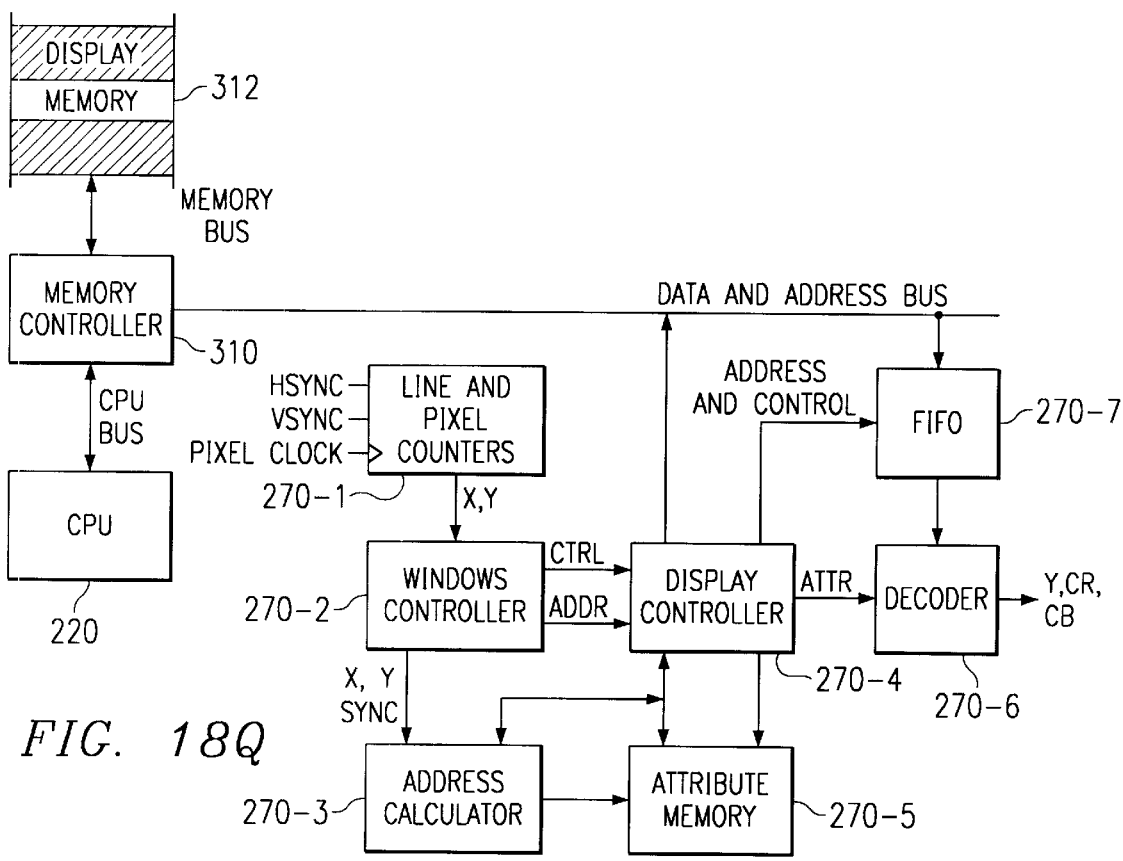

As depicted in FIG. 18Q, the OSD 270 and the CPU 220 communicate with the display memory (SDRAM) 312 via the memory controller 310. The OSD memory addresses are generated by the display controller 270-4. The FIFO 270-7 receive each segment of the windows to be displayed. The OSD controller 270 is composed of the following blocks:

The pixel counter 270-1 is incremented by the pixel clock and line counter when the pixel counter is at the end of the line. It generates X, Y, that represent the pixel position on the screen and synchronization signals Hsyn and Vsync to control screen display.

The windows controller 270-2 contains the position X and Y of each window to be displayed on the current screen. The controller compares X, Y to the position of the windows and indicates to the display controller 220-4 each window transition and the window number.

The address calculator 220-3 calculates the start address and block size of each segment of a window for each new line and pushes the values onto a stack in the attribute memory 270-5.

For each new window transition, the display controller 270-4 reads the new attribute from the attribute memory 270-5. The controller manages the FIFO 270-7. Each new line, the FIFO is loaded block by block with the segments of windows that make up the line. When the FIFO 270-7 is full, the controller 270-4 waits for the next access.

For each pixel, the decoder 270-6 extracts from the FIFO 270-7 the number of bits corresponding to the current pixel to be displayed. It transforms data bits in a pixel.

FIG. 18R shows an example of a display with two overlapped windows. Window 2, in back, is a bit map with 16 colors per pixel, so a pixel requires 4-bits in the frame memory to define the code of the color. Window 1 on top is a bit map with 2 colors per pixel, so a pixel requires 1-bit in the frame memory.

The position and dimension of the windows 1 is given by the attributes X__10, X__11, Y__10, Y__11. Horizontally the number of pixel is: X__11–X__10. Vertically the number of lines is: Y__11–Y__10. Same for window 2 with X__20, X__21, Y__20 and Y__21.

The line Y10 contain 3 segments. The first segment at the beginning of window 2, starts in position X20 and end in Pa. The segment 2, window 1, is displayed on top of window 2, starts in X10 and end in Pc. The third segment is the end of the window 2, start in Pd and end in X21. Segments 1 and 3 come from the memory space of window 2 and segment 2 from the memory space of window 1. The content of the window 2 memory between Pa and Pb are ignored and not transferred to the FIFO.

Figure 18S:
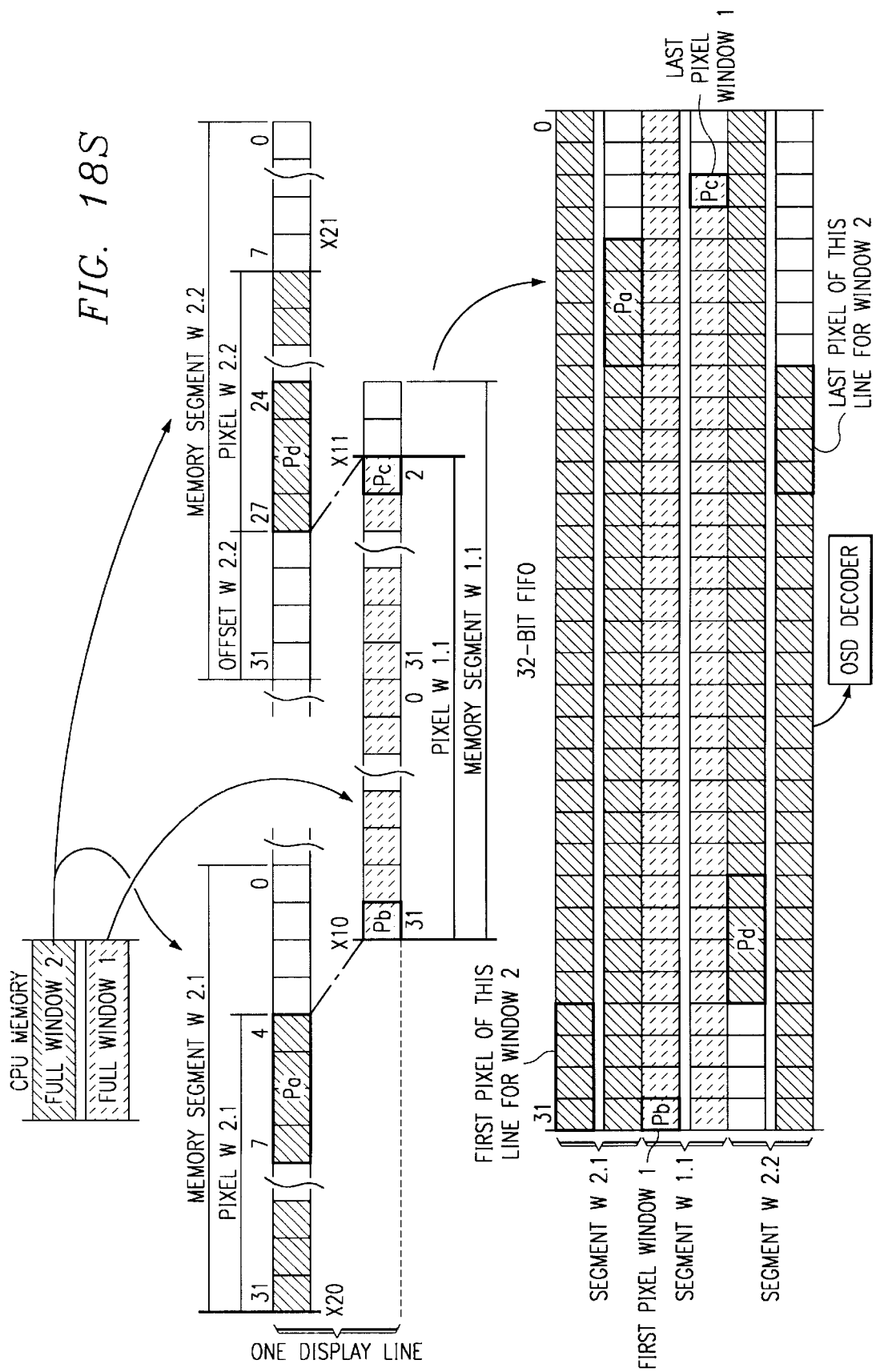
Figure 18W:
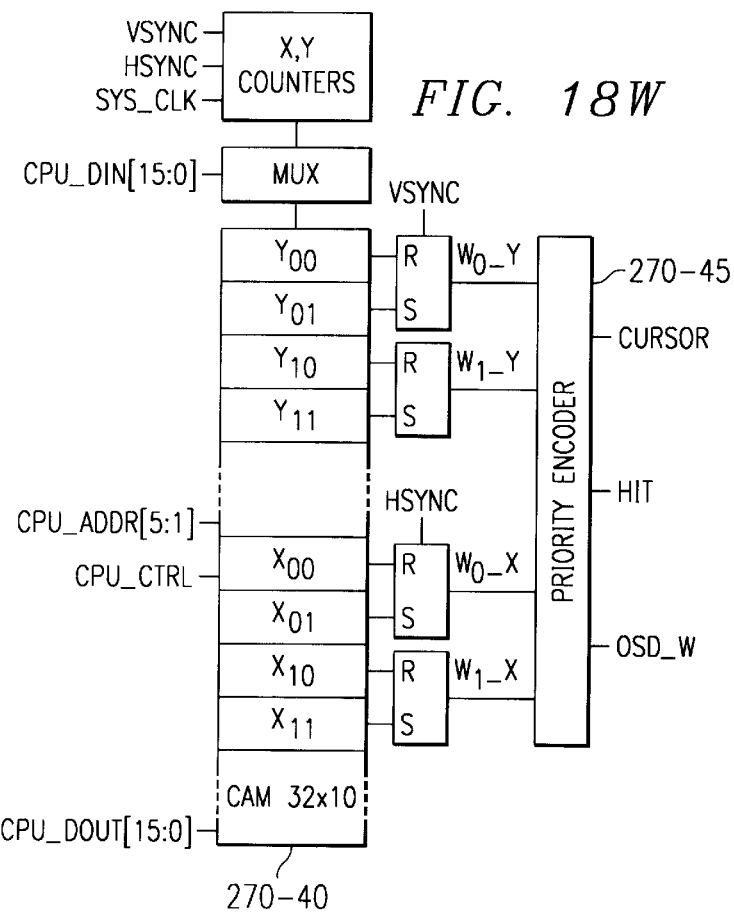

FIG. 18S details the process for this line and the flow from the memory to the FIFO. The CPU 220 has composed two windows in separate memory spaces. The windows are described line by line, each new line starts with a new 32-bit word. The first pixel of a line is aligned with the msb of the word. If the number of bits to describe the content of the line is not modulo 32, some bits of the word can be ignored. The window 2 has 4-bits per pixel, the first segment W2.1 contains 2 words but only 15 pixels. The last 4-bits are not used for display. The second segment W1.1 has 2 words, the window 1 has 1-bit per pixel and 62 pixels horizontally. The last 2-bits of the second word are ignored. The third segment W2.2 is not a beginning of a new line, the pixel Pc is not necessary aligned at the word boundary, in this example Pc is the second pixel of the first word of this segment, this position is referred by the segment offset W2.2.

FIG. 18T shows different blocks of OSD controller 270 described previously. The details of the blocks for the window controller, display controller and decoder are as follows.

The FIFO 270-7 is a 32-bit dual port memory. The data is received from the main memory SDRAM and used by the Pixel selector 270-12. The transfer requests and addresses generation are controlled by the FIFO memory controller. It generates write and read addresses and control signals to the FIFO and the memory address and control to the traffic controller that access the SDRAM. The OSD data is read by segment of windows in a burst. Each new segment the controller 270 accesses the attributes RAM to get a memory address and segment size.

FIG. 18U shows the FIFO management flow for the transfers from the SDRAM.

At the beginning of each new active line, the FIFO is empty the Read and Write pointer are equal.

The address calculator calculate the start address of each segment of the windows that compose the current line and store into the Attribute RAM.

The FIFO controller generate the Read segment request to the OSD Memory controller in order to read the first segment address Sa[23:0] and segment size Ss[8:0] stored previously into the attribute RAM.

If the segment is larger than the size of the FIFO the controller split the segment by burst. When the FIFO is full or cannot contain the block the FIFO controller is waiting.

When the full segment of window has been read the FIFO controller generate a request to access the next segment composing the current line. The pixel selector read the data word by word F[31:0]. The number of bit per pixel or pixel per word can vary for each segment of window so the time between two access to the FIFO is variable. A new segment start always with a new word. As shown FIG. 18R and 18S, window 1 overlaps window 2, Pa is the last pixel of window 2 for this segment. In this case a part of the word of the first segment of window 2 will not be used by the pixel selector to generate a pixel. Address clock signal is generated to access a new word into the FIFO.

For the pixel counter 220-20, there are two different cases (depicted in FIG. 18V): a new segment start or a new pixel clock. When a new segment of window starts the pixel counter logic generate the address clock signal to the FIFO controller in order to transfer the first word of this segment to the pixel selector.

The window controller generates the "Load" signal to indicate a window transition. The "Load" transfer the "Segment offset So[4:0] corresponding to this new segment of window to the pixel counter. There are two situations represented in FIG. 18S:

The segment W2.1 is the left border of the window, So[4:0]=0. Window 2 has 4-bits per pixel, the value of the pixel counter that generate Mux__S[1:0] concatenated with Bs__S[2:0] will be (So[4:0]–Bp[3:0])=28 to point to the first pixel of this word.

The segment W2.2 is overlapped partly with window 1. The first pixel of the first word is not displayed. So[4:0]= (0–Bp[3:0])=28. The pixel counter will be So[4:0]–Bp[3:0]=24 to point to the second pixel of this word.

The "Pixel clock" decrements the Pixel counter by 0, 1, 2, 4 or 8 depending of the number of bits per pixel Bp[3:0] of the current window. An address clock signal is generated when the Pixel counter is equal to zero.

The pixel selector 270-12 receives the 32-bit data word from the FIFO outputs F[31:0]. It contains two parts, a byte multiplexer 270-13 and a barrel shifter 270-14. The byte multiplexer selects one of the four bytes F[31:24], F[23:16], F[15:8] or F[7:0] as function of Mux_S[1:0] as shown Table 22a. The barrel shifter shift the byte to the right by 0 to 7 bit positions, as shown Table 22b.

color is selected. During OSD window the Base[7:0] comes from the current window attribute register.

The output of the multiplexer generate Pixel_Mux[7:0] is used in the bit-map mode to select one of the 256 colors of the CLUT. In graphic mode or still video picture mode, Pixel_Mux[7:0] is one color component, Luma or Chroma. Graphic mode requires three color components per pixel, the Pixel_clock is 3 times faster than in bit-map. In still video picture, 2 color component are required during one pixel duration. The display output is three 8-bits words, Y, Cr and Cb.

TABLE 22a, 22b and 22c

Pixel Selector Control

| Byte Mux 4:1 x 8 | | Shifter 4, 2, 1 | | Pixel counter | |
|---|---|---|---|---|---|
| Control Mux_S[1:0] | Bm[7:0] | Control Bs_S[2:0] | Bs[7:0] valid Outputs | Mux_S[1:0] | Bs[7:0] = |
| 1 1 | F[31:24] | 1 1 1 | Bm[7] | 0 0 | |
| 1 0 | F[23:16] | 1 1 0 | Bm[7 6] | 0 1 | |
| 0 1 | F[15:8] | 1 0 1 | Bm[7 6 5] | 1 0 | |
| 0 0 | F[7:0] | 1 0 0 | Bm[7 6 5 4] | 1 1 | |
| | | 0 1 1 | Bm[7 6 5 4 3] | | |
| | | 0 1 0 | Bm[7 6 5 4 3 2] | | |
| | | 0 0 1 | Bm[7 6 5 4 3 2 1] | | |
| | | 0 0 0 | Bm[7 6 5 4 3 2 1 0] | | |

| Bs_S[2:0] | | | | |
|---|---|---|---|---|
| 1 1 1 | F[31] | F[23] | F[15] | F[7] |
| 1 1 0 | F[31:30] | F[23:22] | F[15:14] | F[7:6] |
| 1 0 1 | F[31:29] | F[23:21] | F[15:13] | F[7:5] |
| 1 0 0 | F[31:28] | F[23:20] | F[15:12] | F[7:4] |
| 0 1 1 | F[31:27] | F[23:19] | F[15:11] | F[7:3] |
| 0 1 0 | F[31:26] | F[23:18] | F[15:10] | F[7:2] |
| 0 0 1 | F[31:25] | F[23:17] | F[15:9] | F[7:1] |
| 0 0 0 | F[31:24] | F[23:16] | F[15:8] | F[7:0] |

The 5-bit pixel counter generates Mux_S[1:0]&Bs_S[2:]. Table 22c indicates the value of Bs[7:0] as function of the pixel counter value. This table combine Tables 22a and 22b.

The color multiplexer 270-18 receives data Bs[7:0] from the barrel shifter and Base[7:0] from the attribute register. It is controlled by number of bits per pixel Bp[3:0], coming from the attribute register. According to the Table 22d the multiplexer selects 0, 1, 2, 4 or 8 bits of the Base address color Base[7:0] and its complement in Bs[7:0] in order to form the outputs Pm[7:0].

TABLE 22d

Pixel Multiplexer
Pixel Mutipler outputs

| Default | Cursor | Bit per Pixel Bp[3:0] | | | | Mux output Pm[7:0] |
|---|---|---|---|---|---|---|
| | | 8 | 4 | 2 | 1 | |
| 1 | 0 | X | X | X | X | Def[7:0] |
| X | 1 | X | X | X | X | Cur[7:0] |
| 0 | 0 | 0 | 0 | 0 | 0 | Base[7:0] |
| 0 | 0 | 0 | 0 | 0 | 1 | Base[7:1] & Bs[0] |
| 0 | 0 | 0 | 0 | 1 | 1 | Base[7:2] & Bs[1:0] |
| 0 | 0 | 0 | 1 | 1 | 1 | Base[7:4] & Bs[3:0] |
| 0 | 0 | 1 | 1 | 1 | 1 | Bs[7:0] |

When the cursor is detected by the window controller Base[7:0] is equal to the cursor color. When the display does not contain any OSD window or motion video, the default The global attribute register 220-50 contains cursor and default color, these values are set by the CPU. The window attribute register contains the attribute for the current window:

Display mode: bit-map, graphic, still video or empty.
Number of bit per pixel or color component: 0, 1, 2, 4 or 8 bits.
The bit-map CLUT base address.
Blending . . .

The attributes are located into the Attribute RAM. The window attributes change every window transition. The segment attribute are sent through this block to the FIFO controller or pixel counter.

The windows controller 270-2 contains a content addressable memory CAM, flip flop and priority encoder. The CAM contains the attributes of position and size of the windows to be displayed on the current frame. Each window require 4 words to indicate horizontally the coordinates of the first and last pixel and vertically the coordinates of the first and last line. A 32_words CAM supports 8 windows.

The CAM compares the value of the pixel and line counters respectively X and Y. When Y counter match a value Yn0, a new window starts vertically and the corresponding RS flip-flop is set Wn_Y=1. When Y counter match a value Yn1, the corresponding window ends vertically and the RS flip-flop Wn_Y is reset. The process is the same horizontally. Wn_Y and Wn_X are combined to indicate that the X, Y counter crosses an active window. The indices "n" indicate the window number. Several windows can be overlapped, the priority encoder defines the display order on the screen. The indices "n=0" correspond to the cursor always on top. Outputs of the priority encoder are HIT and OSD_W; HIT generates the attribute clock and OSD_W select the memory attribute address corresponding to the active window. The HIT signal generates the access request to the attribute RAM at the address given by the priority encoder. The attributes are transferred to the window attribute register.

The CAM can be accessed by the CPU to set the position of the windows during initialization. The address calculator accesses the CAM each line for real time address calculation.

Each new frame the AC transfers the base address Ba0 to Ba7 to the corresponding line pointers "L0" to L7. The line pointers are located in the Attribute RAM. Ba(n) is the base address of the window in the SDRAM.

Figure 18X:
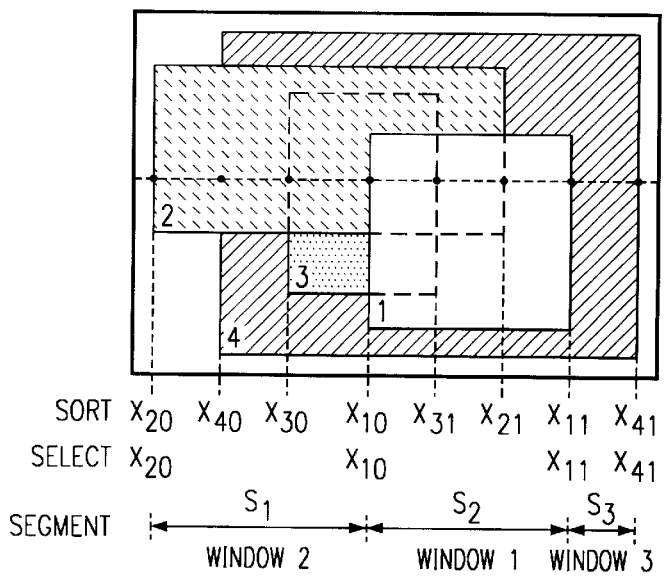

FIG. 18X shows 4 overlapped windows, the line Y cross horizontally all windows start and end. For each line of the active display area, the AC gets the active windows for the current line; the window controller return an 8-bit value. The "1" represent the active, first bit is window 0 and last bit window 7: W0_XY . . . W7_XY=0,1,1,1,1,0,0,0

```
Pseudo code for the window controller:
Y = Y+1;                                        Increment line number when end of line
                                                Y=0 when end of frame
FOR n= 0 to 7                          Check if the current line number Y cross one or
                                                several windows
        IF Y = Yn0   THEN   Wn_Y = 1;           Check if the window "n" starts vertically
             ELSE IF Y = Yn1   Wn_Y = 0;        Check if the window "n" ends vertically
END;                                            All windows with Wn_Y =1 are vertically valid and
                                                cross the current line
    X = X+1;                                    Increment pixel number
    FOR n= 0 to 7                               Check if the current pixel number X cross one or
                                                several windows
        IF X = Xn0   THEN   Wn_X = 1;           Check if the window "n" starts horizontally
             ELSE IF X = Yn1   Wn_X = 0;        Check if the window "n" ends horizontally
        END;                                    Windows with Wn_X=1 are horizontally valid and
                                                cross the current pixel number
    FOR n= 0 to 7                               Define valid window: check if the current pixel
                                                crosses a window"
        Wn_XY = Wn_X AND Wn_Y;                  Check all windows that contain the current pixel
    END;
    M=8                                         Define which window is visible
    FOR n= 7 to 0
        IF Wn_XY = 1   THEN   M = n;            Check valid window with the lower "n"
    END;
    T = M;                                      The current pixel is in the window M. If M=8 the
pixel
                                                is not in a window
    IF T(n−1) < OR >T THEN HIT=1;               If the window number of the previous and current
                                                pixel and are different, HIT indicate a window
                                   transition
    IF M = 0                            THEN   Cursor = 1 Generate Cursor or OSD_W address
                                        ELSE OSD_W = M;
    END;
END;
```

The memory controller 270-66 manages the access to the Attribute RAM and CAM. The access are:
CPU access:
  CAM: The CPU program position and priority of the windows. This access is done during vertical blanking or when before OSD display.
  Attribute RAM: to load the CLUT, windows attributes and Base address.
  Address calculator access: During horizontal blanking to the CAM and Attribute RAM to calculate the segment address, size and offset.
  FIFO controller access: When read segment request is generated, to the Attribute RAM to read the next segment address and size for data transfer between SDRAM and FIFO.
  Window controller access: Each window transition to the Attribute RAM to read window attribute and segment offset.

The address calculator 270-70 is the key element of hardware windowing system. It calculates the attributes of each segments making up the current display line (first address, size in words and offset of the first pixel) and stores the values in the segments stack. The address calculator (AC) receives vertical and horizontal synchronization signals that indicate the beginning of a new frame or a line.

For each active window (Wn_XY=1), the AC reads the contents Xn0 and Xn1 of the CAM, and sorts window indices in the order of transitions from the left to the right. For the given example the sorted values are: X20, X40, X30, X10, X31, X21, X11, X41 (X20, is the lower value X41 the bigger)

From the left to the right when a window starts the AC selects in that window the values with lower indices. For example the first window starts in X20, the first selection is done by selecting only the values <X20 between X20, and X21, the values X40, X30, X31 are eliminated, X10 is maintained. The next window start is X10; there are no values between X10 and X11. There is no remaining window start after X1, so X41 is valid. The selected active transitions are:

X20, X10, X11, X41.

This line has 3 segments: S1 between X20 and X10; S2 between X10 and X11 and S3 between X1 and X41. S1 is window 2, S2 is window 1 and S3 window 4. The AC calculates the segment address. For each window start the segment address Sa[23:0] is equal to the line pointer Ln.

Example
S1: Sa[23:0]=L2;
S2: Sa[23:0]=L1;

The last segment (S3) is the end of window 4. S3 starts in (X11) the AC calculates the number pixels and entire words from the beginning of window 4 to (X11). The number of pixels is (X11–X40). The number of words are (X11–X40)*K4/32, K4 is the number of bits per pixel for window 4 and 32 the number of bits per words. This value is added to the line pointer (L4) give the segment address S3: Sa[23:0].

The block size is the entire number of words between 2 transitions. The offset that points the first pixel is the remainder.

S1: (X10–X20)*K2/32=>Ss[8:0] and So[4:0]

S2: (X11–X10)*K1/32=>Ss[8:0] and So[4:0]

S3: (X41–X11)*K4/32=>Ss[8:0] and So[4:0]

The entire part of the equation gives the number of words Ss[8:0]. The decimal part the offset is So[4:0]. If So[4:0]>0 the number of words is Ss[8:0]+1.

In the last step, the line pointer is incremented by the number of entire words to describe a line of the active windows.

L1=L1+(X11–X10)*K1/32+1 if the number of bits divided by 32 is >0

L2=L2+(X21–X20)*K2/32+1 if the number of bits divided by 32 is >0

L3=L3+(X31–X30)*K3/32+1 if the number of bits divided by 32 is >0

L4=L4+(X41–X40)*K4/32+1 if the number of bits divided by 32 is >0

Figure 18Y:
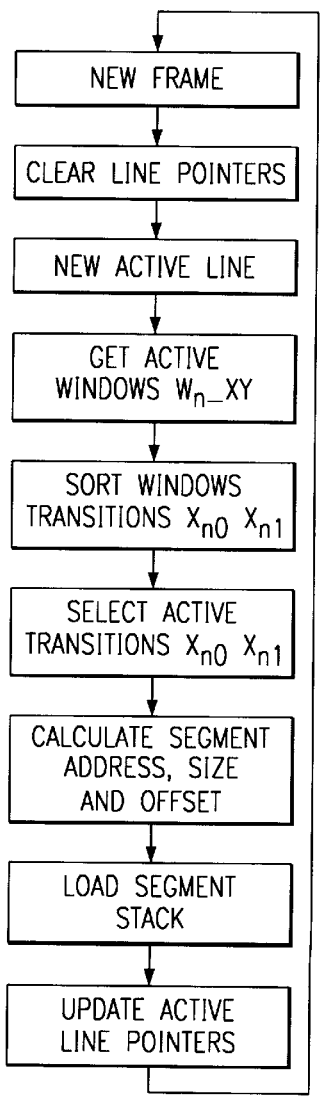
Figure 18A:
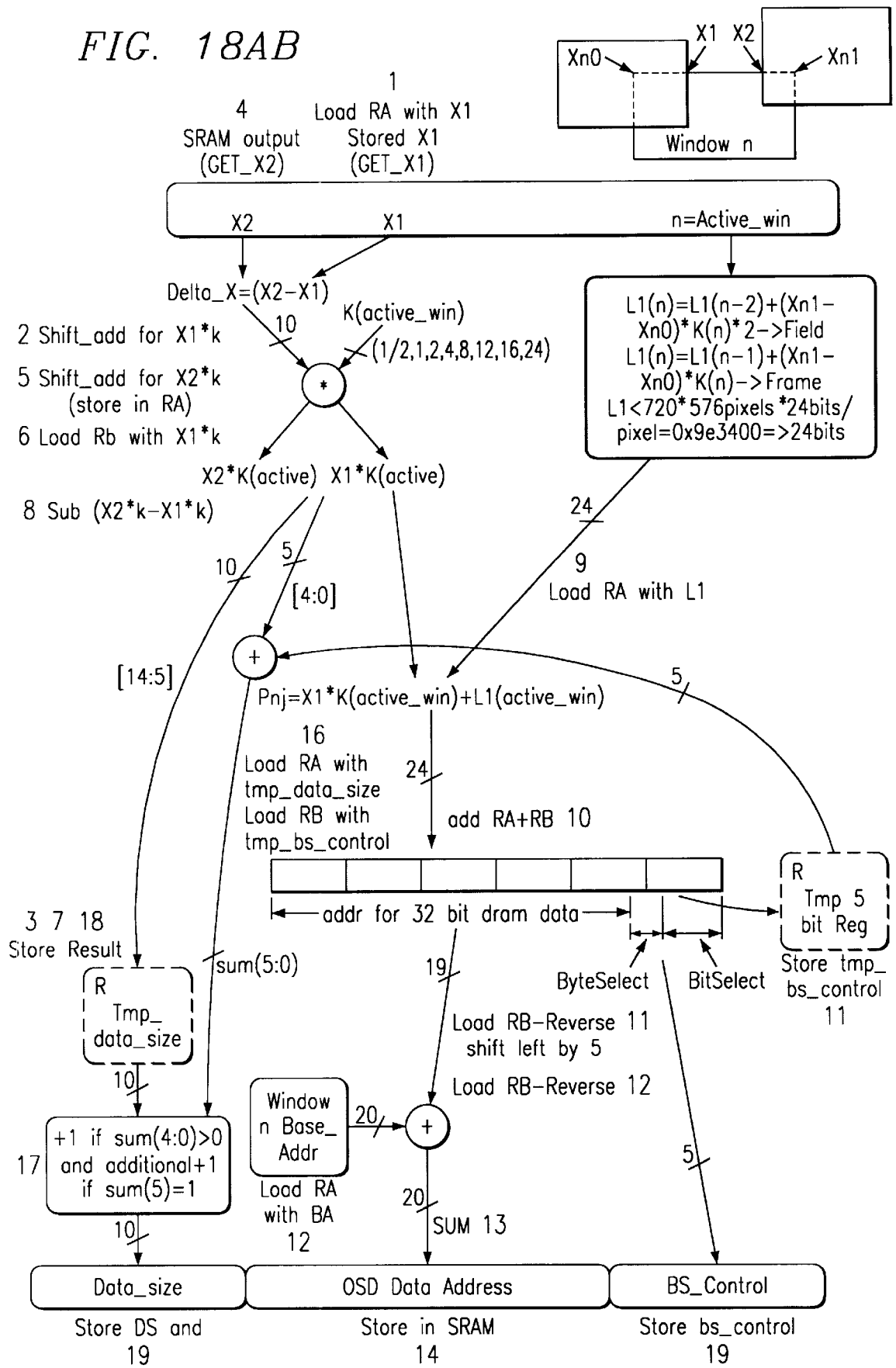
Figure 18A:
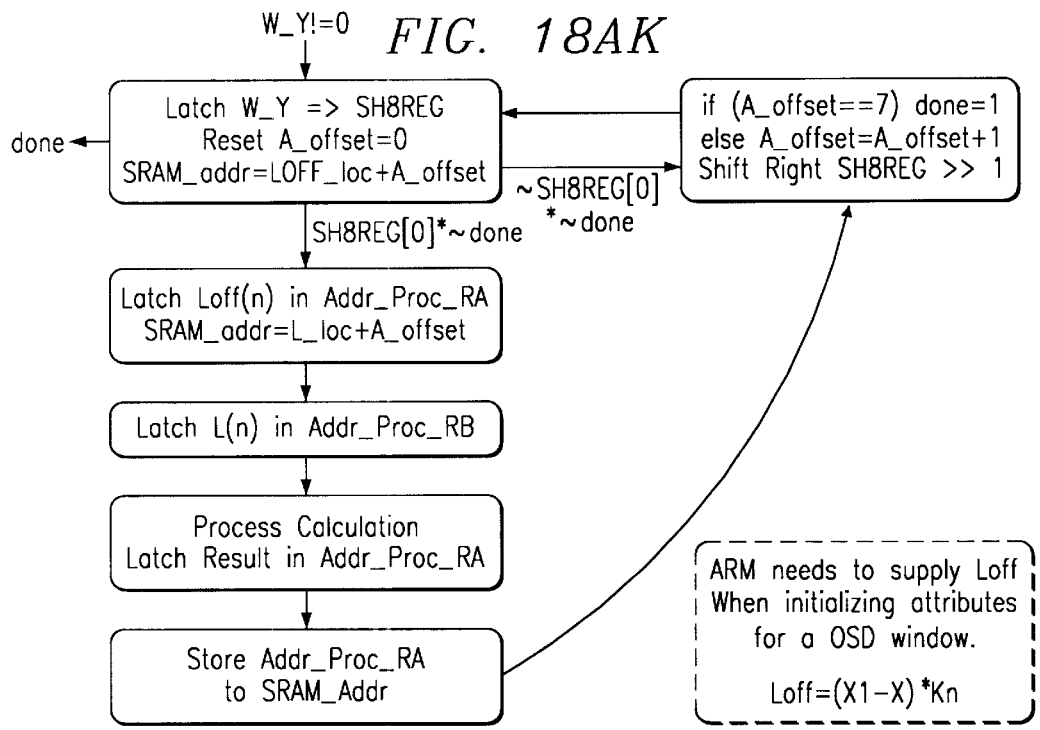
Figure 18A:
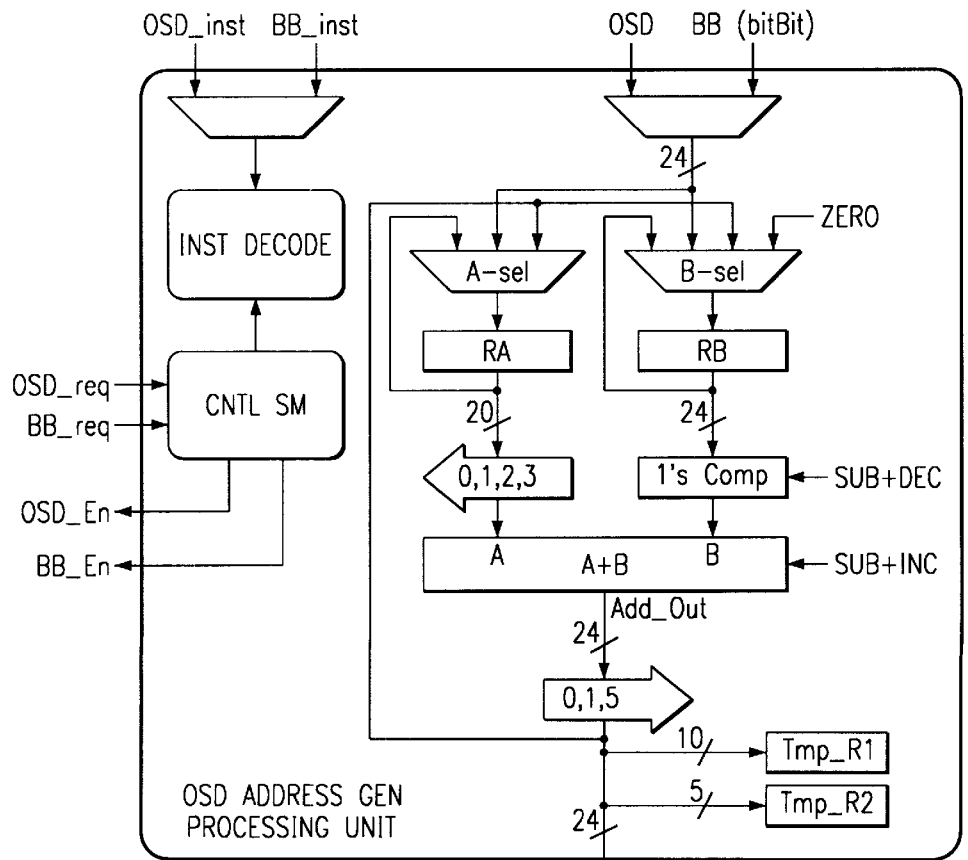
Figure 18A:
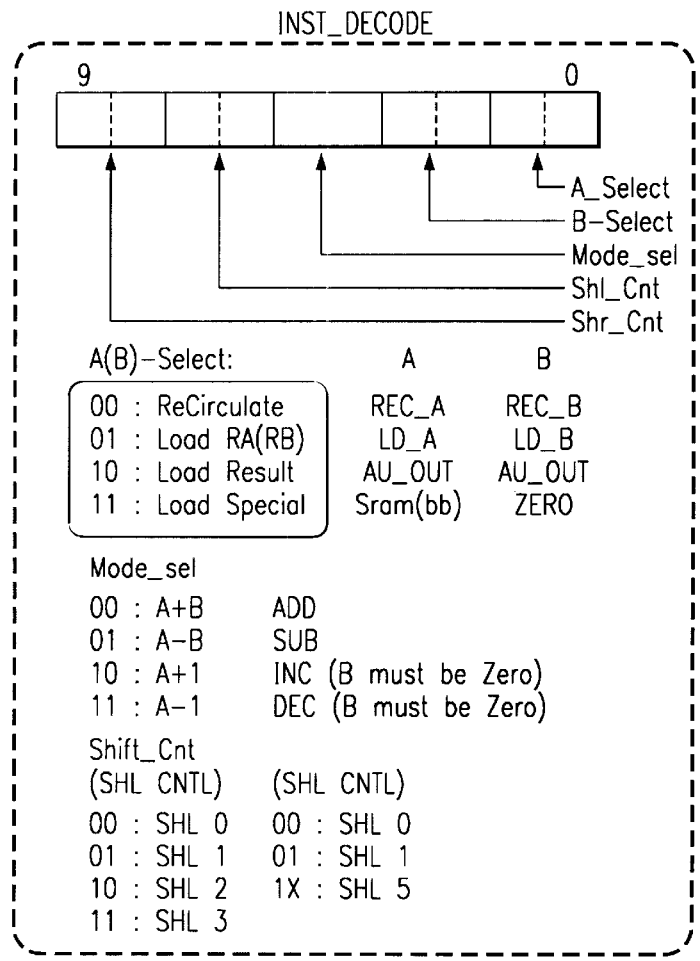
Figure 18A:
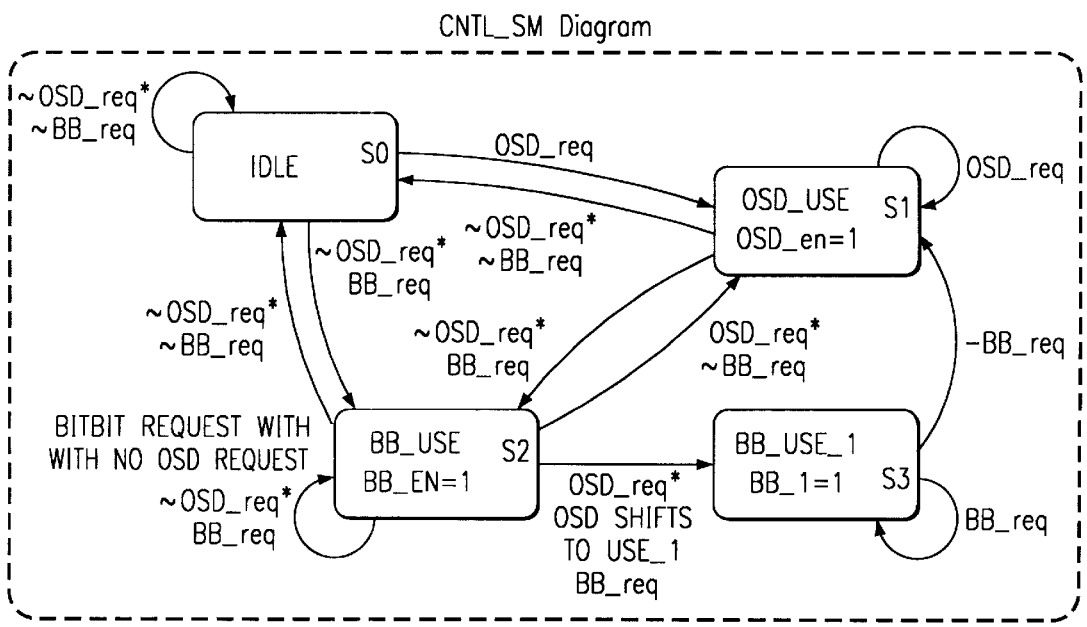
Figure 18A:
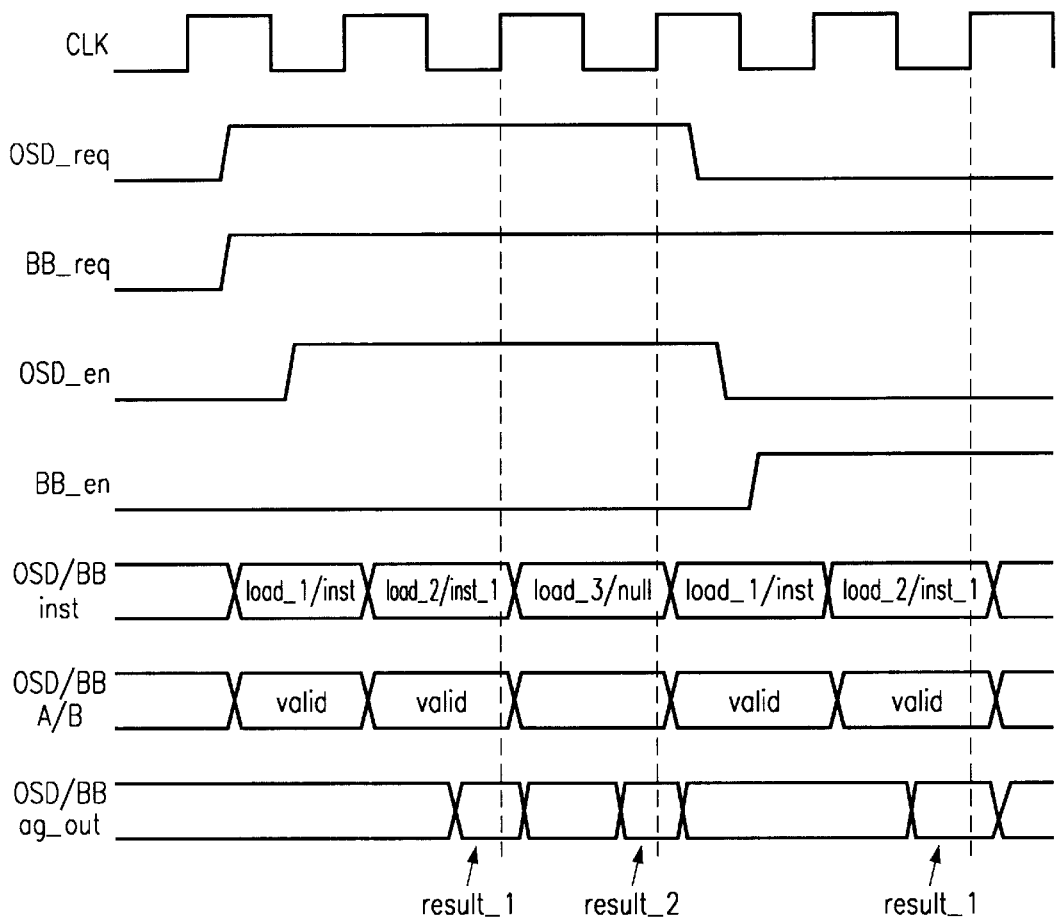
Figure 18A:
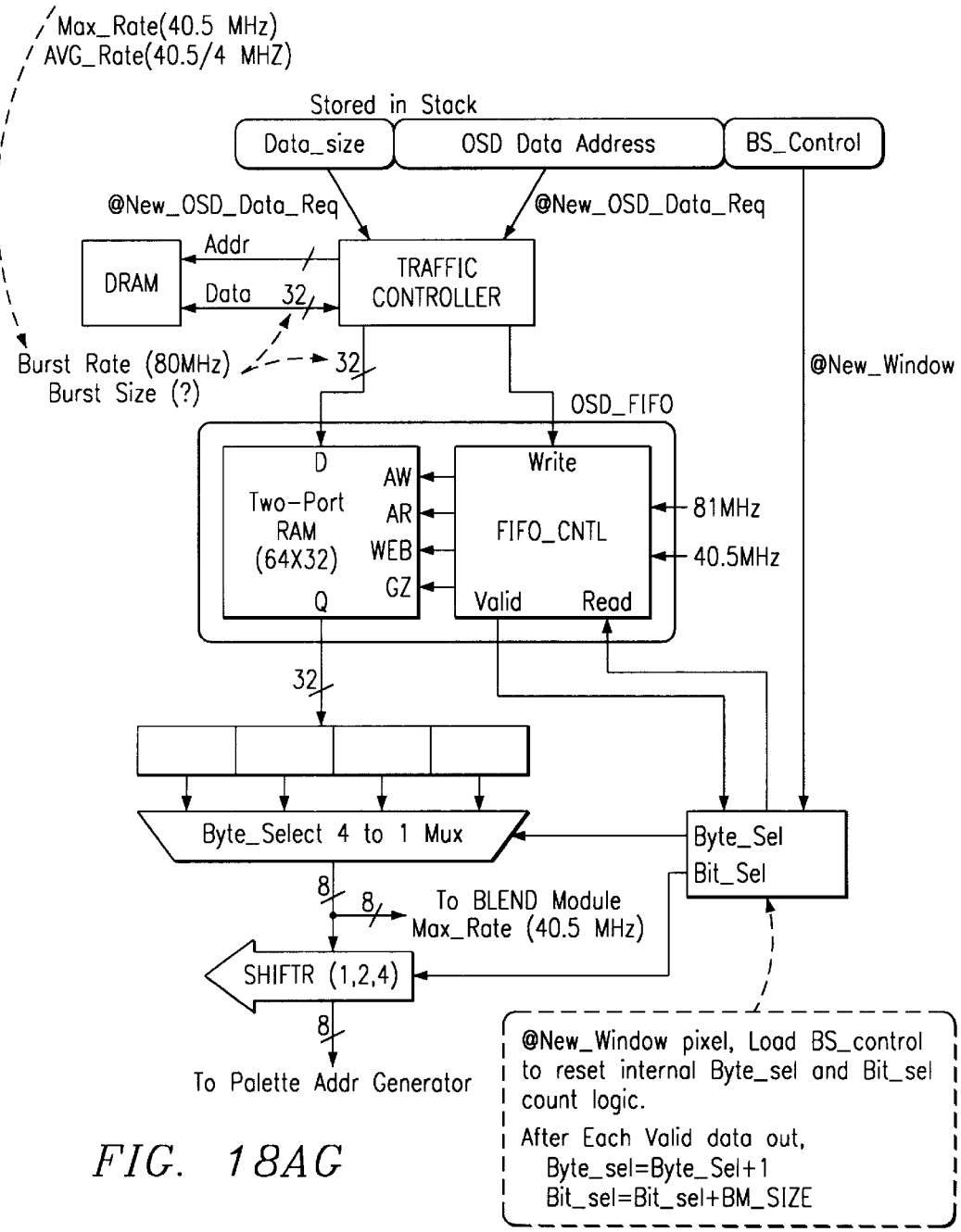
Figure 18A:
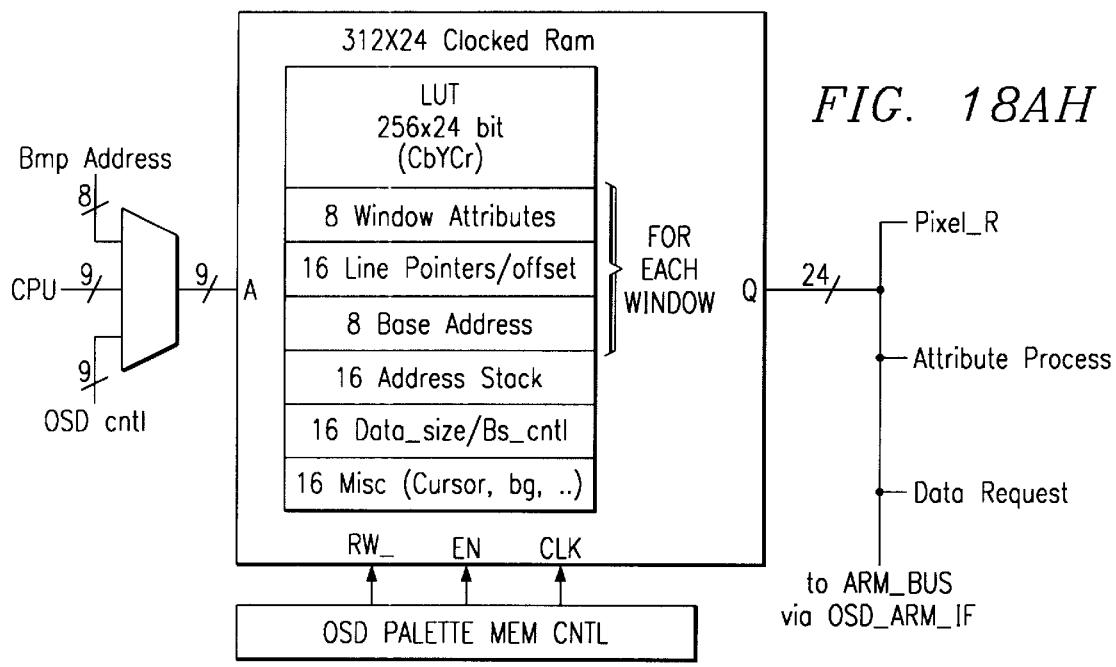
Figure 18A:
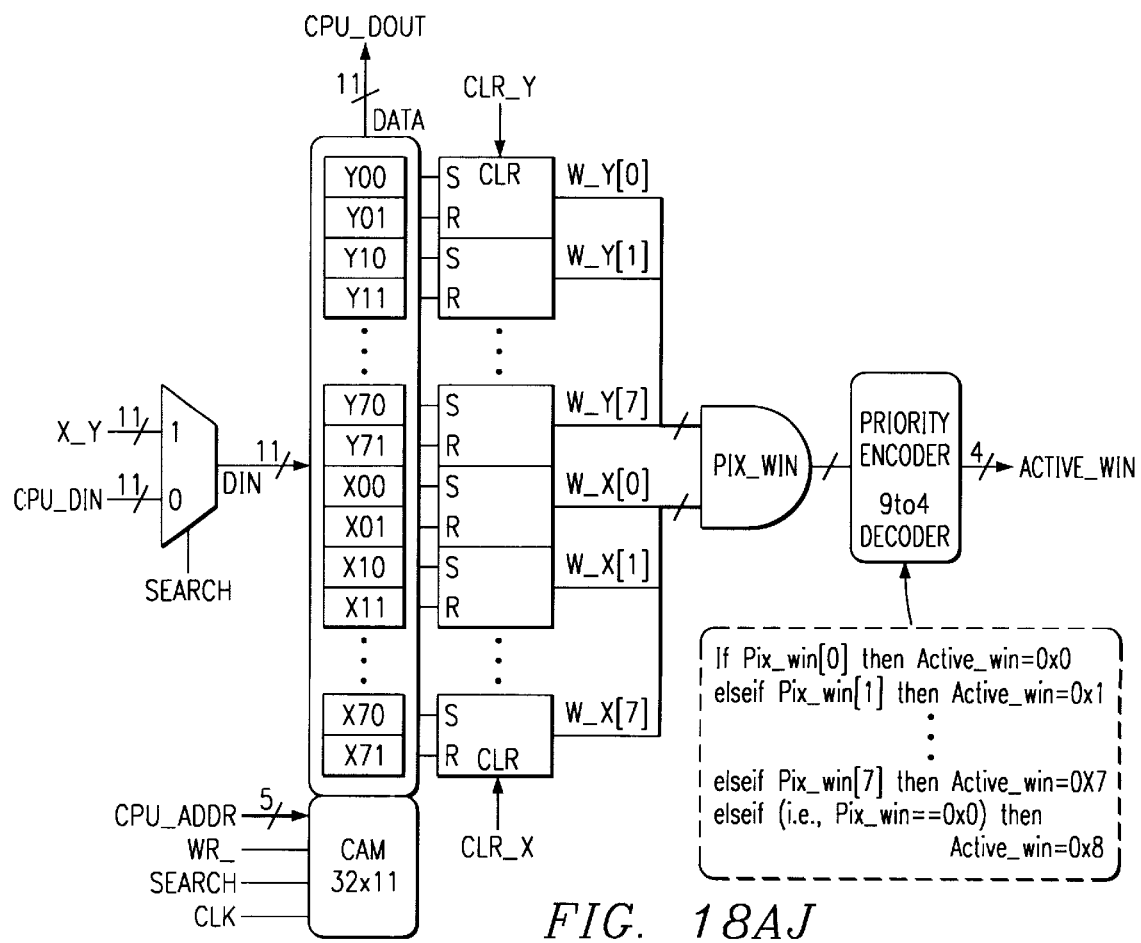
Figure 18A:
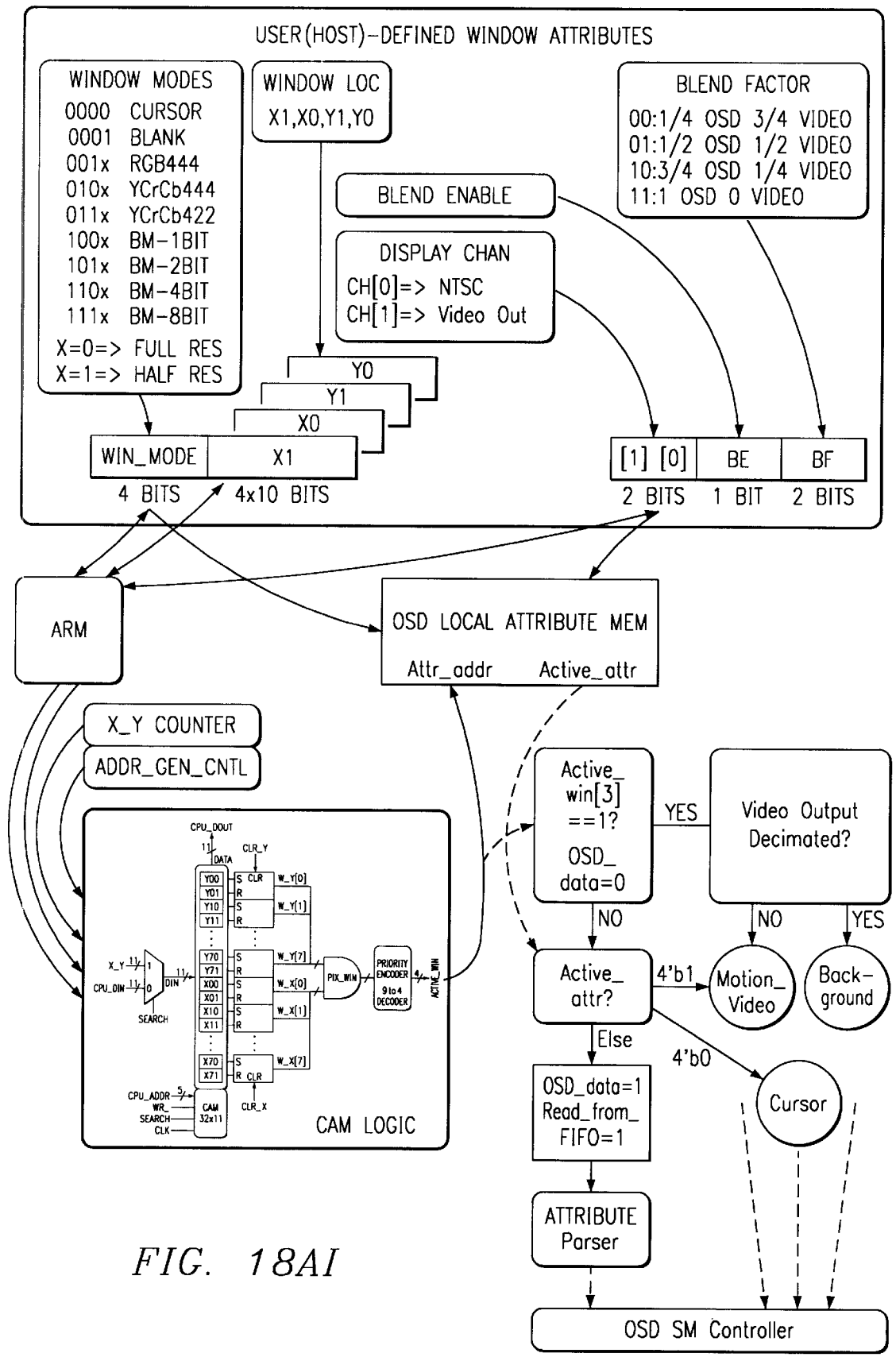

A flowchart of the address calculator steps is depicted in FIG. 18Y. Thus, the OSD system 270 simultaneously displays different kinds of pictures: bit-map, graphic, still video picture, motion video picture or background color. Each picture is in a different window that is managed by OSD hardware.

A display memory organized by windows is located in an SDRAM 312; the same memory space in the SDRAM 312 is used for both the display frame memory and for the CPU working area.

An address calculator calculates the attributes of each of the segments that make up the current display line (first address, size in word and offset of the first pixel) and stores these values in the segments stack.

The OSD data is read in a burst by window segment. For each new segment, the controller accesses the attributes RAM to get a memory address and segment size.

Figure 18Z:
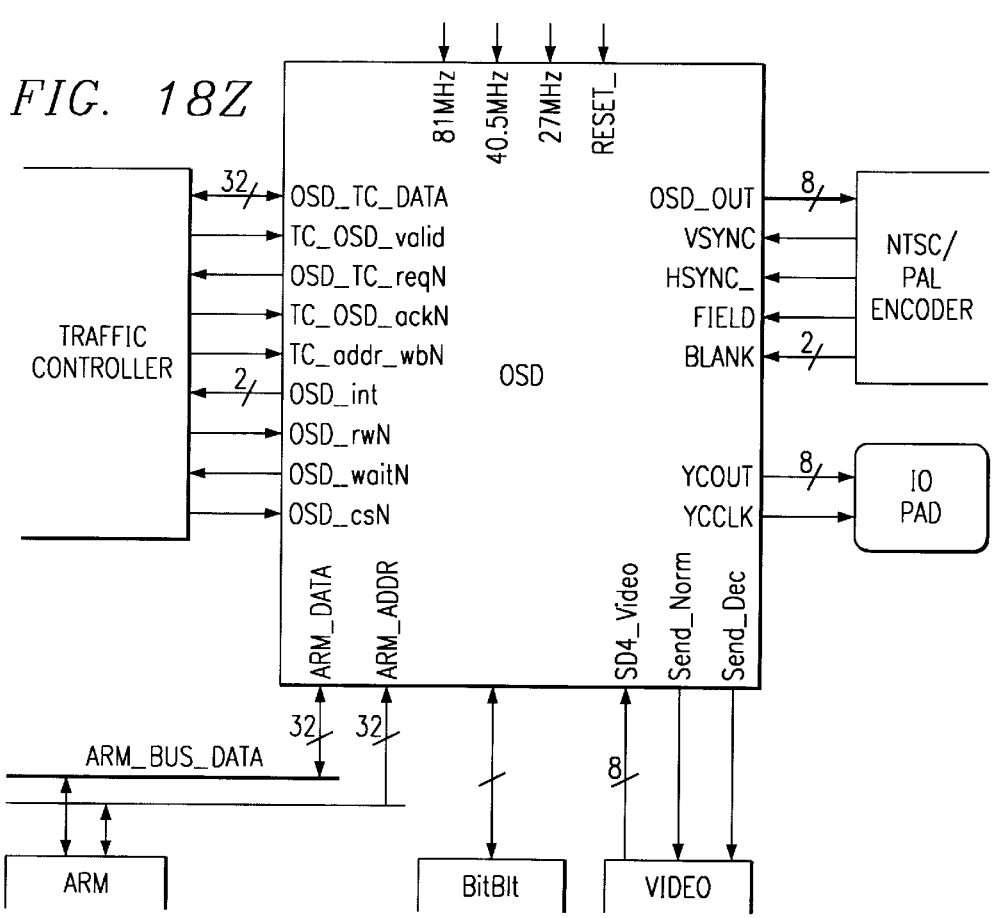
Figure 18A:
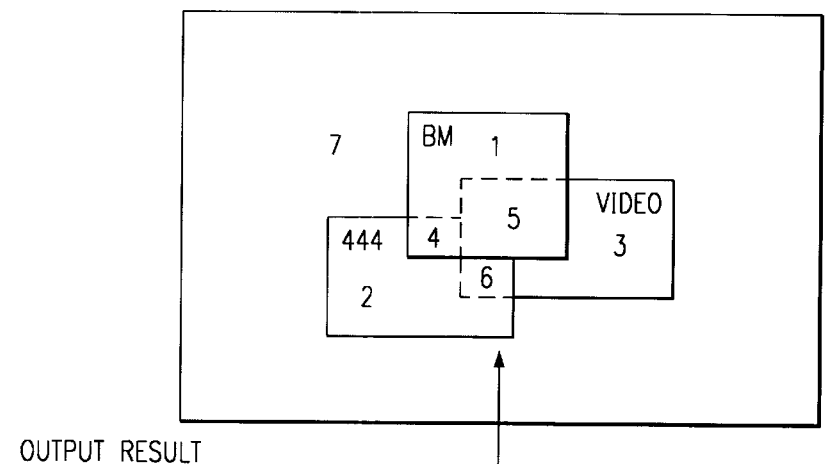
Figure 18A:
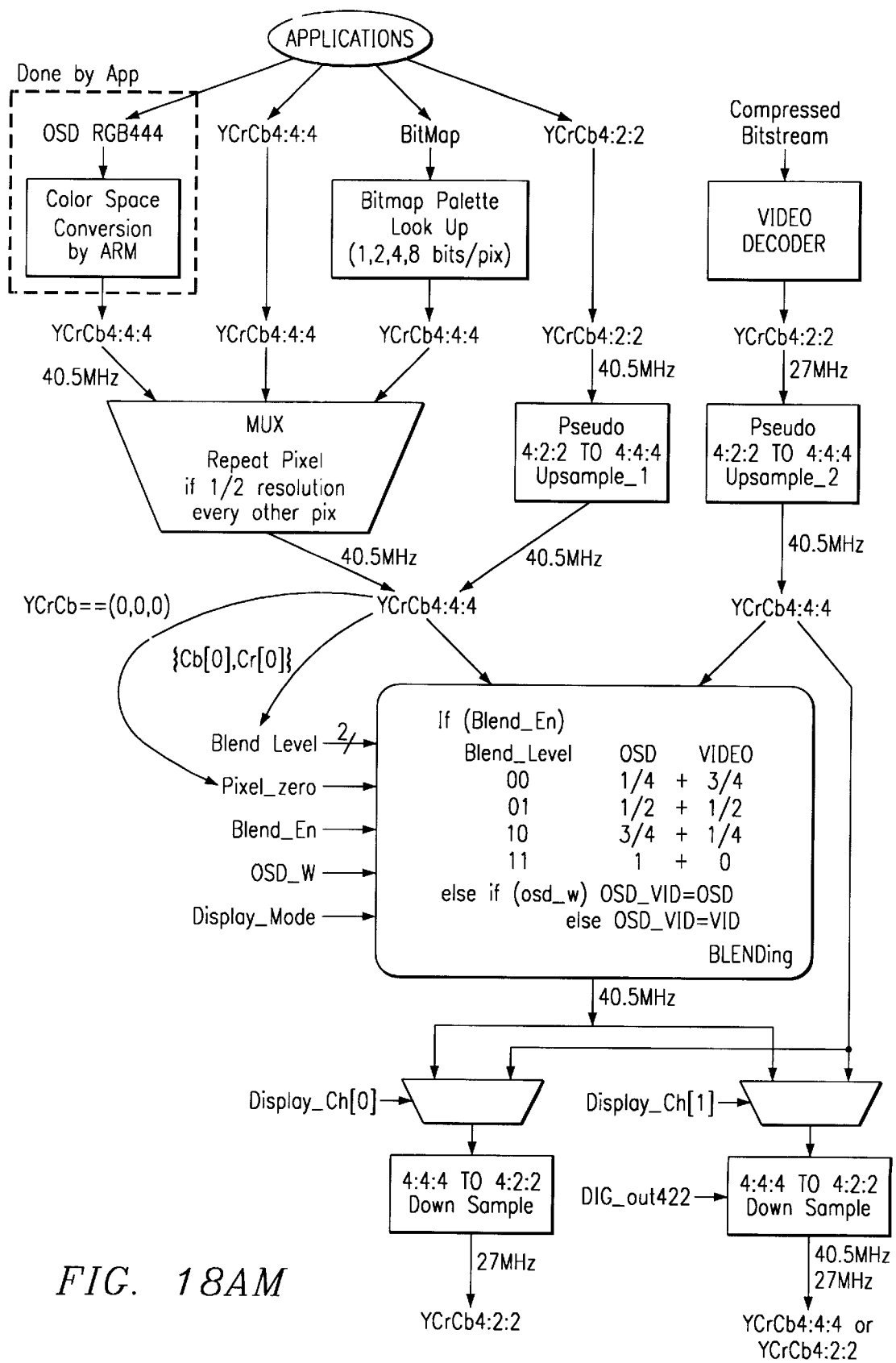
Figure 18A:
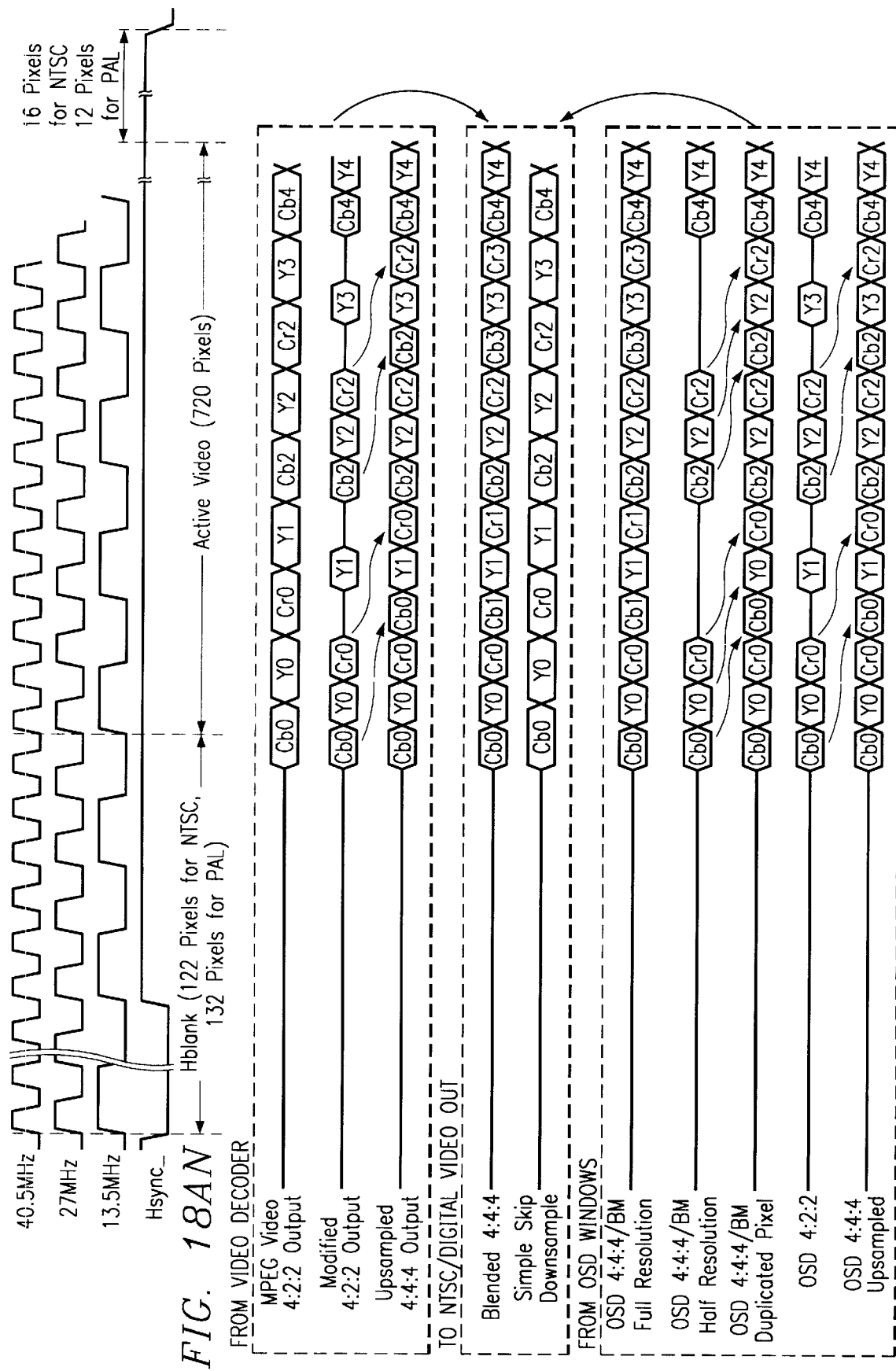
Figure 18A:
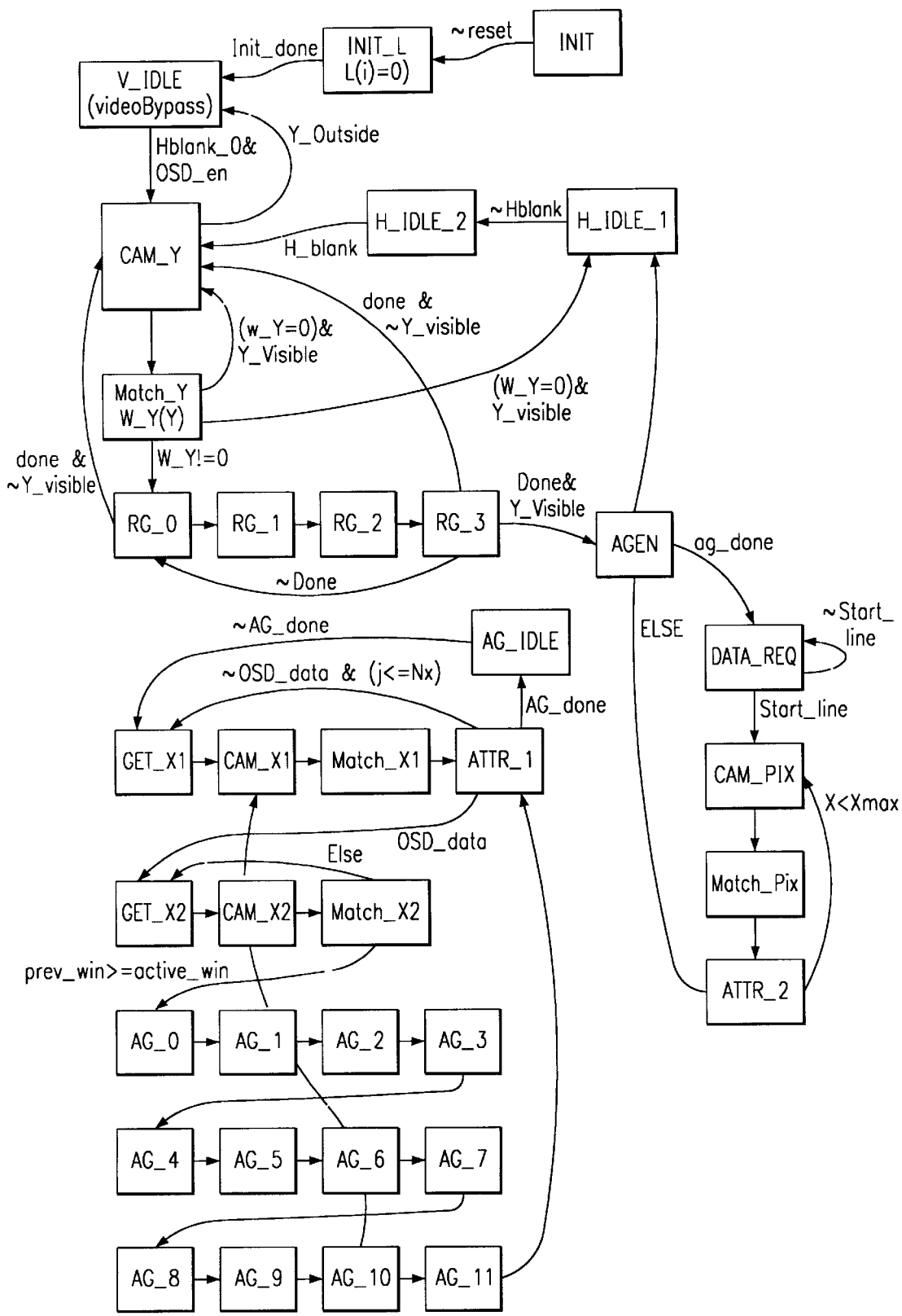
Figure 18A:
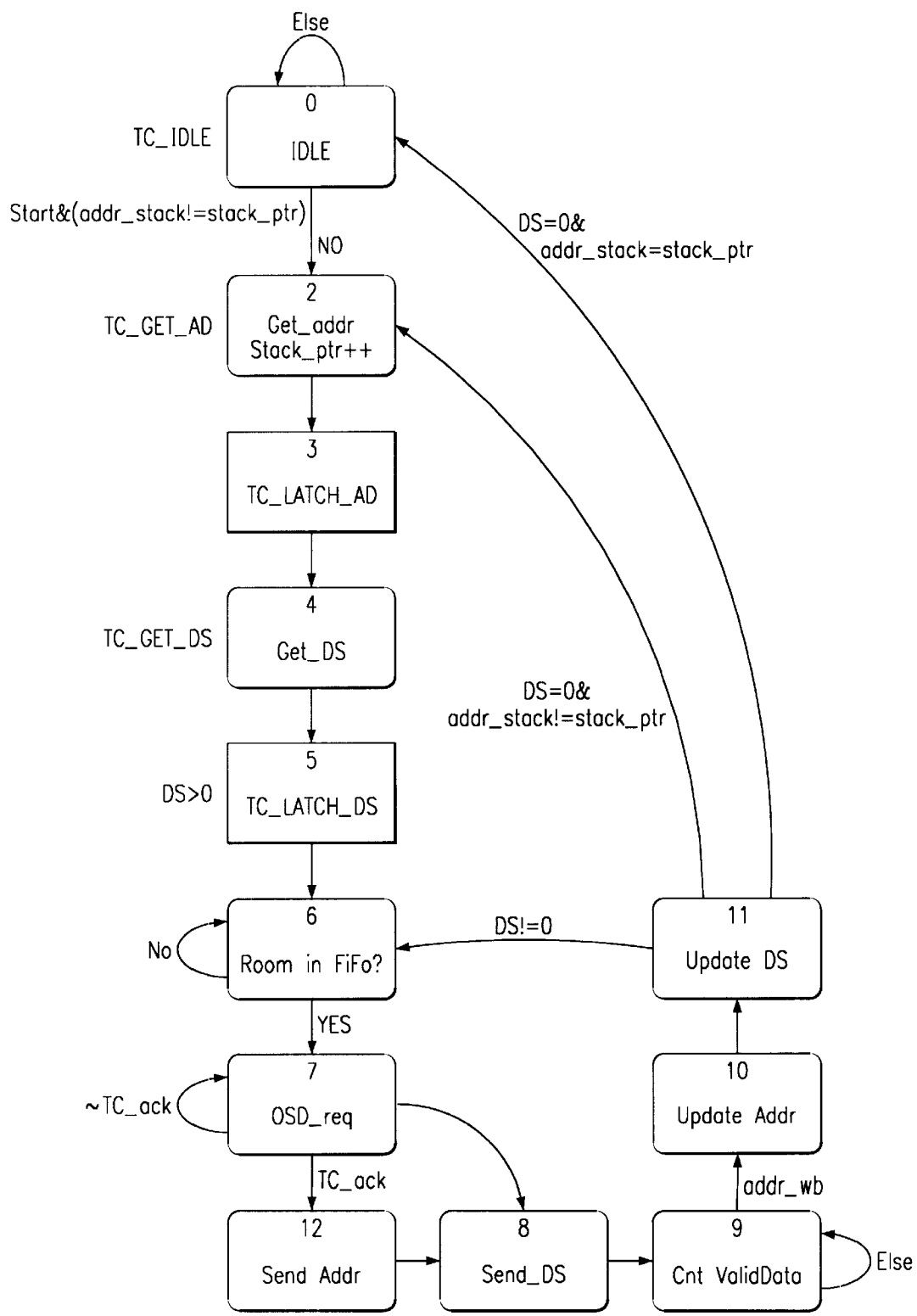
Figure 18A:
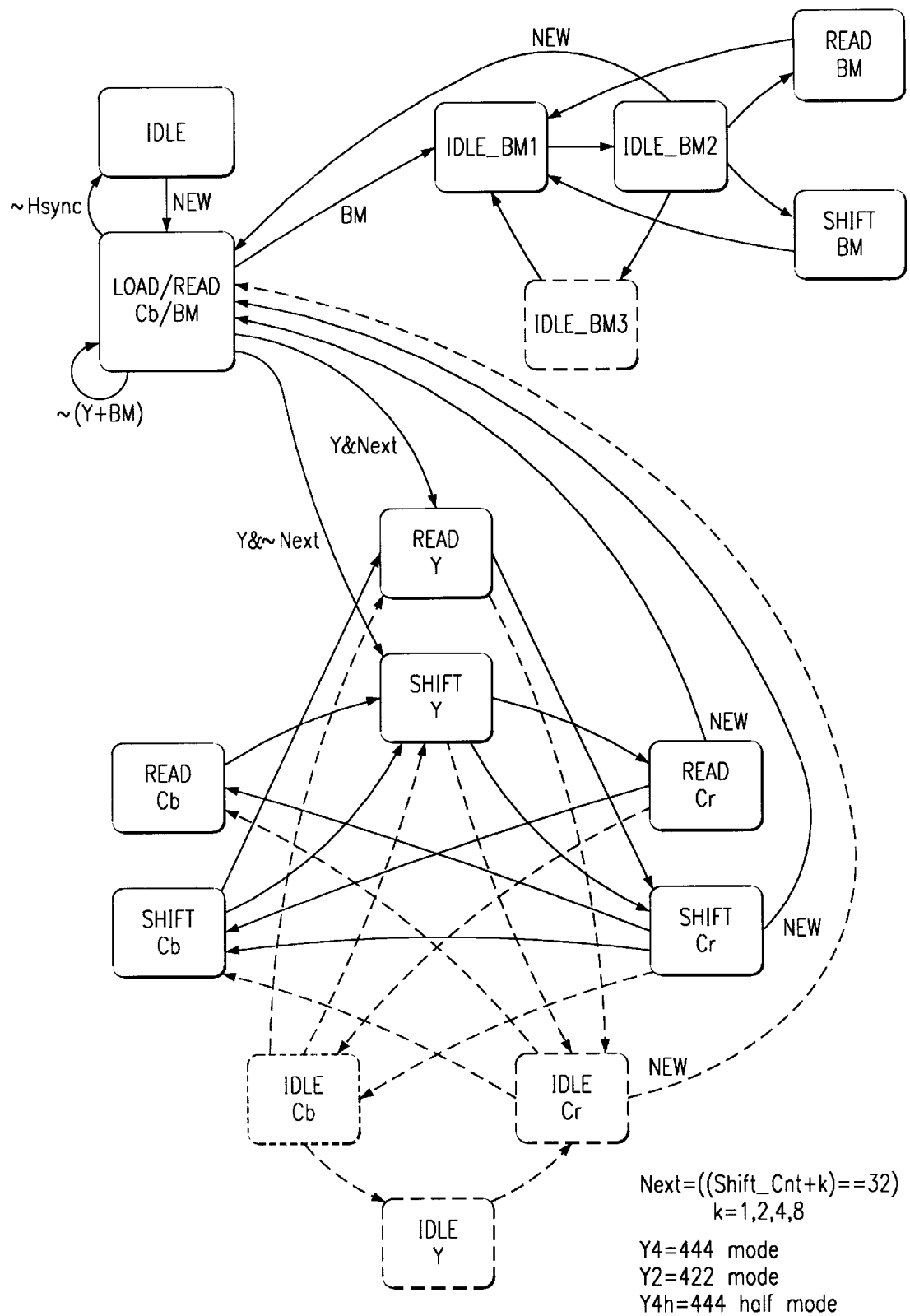
Figure 18A:
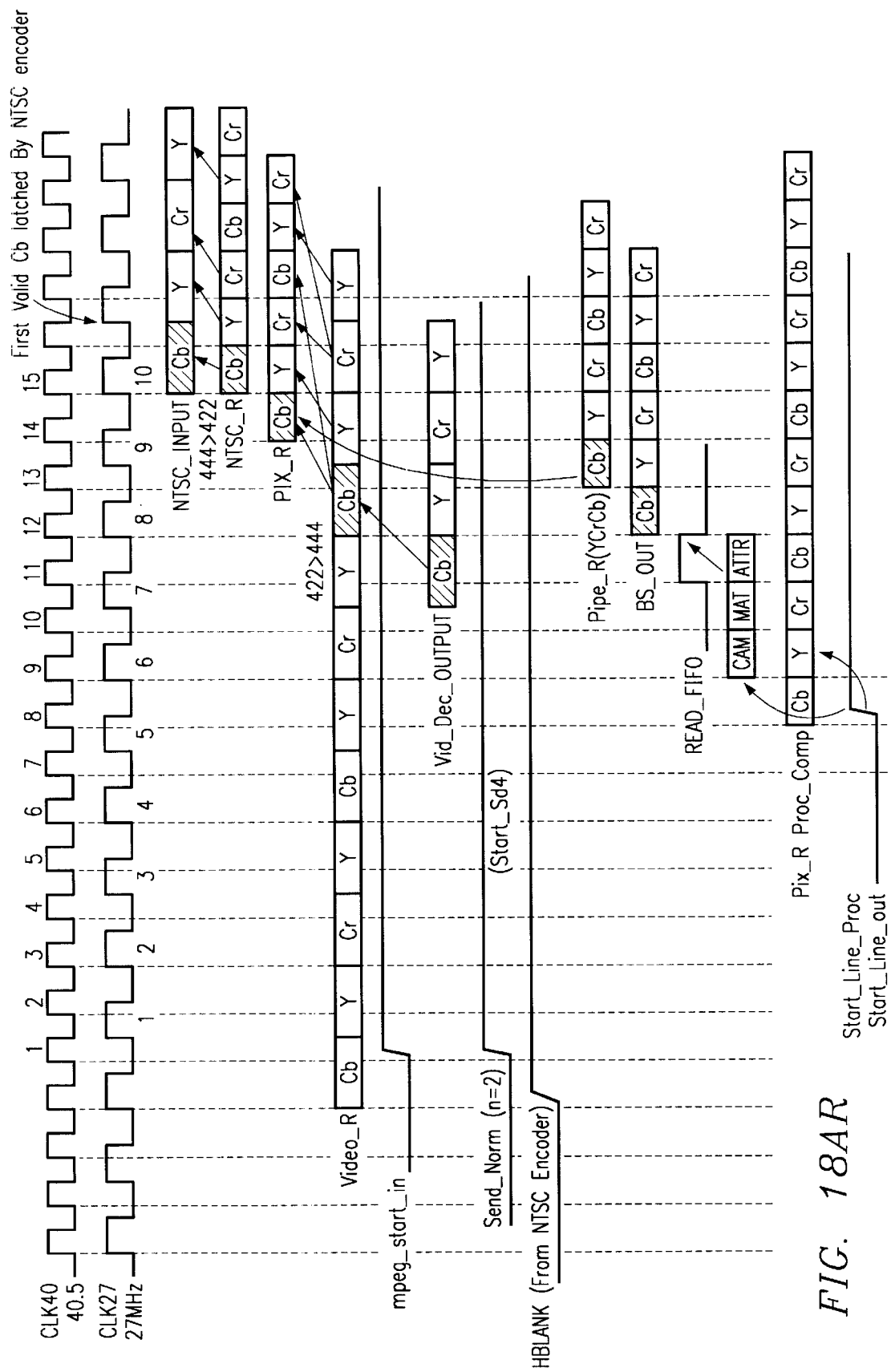
Figure 18A:
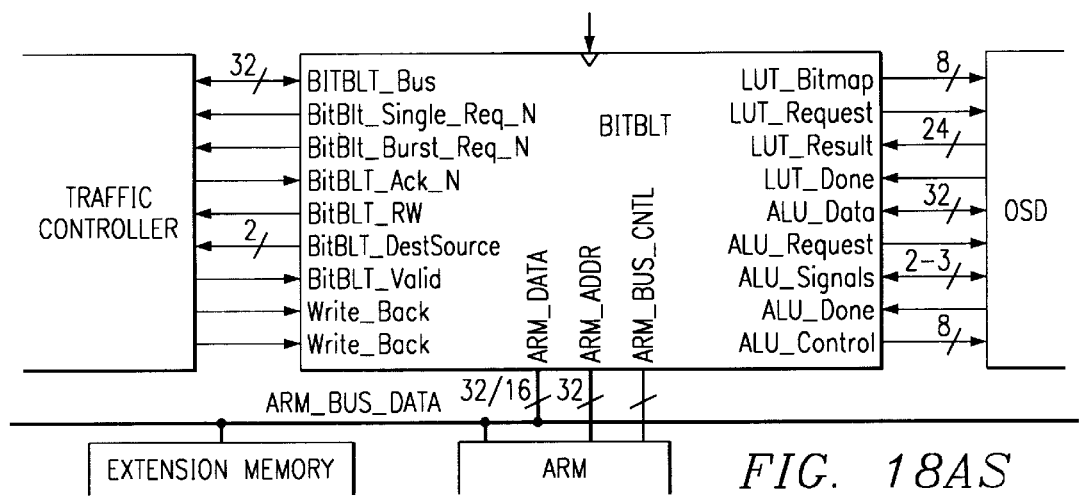
Figure 18A:
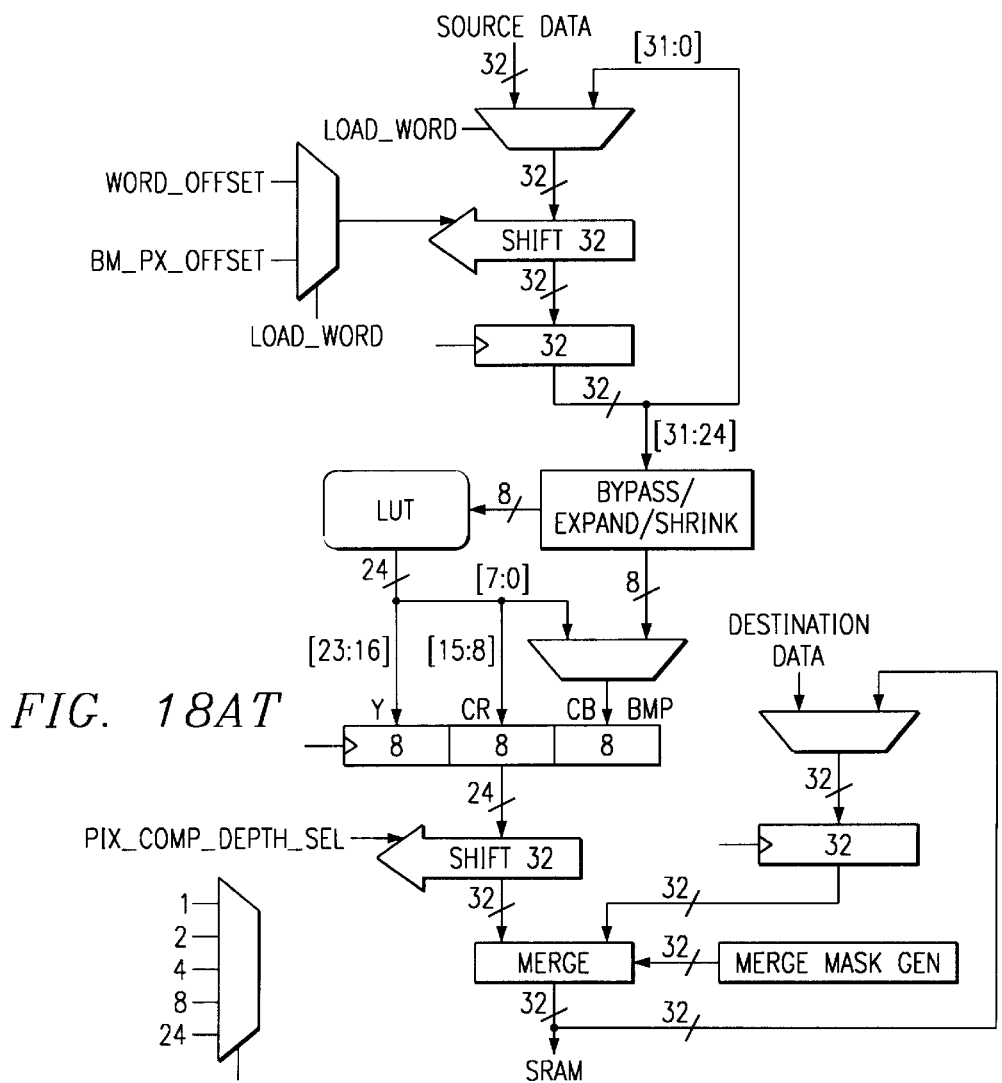
Figure 18A:
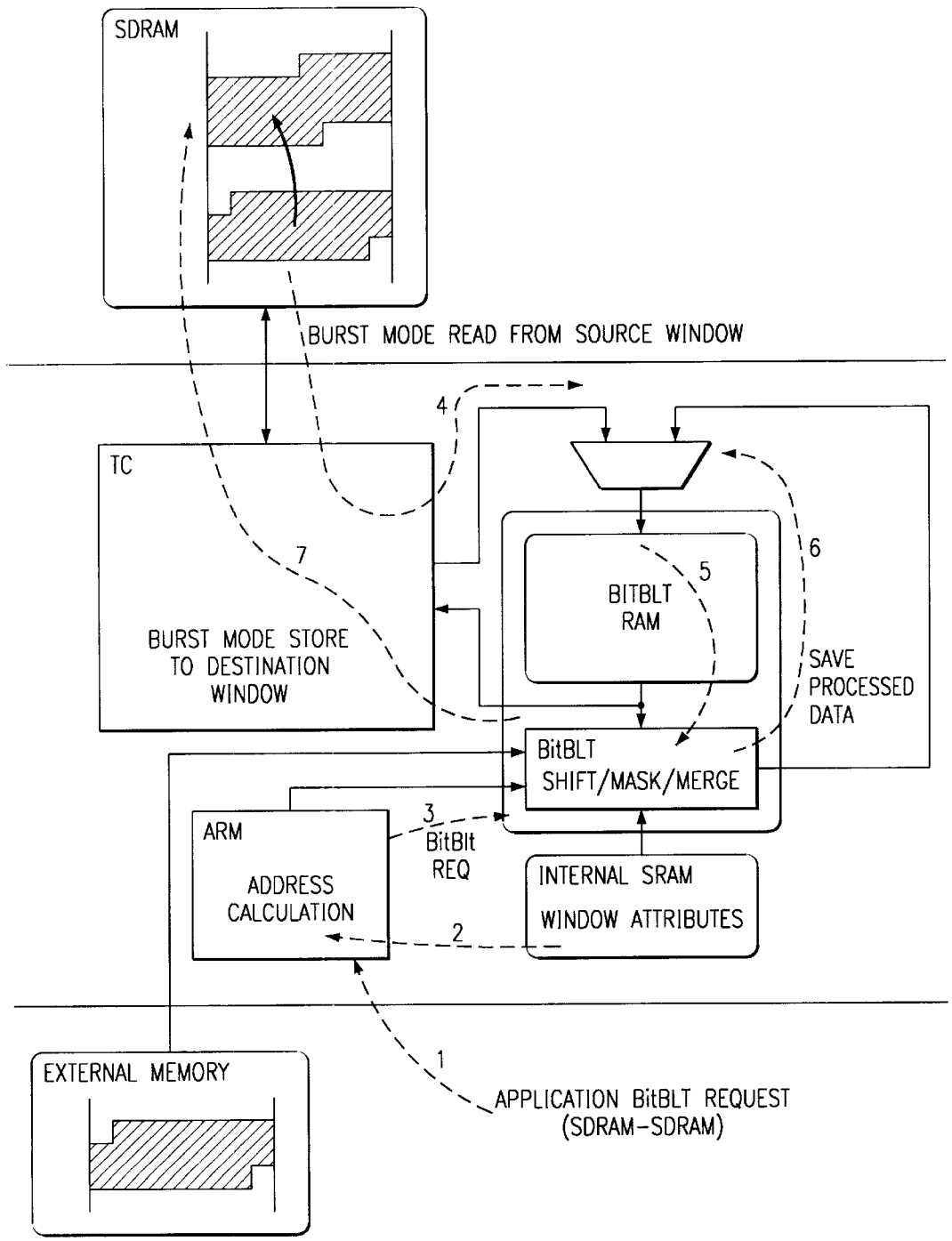
Figure 18A:
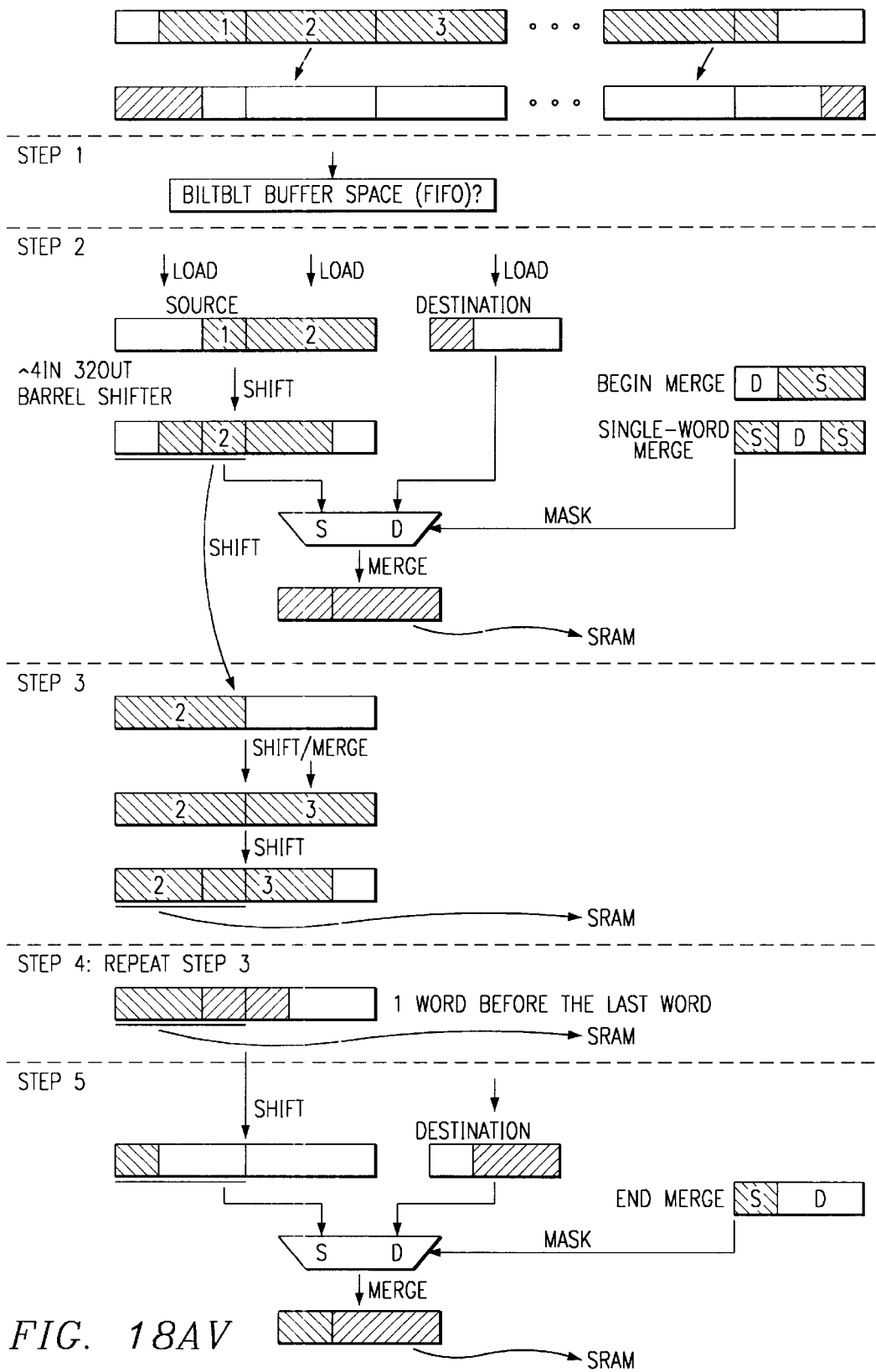
Figure 18A:
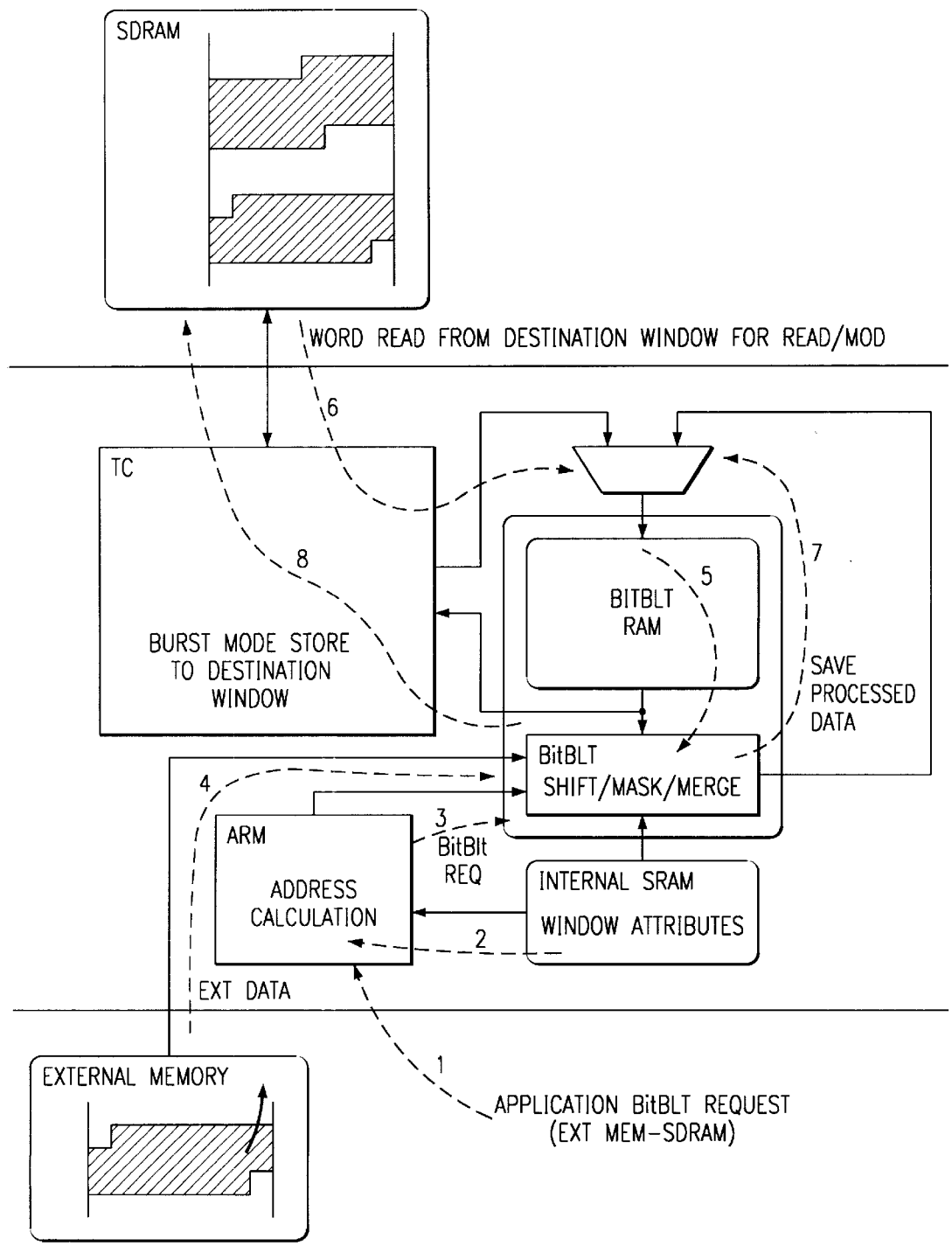
Figure 18A:
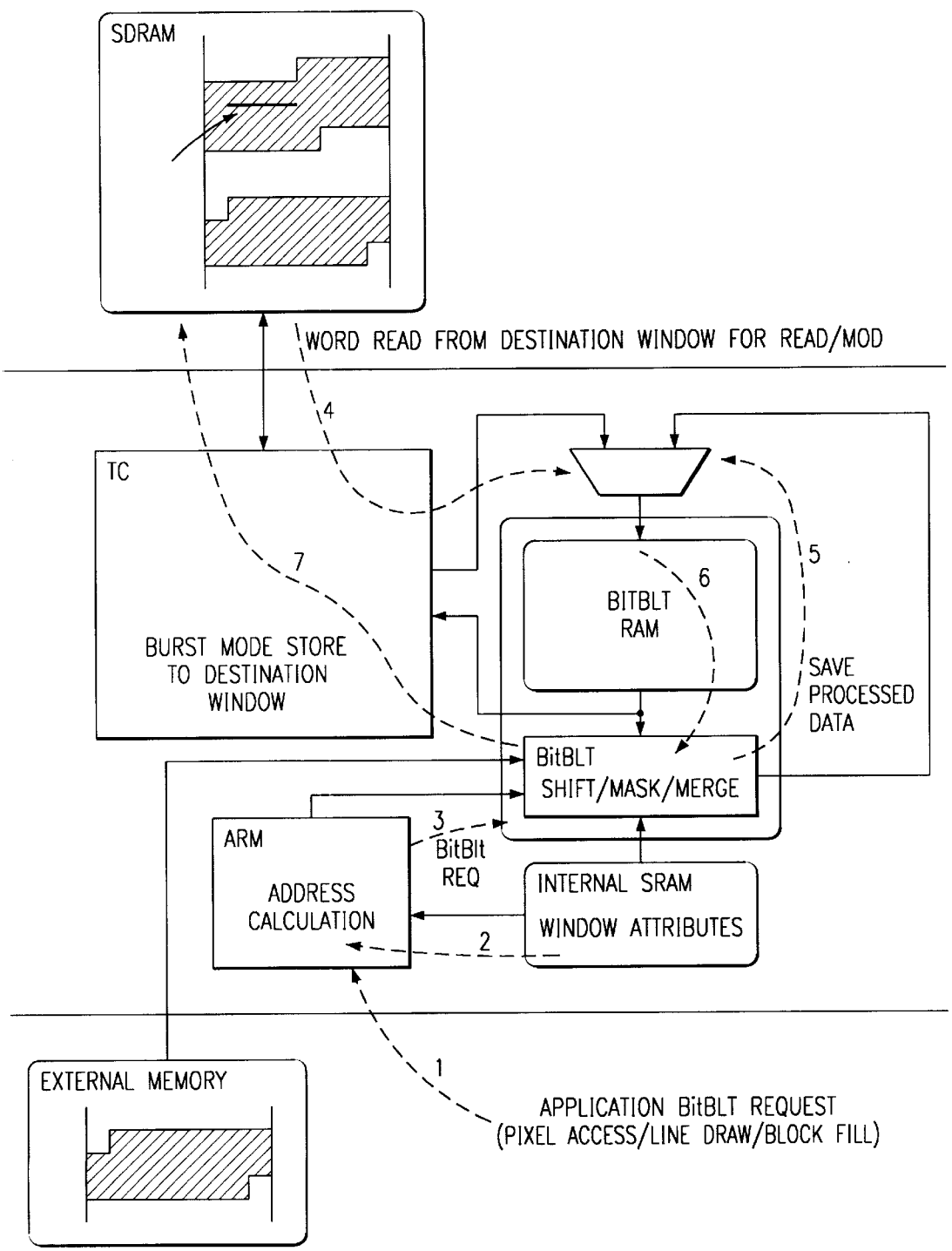
Figure 18A:
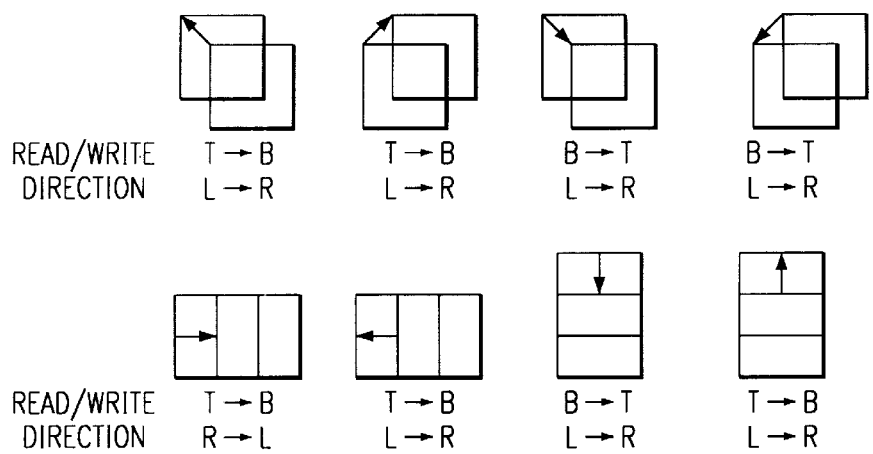
Figure 18A:
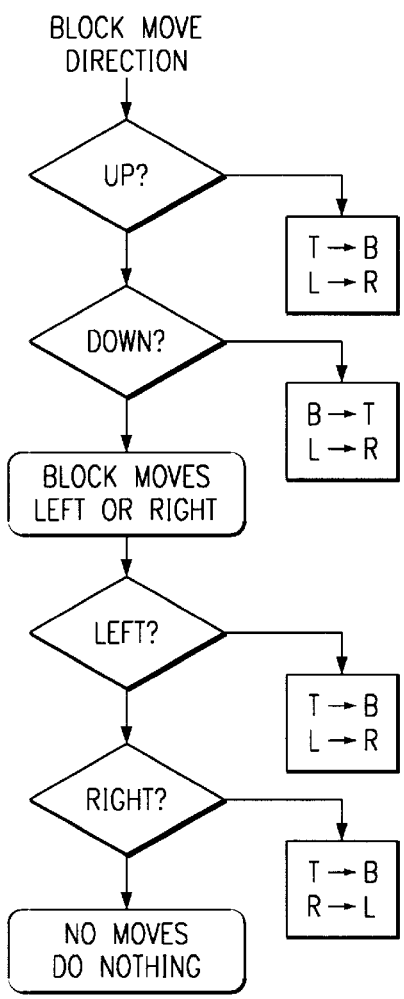
Figure 18B:
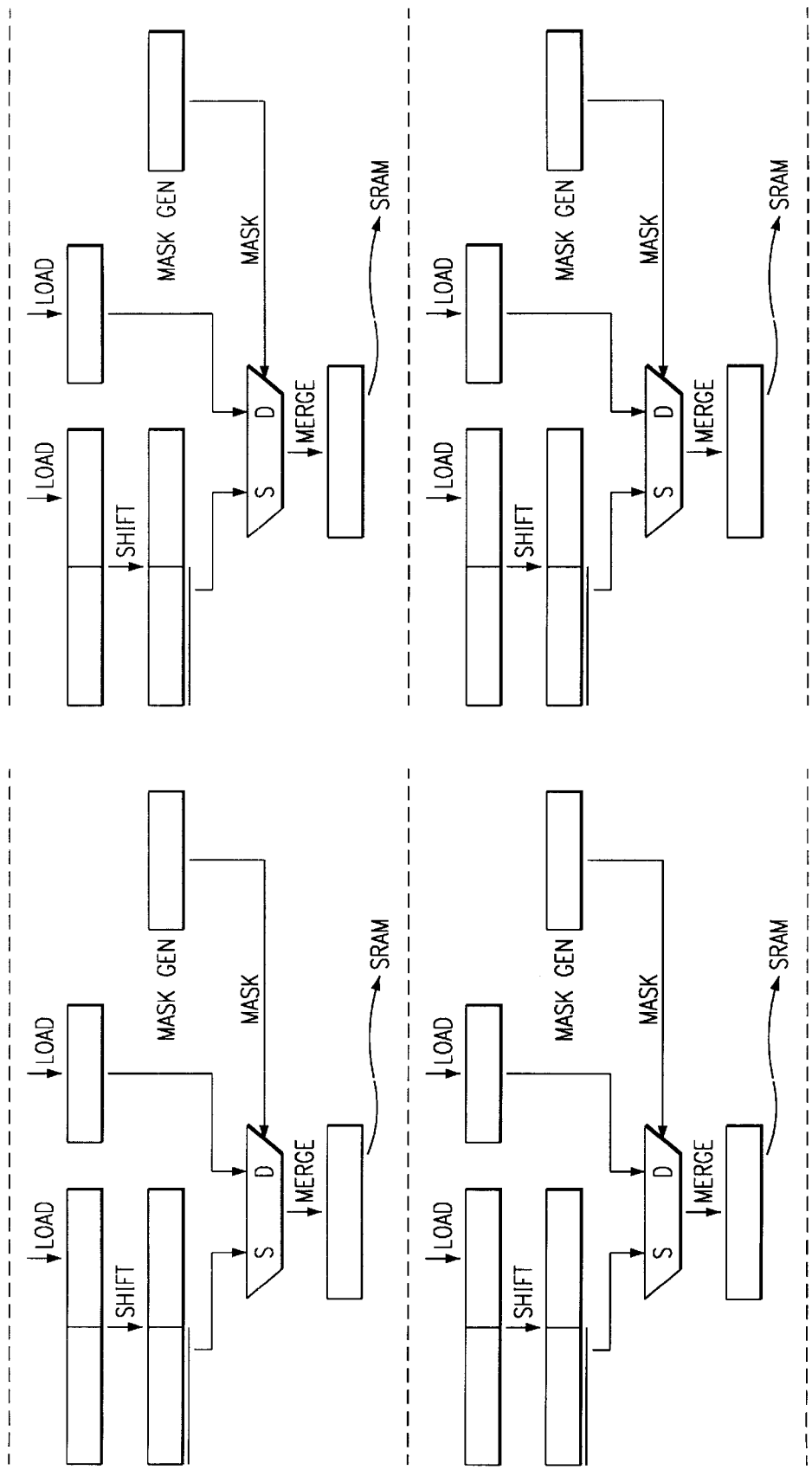
Figure 22A:
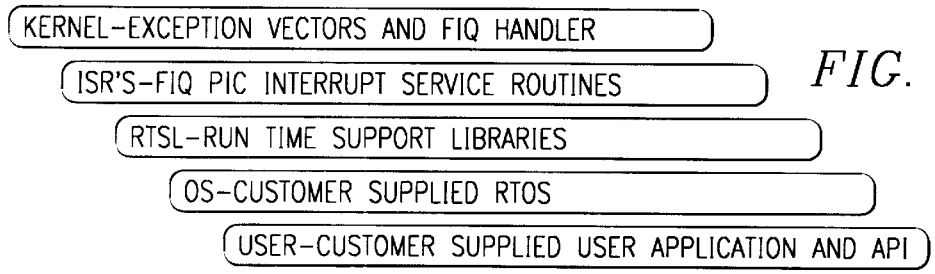
FIGS. 22A–22S depict details associated with software utilized on or with the circuit of FIG. 1B.
Figure 22B:
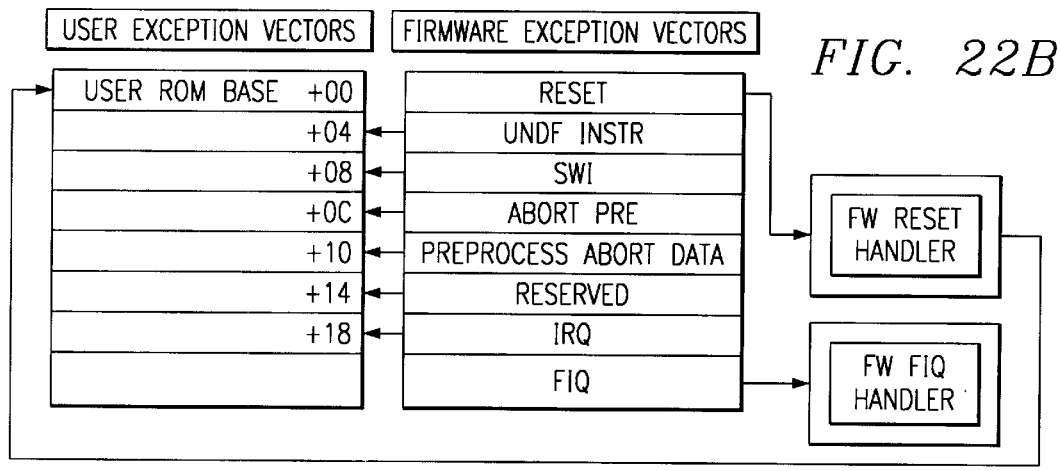
Figure 22C:
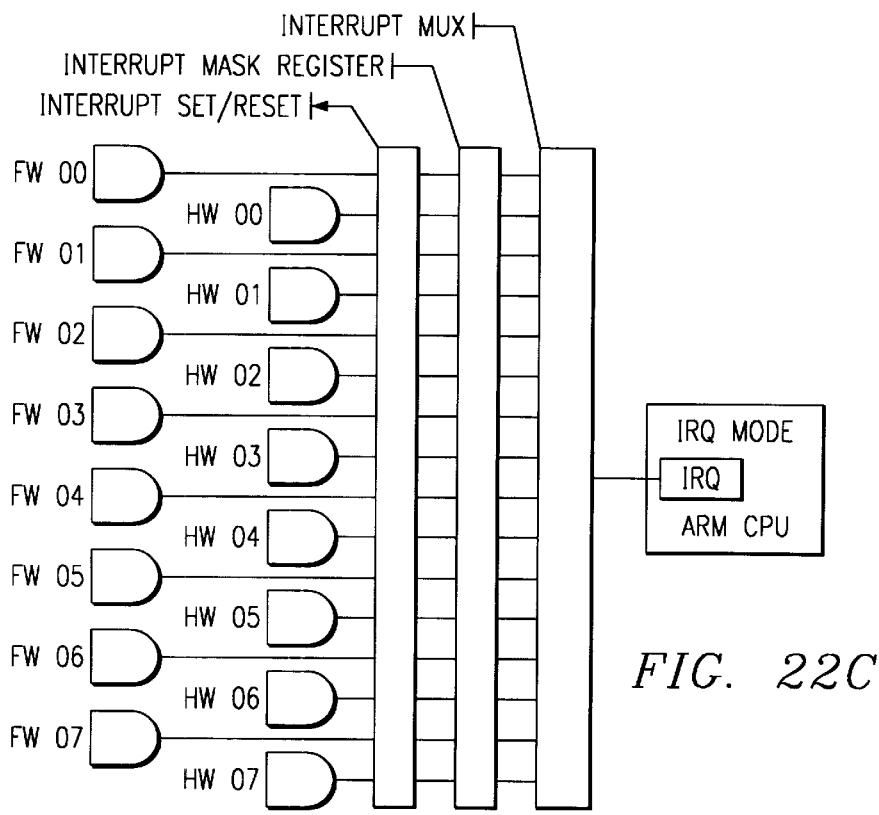
Figure 22D:
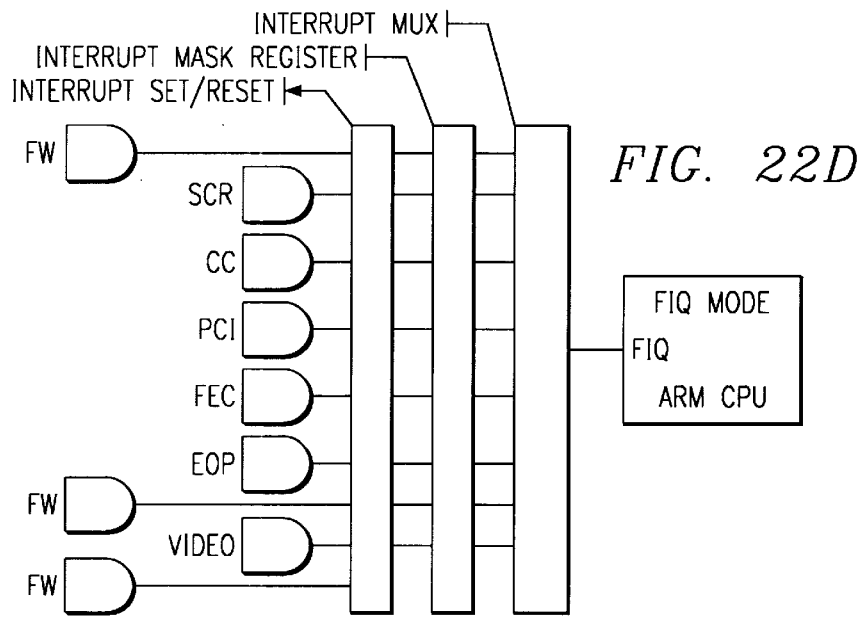
Figure 22E:
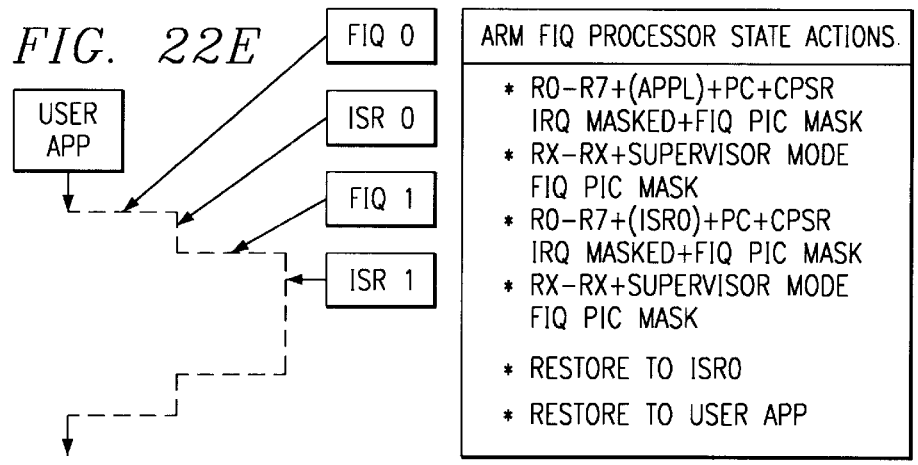
Figure 22F:
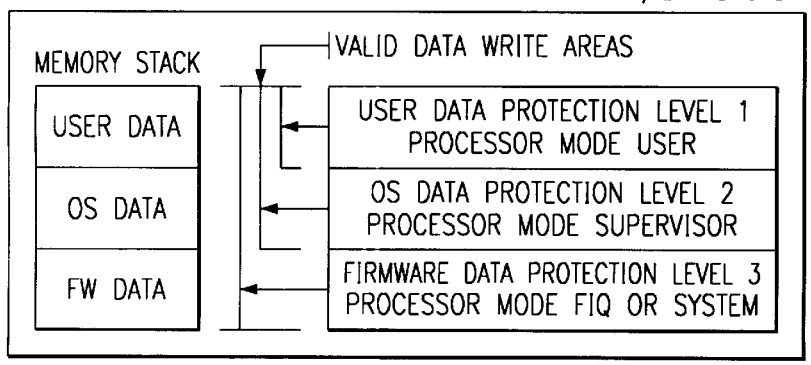
Figure 22G:
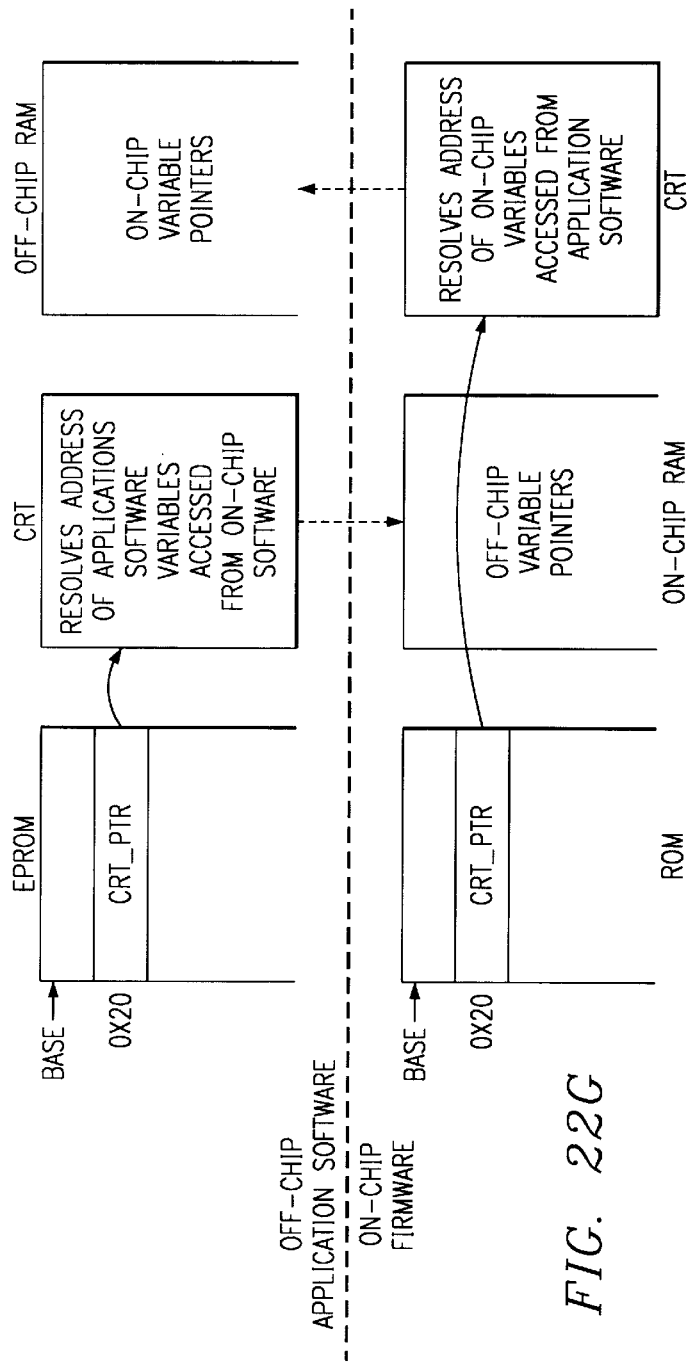
Figure 22H:
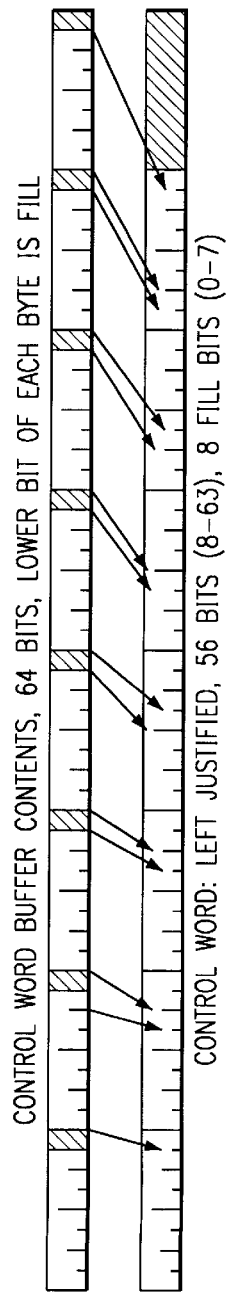

The OSD functionality of the OSD block 270 of FIG. 1B is presently preferred to be implemented as depicted in FIGS. 18Z and 18AA. FIG. 18AB depicts how the data size, address and control are generated for a window; it includes numbered steps for how this is accomplished.

FIGS. 18AC, 18AD, 18AE and 18AF depict the address generation circuitry, the instruction decoding, the state machine of the generation circuitry and a representative set of timing diagrams for this circuitry.

FIG. 18AG depicts how the window data is used by the TC to load the OSD FIFO and illustrates details of the OSD FIFO and its control.

FIG. 18AH illustrates how the OSD palette memory is organized and its interfaces.

FIG. 18AI illustrates how the window mode is determined.

FIG. 18AJ illustrates in more detail the CAM logic block of FIG. 18AI. It operates as described earlier herein.

FIG. 18AK illustrates a line pointer update flow diagram.

FIG. 18AL illustrates an OSD blending example.

FIG. 18AM illustrates the flow associated with FIG. 18AL.

FIG. 18AN illustrates timings for FIG. 18AM.

FIG. 18AO illustrates an OSD state machine and its states.

FIG. 18AP illustrates a state machine for FIFO request to the TC.

FIG. 18AQ illustrates a state machine for FIFO reads and control functions.

FIG. 18AR illustrates a representative timing diagram.

The BitBLT functionality 272 of the OSD block 270 of FIG. 1B is presently preferred to implemented as depicted in FIGS. 18AS and 18AT.

FIGS. 18AU illustrates an SDRAM to SDRAM transfer. FIG. 18AV illustrates this flow in more detail.

FIGS. 18AW and 18AX illustrate other transfers.

FIGS. 18AY, 18AZ and 18BA illustrate other BitBLT functions.

An appendix for the BitBLT module is attached as Appendix C hereto and incorporated by reference herein. It provides details on the operations of the BitBLT module.

The NTSC/PAL Encoder module 260 supports NTSC and PAL B, D, G/H, and I display formats and outputs Y, C, and Composite video with 9-bit DACs. It complies to the RS170A standard and supports the MacroVision Anti-taping function. It provides Closed Caption, Extended Data Services, and aspect ratio VARIS encoding. It also provides sync signals with an option to accept external sync signals.

This module 260 accepts from the OSD module 270 the video data that may have been blended with OSD data and converts it to Y, C, and Composite analog outputs. The Closed Caption and Extended Data Services data are provided by the video decoder 252 through a serial interface line. These data are latched into corresponding registers. The CC encoder sends out Closed Caption data at video line 21 and Extended Data Services at video line 284. The ARM initializes and controls this module via the ARM Interface block. It also sends VARIS code to the designated registers which is then being encoded into video line 20. The ARM also turns on and off MacroVision through the ARM Interface block. The default state of MacroVision is off.

The Communications Co-Processor module 280 provides two programmable timers, 3 UARTs—one for Smart Card and two for general use, accepts IR, SIRCSI and RF signals and provides a SIRCSO output. It also provides two general purpose I/Os and manages the I²C and JTAG interfaces.

This module 280 contains a collection of buffers, control registers, and control logic for various interfaces, such as UARTs, IR/RF, I²C, and JTAG. All the buffers and registers are memory mapped and individually managed by the ARM CPU 220. Interrupts are used to communicate between these interface modules and the ARM CPU.

The circuit 200 has two general purpose timers which are user programmable. Both timers contain 16 bit counters with 16 bit pre-scalers, allowing for timing intervals of 25 ns to 106 seconds. Each timer, timer0 and timer1, has an associated set of control and status registers. These registers are defined in Table 23.

TABLE 23

Timer Control and Status Registers

| Register Name | Read/Write | Description |
|---|---|---|
| tcrx | R/W | Timer Control Register<br>31-6 Reserved (set to 0)<br>5 tint_mask<br>    0 = enable interrupts<br>    1 = mask interrupts<br>4 reserved (set to 1)<br>3 reserved<br>2 soft - soft stop:<br>    0 = reload counters on 0<br>    1 1 = stop timer on 0<br>tss - timer stop:<br>    0 = start<br>    0 1 = stop<br>trb - timer reload<br>    0 = do not reload<br>    1 = reload the timer (read 0) |
| tddrx | W | Timer Divide Down (15-0). Contains the value for the pre-scalar to preload psc during pre-scalar rollover. (Note: reading this register is equivalent to reading the prld register.) |
| prdx | W | Timer Period Register (15-0). Contains the value for tim to preload during tim rollover. (Note: reading this register is equivalent to reading the tim32 register.) |
| prldx | R | Preload Value.<br>31 - 16 Value of prd<br>16 - 0 Value of tddr |
| tim32x | R | Actual Time Value (31-0)<br>31 - 16 Value of tim<br>16 - 0 Value of psc |

Note: x designates the timer number, 0 or 1.

The timers are count-down timers composed of 2 counters: the timer pre-scaler, psc, which is pre-loaded from tddr and counts down every sys_clock; and the timer counter, tim, (pre-loaded from prd). When psc=0, it pre-loads itself and decrements tim by one. This divides the sys_clock by the following values:

(tddr+1) * (prd+1), if tddr and prd are not both 0, or 2, if tddr and prd are both 0.

When tim=0 and psc=0, the timer will issue an interrupt if the corresponding tint_mask is not set. Then both counters are pre-loaded if soft=0. If soft is 1, the timer stops counting.

The timer control register (tcr) can override normal timer operations. The timer reload bit, trb, causes both counters to pre-load, while the timer stop bit, tss, causes both counters to stop.

The two general purpose 2-wire UARTs are asynchronous mode, full duplex, double buffered with 8 bytes FIFO UARTs that operate at up to 28.8 kbps. They transmit/receive 1 start bit, 7 or 8 data bits, optional parity, and 1 or 2 stop bits.

The UARTs are fully accessible to the API and can generate interrupts when data is received or the transmit buffer is empty. The ARM also has access to a status register for each UART that contains flags for such errors as data overrun and framing errors.

The IR/RF remote control interface is a means of transmitting user commands to the set top box. This interface consists of a custom hardware receiver implementing a bit frame-based communication protocol. A single bit frame represents a user command.

The bit frame is defined in three possible lengths of 12, 15 or 20 bits. The on/off values of the bits in the frame are represented by two different length pulse widths. A 'one' is represented by a pulse width of 1.2 ms and a 'zero' is represented by a 0.6 ms pulse width. The example in FIG. 20 shows the IR input bitstream. The bitstream is assumed to be free of any carrier (36–48 KHz typical) and represents a purely digital bitstream in return-to-zero format. The hardware portion of this interface is responsible for determining the bit value along with capturing the bit stream and placing the captured value into a read register for the software interface to access. Each value placed in the read register will generate an interrupt request.

Each user command is transmitted as a single bit frame and each frame is transmitted a minimum of three times. The hardware interface is responsible for recognizing frames and filtering out unwanted frames. For a bit frame to be recognized by the hardware interface it must pass the following steps: first it must match the expected frame size, 12, 15 or 20 bits; then two of the minimum three frames received must match in value. A frame match when detected by the hardware interface will generate only one interrupt request.

The IR/RF protocol has one receive interrupt, but it is generated to indicate two different conditions. The two different conditions are start and finish of a user command. The first type of receive interrupt (start) is generated when the hardware interface detects a new frame (remember 2 out of three frames must match). The second type of interrupt is generated when there has been no signal detected for the length of a hardware time out period (user command time out). Each frame, when transmitted, is considered to be continuous or repeated. So although there is a three frame minimum for a user command the protocol is that when a start interrupt is received the interface will assume that until a finish (time out) interrupt is generated the same frame is being received.

A typical example of the receive sequence is to assume that the interface has been dormant and the hardware interface detects a signal that is recognized as a frame. This is considered the start of a user command, and a start interrupt is issued by the hardware interface. The finish of a user command is considered to be when there has not been a signal detected by the hardware interface for a time out period of approximately 100 ms. The finish will be indicated by an interrupt from the hardware interface.

During a receive sequence it is possible to receive several start interrupts before receiving a finish interrupt. Several start interrupts maybe caused by the user entering several commands before the time out period has expired. Each of these commands entered by the user would be a different command. A new user command can be accepted before the previous command time out.

The IR, SIRCSI, and RF inputs share common decoding logic. FIG. 21 shows a theoretical model of the hardware interface. There are three possible inputs, SIRCSI, IR and RF, and one output, SIRCSO. The IR receiver receives its input from the remote control transmitter while the SIRCSI receives its input from another device's SIRCSO. Again, examining FIG. 21 shows that normal operation will have the IR connected to the SIRCSO and the decoder. The SIRCSI signal has priority over the IR and will override any IR signal in progress. If a SIRCSI signal is detected, the hardware interface will switch the input stream from IR to SIRCSI and the SIRCSI will be routed to the decoder and the SIRCSO.

There are two possible inputs for the IR frame type and one input for the RF frame type. A selection must be made by the user if the received frame type is going to be IR or RF. The IR/RF interface contains two 32-bit data registers, one for received data (IRRF Data Decode register) and one for data to be written out (IRRF Encode Data register). In both registers, bits 31–20 are not used and are set to 0.

The circuit 200 has two general purpose I/O pins (IO1 and IO2) which are user configurable. Each I/O port has its own 32-bit control/status register, iocsr1 or iocsr2.

If an I/O is configured as an input and the delta interrupt mask is cleared, an ARM interrupt is generated whenever an input changes state. If the delta interrupt mask is set, interrupts to the ARM are disabled. If no other device drives the I/O pin while it is configured as an input, it will be held high by an internal pull-up resistor.

If an I/O is configured as an output (by setting the cio bit in the corresponding control/status register), the value contained in the io_out bit of the control/status register is output. Interrupt generation is disabled when an I/O is configured as an output.

The definition of the control/status registers is given in Table 24.

TABLE 24

I/O Control/Status Registers

| Bit Number | Name | Description |
| --- | --- | --- |
| 31-4 | Reserved | Set to 0 (read only) |
| 3 | io_in | input sample value (read only) |
| 2 | dim | delta interrupt mask:<br>0 = generate interrupts<br>1 = mask interrupts |
| 1 | cio | configure i/o:<br>0 = input<br>1 = output |
| 0 | io_out | output value if cio is 1 |

TABLE 24-continued

I/O Control/Status Registers

The circuit 200 includes an I$^2$C serial bus interface that can act as either a master or slave. (Master mode is the default). In master mode, the circuit 200 initiates and terminates transfers and generates clock signals.

To put the device in slave mode, the ARM must write to a control register in the block. The API must set the slave mode select and a 7-bit address for the circuit 200. It must also send a software reset to the I2C to complete the transition to slave mode.

In slave mode, when the programmable address bits match the applied address, the circuit 200 will respond accordingly. The circuit 200 will also respond to general call commands issued to address 0 (the general call address) that change the programmable part of the slave address. These commands are 0x04 and 0x06. No other general call commands will be acknowledged, and no action will be taken.

The circuitry is presently preferably packaged in a 240 pin PQFP. Table 25 is a list of pin signal names and their descriptions. Other pin outs may be employed to simplify the design of emulation, simulation, and/or software debugging platforms employing this circuitry.

TABLE 25

List of Signal Pins and Their Descriptions

| Signal Name | # | I/O | Description |
| --- | --- | --- | --- |
| Transport Parser | | | |
| DATAIN[7:0]* | 8 | I | Data Input. Bit 7 is the first bit in the transport stream |
| DCLK* | 1 | I | Data Clock. The maximum frequency is 7.5 MHz. |
| PACCLK* | 1 | I | Packet Clock. Indicates valid packet data on DATAIN. |
| BYTE_STRT* | 1 | I | Byte Start. Indicates the first byte of a transport packet for DVB. Tied low for DSS. |
| DERROR* | 1 | I | Data Error, active high. Indicates an error in the input data. Tie low if not used. |
| CLK27* | 1 | I | 27 MHz Clock input from an external VCXO. |
| VCXO_CTRL* | 1 | O | VCXO Control. Digital pulse output for external VCXO. |
| CLK_SEL | 1 | I | Clock select. CLK_SEL low selects a 27 MHz input clock. When high, selects an 81 MHz input clock. |
| Communications Processor | | | |
| IR* | 1 | I | Infra-Red sensor input |
| RF* | 1 | I | RF sensor input |
| SIRCSI* | 1 | I | SIRCS control input |
| SIRCSO* | 1 | O | SIRCS control output |
| UARTDI1* | 1 | I | UART Data Input, port 1 |
| UARTDO1* | 1 | O | UART Data Output, port 1 |
| UARTDI2* | 1 | I | UART Data Input, port 2 |
| UARTDO2* | 1 | O | UART Data Output, port 2 |
| PDATA | 8 | I/O | 1394 Interface Data Bus |
| PWRITE | 1 | O | 1394 Interface Write Signal |
| PREAD | 1 | O | 1394 Interface Read Signal |

TABLE 25-continued

List of Signal Pins and Their Descriptions

| Signal Name | # | I/O | Description |
|---|---|---|---|
| PPACEN | 1 | I/O | 1394 Interface Packet Data Enable |
| PREADREQ | 1 | I | 1394 Interface Read Data Request |
| PERROR | 1 | I/O | 1394 Interface Error Flag |
| IIC_SDA* | 1 | I/O | I²C Interface Serial Data |
| IIC_SCL* | 1 | I/O | I²C Interface Serial Clock |
| IO1* | 1 | I/O | General Purpose I/O |
| IO2* | 1 | I/O | General Purpose I/O |
| Extension Bus | | | |
| EXTR/W | 1 | O | Extension Bus Read/Write. Selects read when high, write when low. |
| EXTWAIT | 1 | I | Extension Bus Wait Request, active low, open drain |
| EXTADDR[24:0] | 25 | O | Extension Address bus: byte address |
| EXTDATA[15:0] | 16 | I/O | Extension Data bus |
| EXTINT[2:0] | 3 | I | External Interrupt requests (three) |
| EXTACK[2:0] | 3 | O | External Interrupt acknowledges (three) |
| CLK40 | 1 | O | 40.5 MHz Clock output for extension bus and 1394 interface |
| CS1 | 1 | O | Chip Select 1. Selects EEPROM, 32M byte maximum size. |
| CS2 | 1 | O | Chip Select 2. Selects external DRAM. |
| CS3 | 1 | O | Chip Select 3. Selects the modem. |
| CS4 | 1 | O | Chip Select 4. Selects the front panel. |
| CS5 | 1 | O | Chip Select 5. Selects front end control. |
| CS6 | 1 | O | Chip Select 6. Selects the 1394 interface. |
| CS7 | 1 | O | Chip Select 7. Selects the parallel data port. |
| RAS | 1 | O | DRAM Row Address Strobe |
| UCAS | 1 | O | DRAM Column address strobe for upper byte |
| LCAS | 1 | O | DRAM Column address strobe for lower byte |
| SMIO | 1 | I/O | Smart Card Input/Output |
| SMCLK | 1 | O | Smart Card Output Clock |
| SMCLK2 | 1 | I | Smart Card Input Clock, 36.8 MHz |
| SMDETECT | 1 | I | Smart Card Detect, active low |
| SMRST | 1 | O | Smart Card Reset |
| SMVPPEN | 1 | O | Smart Card Vpp enable |
| SMVCCDETECT* | 1 | I | Smart Card Vcc detect. Signals whether the Smart Card Vcc is on. |
| SMVCCEN | 1 | O | Smart Card Vcc enable |
| Audio Interface | | | |
| AUD_PLLI* | 1 | I | Input Clock for Audio PLL |
| AUD_PLLO | 1 | O | Control Voltage for external filter of Audio PLL |
| PCM_SRC | 1 | I | PCM Clock Source Select. Indicates whether the PCM clock is input to or generated by the circuit. |
| PCMDATA* | 1 | O | PCM Data audio output. |
| LRCLK* | 1 | O | Left/Right Clock for output PCM audio data. |
| PCMCLK* | 1 | I or O | PCM Clock. |
| ASCLK* | 1 | O | Audio Serial Data Clock |
| SPDIF* | 1 | O | SPDIF audio output |
| Digital Video Interface | | | |
| YCOUT[7:0] | 8 | O | 4:2:2 or 4:4:4 digital video output |
| YCCLK | 1 | O | 27 or 40.5 MHz digital video output clock |
| YCCTRL[1:0] | 2 | O | Digital video output control signal |
| NTSC/PAL Encoder Interface | | | |
| NTSC/PAL | 1 | I | NTSC/PAL select. Selects NTSC output when high, PAL output when low. |
| SYNCSEL | 1 | I | Sync signal select. When low, selects internal sync generation. When high, VSYNC and HSYNC are inputs. |
| VSYNC | 1 | I or O | Vertical synchronization signal |
| HSYNC | 1 | I or O | Horizontal synchronization signal |
| YOUT | 1 | O | Y signal Output |
| BIASY | 1 | I | Y D/A Bias-capacitor terminal |
| COUT | 1 | O | C signal Output |
| BIASC | 1 | I | C D/A Bias-capacitor terminal |
| COMPOUT | 1 | O | Composite signal Output |

TABLE 25-continued

List of Signal Pins and Their Descriptions

| Signal Name | # | I/O | Description |
| --- | --- | --- | --- |
| BIASCOMP | 1 | I | Composite Bias-capacitor terminal |
| IREF | 1 | I | Reference-current input |
| COMP | 1 | I | Compensation-capacitor terminal |
| VREF | 1 | I | Voltage reference |
| SDRAM Interface | | | |
| SDATA[15:0] | 16 | I/O | SDRAM Data bus. |
| SADDR[11:0] | 12 | O | SDRAM Address bus. |
| SRAS | 1 | O | SDRAM Row Address Strobe |
| SCAS | 1 | O | SDRAM Column Address Strobe |
| SWE | 1 | O | SDRAM Write Enable |
| SDOMU | 1 | O | SDRAM Data Mask Enable, Upper byte. |
| SDOML | 1 | O | SDRAM Data Mask Enable, Lower byte. |
| SCLK | 1 | O | SDRAM Clock |
| SCKE | 1 | O | SDRAM Clock Enable |
| SCS1 | 1 | O | SDRAM Chip Select 1 |
| SCS2 | 1 | O | SDRAM Chip Select 2 |
| Device Control: | | | |
| RESET* | 1 | I | Reset, active low |
| TDI* | 1 | I | JTAG Data Input. Can be tied high or left floating. |
| TCK* | 1 | I | JTAG Clock. Must be tied low for normal operation. |
| TMS* | 1 | I | JTAG Test Mode Select Can be tied high or left floating. |
| TRST* | 1 | I | JTAG Test Reset, active low. Must be tied low or connected to RESET for normal operations. |
| TDO* | 1 | O | JTAG Data Output |
| Reserved | 3 | | Reserved for Test |
| VCC / GND | 10 | | Analog supply |
| VCC / GND | 44 | | Digital supply |

*indicates a 5 volt tolerant pin

Circuit 200's initialization is a three step process from a software perspective:
Power-on-reset (POR) of the on-chip hardware modules
Firmware controlled initialization
API controlled initialization The sequencing of the above actions is determined by the POR sequence. The ARM software will not start execution until all the on-chip hardware resets are completed. This eliminates the need for firmware checking of POR status in each module.
Power ON Reset (POR)

At Power On Reset the ARM will branch automatically to the POR routine from the jump vector at ROM address 0x00000000. The ARM at reset is in supervisor mode and has the ability to reach all supervisor resources. The POR section will consist of four sub modules:
Diagnostics
'C' Environment
Processor Environment Setup/Initialization
Kernel Setup At the conclusion of POR the logic will branch to the User/OS for continued operation until firmware event processing takes place.
Initialization The on chip firmware is responsible for initializing the FIQ mode stack. The SUPERVISOR, IRQ, ABORT, UNDEFINED and USER stacks must be initialized by the user application. At reset the initialization module will assume the ARM is in Supervisor mode. The initialization module will immediately switch to FIQ mode and not use any Supervisor mode resources. Both the FIQ and IRQ arm enable bits will be set in the CPSR to prevent any further interrupts.

Until the reason for the reset is determined, the initialization module will assume that a warm start had been issued. The OS application may have branched to the Reset vector intentionally. The IRQ and FIQ interrupts will be masked and the processor state will be assumed unknown.

Because the architecture enables nested FIQs, a context save area is established and initialized to allow the FIQ handler to save off the context of each successive FIQ. This area is reserved as a part of the normal FIQ stack area.

Defined within each FIQ ISR task will be a function responsible for hardware and system initialization for that ISR, at reset time this task will be executed by the system Initialization module.

The Initialization module will call tasks for the following after the C environment is initialized:

| | |
| --- | --- |
| TPP | Transport Packet Parser |
| CAM | CAM Conditional Access |
| Video | MPEG Video |
| AUDIO | MPEG Audio |
| TC | Traffic Controller |
| Kernel | FIQ Handler and Dispatcher |

These initializations are accomplished "pre-data" to avoid pipeline delays once live data is present. The error code is a result that indicates a pass-fail status back to the initialization module. Each initialization routine will assume the ARM is in ARM state and FIQ mode. The stack will be the FIQ stack.
C Environment The initialization module will initialize all memory required for the on-chip firmware. This consist of:

RAM area initialization
ROM pointers and data initialization
Diagnostics

At Reset the initialization module will check for the presence of and size of external RAM and SDRAM. A memory test will be executed to assure integrity of the external memory.
Warm/Cold Start If a module receives an initialization call, the module will assume a restart is in place. This will force each module to reprogram the corresponding hardware to a known idle state. This action will be assumed regardless of previous User API programming.
Initialize FIQ Interrupt Logic At reset, the FIQ interrupt logic is in an undetermined state. Initially, the FIQ handler will reprogram all interrupt sources as unmasked to enable all modules to interrupt with all logical interrupts at equal priority. Each interrupt will be reset to unpend any that may have occurred before a warm reset.

The FIQ context save area will be initialized along with the SRAM based vector table. This vector table allows dynamic modification of the FIQ ISR entry points. All FIQ handlers will have a defined set of initialization code pointers, as a default, loaded into the vector table to allow reinitialization of the handler. The ISR will then be responsible for reloading the appropriate state that follows initialization into the vector table if required.

The FIQ handler will then enable FIQ interrupts via the F bit in the ARM CPSR.
Initialization Completion At completion of the initialization module, the state of the ARM firmware will be in IDLE. All FIQs will be enabled waiting on non-data FIQs for status information exchange or stream data FIQs after the User application enables the appropriate SCIDs.
System Memory Layout The logical address space for the circuit 200 is generally defined in five areas:

The system memory defined for usage with the firmware is 4.5 Kbytes of SRAM, organized in two blocks, and 12 Kbytes of ROM. This SRAM is fully accessible by the ARM processor via the TC and has the highest TC priority level. The consequence of that is that any other TC function is delayed by the ARM access.
Firmware Kernel The "Kernel" is the core module of the circuit 200 firmware system. It resides on chip and controls the flow of all FIQ-driven routines.

The purpose of for the Kernel is to control FIQ hardware vectors as well as the ARM Reset processor exception and initial processing of the ABORT exception vector. Rather than have a Kernel that has firmware based scheduling, pre-empting, and dispatching, a hardware and firmware driven Programmable Interrupt Controller (PIC) based design will be used. All dispatching of run-time firmware tasks will be initiated by a FIQ. Some of these FIQs will be generated by hardware devices and some by firmware. The FIQ is exclusively owned by the on-chip firmware and no other device, application software or module.

Each ISR is attached to a hardware device in functionality. Because of the asynchronous nature of the circuit 200, each ISR must have a priority assigned to it. This priority is a result of the design and architecture of the system and not from a run time decision. At run time it is simply a matter of deciding what new FIQs are capable of interrupting a current FIQ in progress, and completing the necessary systems housekeeping to allow that interruption. The purpose of this housekeeping is programming the PIC Mask Register to enable/disable the appropriate FIQs.

The masks on the PIC become the priority scheduler for all FIQ generated requests. Each ISR will know its relative priority in the system and mask the PIC to allow other FIQs that are appropriate. The PIC hardware will present all active FIQs in the interrupt register. The firmware will interpret the generated FIQ and determine which of the FIQs should be processed. The FIQs will remain active until reset by writing to the PIC register, which serves as a reset/ack of that FIQ. In general, if two FIQs are outstanding at the same time, the FIQ with the lowest number assigned physically, will be processed. The priority of these FIQs go from 0->n with 0 the highest priority and n the lowest. The numbers are assigned based on their connection point to the PIQ, but can be logically reassigned in priority.

All of the Kernel execution is based on FIQs. There are no timer-based or other methods of scheduling tasks or execution of code.
Exception Handling The ARM processor handles interruptions to normal program flow through exception vectors. When an event occurs that requires exception processing, the ARM will branch to one of these exception vectors. At these vector locations exist branches to routines that will process the exception and then return to normal program flow. Each exception has a priority associated with it for arbitration purposes and a particular mode the ARM enters upon execution of the exception.

TABLE 26

Exception Vectors

| Exception Vector Address | Priority | Mode | Vector description |
|---|---|---|---|
| 0x00000000 | 1=HIGH | svc | Reset, this vector points to the boot loader and system initialization code |
| 0x00000004 | 6=LOW | undefined | Undefined instruction |
| 0x00000008 | 6 | svc | Software interrupt |
| 0x0000000C | 5 | abort | Abort (prefetch) |
| 0x00000010 | 2 | abort | Abort (data) |
| 0x00000014 | n/a | n/a | Reserved |
| 0x00000018 | 4 | irq | IRQ, this vector points to the IRQ handler |
| 0x0000001C | 3 | fiq | FIQ, this location is the entry point to the FIQ handler |

The Kernel will handle three exceptions directly. FIQs will be owned and processed totally by the Kernel. Reset will be handled initially by the Kernel with control passed to a user vector table via branch after firmware reset. Abort (data) will be preprocessed by the on-chip firmware to determine the type of abort. If it was a traffic controller SDRAM access abort, the on-chip firmware will handle the exception. If it was a true data abort, the firmware abort handler will vector off to the user abort exception vector. All other exceptions will pass directly to the user application via the same vector table. The base vector table address will be located at the memory mapped base location for the user application space as illustrated in Table 26.
Reset This exception vector is normally used as the Power On Reset (POR) or user reset via the reset pin, or for a warm start the circuit 200 via a soft reset. Control of the soft reset will be in the USER domain. This soft reset will be accomplished by branching to the Reset Vector in Kernel defined space. After execution of the firmware reset code, execution will then proceed to the reset vector defined in the user vector table.

Undefined Instruction

This exceptions is generated by the ARM if the currently executed instruction is not recognized by the ARM. This error can be caused if a mistake is make in transitioning from THUMB→ARM state or from ARM→THUMB state. It could also be caused by code being overwritten in a RAM based code fetch.

If this exception occurs, the Kernel will allow the exception to branch directly to the User application via the user vector table.

Software Interrupts (SWI's)

ARM SWI's are general purpose exceptions generated by the API for interprocessor communications. The firmware will not use or generate SWI's. The SWI's are owned by the API, but the firmware will handle the initial SWI vector.

If this exception occurs, the Kernel will allow the exception to branch directly to the User application via the user vector table.

Prefetch Aborts

This exceptions is generated by the ARM if an attempt is made to execute an instruction that has been prefetched from an illegal address. It could be caused by code being overwritten in a RAM based code fetch causing an erroneous value or an actual MMU fault based on program logic. In this design, memory protection violations will generate this exception. Any access by the USER application outside of the range programmed by the USER OS will cause this exception. See Memory Protection for the detailed description of Memory Protection.

If this exception occurs, the Kernel will allow the exception to branch directly to the User/OS application via the user vector table.

Data Aborts

This exception is generated by the ARM if an attempt is made to transfer data to or from an illegal address, or if ARM access to the SDRAM is temporarily held off by the traffic controller. It could be caused by code being overwritten or an actual MMU fault based on program logic.

In this design, memory protection violations will generate this exception. Any access by the USER application outside of the range programmed by the USER OS will cause this exception. See Memory Protection for the detailed description of Memory Protection.

If this exception occurs as a result of the above violation, the Kernel will allow the exception to branch directly to the User/OS application via the user vector table. If the exception occurs as a result of an access hold-off to the SDRAM by the traffic controller, the firmware will completely process the exception and not vector to user space.

IRQ

Under normal circumstances, the IRQ logic is under direct control of the User software. To expedite transferring of data from the firmware to the User software, the firmware will have the ability to generate IRQs as if from a hardware device.

During firmware FIQ task time, IRQs will be masked with the IRQ disable bit in the CPSR. This is necessary to prevent masking the IRQ PIC at FIQ exception time. Using the CPSR instead of having the hardware mask the IRQs prevents the FIQ handler from having to manage the context of the IRQ PIC. Upon return from the FIQ, the CPSR will be restored to the original IRQ disable status.

The firmware will appear as a hardware device to the IRQ handler in USER space. To communicate with the USER app, the firmware will generate an IRQ by writing the corresponding IRQ output bit in the IRQ FW register.

If an IRQ exception occurs, the Kernel will allow the exception to branch directly to the User application via the user vector table.

The table below describes the IRQ inputs. Those inputs identified as firmware are generated by the on chip firmware simulating a hardware device if needed. Each firmware IRQ has an associated structure element to further define data passing upon execution of these IRQs. Those IRQs that do not specify Firmware are actual hardware inputs.

To support the demands of the design, the OS will need hardware capable of supporting 32 IRQs. The hardware as pictured in Error! Reference source not found. has four registers visible (Table 29: FIQ Interrupt Map) to the Firmware used for programming and reading the active interrupt.

TABLE 27

IRQ Interrupt Map

| Register | Action |
| --- | --- |
| Base + 00 IRQ Interrupt Register | RO IRQ Source |
| + 04 IRQ Interrupt Mask Register | RW 1 = Mask 0 = Unmask |
| + 08 Reset Interrupt Register | RW 1 = Reset 0 = No Action |
| + 0C Set Interrupt Register | RW 1 = Set 0 = No Action (Firmware Access Only) |

After an interrupt is generated and processed, the IRQ handler will reset the interrupt by writing a '1' to the corresponding bit to the IRQ Interupt Reset logic.

To generate IRQs from the firmware or OS, the firmware or OS may write to the IRQ Interrupt Set logic. Writing a 1 to the corresponding bit in the IRQ Interrupt Set register will generate a IRQ for that position in the next cycle.

TABLE 28

IRQ PIC Input Definitions

| IRQ Input | Description |
| --- | --- |
| 1 | Timer 0 |
| 3 | Smart Card |
| 5 | Timer 1 |
| 7 | VBLANK Begin |
| 9 | VBLANK End |
| B | I²C |
| D | IR/RF D |
| F | IR/RF E |
| 11 | UART 0 |
| 13 | UART 1 |
| 15 | General Purpose I/O 0 |
| 17 | General Purpose I/O 1 |
| 19 | Extension Bus 0 |
| 1B | Extension Bus 1 |
| 1D | Extension Bus 2 |

Table 29 lists those interrupts that are defined. Software generated interrupts can be generated in any of the interrupt register bits. This allows the Operating System to generate simulated hardware interrupts in those bit positions that are physically connected to hardware devices.

FIQ

All hardware on the circuit 200 notifies the firmware of a need for processing or intervention via an FIQ interrupt to the ARM. Since the ARM supports a single FIQ, they are virtualized using the hardware pictured in Error! Reference source not found.

Each hardware device expects "real-time" processing of their respective FIQs. Because of this, the FIQ Handler (FIQH) will trap the FIQ, identify it, and make a data processing decision. The FIQH will then process the appropriate ISR.

Besides hardware generated FIQs, the Kernel will also process firmware generated FIQs. Firmware FIQs are necessary for algorithms that need real time posting or processing of events, or to delay processing of a process. It is expected that the OSD module will be the leading user of this feature.

Hardware support

To support the demands of the design, the Kernel firmware has a PIC capable of supporting 32 FIQs. The PIC has four registers visible (Table 29: FIQ Interrupt Map) to the Firmware used for programming and reading the active interrupt.

TABLE 29

FIQ Interrupt Map

| Register | | Action |
|---|---|---|
| Base + 00 | FIQ Interrupt Register | RO FIQ Source |
| + 04 | FIQ Interrupt Mask Register | RW 1 = Mask 0 = Unmask |
| + 08 | Reset Interrupt Register | RW 1 = Reset 0 = No Action |
| + 0C | Set Interrupt Register | RW 1 = Set 0 = No Action |

Table 30 describes a memory mapped 32 bit R/W register. This register represents the bit mapped position of the FIQ capable interrupts.

TABLE 30

FIQ Interrupt Register (FIQIR)

| FIQ/PIC Interrupt Vector | Description |
|---|---|
| 0 | Firmware |
| 1 | SCR Counter Overflow |
| 2 | Continuity Count (CC) Error Interrupt |
| 3 | Packet Count (PC) Interrupt |
| 4 | FEC Error Interrupt |
| 5 | End of Packet (EOP) Interrupt |
| 6 | Firmware |
| 7 | Video Decoder Interrupt |
| 8 | Firmware |
| 9 | Reserved |
| A | Reserved |
| B | Reserved |
| C | Reserved |
| D | Reserved |
| E | Reserved |
| F | Reserved |
| 10 | Reserved |
| 11 | Reserved |
| 12 | Reserved |
| 13 | Reserved |
| 14 | Firmware |
| 15 | Reserved |

After an interrupt is generated and processed, the firmware will reset the interrupt by writing a '1' to the corresponding bit in the FIQ Interrupt Reset register.

To generate FIQs from the firmware, the firmware may write to the FIQ Interrupt Set register. Writing a 1 to the corresponding bit in the FIQ Interrupt Set register will generate a FIQ for that position in the next cycle.

When an otherwise active FIQ is unmasked it will generate a FIQ. An interrupt line may be masked and unmasked several times. It will remain active until serviced by the firmware due to its priority.

In the case of a tie for multiple incoming unmasked FIQs, the firmware logic will use the lowest numbered FIQ as the highest priority. If a higher priority unmasked interrupt again comes in before the previous lower FIQ is serviced, then the lower priority FIQ will again be held off.

It is important to note this has the potential for lower priority FIQs to never be serviced.

All register manipulations in the PIC must be atomic in nature. Once a read/modify/write sequence begins on a PIC register, the associated hardware or firmware must not update that register until after completion of the modification cycle.

Also note the interleaving of hardware and firmware FIQs. This will further enable the firmware to manage FIQ priorities by setting a firmware generated FIQ as a higher priority than hardware.

To manage these firmware priorities, the firmware will maintain an internal table in RAM of vector addresses for those firmware based FIQs. This will allow run-time manipulation of ISR priorities. Each firmware FIQ can be placed in the vector position associated with the priority of that vector as viewed by the PIC.

This will also allow dynamic modification of routines that are executed. An example of this would be pointing to initialization routines at startup and modifying the vectors to point at main code of the associated FIQ after startup.

TABLE 31

Firmware FIQ Vector Table

| Address/WORD Offset | Description |
|---|---|
| +00 | Firmware |
| +01 | SCR Counter Overflow |
| +02 | Continuity Count (CC) Error Interrupt |
| +03 | Packet Count (PC) Interrupt |
| +04 | FEC Error Interrupt |
| +05 | End of Packet (EOP) Interrupt |
| +06 | Firmware |
| +07 | Video Decoder Interrupt |
| +08 | Firmware |
| +09 | Reserved |
| +0A | Reserved |
| +0B | Reserved |
| +0C | Reserved |
| +0D | Reserved |
| +0E | Reserved |
| +0F | Reserved |
| +10 | Reserved |
| +11 | Reserved |
| +12 | Reserved |
| +13 | Reserved |
| +14 | Firmware |
| +15 | Reserved |

FIQ Handler

The FIQ handler (FIQH) is the actual ISR routine for all ARM FIQs. It is the responsibility of the FIQH to accept the FIQ vector branch, decide the proper pseudo ISR routine to execute, enter the proper ARM mode and branch to the ISR. At the completion of the ISR it will logically return to the FIQH which will then return to the USER API interrupted program flow. Note the "logical return" to the FIQH. It is anticipated that proper stack management will allow a direct return to the interrupted program flow.

FIQ ISR

The firmware FIQ ISR will perform the necessary setup to save the present context it will destroy. It will then program the IRM register to allow interrupts of a higher priority FIQs. It will then process the logic necessary to execute its intended function. At completion it will restore the context saved and branch as a normal return.

IRQ/FIQ Interface

The following routines specify the interface to the IRQs and FIQs.

irqInit( )

Syntax

FERROR ferror=irqInit(void);

where:

no parameters

Returns fError=0, No Errors

Mode

Supervisor Privileged (Access Bit Enabled)

ARM 16 (THUMB)

Description

This function initializes the irq handler and resource table to defaults. This function is written in assembler and may be called from 'C'.

This function must be called before any irqs are asserted in the system if the T.I. supplied irq handler is implemented.

Example

FERROR ferror;

ferror=irqInit( );

See Also irqHandler( )

irqHook( )

irqHandler( )

Syntax irqHandler(void);

where:

no parameters

Returns fError=0, No Errors

Mode

IRQ (Interrupt Handler)

ARM 16 (THUMB)

Description

This function when installed, will dispatch the function ISRs based on the ARM IRQ.

Using the function irqHook( ), function addresses may be programmed into the IRQ vector table. When an IRQ occurs, irqHandler will dispatch the appropriate ISR based on the IRQ_STATUS_REG. This register has predefined hardware devices from bit 0–1F. This function uses the bit offset of 0–1F to dispatch the associated function from the IRQ vector table.

The dispatched function executes in IRQ mode. The stack is assumed and all registers are saved before entry to the dispatched function. IRQs are disabled and the IRQ mask register is saved. The dispatched function is NOT declared with the INTERRUPT type but as a normal function. It is up to the dispatched function to re-enable IRQs through the CPSR and reprogramming of the IRQ_MASK_REG if needed. The irqHandler will reset the cause of the IRQ and save/restore the IRQ_MASK_REG upon entry/exit of the dispatched function.

Note this handler allows re-entrant IRQs and handles the necessary housekeeping for this to occur.

The function irqInit should be called before this handler is allowed to run.

Example

This function is not callable, but should be vectored from USER_ROM_BASE+0x0c.

See Also irqHook( )

irqInit( )

irqHook( )

Syntax

FERROR ferror=irqHook(long irq_num, long addr)

where:

irq_num The number of the irq vector to be replaced addr The address of the routine to be vectored to.

Returns fError=0, No Errors

Mode

ARM 16 (THUMB)

Description

This function is used to install IRQ handlers. Based on the input parameter 'irq_num'. The associated address vector in 'addr' will be programmed into the IRQ vector table. 'irq_num' is valid from 0 to the maximum number of IRQs.

The dispatched function executes in IRQ mode. The stack is assumed and all registers are saved before entry to the dispatched function. IRQs are disabled and the IRQ mask register is saved. The dispatched function is NOT declared with the INTERRUPT type but as a normal function. It is up to the dispatched function to re-enable IRQs through the CPSR and reprogramming of the IRQ_MASK_REG if needed. The irqhandler will reset the cause of the IRQ and save/restore the IRQ_MASK_REG upon entry/exit of the dispatched function.

Note the irqHandler allows re-entrant IRQs and handles the necessary housekeeping for this to occur.

The function irqInit should be called before this handler is allowed to run.

See Also irqInit( )

fiqGen( )

Syntax fiqGen(ulong fiq);

where fiq Bit mapped long representing the fiqs to generate

Returns no return

Description fiqGen is used to generate software fiqs. It can also be used to simulate hardware fiqs by setting the bit in the word associated with that fiq input. Setting bit zero will generate the fiq that is assigned to bit zero. Multiple bits may be set at the same time. Note the fiq handler will process the bits from 0–31 in priority.

Example define fwFIQ06 (unsigned long)0x06 fiqGen(fwFIQ06);

See Also irqGen( )

irqGen( )

Syntax irqGen(ulong irq);

where irq Bit mapped long representing the irqs to generate

Returns no return

Description irqGen is used to generate software irqs. It can also be used to simulate hardware irqs by setting the bit in the word associated with that irq input. Setting bit zero will generate the irq that is assigned to bit zero. Multiple bits may be set at the same time. Note the irq handler will process the bits from 0–31 in priority.

Example

```
#define fwIRQ06 (unsigned long)0x06
irqGen(fwIRQ06);
```

See Also fiqGen( )

Memory Management/Protection

For memory protection purposes, the system memory map is divided into three areas of protection.

Memory protection level 1 can only write to level 1 data space.

Memory protection level 2 can write to level 1 and 2 data space.

Memory protection level 3 can write to level 1, 2 and 3 data space.

This memory protection is necessary to prevent user applications or OS functions to write directly into firmware data space corrupting the on chip hardware. A second level of protection is also provided to prevent the user application from writing into OS data space. A programmable register allows the user to define which part of the extension bus DRAM is OS protected.

The monitoring of data writes is managed by the traffic controller (TC), which checks that the write is in a valid range.

The OS software can temporarily assume the firmware level protection by manipulating the so-called "protection bit." This is supplied via a traffic controller hardware register and is only accessible from OS or firmware data.

Violations of the programmed memory ranges will cause the TC to assert the DATA ABORT ARM processor exception. This exception is handled by the previously defined section on data aborts.

RTSL/USER/OS to Firmware Communications

The RTSL (Run Time Support Library) is the top level name for all TI supplied libraries that support the circuit 200. The firmware has established through IRQs a way to manage passing run time data to the USER applications. Using the RTSL the USER application can communicate with the firmware.

The USER API will execute an RTSL function that uses the passed parameter to determine what on-chip function to perform. The passed parameter can be a function identifier that maps to a set of functions on chip or further embedded in the RTSL. All logical programming and status determination of on-chip hardware will be isolated from the USER/OS through this RTSL. This does not prohibit the User OS from accessing the hardware directly, using the protection bit whenever necessary.

The RTSL routines can access/share on-chip variables via the Common Reference Table (CRT). The CRT allows resolution of on-chip variables in the separate off-chip application software. There are two CRTs, one on-chip and one in the application software. The on-chip CRT pointer is located at a 0x20 offset from the on-chip ROM. The CRT pointer in the application software is located at a 0x20 offset from the user EPROM base. At start-up/reset, the respective software modules (on-chip firmware and off-chip application software) initialize their CRTs.

Common Reference Table

The on-chip firmware needs the ability to communicate with off chip functions, memory tables and processes. The off-chip RTSL or Run Time Support Library also needs the ability to make calls and/or manipulate data and pass parameters from the library to the on-chip functions. This communication needs to be standardized such that future releases of the chip or RTSL will not necessarily be dependent on each other. Also, this allows the code for each module, RTSL and on-chip firmware, to be built independently and not compiled,inked and loaded together.

To accomplish a common communication path between the two, a structure is defined with a known location on chip that will allow the process to communicate. This structure is defined and referred to as the CRT or Common Reference Table. Below is a list of the locations and features of each element of the CRT.

TABLE 32

CRTFW Common Reference Table (Firmware)

| CRT Address | Type | Entry description |
|---|---|---|
| +0x00000000 | ulong | Size of the table in bytes |
| +0x00000004 | ulong | Version of On-Chip Firmware |
| +0x00000008 | ulong * | Pointer to FIQ Vector Table |
| +0x0000000C | ulong * | Pointer to tcInit function |
| +0x00000010 | ulong * | Pointer to tppInit function |
| +0x00000014 | ulong * | Pointer to audInit function |
| +0x00000018 | ulong * | Pointer to vidInit function |
| +0x0000001C | ulong * | |

The table is referenced by a pointer hard coded at location 0x20. This location is one word address above the exceptions vectors and is a permanent location for this definition. The complete definition of the CRT is referenced in a common file called def.h. The structure typedef CRTFW defines the on-chip CRT and is updated as needed.

In addition to on-chip resources that need to be shared, the RTSL or User environment must make available certain data tables and functions for on-chip use. An example of this is the video decoder loader data table. This data is used entirely on chip, but due to size constraints is held off chip in the RTSL library. Because of these needs there is an associated off-chip CRT termed CRTOC for Common Reference Table Off Chip. A pointer to this table is expected at the base of user code +0x20 or 0x2000020. This table must be ROM'd. The values and pointers must be available before the user reset vector is executed. Some of the data will be referenced as the circuit 200 executes a hardware reset.

TABLE 33

CRTOC Common Reference Table (Application Software)

| CRTOC Address | Type | Entry description |
|---|---|---|
| +0x00000000 | ulong | Size of the table in bytes |
| +0x00000004 | ulong * | Pointer to video decoder microcode |

Transport Packet Parser

The Transport Packet Parser (TPP) in the circuit 200 processes the header of each packet and decides whether the packet should be discarded, further processed, or stored without intervention from software. Further processing on the packet is done by the TPP software module, which is activated by interrupt from the TPP hardware after the completion of the packet data transfer.

TPP Interface

The following routines specify the interface to the transport packet parser (TPP) related functionality.

tppInit( )

Syntax void tppInit(void);

Returns

This function returns no error code.

Description

The function initializes the Transport Packet Parser hardware. It will reinitialize all related tables, structures and hardware locations. This function should only be called if a total re-initialization of the hardware bitstream demultiplexer is required.
Example

```
#include "tpp.h"         /* include related definitions        */
#include "memory.h"      /* include hardware memory mapping */
main( )
{
   tppInit( );           /* initialize the TPP hardware        */
   . . .
}
```

Protection Level

This routine needs to run with protection ON, as it accesses the on-chip protected resources.
See Also
   tcInit( )

tppEnableScid( )

Syntax void tppEnableScid(uchar logical_channel, ushort scid, uchar flag, uchar device);

where:

```
logical_channel = logical channel to open for this SCID (0–31)
scid            = SCID to use for this logical channel to enable this
                  SCID
                  or SCID_DISABLE to disable this channel
flag            = OR'd value of several flag bits as follows:
                  CC_ENABLE or CC_DISABLE to enable or
                  disable CC error checking
                  SCR_CHAN if the SCR is to be taken from
                  this channel
device          = Virtual device to map this channel to as follows:
                  AUDIO = send this channel data to the on-chip
                  Audio decoder
                  VIDEO = send this channel data to the on-chip
                  Video decoder
                  HSDATA = send this channel data to the high speed
                  data port
                  NOMAP = no virtual device mapping for this
                  channel
```

Note: It is the responsibility of the application programmer to enable ONLY 1 channel as SCR_CHAN. To disable an existing SCR_CHAN, repeat the call to tppEnableScid without OR-ring SCR_CHAN in the flag Returns
   The function does not return an error code.
Description
   This function enables the demultiplexing of data from and the incoming DSS stream for the given SCID and enables the logical channel (0–31) for output. In case of virtual device mapping, the output will automatically be routed to the appropriate on-chip resource. The channel can be used for SCR extraction, if so indicated by the SCR_CHAN in the flag parameter.
   Checking of the Continuity Counter for the channel is enabled or disabled by resp. CC_ENABLE or CC_DISABLE in the flag parameter.
   To disable a channel, the SCID parameter passed needs to have the value SCID_DISABLE. The software will ignore all other parameters and disable the logical channel. All old channel parameters will be overwritten during the next tppEnableScid call for this same logical channel.
Example

```
#include "tpp.h"
main( )
{
   . . .
   /* Enable logical channel 4, SCID 420, enable CC error checking,  */
   /* make it the SCR channel and map it to the VIDEO device         */
   /* (routs to on-chip video decoder                                */
   tppEnableScid(4, 420, CC_ENABLE | SCR_CHAN, VIDEO);
   . . .
   tppEnableScid(4, 420, CC_DISABLE, VIDEO);  /* Disable CC check */
                                              /*and SCR acq.      */
   . . .
   tppEnableScid(4, SCID_DISABLE, 0 ,0);      /* disable logical channel 4 */
   . . .
}
```

Protection Level

This routine needs to run with protection ON, as it accesses the on-chip protected resources.

tppSetChannelOutl( )

Syntax void tppSetChannelOut(uchar logical_channel, uchar enable, ushort out, ushort decrypt);

where:

```
logical_channel = logical channel (0–31)
enable          = flag to indicate which and how many channels to
                  enable/disable as follows:
                  DISABLE_ONE_CHAN = disable only the given channel
                  ENABLE_ONE_CHAN = enable only the given channel
                  DISABLE_ALL_CHAN = disable all channels
                  ENABLE_ALL_CHAN = enable all channels
out             = Output direction of demultiplexed stream as follows:
                  OUTPUT_NONE =
                  no output from demultiplexer for this channel
                  OUTPUT_ON_CHIP =
                  output demultiplexed data to on-chip
                  resource
                  OUTPUT_DVCR = output demultiplexed data to DVCR
                  OUTPUT_ALL =
                  output demultiplexed data to on-chip and DVCR
decrypt         = Indicator which output to decrypt as follows:
                  DECRYPT_NONE = no decryption
                  DECRYPT_DVCR = decrypt output to DVCR only
                  DECRYPT_ON_CHIP =
```

| |
|---|
| decrypt output to on-chip resource only |
| DECRYPT_ALL = |
| decrypt output to both DVCR and on-chip |

Returns
 This function does not return and error code.
Description
 The function enables/disables and directs the output from the demultiplexer to the appropriate resource. It also allows the caller to specify which one of the output directions will be decrypted. If the input parameter specifies DISABLE_ALL_CHAN, the additional parameters are not considered anymore. In case ENABLE_ALL is specified, all logical channels (0–31) are enables with the given output and decryption characteristics as well as the decryption specified in the input parameters.
Example

```
#include "tpp.h"
main( )
{
    ...
    /* Enable the output of logical channel 4 to the DVCR and decrypt   */
    /*the stream                                                         */
    tppSetChannelOut(4, ENABLE_ONE_CHAN, OUTPUT_DVCR, DECRYPT_DVCR);
    ...
    /* Enable the output of channel 22 to the onchip resource AND       */
    /*DVCR and decrypt both                                              */
    tppSetChannelOut(22, ENABLE_ONE_CHAN, OUTPUT_ALL DECRYPT_ALL);
    ...
    /* Disable the outputs of all channels, the additional parameters   */
    /* (=0) are of no consequence                                        */
    tppSetChannelOut(0, DISABLE_ALL, 0 , 0);
}
```

Protection Level
 This routine needs to run with protection ON, as it accesses the on-chip protected resources.
tppGetData( )
Syntax void tppGetData(uchar logical_channel, uchar *buf, long size, uchar irq, Get_data_s *ret, uchar transfer_type, Filt_s *filter);

where:

| | |
|---|---|
| logical channel | = logical channel to use |
| *bufj | = pointer to the buffer, where the data is to be stored |
| size | = size of the data (in bytes) |
| irq | = IRQ to activate when the transfer is completed, or aborted |
| ret | = Get_data_s type structure used to return function result parameters |
| transfer_type | = Type of transfer to perform as follows: <br> BASIC = basic transfer; N bytes to *buf <br> CAP = CAP type transfer, transfer to free buffer in array of 128 byte buffers. *Buf points to 1-st buffer in the array. Transfer total of size bytes. <br> CWP = CWP type transfer, transfer to buffer in indexed array Index with logical channel, *buf points to start of array. Transfer is size bytes long. |
| filter | = structure of Filt_s type or NULL. If no filtering is required, this parameter should be NULL. If filtering is required, this parameter points to a Filt_s structure defined as follows: <br> typedef struct <br> { <br>    long filter;   /* filter mask to use */ <br>    uchar filt_type;   /* filter type */ <br> }Filt_s <br> filt_type contains the type of filter to use as follows: <br>    FILT_FIRST = Filter based on 32 bit 4 word algorithm <br>    FILT_ONE = Filter only the first word with 32 bit filter <br>    FILT_THREE=Apply complete 3 tier filter algorithm |

Returns
    The function does not return an error code.
Description
    The function transfers "size" bytes from the given logical channel stream to the destination buffer address as specified. The type of transfer determines the way the destination is calculated. In case of CAP the transfer always takes place in 127 byte increments to whatever free buffer is found in the CAP buffer array. The firmware will do the management of busy/free CAP-buffers.
    The irq parameter specifies the IRQ to activate when the transfer is completed or aborted. The reason for the IRQ as well as the buffer address (CAP) and/or the logical channel that caused the IRQ are all located in the "ret" structure. The format of the Get_data_s structure is as follows:

```
typedef struct
{
    uchar buf_index;     /* index into the buffer pool (CAP, CWP only) */
    uchar match_pos;     /* position of filter match                   */
    uchar logical_chan;  /* logical channel of report                  */
    uchar status;        /* call return status (ERR_GOOD or ERR_ABORT) */
}Get_data_s;
```

Filtering of the data is determined by the "filter" parameter. If no filtering is to be performed, the caller should pass a NULL. If filtering is to be done, the Filt_s structure needs to be loaded with the appropriate parameters as shown in "syntax".
Example

```
#include "tpp.h"
main( )
{
    static uchar buf[2000];
    Get_data_s return_parms = {0,0,0,0};
    Filt_s filter = {0x12345678, FILT_THREE};
    ...
    tppGetData(4,buf, 2000, 5, &return_parms,BASIC,&filter);
            /* get normal data with filter                       */
    ...
    tppGetData(4,buf, 2000, 5, &return_parms,BASIC,NULL);
            /* restart get 2000 bytes , but turn filter off      */
    ...
    tppGetData(5,buf, 2000, 5, &return_parms,CAP,&filter);
            /* get CAP data with filter                          */
    ...
    tppGetData(6,buf, 127, 5, &return_parms,CWP,NULL);
            /* get CWP data, no filter                           */
    ...
}
```

Protection Level
    This routine needs to run with protection ON, as it accesses the on-chip protected resources.
tppAbortGetData( )
Syntax
    void tppAbortGetData(uchar logical_channel);
where:

logical_channel=channel to use

Returns
    The function does not return an error code.
Description
    The function terminates any tppGetData request that is in progress on the given logical channel. Since the possibility exists that the transfer to be aborted is finishing while the application call is being made, the application program should be able to handle a tppGetData termination IRQ even after this tppAbortGetData call is completed. This is due to the asynchronous nature of the API and the firmware on-chip.
Example

```
#include "tpp.h"
main( )
{
    ...
    tppAbortGetData(4);    /* abort the get data request on */
    ...
                           /* logical channel 4             */
    ...
}
```

Protection Level
    This routine needs to run with protection ON, as it accesses the on-chip protected resources.
tppDeliverControlWord( )
Syntax void tppDeliverControlWord(uchar cw_index, uchar *cwp_buf);

where:

cw_buf_index=the index into the CW key buffer array (0–63)

cwp=pointer to the 8 byte decryption keyword to be compacted

Returns
    The function does not return an error code.
Description
    The function will compact the 8 byte CWP data from the cwp_buf locations into a 7 byte compacted Control word as follows:
    The resulting control word will be stored in the control word key table at the given index for the decryption engine to access at the appropriate time.
Example

```
#include "tpp.h"
main( )
{
    uchar buf[8] = {1,2,3,4,5,6,7,8};   /* uncompressed dontrol word */
    ...
    tppDeliverControlWord(23, bbuf);    /* compress control word into */
                                        /* key table [23]             */
}
```

Protection Level

This routine needs to run with protection ON, as it accesses the on-chip protected resources.

tppCwpAcqEnable( )

Syntax void tppCwpAcqEnable(uchar irq, uchar *buf, Cwp_s *parms,
        char enable);

where:

---

```
irq = IRQ to activate upon completion of the CWP acquisition
buf = pointer to buffer array to use for CWP storage (32 entries of 128 bytes each)
parms = structure that contains the bitmapped logical channels to enable/disable as follows:
    typedef struct
    {
        ulong odd_even;    /* bitmapped odd-even flag    */
        ulong logical_chan; /* bitmapped logical channels */
    }Cwp_s;
    The odd_even parameter is used by the firmware for tracking of odd/even channels
    The logical channel parameter services as logical channel (buffer index) return upon
    successful completion of CWP acquisition.
enable = flag to indicate ENABLE/DISABLE of CWP acquisition
```

---

Returns

The function does not return an error code.

Description

In case of ENABLE, the CWP acquisition will be enabled for those logical channels that are '1' in "map" for DIS-ABLE; the CWP acquisition will be disabled for those logical channels that are '1' in the map parameter. The process of ENABLE/DISABLE is accumulative; the logical channels that were previously enabled/disabled are not changed, unless specified in "map".

The acquisition of the CWP automatically selects the appropriate CWP buffer from the buffer pool pointed to with buf. CWP buffer management is done by the firmware. It will 'in-use' the buffer when the CWP is written into it, and 'free' it when the tppDeliverControlWord call is executed for that CWP buffer. When a CWP is acquired, but the buffer is "in-use", the CWP will be discarded. Otherwise, the CWP will be transferred to the appropriate CWP buffer and upon completion of the transfer, the IRQ will be activated that was specified in the irq passing parameter. The logical channel of which acquisition was completed is returned in the Cwp_s return structure logical_channel member.

When DISABLE is specified in the enable flag, irq, buf and parms are not used. The appropriate logical channel's CWP acquisition will be disabled, no response is generated to the caller.

Note: The Cwp_s ->logical_chan upon return is an lvalue, not bitmapped as it is upon call.

Example

```
#include "tpp.h"
main( )
{
    Cwp_s parms = {0,0x0E};
    ...
    tppEnableCwpAcq(5, buf, &parms, ENABLE);   /* enable CWP for         */
                                                /* logical channels 1,2,3 */
                                                /* use IRQ 5 upon completion */
    ...
    parms.logical_chan = 0x02;                  /* set only bit 1 to '1'  */
                                                /* (= log. Chan 1)        */
    tppEnableCwpAcq(0, 0, &parms, DISABLE);     /* disable CWP acq. For   */
                                                /* channels 2,3           */
                                                /* Note that chan 1 is    */
                                                /* still active CWP acq.  */
    ...
}
```

Protection Level

This routine needs to run with protection ON, as it accesses the on-chip protected resources.

tppCapAcqEnable( )

Syntax void tppCapAcqEnable(ulong map, uchar flag);

where:

map=bitmapped logical channel(s) to enable/disable flag=flag to indicate ENABLE/DISABLE this (these) logical channel(s)

Returns

The function does not return an error code.

Description

This function allows the caller to enable/disable CAP buffers in the CAP buffer pool. The function will set/reset the buf-free flag for the appropriate index.

Each logical channel that needs to be enables/disabled is represented by a '1' in the bitmap.

Example

```
#include "tpp.h"
main( )
{
    ...
    tppCapAcqEnable(0x0E,ENABLE);    /* Enable the CAP buffer for the   */
                                     /* indices 1,2,3                   */
    ...
    tppCapAcqEnable(0x04,DISABLE);   /* disable CAP buffer index 2      */
    ...
}
```

Protection Level
This routine needs to run with protection ON, as it accesses the on-chip protected resources.
vcrCommand( )
Syntax
void vcrCommand(char command);
where:

command=VCR control command(s) as described below

Returns
The function does not return any error code.
Description
The function can be used to control the digital VCR processing function on the chip. The command consists of the OR'd command functions as follows:

| | |
|---|---|
| VCR_ON or VCR_OFF | -- VCR ON or OFF |
| VCR_PLAY or VCR_RECORD | -- VCR PLAY or RECORD |
| VCR_FULL_PACK or VCR_PAYL_ONLY | -- Process FULL packet or PAYLOAD only |

VCR_PLAY/RECORD and VCR_FULL_PACK/PAYL_ONLY functions are only changed when either the VCR_ON function is included in the command or the VCR_ON command was executed in a previous vcrCommand call (see example).

Notes: When the command contains the VCR_OFF function, all other OR'd functions will be ignored, thus vcrCommand(VCR_OFF|VCR_RECORD|VCR_PAYL_ONLY) will NOT change the settings of the PLAY/RECORD or the FULL/PAYLOAD ONLY functions on the chip.

Example

```
#include "vcr.h"                                              /* include vcr definitions  */
main( )
{
    ...
    vcrCommand(VCR_ON | VCR_PLAY | VCR_FULL_PACK);            /* play, process           */
                                                              /* full packets            */
    ...
    ...
    vcrCommand(VCR_RECORD | VCR_PAYL_ONLY);                   /* record payload only     */
    ...
    vcrCommand(VCR_OFF);                                      /* turn the VCR OFF        */
    ...
    vcrCommand(VCR_PLAY,VCR_FULL_PACK);                       /* no function, VCR is OFF */
    ...
}
```

Protection Level
This routine needs to run with protection ON, as it accesses the on-chip protected resources.
Infrared Control and RF Control
Initialization
At power-up there is required initialization by the application software. The application software will have to perform one step to initialize the interface. The user should call the irrfInitIntrfc routine to initialize the internal firmware variables.

Module Description

The IR/RF remote control interface is a means of transmitting user commands to the set top box. This interface consists of a custom hardware receiver implementing a bit frame based communication protocol. A single bit frame represents a user command.

The bit frame is defined in three possible lengths of 12, 15 or 20 bits. The hardware portion of this interface is responsible for determining the bit value along with capturing the bit stream and placing the captured value into a read register for the software interface to access. Each value placed in the read register will generate an interrupt request.

Each user command is transmitted as a single bit frame and each frame is transmitted a minimum of three times. The hardware interface is responsible for recognizing frames and filtering out unwanted frames. A frame match when detected by the hardware interface will generate only one interrupt request.

The IR/RF protocol has one receive interrupt, but it is generated to indicate two different conditions. The two different conditions are start and finish of a user command. The first type of receive interrupt (start) is generated when the hardware interface detects a new frame. The second type of interrupt is generated when there has been no signal detected for the length of a hardware time out period (user command time out). Each frame, when transmitted, is considered to be continuous or repeated. So although there is a three frame minimum for a user command, the protocol is that when a start interrupt is received the interface will assume that until a finish (time out) interrupt is generated the same frame is being received.

During a receive sequence it is possible to receive several start interrupts before receiving a finish interrupt. Several start interrupts maybe caused by the user entering several commands before the time out period has expired. Each of these commands entered by the user would be a different command. A new user command can be accepted before the previous command time out.

There are two possible inputs for the IR frame type and one input for the RF frame type. A selection must be made by the user if the received frame type is going to be IR or RF.

The IR/RF interface will provide information to the user application through a status mailbox. New information in the mailbox will be indicated by an IRQ from the IR/RF driver. There are two interrupts (decode and encode) from the hardware interface that could invoke either RTSL supplied routines or invoke user supplied routines. These parameters are provided by the user and setup by an RTSL initialization routine.

An initialization routine will setup the pointers to the IRQ vectors for the decode and encode handlers and a pointer to the status mailbox. There are basic encode and decode handlers supplied in the RTSL; however, the user can also decide to use encode and decode handlers other than the ones supplied.

There are two required IRQ numbers that must be supplied to the interface, which is user notification that an encode operation has completed or that a decode operation has completed.

IR/RF Interface

The following routines specify the interface to the IR/RF ports.

irrfInitIntrfc( )

Syntax

```
void irrfInitIntrfc(unsigned char dec_irq   :User notification decode interrupt number
                    unsigned char enc_irq   :User notification encode interrupt number
                    void *dec_hndlr         :Decode handler
                    void *enc_hndlr         :Encode handler
                    unsigned int *dec_sts   :Pointer to decoder status,
                    unsigned int *enc_sts   :Pointer to encoder status)
```

Returns
  Nothing
Description
  This routine will initialize the IR/RF interface. IrrfInitIntrfc will initialize the user's notification IRQ, the vectors in the IRQ table for the encode and decode handlers, hardware registers and initialize a global interface structure. The user is required to allocate the memory required for both status mailboxes (dec_sts and enc_sts). This routine should be called by the user at power up to initialize the interface parameters. If the pointers passed for the interrupt handlers are NULL, then the RTSL supplied routines for the IRRF interface will be loaded into the IRQ vector table. If there are addresses supplied for the Decode and Encode handlers then the values for the other parameters of usr$_{irq, dec}$_sts and enc_sts should be NULL.

irrfEncIsr( )
Syntax
  interrupt void irrfEncIsr( )
Returns
  Normal return from interrupt
Description
  This routine will handle interrupts from the encode function for the SIRCSo of the IRRF interface. The functions performed by this routine will be to place the value of the command in the encode status mailbox as an indicator that the SIRCSo function has completed. An IRQ is then issued to the user through the IRQ that the user specified for the encode IRQ in the initialization routine. The encode command bit is cleared to indicate to the software interface that an encode operation is no longer in service.

irrfDecIsr( )
Syntax
  interrupt void irrfDecIsr( )
Returns
  Normal return from interrupt
Description
  This routine will handle the interrupts from the decode function of the IR/RF interface. There are two different types of interrupts associated with the decode interrupt. If the time out bit is not set in the decode register of the interface this interrupt indicates a new bit frame has been identified. If the time out bit is set then it means this interrupt indicates that there has not been a bit stream for the period of the hardware time out. If a new bit frame has been identified the bit frame value is place in the status mailbox (dec_sts) and the user is notified through an IRQ that was specified by the user in the initialization routine. The read will take whatever size command that is in the decode register (12,15 or 20 bit), it up to the user to know what size of command to expect.
irrIntrfcWr
Syntax > unsigned char irrIntrfcWr(unsigned int cmd)

Returns
1 if SIRCSo command was successfully written to the encode register
0 if SIRCSo command is already in progress, command was not written Description
This is the write routine for the SCIRCSo for the IR/RF interface. Normally the SCIRSo will receive the input signal from the SCIRSi and output it. When this routine is called the cmd (command) that is passed in the argument list will be written to the encode register for the IR/RF interface.

For the command to be transmitted on the SCIRSo the encode bit must set in the command before it is written to the encode register.
irrfDecRfSel( )
Syntax > void irrfDecRfSel(unsigned char select)

where:

> unsigned char select; 0=IR selected/1=RF selected

Returns
Nothing
Description
This routine will select what the frame format for the decode function of the IRRF interface, 15 or 20 bits.
irrfEncRfSel( )
Syntax > void irrfEncRfSel(unsigned char select)

where:

> unsigned char select; 0=IR selected/1=RF selected

Returns
Nothing
Description
This routine will select what the frame format for the encode function of the IRRF interface, 15 or 20 bits.

Smart Card Communication Control

The circuit 200 interface to the NDC Smart Card is based on the ISO-7816-3 specification, which defines electronic signals and transmission protocols. Only the portions of the specification that pertain to a asynchronous type of interface are used. The interface itself is the Smart Card and a specific UART inside the circuit 200. In this section, the Smart Card will be referred to as the card and the circuit 200 will be referred to as the interface device.

Note that only one message to the Smart Card can be outstanding; the response or time out from the previous message must be received before another message can be sent to the Smart Card.
Initialization At power-up there is required initialization by the application software. The application software will have to perform two operations to initialize the interface. First initialization step performed by the user is to load the address of smcSmartCardIsr into the IRQ vector table. The second initialization step is then to invoke the function smcIntrfcInit with the required parameters to initialize the internal firmware variables.

The Smart Card interface will initialize on a system reset.
Module Description

The ISO-7816-3 specification defines the interaction between the card and the interface device as conducted through the following consecutive operations:
Connection and activation of the contacts by the interface device
Reset of the card
Answer to Reset by the card
Subsequent information exchange between the card and the interface device
Deactivation of the contacts by the interface card
Connection and Activation of the Contacts by the interface The interface device controls the powering of the card. The following conditions are required as part of the powering sequence to the card.
RST (Reset) is in state L (SCCSR bit 11 to Inactive(0))
VCCEN (SCCSR bit 12 to Enable(1))
VPP is raised to idle state (0 to SCCSR bit VPPE)
Reset of the Card The reset command is the signal to the card that provides a known starting state. The information exchange between the card and the interface device cannot begin until the Reset signal has been asserted to the card and the interface has received an answer to the reset sequence from the card. The interface is responsible for initiating the reset command and any following message transactions with the card.

To initiate the Reset sequence to the card set bit 2 active (URST=1) in the SCICR register. The Smart card will then respond to the reset signal on the I/O line within 40,000 clock cycles. Once the card responds to the reset signal then CCP hardware will itself reset the URST line. The interrupt handler for the interface will use a time out to determine when the answer to reset (ATR) sequence has finished. The interrupt handler for the interface will then issue an interrupt with a ATR received complete status to the application software. This interrupt completes the ATR sequence If the card does not respond to the reset command within the time period specified in the ISO-7816-3 specification the UART hardware will generate an interrupt (ARST) to the firmware. The interface interrupt handler will, upon receiving a no answer to reset interrupt, generate a ATR error status interrupt to the application software. This interrupt indicates that the ATR sequence failed.

Also note that before the Reset sequence command can be issued, bit 3 must have been set active (VCCEN=1) in the SCICR register.
Subsequent Information Exchange Between the Card and the Interface Device Information transfer is always initiated by the interface device, never by the Smart Card. The interface will send a command header to the card. The card will acknowledge the receipt of the header using procedure bytes, which will be then followed by a data transfer that can be either from or to the card.
The interface to card transaction
Command header is transmitted to the card
Card responds with a procedure byte (ACK) that indicates single data or block transfer of data bytes and what the VPP state should be.
Depending on the direction of the command the card or interface will transfer the data or data bytes After the transfer of data bytes the card will transfer the SW1 byte (9xH or 6XH) and then SW2 byte which indicates the end of this transaction between the interface device and the card.

A flow control mechanism at the hardware layer controls when a character can be transmitted on the link. Either the card or the interface can hold transmission by exercising the flow control mechanism. On the interface side there is not firmware access to the flow control. When the receive FIFO in the UART is full the UART hardware will exercise the flow control to prevent further characters from being transmitted from the card.

A time out mechanism called Work Wait time is used only to measure the maximum time difference between the start bits of two consecutive characters transmitted on the link (Received and Transmitted). This timing mechanism is programmable through a register in the firmware with a value passed from the application software. When the Work Wait time expires the UART will issue an interrupt which the firmware will then generate an interrupt to the application software.

Command Header

A header is composed of five bytes and is always sent by the interface device. The header bytes are CLA, INS, P1, P2, P3:

CLA is the instruction class

INS is the instruction code in the instruction class

P1, P2 are a reference that completes the instruction code

P3 is the number of data bytes that will be transferred either to or from the Smart Card. The direction is determined by the instruction. A direction indicator will be passed as a parameter from the API telling the communication routine what the direction will be.

Procedure Byte

Following the transmission of the command header the interface will wait for the response from the card. The response has the form of a procedure byte (can be considered an ACK byte) followed by one or more data bytes. There are three possibilities for the procedure byte, ACK, NULL, SW1.

The ACK byte's seven most significant bits will be either equal or complimentary to the INS byte. This byte will be used to control data transfer and VPP state.

The NULL=60, is used to reset work wait time. If a command is sent to the card and the processing time required is longer than the work wait time the NULL byte would cause a reset of the work wait time which would then allow further card processing time. Additionally any character received will reset the work wait time, the NULL byte just allows a way to reset the work wait time without requiring the transfer of data.

The SW1 byte followed by the SW2 byte indicates the end of the command process. SW1 has two possible base values 9X or 6X (60H is a NULL character). If the SW1 byte is received anywhere in the stream of characters from the card that is an indication that the transaction between the card and the interface device is about to be complete. This is regardless of what the expected byte count that was passed in the command header. Once the SW2 character is transmitted and the guard time for the SW2 has expired then the interface to card transaction is complete.

The following are the possibilities for the values of the ACK byte which will control the transfer of data and control the state of VPP. The ACK byte is divided into two sections, the seven most significant bits are used to control data transfer (bits 1–7) and the least most significant bit (bit 0) is used to control the state of the VPP. An exclusive OR operation is performed between the procedure ACK byte and the command INS byte from the command header to obtain the transfer state and VPP state.

TABLE 34

Procedure Byte

| B7 | B6 | B5 | B4 | B3 | B2 | B1 | B0 |
|---|---|---|---|---|---|---|---|
| ACK | ACK | ACK | ACK | ACK | ACK | ACK | VPP |

Possible Data Transfer States and VPP States

Exclusive OR operation yields a '00' then all the remaining data bytes are transferred subsequently. The VPP state is maintained at or set to zero (idle).

Exclusive OR operation yields a '01' then all the remaining data bytes are transferred subsequently. The VPP state is maintained at or set to one (active).

Exclusive OR operation yields a 'FF' then only the next data byte if one remains is transferred. The VPP state is maintained at or set to zero (idle).

Exclusive OR operation yields a 'FE' then only the next data byte if one remains is transferred. The VPP state is maintained at or set to one (active).

Deactivation of the Contacts

The Deactivation of the contacts occurs after the information session has terminated. The steps required are:

Set RST inactive.

Set the Clock line to L, (This is not under software control)

Set VPP inactive

Set I/O line to L, ( This is not under software control)

Set VCC inactive

Status Information Exchange From the Interface Device to the User

The user will be notified through an IRQ and a status word when the following Smart Card events occur:

Smart Card Detect (Insertion/Removal)

VCC detect loss

Transaction complete

Work Wait Time out

NAK error

Parity error

No answer to reset

Once one of the Smart Card conditions listed above becomes active the RTSL interrupt service routine will use the IRQ number that the user designated with the smcIntrfcInit function to notify the user that a Smart Card event has occurred. Before the IRQ is generated the ISR will set a bit in the mailbox status word as to the cause of the Smart Card IRQ. The mailbox status word is allocated and supplied by the user through the smcIntrfcInit function. It is the responsibility of the user to clear the bits in the mailbox status word after each event occurs. In Table 35 are the bit values that will be passed back in the Smart Card status mailbox status word.

TABLE 35

| | Smart Card Status Mailbox Word |
|---|---|---|---|---|---|---|---|
| NU | NU | NU | NU | NU | NU | NU | NU |
| Bit 31 | Bit 30 | Bit 29 | Bit 28 | Bit 27 | Bit 26 | Bit 25 | Bit 24 |
| NU | NU | NU | NU | NU | NU | NU | NU |
| Bit 23 | Bit 22 | Bit 21 | Bit 20 | Bit 19 | Bit 18 | Bit 17 | Bit 16 |
| NU | NU | NU | NU | NU | NU | NU | PAR |
| Bit 15 | Bit 14 | Bit 13 | Bit 12 | Bit 11 | Bit 10 | Bit 09 | Bit 08 |
| NAK | INSRTD | REMVD | VCC | WWT | NU | COM | RST |
| Bit 07 | Bit 06 | Bit 05 | Bit 04 | Bit 03 | Bit 02 | Bit 01 | Bit 00 |

NU: Bits 31-07 Not Used Reserved
PAR: Bit 08 Excessive Parity Errors have been received
NAK: Bit 07 Excessive NAK errors have been received
INSRTD: Bit 06 Card Inserted and powered
REMVD: Bit 05 Card Removed
VCC: Bit 04 VCC Loss
WWT: Bit 03 Work Wait Time out
NU: Bit 02 Not Used Reserved
COM: Bit 01 Smart Card Transaction complete
RST: Bit 00 Smart Card Reset complete
Smart Card Interface The following routines specify the interface to the Smart Card.
smcIntrfcInit( )

```
unsigned char smcIntrfcInit(unsigned char irq_num, unsigned int *status
                           unsigned char *scout, unsigned char *scin,
                           unsigned char *sizein, unsigned char timeout)
where:   irq_numUser interrupt number
         *status, User pointer to returned status variable, indicates type of
            completion
         *scout, Pointer to data to send to CAM
         *scin, Pointer to data received from CAM
         *sizein, Length of data received from CAM
         timeout, Timeout before quitting (in 10 mS units)
```

Returns

The return from this call does not indicate a successful operation but rather if the operation was allowed and if the passed parameters were correct. The completion of this operation will be indicated to the application software through an interrupt. This call returns 0 on successful execution. Otherwise it returns non zero error code.

| ERR_RESETSC2 | Smart card reset failure due to Null pointer for return data. |
| ERR_COMMSC2 | One or more of the passed parameters is out of range or a NULL pointer. |
| ERR_INITSCI | SCI initialization failure due to that the UART could not apply VCC to the Smart Card. |

Description

Called by user at power up to initialize internal interface parameters. Initialize pointers to the register locations, initialize the global data area and initialize the UART so that the work wait time and transmitter holding register empty interrupts are masked. The IRQ number passed is chosen by the user and the unsigned integer for the mailbox status word is allocated by the user. It is important to note that the Smart Card interrupt service routine is not loaded into the IRQ vector table, it is up to the user to load the vector to the Smart Card ISR separately.

Function Overview

Initialize the following pointers to point to the hardware interface registers of the Smart Card UART. These are global parameters: scdata_reg=SCURB, sccc_reg=SCCCR, scs_reg=SCSR, scic_reg=SCICR, scbdr_reg=SCBRD, scvccdt_reg=VDTIM scwwtim_reg=WWTIM.

Initialize the return status parameters irq_num and *status into the global data structure. Initialize in the global data structure the internal state machine of the Smart Card interface to UNDEF_ST (undefined state).

Clear the SCIC register to initialize the UART for configuration.

Set the mask bits for the work wait time and transmitter empty interrupts and set the FREE bit in the SCIC register to enable transmission on the UART.

smcInitSmartCardUart( )

Syntax unsigned char smcInitSmartCardUart( )

Returns

This call returns 0 on successful execution. Otherwise it returns non zero error code.

Error Code

ERR_INITSCI SCI initialization failure due to most probable cause of the Smart Card is not detected Description This routine would be called to set the UART with default parameters prior to issuing a reset command. The VCCEN enable routine is called to enable the power to the Smart Card.

| Clock Rate: | 5 MHz |
| Baud Rate: | 9600 bps (372) |
| Transmit Retries on NAK error: | 3 |

| | |
|---|---|
| Receive Retries on parity error: | 3 |
| Work Waiting Time: | 1.2s |
| Guard Time: | 0 |

The Work Waiting time it is important to recognize the units that the value that is passed in from the application software and the correlation to the unit that the hardware timer is using. For example the application software will pass in a value of seconds. The UART hardware is counting cycles which is 1/ETU, cycles per ETU times 16. The clock speed of the UART is running at a rate of sixteen times the clock to the card. The work wait time default is set so that when a Reset command is issued the time out will occur in 1.2 seconds. This number is derived from 373/4.6 MHz*124=10 mS*120=1.2 S. All time passed from the user will be in 10 mS units.

Function Overview

Write to SCICR (Bits 0–1): 1=4.6 MHz Clock Frequency
Write to SCICR (Bit 7): VCCEN set active through call to smcSmartCardVccen
Write to BDR (Bits 0–15): 24 Initial baud rate divisor number
Write to SCCCR (Bits 4–7): 3 Number of NAK retries allowed per character
Write to SCCCR (Bits 0–3): 3 Number of Parity error retries allowed per character
Write to SCCCR (Bits 8–15): 0 Additional Guardtime ETU's
Set state Smart UART state machine to Pre Reset State (PR_RST_ST)
smcResetSmartCard( )
Syntax
  unsigned char smcResetSmartCard( )
Returns The return from this call does not indicate a successful operation but rather if the operation was allowed and if the passed parameters were correct. The completion of this operation will be indicated to the application software through an interrupt. This call returns 0 on successful execution. Otherwise it returns non zero error code.

Error Code

| | |
|---|---|
| ERR_RESETSC | Smart Card reset failure |

Description

This routine resets the Smart Card and retrieves the Answer-to-Reset (ATR) string (usually 11-Bytes). The completion of the ATR will result in an interrupt. smcResetSmartCard will enable the reset line to the Smart Card through the SCCR register. Using the addresses from the global data structure that was set up using smcIntrfcInit the interrupt handler will place the received characters into the buffer specified and increment the size of the returned string. The end of the Reset transaction will be when the Work Wait Timer expires 1.2 seconds after the last character has been received from the Smart Card . After the Work Wait Timer expires the user will be notified through the IRQ that the user designated for the Smart Card Interface in the smcInitIntrfc function.

The reset command cannot be issued without having VCCEN active to the Smart Card. Before any call to the reset routine the card must have been inserted and successfully powered up. Once the ICOM (Initialization complete) interrupt has been received the initialization of the UART is complete and the smcResetSmartCard function can be called. The ICOM interrupt will have assured that there is an active VCC to the card and also assured that there is a card installed.

The work wait time error interrupt is unmasked since there will now be characters being exchanged between the interface and the Smart Card.

Function Overview

Verify passed parameters (No Null pointers) and pass them in global data structure to interrupt handler routine Test to see if the interface can issue a Reset. Current state must be Pre Reset State Enable Work Wait time error detection Write to SCICR (bit 2=1): Enables the reset line to the Smart Card, command bit will be reset by the hardware after either a response to the reset or a timeout of the reset command. The answer to reset string will be handled in the interrupt handler.

Initialize size of return string to zero

See Also

Interrupt Handler
smcSetSmartCardUart
Syntax

```
unsigned char smcSetSmartCardUart(
        unsigned char clock,
        unsigned char baud,
        unsigned char xmit_retry,
        unsigned char rcv_retry,
        unsigned long work_wait,
        unsigned char guard_time)
where:
    clock,      SCI clock rate in MH (5, 10 or 20)
    baud,       SCI baud rate in bps (1 = 9600, 2 = 19200,
3 = 38400, 4 = 76800)
    xmit_retry, number of xmit retries on NAK (0 - 3)
    rcv_retry,  number of recv retries on parity err (0 - 3)
    work_wait,  work waiting time
    guard_time, guard time in ETU (0 - 255)
```

Returns

This call returns 0 on successful execution. Otherwise it returns non zero error code.

Error Code

| | |
|---|---|
| ERR_SETSCI | SCI UART configuration failure |

Description

This routine would be called to set the UART with parameters received from an answer to reset sequence. This routine can be called prior to reset if the default parameters are known. The following parameters are set in this routine:

clock: Clock selection, three possibilities (5=4.6 MHZ,10= 9.2 MHz, 20=18.4 MHz)
baud: Baud rate selection, 4 possibilities (See table)
retrans: Transmit retries (0–16 retries)
rerecv: Receive retries (0–16 retries)
wwtime: Work wait time (See table)
gtime: Additional Guardtime, 0–255

The parameters baud rate, wwtime and clock are closely related. Each of the parameters may have different limits depending on what the values of the other two parameters. Please consult table for the relationship.

Also note that VCC should be enabled before setting the UART, but is not checked in this routine. Note the passed parameters are verified for range accuracy. wwtime is checked in the routine smcCalWrkWt( ), if the time is greater than 1.2 seconds the routine will return a 0 and this routine will return an error condition because of it. This routine will also return an error if the clock selection is not 5,10,20.

The clock rate can be changed after reset as specified by the CAM in the ATR. The interface is responsible for maintaining phase lock during clock rate change. The clock must never be stopped and restarted when this routine is called.

Function Overview

Write to SCICR (Bits 0–1): 1=4.6 MHz, 2=9.2 MHz, 3=18.4 MHz Clock Frequency

Write to BRD (Bits 0–15): Baud rate divisor number

Write to WWTIM (Bits 0–16): Work Wait Time

Write to SCCCR (Bits 4–7): 3 Number of NAK retries allowed per character

Write to SCCCR (Bits 0–3): 3 Number of Parity error retries allowed per character Write to SCCCR (Bits 8–15): 0 Additional Guardtime ETU's smcSmartCardCommunication Syntax > unsigned char smcSmartCardCommunication(unsigned char dir, unsigned char sizeout)

where:

> dir, direction of data transfer:0-to, 1-from CAM
>
> sizeout, length of data to send (5-Byte header include.)

Returns

The return from this call does not indicate a successful operation but rather if the operation was allowed and if the passed parameters were correct. The completion of this operation will be indicated to the application software through an interrupt. This call returns 0 on successful execution. Otherwise it returns non zero error code.

Error Code

| | |
|---|---|
| ERR_COMMSC1 | The UART state machine is not in the correct state to start a transaction. |
| ERR_COMMSC2 | Problem of data direction is from CAM and size of expected data is zero. |
| ERR_COMMSC3 | Passed value for Work Wait time is too large for current baud rate to handle. |

Description

This routine is called to invoke the communication sequence necessary to send a command to the Smart card (CAM) interface, in accordance with the ISO 7813-3 standard. Some commands transfer data to the CAM while others retrieve data from the CAM.

This function will send the first byte of the command header to the Smart Card and rely completely on the RTSL Smart Card interrupt handler to complete the transaction. The error codes that are returned by this function deal strictly with requirements needed to start a transaction and do not cover possible errors that may occur during the transaction.

The pointers passed to this routine (scout, scin, sizein) must not be NULL pointers. If any of the pointers are NULL then the function will return an error and the transaction will not have been started. It is assumed that the pointers that are passed by the user point to memory locations that are sufficient in size to complete the transaction.

Prior to calling this function the user must have called and completed successfully the smcSmartCardReset function.

This routine is usually very time critical. The successful completion of the CAM communication will result in an interrupt to the user.

The RTSL interrupt handler for the Smart Card transactions will follow the I/O sequence in the following steps:

Send a 5-Byte header to the CAM.

Read a one-Byte CAM response (ACK byte). Do not store in the input buffer.

Send data to the CAM, or read data from the CAM, depending on the dir indicator.

Read the 2-Byte response, and store it in the input buffer.

Protection Level

This routine needs to run with protection OFF

Function Overview

Check Smart Uart state machine to verify that the interface is ready for a message transaction. Current state must be Post Reset state (PST_RST_ST)

Verify passed parameters (No Null pointers) and pass them in global data structure to interrupt handler routine Advance Smart Uart state machine to message transaction state Initialize the global data area with passed parameters to be used by interrupt handler Initiate the transaction by sending first byte of command header, ( Interrupt handler will handle the rest of the transaction)

Enable Work Wait time error detection

Return to caller

See Also

Interrupt Handler smcSmartCardStatus( )

Syntax unsigned char smcSmardCardStatus( )

Returns

This call returns 1 on successful execution. Otherwise it returns zero error code.

1: Smart Card In

0: Smart Card Out

Description

This routine returns the In/Out status of the Smart Card.

Function Overview

Read SCSR bit SCSTAT(9) if equal to one then Card is detected.

Return a 1 if Card is detected and 0 if not.

smcSmartCardIsr( )

Syntax void interrupt smcSmartCardIsr(void)

Returns

Nothing( )

Description

This routine is an interrupt service routine. The SCS register is read to determine which interrupts occurred. The interrupts for the Smart UART are not mutually exclusive so several interrupts could be present at one time. On each activation of the ISR the SCS register must be completely scanned. The functions that the ISR will invoke are stored in an array of void function pointers called smcisr_functions[ ]. This array has an element for each bit in the SCS register. Bits that are not used in the SCS register will have the corresponding elements in the array initialized to a NULL pointer. SCS register bits will have their corresponding array elements initialized with pointers to the individual functions that will process those causes of interrupts.

This is the interrupt service routine that will handle the interrupt from the Smart UART. There are eight (10) possible causes for an interrupt to be generated by the Smart Card UART. These interrupts are also listed in increasing priority.

RCWE: Receive Character Waiting Error (FIFO full no further characters will be received)
PE: Parity Error
NAK: NAK error
ARST: Answer to Reset never occurred
VCCDE: VCC Detect Event
SMDE: Smart Card Detect Event
ICOM: Initialization complete
WWTE: Work Wait time out error
DR: Data Ready
THRE: Transmitter Holding Register Empty Function Overview Shift the value in the SCS register from right to left shifting out the four most significant bits, these are receive FIFO count bits. Keep track of the number of shifts that have been performed.

Examine most significant bit to see if it is set. Invoke an ISR if the bit is set using the number of shifts performed to index the array of ISR pointers. If array has a NULL pointer for the indexed element do not process.

Examine to shifted value of the SCS register if any other bits are set. If no further bits are set then the function can be exited else go on step 4. This is done for performance purposes, there is no need to do any further processing if there are not any other interrupt conditions set.

Shift from right to left 1 bit and perform step 2 until 16 shifts have been performed.

General Purpose UARTs

The circuit 200 hardware includes three UARTs. One is dedicated to the 'SmartCard®' interface. The other two UARTs are general purpose; their support software will be discussed in this section.

Initialization

At power-up there is required initialization by the application software. The application software will have to invoke the function uartIntrfcInit with the required parameters to initialize the firmware.

Module Description

All UART control and status registers are memory mapped and are fully accessible by the API. The support software for all UARTs will execute in the application software domain, using IRQ interrupts.

The UART is a simple two wire, buffered UART with optional software flow control (XON/XOFF). The functionality consists of transmit and receive of single characters. Features of the UART drivers include:

Programmable Baud rate
Programmable number of start/stop bits (1 or 2)
Programmable number of data bits (7 or 8)

The UART registers are located in the Communication Processor address space.

Assumptions

Full duplex interface
No Echo of received characters
ASCII characters only
Interface will initialize on system reset
Character-based driver The RTSL driver supplied will allow the user to support (XON/XOFF) flow control. There is not a receiver that is able to unconditionally accept a sender's data. A flow control protocol allows the receiver to control the rate or amount of data from the sender during the course of a transaction.

Operation

After initialization the user will call the uartSetUart function to define parameters such as baud rate, data size and parity enable. The UART driver is single event driven which means that the user will get an IRQ after each character is sent or received. Other single events such as character errors and breaks will also generate IRQs to the user. The development of the UART driver is at the discretion of the application developer.

Inter-Integrated Circuit ($I^2C$) Bus Driver

The circuit 200 will support the $I^2C$ protocol. To interface the application program to the hardware, a driver known as the $I^2C$ Driver will handle several API functions that enable the application to send, receive and configure some parameters of the $I^2C$ bus.

Module Description

As defined, the device that is currently transmitting is known as the transmitter and the device that is currently receiving is known as the receiver. Each device is recognized by a unique address and can operate as either a transmitter or receiver. A device can also be recognized and known as a master or slave. The master is the device that initiates the data transfer. The slave is the device that is addressed by the master. The circuit 200 is assumed to be programmed as the master on a single master bus.

Multi-Master

Although recognized as a multi-master protocol, this implementation will not support an arbitrated multi-master bus. The circuit 200 may be programmed either as a master or slave, but will only support one master on the bus.

Bit Rate

The Low Speed Mode, the 100 kbit/s, is the only mode supported. Fast Speed Mode of 400 kbit/s is not supported as a master. This does not prohibit operation because the Low-Speed Mode is a subset of the Fast-Speed Mode.

Addressing

Only seven bit addressing is supported. Extended 10-bit addressing is not supported as a master. Programming of slave addresses in software using the protocol is also not supported. All addresses are generated internally as part of the device.

TABLE 36

| | Addressing | |
|---|---|---|
| Slave Address | R/W Bit | Description |
| 0000 000 | 0 | General Call Address |
| 0000 000 | 1 | Start Byte |
| 0000 001 | x | CBUS Address |
| 0000 010 | x | Reserved |
| 0000 011 | x | Reserved |
| 0000 1xx | x | Reserved |
| 1111 1xx | x | Reserved |
| 1111 0xx | x | 10-bit slave |

Start Condition

A start condition must come before any command. A start can be identified by a high to low transition on the data line while the clock is in a high state.

Stop Condition

A stop condition will terminate any communication between the slave and master device. A stop can be identified by a low to high transition on the data line while the clock is in a high state.

Acknowledge

All data transfers use the acknowledge for each byte transferred. The transmitter releases the SDA line high during the acknowledge clock pulse. The receiver pulls the SDA line low during the acknowledge clock pulse. Any non acknowledge will cause the master to abort the transfer. An exception to this may be made during the last byte of the byte of a data transfer when the master is the receiver. On the last byte transferred, the Master will NAK the byte to single that byte as the last.

Byte Format

Each byte is eight bits long. The number of bytes transmitted is limited only in the buffer length used to hold the data. Each byte is followed by an acknowledge bit. Data is transmitted with the most significant bit (MSB) first.

General Call

The general call is used to address all devices on the bus at the same time. If a device does not need any data provided by a general call, it may ignore this address by not issuing an acknowledge. If a device does need the data from a general call, it will acknowledge the address and act as a slave receiver. Each byte after the address will be acknowledged by every device capable of using the data.

The second byte defines one of two potential protocols to follow. If the LSB of the byte is '0' with a value of 0x06, the device will reset and take on the programmable part of their address. If the LSB of the byte is '0' with a value of 0x04, the device will not reset, but will take on the programmable part of their address. All other codes will be ignored.

If the second byte LSBit is a '1', this is generated from a hardware device general call. Since as a hardware master this device does not know what other devices are on the bus, this call enables it to announce its address in the upper seven bits of the second byte.

Timing

The receiver can place the transmitter into a hold state by forcing the clock line low. This places the transmitter into a wait state that enables the receiver to perform other tasks until ready to receive. The receiver releases the clock line which enables the transmitter to continue the data transfer.

I²C Interface

Table 37 lists the I2C APIs. These routines are described in more detail in the following section.

TABLE 37

I²C APIs

| Name | Description |
|---|---|
| i2cInit( ) | Master/Slave Initialize I²C |
| i2cStatus( ) | Master/Slave Return the status of the I²C |
| i2cIOSequence( ) | Master Execute a transaction. |
| i2cIOSequenceWithAddress( ) | Master Execute a transaction with repeated start for random addressing |
| i2cReceive( ) | Slave Receive a message. |

I2cINit( )

Syntax

```
ferror = i2cInit (I2CPBLOCK *pblock);
where:
*pblock = A parameter block pointer that contains the I2C initialization
parameters.
typedef struct {
         uint       Address;    /* local device address for transactions matching
         */
    uint       Mode;       /* 0 Slave non zero Master
         */
    I2CSTATUS  *Status;       /* pointer to status register used at IRQ time
         */
    uint       Irq;        /* IRQ id used for signaling the end of a transaction
         */
    uint       byteTimer;  /* value in 25usec used to time byte to byte aborts
         */
} I2CPBLOCK;
```

<Address> contains the 7 bit address in bits 7:1. This address is used to represent the I2C device address.
<Mode> is set to 0 to program the interface as a slave device. A value of 1 in bit 0 indicates the device should respond as a master.
<*Status> is a pointer that provides a status register at irq time. The irq is used to indicate a previously issued com mand has completed. It is also used to indicate progressive information about the current driver state or need for information. The register is set by the driver and cleared by the application reading it. It is the responsibility of the application to copy/clear the register during the irq processing to prevent conflict.

<Irq> is the numeric FW irq to be used as the signal for command completion or event notification. This value should be programmed from 0x1F.

<byteTimer> is used by the hardware to provide a byte to byte timer. Any incomplete byte transactions can be aborted using this timer. The timer is in resolutions of 25 usec and is 23 bits wide. A value of zero will turn the timer off. Beware that turning this timer off can cause the hardware to stall if another device fails. The only recovery from this stall is a hardware reset.

Returns ferror NOERROR

Description i2cInit is used to setup the run-time parameters needed for I2C operation. This function must be called before any other I2C functions are executed.

I2cStatus( )

Syntax

```
ferror = i2cStatus(I2CSTATUS *pblock);
where:
*pblock = A pointer that contains the location to write the status words
structure.
typedef  struct {
    ulong I2CAW;      /* current read address
    */
    ulong I2CS;       /* current status word
    */
    ulong I2CC;       /* current word
    */
    ulong I2CAS;      /* current programmed address
    */
} I2CSTATUS;
```

Returns ferror NOERROR

Description

This function will return the current status of the I2C Registers as well as the IRQ status register at the end of the command when signaled by the irq. The organization and content of the status is TBD.

I2cIOSequence( )

Syntax ferror =i2cIOSequence (uchar I2CAddress,
    uchar *data,
    uint dataLength,
    uint retryCount);

where:

I2Caddress=The device address defined in the upper seven bits (bit 1–7). The LSB (bit 0) defines the function as a read or write. 0=write and 1=read.

*data=Indicates the location to place the incoming data from the read device in <I2Cadress> dataLength=The number of bytes expected to receive and store at <*data> retryCount=Value used to indicate how many attempts at retransmission is taken before an error is indicated. A value of 0 indicates no retries Returns ferror NOERROR Description i2cIOSequenceWithAddress( ) writes to or reads from the I2C device specified in <I2CAddress>. After the <I2CAddress> is sent, the Master will then either send the data referenced by <*data> or receive data for the length of <dataLength> and place the bytes at <*data>. After the transaction is complete, the function will signal the application via the status word <I2CStatus> and <I2CIrq> set during <i2cInito>.

During the transaction. An internal byte attempt timer will manage the byte to byte timing. This parameter <byteTimer> is defined in the <i2cInit( )> function. Any failure to fully receive a valid framed byte will result in this timer expiring and a retry attempted if programmed.

The caller will define the number of attempts to retry using <retryCount> if the byteTimer expires, an acknowledge fault or framing error will occur.

I2cIOSequenceWithAddress( )

Syntax ferror=i2cIOSequenceWithAddress(uchar I2CAddress,
    uint address,
    uint addressLength,
    uchar *data,
    uint dataLength);

where:

I2Caddress=The device address defined in the upper seven bits (bit 1–7). The LSB (bit 0) defines the function as a read or write. 0=write and 1=read.

Address=A random access address defined in the device targeted by <I2CAddress>. The format of the address is device dependent. The address will be transmitted MSB first. The address should be left justified in the word <address>. $1^{st}$ address byte in bits 31–24, $2^{nd}$ in bits 23–16, $3^{rd}$ in bits 15–8, $4^{th}$ in bits 7–0.

addressLength=The length of the address as defined in <address>. This length is measured in 8 bit bytes.

*data=Indicates the location to place the incoming data from the read device in <I2Cadress> dataLength=The number of bytes expected to receive and store at <*data>

Returns ferror NOERROR

Description i2cIOSequenceWithAddress( ) writes to or reads from the I2C device specified in <I2CAddress>. The device is assumed to have read/write and random capability by using <address> as an internal pointer to the data desired. After the I2CAddress and Address is sent, the Master will then either send the data referenced by <*data> or receive data for the length of <dataLength> and place the bytes at <*data>. After the transaction is complete, the function will signal the application via the status word <I2CStatus> and <I2CIrq> set during <i2cInit( )>.

During the transaction. An internal byte attempt timer will manage the byte to byte timing. This parameter <byteTimer> is defined in the <i2cInit( )> function. Any failure to fully receive a valid framed byte will result in this timer expiring and notification via irq of a failed transaction.

This function does not attempt any error recovery via retransmission. An error will be indicated in the <I2CStatus>.
I2cReceive( )
Syntax

```
ferror = i2cReceive(I2CREAD *pblock);
where:
*pblock = A pointer that contains the location to write the status words
structure.
typedef  struct {
    ulong *data;   /* place the data here
    */
    ulong num;     /* number received              */
    ulong size;    /* maximum number to receive    */
    } I2CREAD;
```

Returns
 ferror NOERROR
Description
 This function will receive a message and place the data at <*data> until <size> or normal completion of the receive data. If <size+1> is reached abnormally, the read is terminated. The driver will then go into hunt mode again, looking for a new start after notifying the application of the error via status.
MPEG Video Decoder
Initialization
 The MPEG video decoder requires the following initialization:
 Load the MPEG video decoder microcode into DRAM
 Load the code loader and init. microcode to IMEM
 set the cpu_cntl register
 Write the "play" command to the command FIFO
 The above will start the MPEG video decoder.
Module Description
 The run time support for the MPEG video decoder consists of a routine to allow the API to send commands to the video decoder. This routine is vidSendCommand( ). In addition, an initialization routine is needed to setup the MPEG video decoder at bootup time. The bootup sequence for the decoder will leave it in free running "PLAY" mode.
 The Video firmware interfaces with the MPEG video decoder via the command FIFO located in the MPEG video decoder hardware. The command set that needs to be supported by the firmware consists of:
 PLAY
 FREEZE
 STOP
 SCAN
 NEW_CHANNEL
 RESET
 In addition the firmware is responsible for writing the SCR to the MPEG video decoder. The SCR packet handling is described in the TPP section of this software design specification. The SCR is sent to the MPEG video decoder every time that the SCR packet is detected in the DSS stream. The packet SCID for the SCR is determined by the application software at system startup time. The SCR that is sent to the MPEG video decoder is the SCR from the packet, not the system SCR.
 The MPEG video decoder registers are memory mapped. The command FIFO is located in SDRAM. The location of the FIFO is dynamically established during the startup of the MPEG video decoder micro code. The initialization program of the ARM incorporates the checking of a status bit in the MPEG decoder to verify that micro code is running in IDLE state. Once the micro code is running, the location of the FIFO command buffer structure can be read from a dedicated SDRAM address.
Video Decoder Interface
 The following routines specify the interface to the video decoder.
vidInit( )
Syntax
 void vidInit( );
Returns
 The function does not return an error code.
Description
Example
Protection Level
 This routine needs to run with protection ON, as it accesses the on-chip protected resources.
vidCommand( )
Syntax
 void vidCommand(long command);
where:
 command:
  PLAY
  FREEZE
  STOP
  SCAN
  NEW_CHANNEL
  RESET
Returns
 There is no error checking in the routine for valid input data range. Validation of the calling parameter is the responsibility of the caller. The function does not return an error code.
Description
 This function allows the application software to send a command to the MPEG video decoder. The following commands are supported:

| | |
|---|---|
| PLAY | normal decoding |
| FREEZE | normal decoding but continue to display the last picture |
| STOP | stops the decoding process. The display continue with the last picture |
| SCAN | searches for the first I picture, decodes it, continuously displays it, and flushes the buffer |
| NEW CHANNEL | for channel change. This command should be preceded by a Stop command. |
| RESET | halts execution of the current command. The bitstream buffer is flushed and the MPEG Video decoder performs an internal reset |

Example
Note
 This function is NOT re-entrant.
Protection Level
 This routine needs to run with protection ON, as it accesses the on-chip protected resources.
MPEG Audio Decoder
Initialization
 The MPEG audio decoder initialization writes the default values of Table 38 to the audio control register.

TABLE 38

Audio MPEG Decoder Default State
Audio MPEG decoder default state

- PCM Select to 16 bit, 256 times over sampling
- Dual channel mode to Ch0 on left, Ch1 on right
- Mute control set to normal operation (not muted)
- Reset control set to normal operation (not reset)

Module Description

The runtime support of the MPEG audio decoder consists of:
PCM changes, API selects from following
 16 bit, no over sampling
 16 bit, 256× over sampling
 18 bit, no over sampling
 18 bit, 384× over sampling
Dual channel mode Output mode select
 Ch0=left, Ch1=right
 Ch0=left and right
 Ch1=left and right
 Mute/unmute
 Reset audio mode
 Audio Decoder Interface
The following routines specify the interface to the audio decoder.

audInit( )

Syntax void audIni ( );

Returns

The function does not return an error code.

Description

The routine initializes the audio decoder to initial state. The initial state is:
 Audio decoder in RESET state and MUTE (No decoding, no output)
 Channel output setup as CHAN0L1R (Channel 0 left, Channel 1 right)
 PCM setup as PCM16_0 (16 bit output no oversampling)

Example

```
main( )
{
    audInit( );      /* initialize audio decoder */
}
```

Protection Level

This routine needs to run with protection ON, as it accesses the on-chip protected resources.

See Also audCommand( )

audCommand( )

Syntax void audCommand(long command);

where:

command: Maximum one element from each group below OR'd together
 Group 1: CHAN0L1R or CHAN0LR or CHAN1LR
 Group 2: PCM16_0 or PCM16_256 or PCM18_0 or PCM18_256
 Group 3: MUTE or UNMUTE
 Group 4: RESET Returns There is no error checking in the routine for valid input data range. Validation of the calling parameter is the responsibility of the caller. The function does not return an error code.

Description

The function examines the command parameter and takes action upon each of the commands that are OR'd together. It will only test for one element from each of the groups (1, 2, 3 and 4) below. If more than one element from a group is specified, the outcome of the call is undetermined.

Subsequent calls will only change those values that are different from the previous call. See examples below.

```
Group 1:
    CHAN0L1R    /* Channel 0 left, Channel 1 right   */
    CHAN0LR     /* Channel 0 both left and right     */
    CHAN1LR     /* Channel 1 both left and right     */
Group 2:
    PCM16_0     /*  16 bit, no over sampling         */
    PCM16_256   /*  16 bit, 256 x over sampling      */
    PCM18_0     /*  18 bit, no over sampling         */
    PCM18_256   /*  18 bit, 384 x over sampling      */
Group 3:
    MUTE        /* Mute audio decoder output         */
    UNMUTE      /* Unmute audio decoder output       */
Group 4:
    RESET       /* reset audio decoder               */
```

Example

```
#include "audio.h"                   /* command definitions        */
main( )
{
    /* Direct Channel 0 output to both L+R, do 16 bit, 256 x over- */
    /*sampling and unmute                                          */
    audCommand(CHAN0LR | PCM16_256 | UNMUTE);
    ...
    audCommand(MUTE);                /* mute the audio channel     */
    ...
    audCommand(CHAN0L1R | UNMUTE);   /* sChan. 0 left, Chan 1      */
                                     /* right, unmute output       */
    ...
}
```

Note: When the RESET command is issued, all other commands in that call will be ignored, the values remain those set in previous calls.

Protection Level

This routine needs to run with protection ON, as it accesses the on-chip protected resources.

NTSC/PAL Encoder

Initialization

The initialization of the Video Encoder is limited to setup of the VIDEO_MODE0, VIDEO_MODE1 and HSYNC_OFFSET registers according to Table 39.

TABLE 39

NTSC/PAL Encode Default State

| Register | default state |
| --- | --- |
| VIDEO_MODE0 | Bit 7 = 1: Blanked output |
| | Bit 6 = 0: not used |
| | Bit 5 = 0: not used |
| | Bit 4 = 1: 1.5 Mhz Chroma cutoff |
| | Bit 3-2 = 00 Video output |
| | Bit 1-0 = 00: not used |
| VIDEO_MODE1 | Bit 7-5 = 0: not used |
| | Bit 4 = 0: Video DAC output disabled |
| | Bit 0 = 1: NTSC setup 0% |
| HSYNC_OFFSET | Bit 7-6 = 00: not used |
| | Bit 5-O = XXXXXX Dependent on Application, see table Error! |
| | Reference source not found. |

Module Description

The NTSC/PAL encoder will be directly accessible from the ARM.

Close caption data consists of 2 characters per frame, encoded in line 21 (odd field). The generation of the CC data is automatically done by the NTSC/PAL encoder; it uses the data in the caption data registers. The data is written to these registers by the OSD.

The MacroVision copy protection will be supported. The activation/deactivation will take place via an ARM RTSL routine. It will be callable from the API.

NTSC/PAL Encoder Interface

The following routines specify the interface to the NTSC/PAL encoder.

encInit( )

Syntax void encInit( uchar mode, enc_s *parms);

where:

mode = NTSC or PAL
parms = pointer to structure enc_s as follows:
typedef struct
{
    unsigned char video_mode0_register;  /* video MODE 0 register bit pattern */
    unsigned char video_mode1_register;  /* ditto MODE 1 register */
    char hsync_offset;  /* Horizontal Synch. Offset count */
}enc_s;

The video_mode0_register and video_mode1_register have to be setup to reflect the appropriate bit pattern for the respective registers.

Hsync_offset contains one of 3 values according to the following table:

| NTSC | −32 | 76 Clocks Td |
| --- | --- | --- |
| | 0 | 108 clock Td (default) |
| | +32 | 139 clocks Td |
| PAL | −32 | 96 clocks Td |
| | 0 | 128 clocks Td (default) |
| | +32 | 159 clocks Td |

The video mode 0 and 1 bits need to be setup to reflect the appropriate function according to the specification.

Note: If the parms parameter upon call is NULL, the software will setup the encoder for the default parameters as defined in the specification.

Returns

There is no error checking in the routine for valid input data range. Validation of the calling parameter is the responsibility of the caller. The function does not return an error code.

Description encInit( ) allows the caller to initialize the NTSC/PAL encoder for the appropriate mode.

Example

```
/* in an include file, typedef the mode structure        */
typedef       struct { ... }enc_s;
/* declare a local copy of the structure                  */
enc_s mode = { .... parameter list here ... };
/* now setup the encoder                                  */
encInit(PAL, &mode);
```

Protection Level

This routine needs to run with protection ON, as it accesses the on-chip protected resources.

encCommand( )

Syntax void encCommand(uchar mode, long command);

where:

command

Lower 3 bytes are the command(s) to the encoder from the table below

Upper byte is the Color Bar value as described below

Returns

There is no error checking in the routine for valid input data range. Validation of the calling parameter is the responsibility of the caller. The function does not return an error code.

Description encCommand allows the caller to change the current setup of the NTSC/PAL encoder with the appropriate parameters.

The 'command' parameters can contain any or all of the parameters OR'd together into the appropriate parameter. As it is shown, every bit contains either an ENABLE or a DISABLE type command and they are mutually exclusive.

The runtime support software will evaluate each 'command' parameter according to the table below.

The commands are defined in the encoder.h file as follows:

TABLE 40

NTSC/PAL Encoder Commands

| Command Mnemonic | Type | Description |
|---|---|---|
| VID_BLANK_ENABLE | E | Enable video blanking (video output disabled) |
| VID_BLANK_DISABLE | D | Disable video blanking (video output enabled) |
| CC_EVEN_ENABLE | E | Close caption even field enabled |
| CC_EVEN_DISABLE | D | Close caption even field disabled |
| CC_ODD_ENABLE | E | Close caption odd field enabled |
| CC_ODD_DISABLE | D | Close caption odd field disabled |
| VID_DAC_ENABLE | E | Enable the video output DAC(s) (*) |
| VID_DAC_DISABLE | D | Disable the video output DAC(s) (*) |
| PAL_OUTPUT_SELECT | E | PAL output mode |
| NTSC_OUTPUT_SELECT | D | NTSC output mode |
| CHROMA_AT_30 | E | Chroma cutoff frequency at 3.0 MHz |
| CHROMA_AT_15 | D | Chroma cutoff frequency at 1.5 MHz |
| NTSC_SET_75 | E | NTSC setup at 7.5% |
| NTSC_SET_0 | D | NTSC setup at 0% |

(*) Only available for test purposes

Note that the commands are listed in pairs of 'ENABLE' or 'DISABLE' type of function. If an ENABLE and DISABLE type function are both OR'd together in the same call, the DISABLE type function prevails.

For color bar generation, the following are defined in encoder.h:

TABLE 41

Color Bar Menmonic Description

| Color Bar menmonic | Description |
|---|---|
| COLOR_BAR_0 | Color bars 0% enabled (100% video) |
| COLOR_BAR_75 | Color bars 75% enabled |
| COLOR_BAR_100 | Color bars 100% enabled |

Example
    #include "encoder.h"

```
main ( )
{
    long new_command = (COLOR_BAR_75 | VIDEO_BLANK_ENABLE);
    ...
    encInit(PAL,0);                /* initialize encoder to PAL    */
                                   /* mode, use defaults           */
    ...
    encCommand(new_command);       /* Disable video output (Enable */
                                   /* blanking)and 75% color bars  */
}
```

NOTE: Only those commands that are specified in the 'command' parameter will be changed. All other command parameters remain as they were previously. If mutually exclusive parameters are specified, the DISABLE type overrides the ENABLE type.

Protection Level

This routine needs to run with protection ON, as it accesses the on-chip protected resources.

encGetStatus( )

Syntax char encGetStatus( );

Returns

The function returns the status byte from the encoder, with bit description as follows:

| | |
|---|---|
| Bit 3: FIELD | 0 = Odd field active OR interlace mode |
| | 1 = Even field active |
| Bit 2: VBLANK | 0 = Vertical blanking period active |
| | 1 = Outside vertical blanking period |

All other bits are 0.

Description

The function can be used to obtain the current status of the video encoder. It returns the snapshot at the time the status register was read.

Protection Level

This routine needs to run with protection ON, as it accesses the on-chip protected resources.

On Screen Display (OSD) and Graphics Acceleration

The OSD and Graphics acceleration modules provide the API-to-firmware interface for all on-screen display and graphics drawing functions. There are two major sections, OSD, and graphics acceleration. Each section consists of an overview of the API capabilities and constraints, followed by the API description.

The following section details the data structures that are visible to the application developer and common to both the on screen display hardware and the graphics acceleration hardware.

System Data Structures disptype: disptype enumerates all of the possible hardware display types, including half resolution displays.

Note: the order of the list is important: place at top of the list the display types that require a palette, with BITMAP8HR last. That allows a fast check on the attributes of the displayed windows. The code works correctly with any list order.

```
typedef enum {
    BITMAP1,       /* 1 bit bitmap */
```

-continued

```
BITMAP2,        /* 2 bit bitmap */
BITMAP4,        /* 4 bit bitmap */
BITMAP8,        /* 8 bit bitmap */
BITMAP1HR,      /* 1 Bit bitmap half resolution */
BITMAP2HR,      /* 2 bit bitmap half resolution */
BITMAP4HR,      /* 4 bit bitmap half resolution */
BITMAP8HR,      /* 8 bit bitmap half resolution */
YCRCB422,       /* 4:2:2 YCRCB Graphic Display */
YCRCB444,       /* 4:4:4 YCRCB Graphic Display */
YCRCB444HR,     /* 4:4:4 YCRCB graphic half resolution */
VIDEO,          /* Full Size MPEG Video Display */
VIDEOHSIZE,     /* MPEG Video Display Half Resolution */
VIDEOQSIZE,     /* MPEG Video Display Quarter Resolution */
VIDEOESIZE,     /* MPEG Video Display Quarter Resolution */
CURSOR          /* Cursor */
} DISPTYPE;     /* Window display type   */
``` osdpaltype: OSDPaltype enumerates all possible palette types that are available.

It corresponds to the number of entries/colors in the palette table. If the value is zero, no palette structure is needed: for example this is the case of the video windows.

```
typedef enum {
    NoPalet = 0,    /* No palette is needed */
    Pal1Bit = 2,    /* 2 colors for 1 Bit Palette */
    Pal2Bit = 4,    /* 4 colors for 2 bit palette */
    Pal4Bit = 16,   /* 16 colors for 4 bit palette */
    Pal8Bit = 256   /* 256 colors for 16 bit palette */
} OSDPaltype;       /* The number of colors in a palette */
``` osdblendtype: OSDBlendType enumerates all possible blending types that are available.
```
typedef enum {
    NoBlend = 0,    /* No blending
    ColorB4 = 1,    /* 4 levels on the CLUT basis (Cb_0 Cr_0)
    ColorB16 = 2,   /* 16 levels on the CLUT basis (Cb_0 Cr_0 Cb_1 Cr_1) */
    WindowB16 = 3   /* 16 levels on the window basis*/
} OSDPaltype;
``` memtype: memtype is used to describe the different memory types that the bitblt module may transfer data to and from. The bitblt module needs to know what kind of memory it is accessing because each memory type requires different hardware signaling.

typedef enum {SDRAM, EBIF} memtype;

Buffer: Buffer defines a basic structure that defines a continuous region of memory. The storage is cwBufferSize words long, at the address pBuffer.

```
typedef struct {
    word cwBufferSize;   /* Size of Buffer */
    word *pBuffer;       /* Pointer to Buffer */
} Buffer;
```

Hpalette: HPALETTE defines the handler of a palette that has been created by using the related API routine. Actually, its value is equal to the address of the buffer where the palette is stored.

typedef word HPALETTE; /* Palette Handler */

Hdisplay: HDISPLAY defines the handler of a hardware display that has been created by using the related API routine. Actually, its value is equal to the address of the buffer where the display structure is stored.

typedef word HDISPLAY; /* Palette Handler */

Error Conditions define E_NONE 0
  No error.
define E_ERROR 0xFF
  General purpose error: some kind of error occurred.
define E_HDM_ADJUSTED_VIDEO_DIM 0x80
  The display coordinates were changed by the routine.
define E_HDM_MAX_PHYSICAL_EXCEEDED 0x81
  The application tried to create more than eight physical displays. A virtual display is created instead of a physical one.
define E_MEMORY_TYPE_INCORRECT 0x82
  The application tried to create a physical display with the display buffer stored in the external memory. A virtual display is created instead of a physical one.
define E_HDM_DISPLAY_BUSY 0x83
  The application tried to create a physical display with the same ID of another active display. A virtual display is created instead of a physical one.
define E_HDM_VIDEO_DISPLAY_EXCEEDED 0x84
  The application tried to create more than one video display (either decimated or full screen). A virtual display is created instead of a physical one.

General Module Description

The On Screen Display (OSD) hardware is capable of concurrently managing up to eight different types of displays or virtual windows concurrently on a NTSC or PAL type monitor.

Error! Reference source not found. shows three different types of displays: a 4:4:4 Graphic image, a 4 bit bitmap, and an MPEG video. We use the term display instead of window because each display may be of a different type, such as:
Graphic or "TrueColor"—1 or more may be shown
Bitmap—1 or more may be shown
MPEG Video—up to 1 may be shown The firmware maintains attributes for each display, such as size, position, palette if necessary, and display type.

TrueColor displays use Luminance(Y), Red Chrominance (Cr), and Blue Chrominance (Cb) color components to store an image. The CbYCr image is stored in either 4:4:4 or 4:2:2 format. 4:4:4 is a 24 bit format, where each color component is 8 bits, resulting in 24 bits per pixel. 4:2:2 halves the chrominance information, resulting in an average pixel depth of 16 bits.

Bitmaps are 1,2,4, or 8 bits pixel. Each pixel is an index into the 24 bit hardware color lookup table. The palette attribute contains an offset into the hardware palette. This offset is used to calculate the actual color index into the table. Using the color index, the 24 bit CbYCr value can be determined.

The MPEG video window is capable of displaying a full size NTSC or PAL video, or a decimated version of the MPEG video. Only one video display may be used at any time.

Up to eight overlapping displays can be shown concurrently on the screen. If a hardware cursor is required, then one hardware window must be used for that purpose, leaving seven application programmable hardware displays.

The on screen display firmware is responsible for managing the following hardware resources:
Color Lookup Table (CLUT) or Palette
Eight Hardware Windows
Hardware Cursor The OSD maintains a 256 entry color lookup table. Each entry in the table contains a 24 bit CbYCr color value. The lookup table is used by bitmap displays to generate CbYCr 24 bit color values from the 1,2,4, or 8 bit color indices.

Any number of user palettes may be defined on the hardware palette. The palettes may use mutually exclusive regions of the palette memory, or color palettes may overlap others. Error! Reference source not found. shows two examples of how the CLUT may be organized. Example (a) shows four non-overlapping palettes. example (b) shows 4 palettes, each one larger bit palette overlapping the smaller. An application may use a combination of overlapping and non-overlapping palettes if desired.

Once a palette is defined, it may be attached to a bitmap display. The bitmap display will then use that particular palette to define its new color-set. It is the responsibility of the application to make sure the entries in the color palette are correct. Application firmware will not check for color consistency across hardware displays.

The application software is required to perform the necessary housekeeping and memory management on the CLUT, including:

Tracking where in the CLUT all of the palettes are

Palette memory fragmentation (see cltFreePalette( ) below)

Palette Color management, i.e. making sure color are consistent with application requirements.

During repeated cltNewPalette( ) and cltDeletePalette( ) function calls, the 256 palette memory may become fragmented. For example, Error! Reference source not found. shows how fragmentation of the memory palette could prevent optimum use. At first, 6 different palettes were active in the palette. Then, three of the 2 bit palettes were freed, leaving small gaps in between the larger palettes. Item 4 in the figure shows how the palette was allocated after the palette memory was packed. Again, it is the responsibility of the application to determine how to manage this issue.

The hardware window management API is responsible for managing the OSD hardware that controls the display windows. The OSD allows up to 8 different displays to be viewed at any given time. The following display types are allowed:

Bitmap 1 bit/pixel

Bitmap 2 bits/pixel

Bitmap 4 bits/pixel

Bitmap 8 bits/pixel

CbYCr 4:4:4 24 bits/pixel

CbYCr 4:2:2 16 bits/pixel (avg.)

MPEG video (full size or decimated)

In addition, a half-resolution mode for Bitmap and CbYCr 4:4:4 displays is allowed. This features essentially allows a horizontally-decimated-by-two image to be stored in memory. The decimated image is rendered full size by the hardware, which replicates every pixel horizontally on the output. Only decimated half, quarter or eighth resolution MPEG video displays are maintained by the OSD firmware.

A hardware display may be created anywhere in application memory, such as SDRAM or memory on the external extension bus. However, due to internal bandwidth requirements of the circuit 200, only displays created in SDRAM may be rendered by the OSD hardware. A hardware display on the extension bus must always have a Z plane priority less than 8, which will ensure that the screen is invisible (because the top 8 displays are managed by the OSD hardware). This is not true for displays created in SDRAM, which do not have a priority.

An application may create as many displays as needed within available hardware resources. This feature allows the application to create more displays in SDRAM than the OSD hardware can display. For example, if an application creates 10 different displays, only 8 of them will be viewable.

The OSD determines which display is viewable through 2 attributes: its id and a show/hide bit. If the display id is between 0–7, then it corresponds to one of the 8 Z-plane levels managed by the OSD. The top level display is id 0, the bottom is id 7. Id or level 0 may be used by the hardware cursor if needed, but otherwise may be used as the highest priority hardware display. Only one hardware display is allowed per Z-Plane. This is because the OSD allows the user to overlap hardware windows. Windows with a lower Z-plane will overlap windows with a higher Z-plane. See Error! Reference source not found. for an illustration. The API allows an application to set what level a display should be. If a display is set to a plane between 0 and 7, an application can control whether it is viewable or not by calling a function that will set the visibility of the window.

Note that a portion of a display of any type, except for the decimated MPEG windows, can lie outside the visible part of the screen: the part of the display that is out of the screen is automatically cropped. There are only two limitations: the upper-left corner of a window must lie inside the video screen and the display size cannot be greater than the screen dimension.

If a display is not between 0–7, then is should be marked VIRTUAL (see irqInit( )for details). Virtual displays work just like normal displays, except that they cannot be viewed.

User application code is responsible for managing the OSD window memory. The user provides starting addresses for each hardware window it creates. The application software will provide as much memory management support software as needed. For example, if memory fragmentation occurs, it will be up to the application software to pack the display memory (see Error! Reference source not found. for a related problem).

Bitmap, graphic 4:4:4 or 4:2:2 displays may be blended with an MPEG video display when they overlap the video display or with the background color when they don't overlap an MPEG window. If window blending is enabled, the amount of blending is determined by a blend factor. Table 42 indicates the supported blending levels.

Also color blending on the pixel level is supported: this feature is available for the bitmap displays only. If the color blending is enabled, the amount of blending of each pixel is determined by the LSB of the chrominance components of the pixel itself: in other words, the blend factor of a pixel corresponds to the LSB of the Cb and Cr values that are stored in the CLUT entry corresponding to that pixel. As shown in Table 42, the window blending supports 16 different levels, whereas the color blending can support either 4 or 16 levels, according to the selected blending mode. Actually, only four levels of blending are displayed exactly for each pixel: these four main level are those corresponding to the ratios 25%, 50%, 75% and 100% of OSD window contribution. The other levels are achieved by mixing the four main blending levels in every 2×2 pixel square area of the display. The resulting effect should approximate the real 16 level blending. Error! Reference source not found. shows an example of the blending technique.

TABLE 42

Blending Levels

| Blending Type | Window Blend Factor | Cb[0] | Cr[0] | Cr[0] | Cr[0] | OSD window contribution | MPEG Video contribution |
|---|---|---|---|---|---|---|---|
| NoBlend | don't care | don't care | don't care | don't care | don't care | 1 | 0 |
| ColorB4 | don't care | 0 | 0 | don't care | don't care | ¼ | ¾ |
| ColorB4 | don't care | 0 | 1 | don't care | don't care | ½ | ½ |
| ColorB4 | don't care | 1 | 0 | don't care | don't care | ¾ | ¼ |
| ColorB4 | don't care | 1 | 1 | don't care | don't care | 1 (Opaque) | 0 |
| ColorB16 | don't care | 0 | 0 | 0 | 0 | 1/16 | 15/16 |
| ColorB16 | don't care | 0 | 0 | 0 | 1 | ⅛ | ⅞ |
| ColorB16 | don't care | 0 | 0 | 1 | 0 | 3/16 | 13/16 |
| ColorB16 | don't care | 0 | 0 | 1 | 1 | ¼ | ¾ |
| ColorB16 | don't care | 0 | 1 | 0 | 0 | 5/16 | 1/16 |
| ColorB16 | don't care | — | — | — | — | — | — |
| ColorB16 | don't care | 1 | 1 | 1 | 1 | 1 (Opaque) | 0 |
| WindowB16 | 0 | don't care | don't care | don't care | don't care | 1/16 | 15/16 |
| WindowB16 | $0 \leq N \leq 15$ | don't care | don't care | don't care | don't care | (N + 1)/16 | (15 − N)/16 |
| WindowB16 | 15 | don't care | don't care | don't care | don't care | 1 (Opaque) | 0 |

The hardware also supports a transparency mode with bitmap, graphic 4:4:4 or 4:2:2 displays. If transparency is enabled, then any pixel on the graphic or bitmap display that's value is 0, will allow video to be displayed. Essentially, 0 valued pixels are considered the transparent color, i.e. the MPEG video underneath or the background color will show through the bitmap.

Table 43 shows the connection between transparency and blending on the same window.

TABLE 43

Blending and Transparency

| Transparency Enable | Blending Type | Window Blend Factor | OSD window contribution | MPEG Video contribution |
|---|---|---|---|---|
| 0 | NoBlend | don't care | 1 | 0 |
| 0 | ColorB4 | don't care | depending on $Cb_0$ and $Cr_0$ | depending on $Cb_0$ and $Cr_0$ |
| 0 | ColorB16 | don't care | depending on $Cb_0$, $Cr_0$, $Cb_1$, $Cr_1$ | depending on $Cb_0$, $Cr_0$, $Cb_1$, $Cr_1$ |
| 0 | Window B16 | 0 + 15 | depending on blend factor | depending on blend factor |
| 1 | NoBlend | don't care | 0 if pixel value = 0<br>1 if pixel value = 0 | 1 if pixel value = 0<br>0 if pixel value ≠ 0 |
| 1 | ColorB4 | don't care | 0 if pixel value = 0<br>else<br>depending on $Cb_0$ and $Cr_0$ | 1 if pixel value = 0<br>else<br>depending on $Cb_0$ and $Cr_0$ |
| 1 | ColorB16 | don't care | 0 if pixel value = 0<br>else<br>depending on $Cb_0$, $Cr_0$, $Cb_1$, $Cr_1$ | 1 if pixel value = 0<br>else<br>depending on $Cb_0$, $Cr_0$, $Cb_1$, $Cr_1$ |
| 1 | Window B16 | 0 + 15 | 0 if pixel value = 0<br>else<br>depending on blend factor | 1 if pixel value = 0<br>else<br>depending on blend factor |

OSD Internal Data Structures
Type Definitions
OSDParams: defines the parameters stored in the OSD SRAM used by the OSD hardware display module.

Actually, this is an exact copy of window attribute area inside the OSD SRAM.

```
typedef struct {
    uchar   NOTUSED0;
    uchar   wPalBaseAddr;           /* Base Address of Palette if used*/
    int     RESERVED:          2;   /* For future use */
    int     wBlendLevel:       4;   /* See Table 42: Blending Levels */
    int     fBlend:            2;   /* Blending Mode */
    int     wChannelControl:   2;   /* Table 29: Channel Control Modes */
    int     fTransparency:     1;   /* Transparency enable */
    int     win_mode:          5;   /* Hardware window mode */
    word *  wDispBaseAddr;          /* Word addr. of display: 21 bits */
    word    cbitDisplayLength;      /* Length of display in bits: 20 bits */
    word    line_ptr;               /* line_ptr (internal use only)
*/
} OSDParams;
```

```
typedef struct {
    uint        idDisplay;          /* Display Number or ID */
    DISPTYPE    dtype;
    OSDParams   osdData;            /* OSD Data that is used by hardware */
    OSDPalette  *ppal;              /* Palette data if necessary */
    OSDCoords   coords;             /* coordinates of display */
    word        pixDisplayLength;   /* display length in pixels */
    memtype     mt;                 /* memory where disp. is stored */
    Buffer      bufDisplay;         /* copy of the disp. Buffer entry pt */
    Buffer      bufAPI;             /* copy of the API Buffer Entry pt */
} OSDDisplay;
```

TABLE 44

Channel Control Modes

| ucChannelControl | | Bit 1: Digital | Bit 0: NTSC/PAL |
|---|---|---|---|
| Value | Binary | Video Output | Encoder |
| 0 | 0 0 | Disabled | Disabled |
| 1 | 0 1 | Disabled | Enabled |
| 2 | 1 0 | Enabled | Disabled |
| 3 | 1 1 | Enabled | Enabled |

OSDDisplayCoord: Defines the upper left and bottom right coordinates of a hardware display. The units of the coordinates are in pixels. The coordinates must be even valued. Only the coordinates of the upper-left corner of the display must correspond to a point inside the video screen. Also, the horizontal size and vertical size of a display cannot be greater than the corresponding dimension of the screen (720×480).

```
typedef struct {                 (pixX0,
    uint pixX0;
    uint pixY0;
    uint pixX1;
    uint pixY1;
} OSDDispCoords;
                                                (pixX1,
```

OSDDisplay: Defines all the parameters required to maintain a Hardware Display.

OSDPalette: Defines the required attributes for a palette. This data structure is filled in before being passed to the cltNewPalette( ) function.

```
typedef struct {
    uchar         clutoffset;  /* base address of palette */
    OSDPaltype paltype;        /* Type of Palette */
    word          *pcolors;    /* Pointer to a list of colors */
    Buffer        *pbuf;       /* pointer to a storage area */
} OSDPalette;
``` where:

| | |
|---|---|
| clutoffset | 0<=clutoffset<256. Index into CLUT table where palette table begins |
| paltype | The type of palette being created. This is may be only one of the enumerated data types, either Pal1Bit, Pal2Bit, Pal4Bit, or Pal8Bit. This parameter indicates the number of entries that are stored in for this palette. |
| pcolors | If pcolors == NULL, then use the colors already stored in the CLUT, otherwise pcolors points to an array of uint's of the length stored in paltype. |
| pbuf | Pointer to storage area created by application. This is used for internal firmware consumption. |

Note:
One color is stored in a 32 bit memory cell: the leading 8 MSB are undefined and the following three bytes contains the color definition, according to the CCIR-601/CCIR-656 specifications.

Color Lookup Table Management API

All Color Lookup Table Management API (Table 45) functions are prefixed by the clt mnemonic. Error! Reference source not found. briefly describes what functions are provided by the circuit 200 firmware for palette management. In general, the firmware will provide the capability to create new palettes, assign palettes to bitmap displays, and change individual colors within a specified palette.

In this section all the API routines are defined.

cltQueryPaletteStorage: it returns the number of words that the application must allocate before creating a new color palette structure.

Syntax:
    word cltQueryPaletteStorage (OSDPaltype paltype);

cltNewPalette: this function creates a new palette structure. The palette is stored in the memory buffer that has been previously created by the application. The parameters that identifies the palette are the number of colors and, eventually, the index into the CLUT where the palette begins.

Syntax:
    HPALETTE cltNewPalette (OSDPaltype paltype, uchar clutoffset, Buffer *pbuf);

cltFreePalette: it deletes a color palette structure.

Syntax:
    FERROR cltFreePalette (HPALETTE hpalette);

cltSetDisplayPalette: it associates a color palette to a window. This window could be either an active display or a virtual display.

Syntax:
    FERROR cltSetDisplayPalette (HDISPLAY hDisplay, HPALETTE hpalette);

cltGetDisplayPalette: this functions returns the handler of the color palette that is attached to a window.

Syntax:
    HPALETTE cltGetDisplayPalette (HDISPLAY hDisplay);

cltSetPaletteColors: it copies an array of colors in the CLUT. The number of colors to be copied and the CLUT offset where the colors have to be copied are defined by the palette structure.

Syntax:
    FERROR cltSetPaletteColors (HPALETTE hpalette, word *pcolors);

cltGetPaletteColors: this function reads the colors stored in the CLUT. The number of colors to be read and the CLUT offset where the colors have to be read are defined by the palette structure Syntax:
    FERROR cltGetPaletteColors (HPALETTE hpalette, word *pcolors);

cltSetOneColor: it writes one color in the CLUT. The address id defined by the CLUT offset of the color palette and by the color index inside the palette.

Syntax:
    FERROR cltSetOneColor (HPALETTE hpalette, word color, uchar index);

cltGetOneColor: it reads one color in the CLUT. The address id defined by the CLUT offset of the color palette and by the color index inside the palette.

Syntax:
    FERROR cltGetOneColor (HPALETTE hpalette, word *color, uchar index);

cltGetPaletteType: this function returns the type (number of colors) of a color palette. If the return value is zero, the palette structure is incorrect.

Syntax:
    OSDPaltype cltGetPaletteType (HPALETTE hpalette);

cltPalTypeRequire: this function returns the palette type required by a window display. If the display does not require a palette structure (for example, it is a video display or a YCrCb display), the return value is zero.

Syntax:
    OSDPaltype cltPalTypeRequire (HDISPLAY hdisplay);

TABLE 45

Color Lookup Management API

| Name | Description |
|---|---|
| cltQueryPaletteStorage( ); | Determine how many words of memory are required by cltNewPalette( ) |
| cltNewPalette( ) | Creates a color palette |
| cltDeletePalette( ) | Delete a color palette |
| cltSetDisplayPalette( ) | Attach or assign a color palette to a bitmap display |
| cltGetDisplayPalette( ) | Determine what palette is defined for a bitmap display |
| cltSetPaletteColors( ) | Change the set of colors for a given palette. |
| cltGetPaletteColors( ) | Return an array of colors from a given palette. |

TABLE 45-continued

Color Lookup Management API

| Name | Description |
| --- | --- |
| cltSetOneColor( ) | Change one color entry for a given palette. |
| cltGetOneColor( ) | Return one color entry from a given palette. |
| cltGetPaletteType( ) | Retrieves the palette type. Valid types are defined in OSDPaltype |
| cltPalTypeRequire( ) | Find the palette type needed by a window display |

Following is a brief description of some of the color lookup table API commands.

cltQueryPaletteStorage( )

Syntax word cwPalBuffer=cltQueryPaletteStorage(OSDPaltype paltype);

where:

paltype The type of palette to query for, as defined by one of the entries in OSDPaltype.

Returns cwPalBuffer, Number of words application should malloc( ) for use in allocating internal storage for palette as required by palette defined by pal.

Description cltQueryPaletteStorage( ) is used to determine how many words of memory are required by cltNewPalette( ).

Algorithm

Actually, the return value is constant, since the memory storage area does not depend on the number of colors.

Example

HPALETTE hPalette;

word cwpalMemSize;

/* Allocate Memory Required by firmware to maintain palette information */ cwpalMemSize=cltQueryPaletteStorage(Pa2Bit);

See Also cltNewPalette( )

cltDeletePalette( )

cltNewPalette( )

Syntax

HPALETTE hPalette=cltNewPalette(OSDpaltype paltype, uchar clutoffset, Buffer *pbuf);

where:

| paltype | The type of palette being created |
| --- | --- |
| clutoffset | offset into hardware palette to define new palette. |
| pbuf | workspace area created by the user application for internal storage. |

Returns hPalette, A handle value returned by cltNewPalette( ) that identifies the firmware hardware palette with application software.

If hPalette==NULL, then an error occurred.

Possible error conditions are:

1. invalid palette type.

2. invalid offset.

Description cltNewPalette( ) creates a palette of type paltype.

Example

HPALETTE hPalette;

word *palmem;

Buffer buffer;

/* Allocate memory for palette */ buffer.cwBufferSize=cltQueryPaletteStorage(Pal2Bit);

buffer.pbuffer=(word *) malloc (buffer.cwBufferSize * sizeof(word));

/* Create Palette */ hPalette=cltNewPalette(Pal2Bit, 8, &buffer);

See Also cltQueryPaletteStorage( )

cltFreePalette( )

Syntax

FERROR fError=cltFreePalette(HPALETTE hPalette, Buffer *pbuf);

where:

hPalette A handle identifying a palette created by cltNewPalette( ).

pbuf The internal buffer storage structure that was created by cltNewPalette

Description

This function frees up the memory associated with the creation of hPalette. The application software is responsible for cleaning up the memory stored in pbuf.

It will return 0, if no errors occurred, and a non-zero value if an error occurred.

The application software is required to ensure that no hardware windows are using the palette before it is freed. This routine will not change any values in the CLUT table.

Example

Buffer buffer;

/* The deletion of a palette must be the same as the creation—a two part process. */ cltFreePalette(hPalette, &buffer);

free(buffer.pBuffer);

See Also cltNewPalette( )

cltSetDisplayPalette( )

Syntax

FERROR fError=cltSetDisplayPalette(HDISPLAY hDisplay, HPALETTE hPalette);

where:

hDisplay: handle to a display hPalette: handle to palette being used for hardware display indicated by hDisplay Returns fError=0, No Errors Possible error conditions are:

1. the palette does not correspond to the display type.

Description

This function will attach a palette indicated by hPalette to a hardware display indicated by hDisplay. If the display is not a bitmap display, the function will have no effect. A non-zero value will be returned if an error occurs.

In order to reduce visible artifacts that may be caused by changing the OSD palette, the change should only take place when the display is inactive, or during the vertical blanking interval.

See Also cltGetDisplayPalette( )

cltGetDisplayPalette( )

Syntax

HPALETTE hPalette=cltGetDisplayPalette(HDISPLAY *phDisplay);

where:
    phDisplay Pointer to a Display Handle.
Returns
    hPalette, the palette associated with phDiplay.
Description
    cltGetDisplayPalette( ) returns a handle to the palette attached to the hardware display indicated by phDisplay.
See Also
    cltSetdisplayPalette( )
cltSetPaletteColors( )
Syntax
    FERROR fError=cltSetPaletteColors(HPALETTE hPalette, word *pcolors);
where
    hPalette Handle to a palette
    pcolors An array of color values;
Returns
    fError=0, No Errors
    Possible error conditions are:
        1. invalid palette parameters
Description
    Sets the palette indicated by hPalette with the colors in pcolors. These colors will overwrite any other colors that were stored in the OSD for this palette.
    The actual writing of the color data to the OSD palette memory should be restricted to the vertical blanking interval to reduce visual artifacts.
Example

---

HPALETTE hPalette;
OSDPaltype paltype;
word pcolorset[4] = [YELLOW, BLACK, WHITE, BLUE];
hPalette = cltGetPalette(&hDisplay);
/* Paltype will tell us how many entries are in this palette, so we know how many colors to set. */
paltype = cltGetPaletteType(&hPalette);
if (paltype == Pal2Bit) {/* paltype is valid, i.e. this is a 2 bit CLUT,
                                    which requires four colors */
    cltSetPaletteColors(hPalette, pcolorset);
}

---

See Also
    cltGetPalette( )
    cltGetPaletteType( )
cltSetOneColor( )
Syntax
    FERROR fError=cltSetOneColor(HPALETTE hPalette, word color, uchar index);
where
    hPalette Handle to a palette
    colors The color value;
    index The offset of the color inside the palette.
Returns
    fError=0, No Errors
    Possible error conditions are:
        1. invalid palette parameters
        2. invalid index
Description
    Sets one entry in palette indicated by hPalette. This color will overwrite the color that was stored in the CLUT.
    The actual writing of the color data to the OSD palette memory should be restricted to the vertical blanking interval to reduce visual artifacts.

Example

---

HPALETTE hPalette;
OSDPaltype paltype;
word color = YELLOW;
unsigned char index = 2;
hPalette = cltGetPalette(&hDisplay);
/* Paltype will tell us how many entries are in this palette, so we now how many colors to set. */
paltype = cltGetPaletteType(&hPalette);
if (paltype == Pal2Bit) {/* paltype is valid, i.e. this is a 2 bit CLUT,
                                    which requires four colors */
    cltSetOneColor(hPalette, color, index); /* set the third palette entry */
}

--- cltGetPaletteColors( )
Syntax
    FERROR fError=cltGetPaletteColors(HPALETTE hPalette, word *pcolors);
where
    hPalette handle to a palette
    pcolors array of color values
Returns
    fError=0, No Error
    Possible error conditions are:
        1. invalid palette parameters
Description
    cltGetPaletteColors( ) will copy all of the colors for the palette indicated by hPalette into the array indicated by pcolors. Note that pcolors is not a pointer to the internal colors array, so changing the values in pcolors once cltGetPaleteColors( ) has completed will not change the palette colors.
Example
    word pcolors[4];
    HPALETTE *hpalette;
    OSDPaltype paltype;
    hPalette=cltGetPalette(hDisplay);
    paltype=cltGetPalettetype(hPalette);
    if (if paltype==Pal2Bit) {
        cltGetPaletteColors(hPalette, pcolors);
    }
See Also
    cltSetPaletteColors( )
cltGetOneColor( )
Syntax
    FERROR fError=cltGetOneColor(HPALETTE hPalette, word *pcolor, uchar index);
where
    hPalette handle to a palette
    pcolors the pointer to the color value
    index the offset of the color inside the palette.
Returns
    fError=0, No Error
    Possible error conditions are:
        1. invalid palette parameters
        2. invalid index
Description
    cltGetPaletteColors( ) will copy the color for the palette indicated by hPalette into the variable pointed by pcolor.
Example
    word *pcolor;
    HPALETTE *hpalette;

```
OSDPaltype paltype;
uchar index=3;
hPalette=cltGetPalette(hDisplay);
paltype=cltGetPalettetype(hPalette);
if (if paltype==Pal2Bit) {
    cltGetPaletteColors(hPalette, pcolor,index);
}
``` cltGetPaletteType( )

Syntax

OSDPaltype paltype=cltGetPaletteType(HPALETTE hPalette);

where hPalette Handle to a palette

Returns paltype: A palette type as defined by OSDpaltype.

Description cltGetPaletteType( ) returns the type of palette indicated by hPalette.

Hardware Display Management Software Architecture

The hardware display management (hdm) is responsible for controlling the OSD windowing hardware of the circuit 200. This document uses the term hardware display instead of hardware window to describe one of the eight OSD hardware controlled windows. This is because from a software perspective, one can have many "windows" in a hardware display.

The hdm is responsible for maintaining all hardware displays. There are three main types of displays: bitmap, graphic, and video. They are outlined in Table 46.

TABLE 46

Display Types

| Bitmap | Graphic | Video |
|---|---|---|
| 1 bit | CbYCr 4:2:2 | Full Size |
| 2 bit | CbYCr 4:4:4 | Half Size Decimated |
| 4 bit | CbYCr 4:4:4 HR | Quarter Size Decimated |
| 8 bit | | Eighth Size Decimated |
| 1 bit HR | | |
| 2 bit HR | | |
| 4 bit HR | | |
| 8 bit HR | | |

Each Display has an associated list of attributes that describe its characteristics. Table 47 defines the attributes for each of the three display types.

TABLE 47

Display Attributes

| Attribute | Bitmap | Graphic | Decimated Video | Full Screen Video |
|---|---|---|---|---|
| id | Yes | Yes | Yes | No |
| Coordinates | Yes | Yes | Yes | No |
| fVisibility | Yes | Yes | Yes | No |
| fTransparency | Yes | Yes | No | No |
| fBlend | Yes | Yes | No | No |
| BlendFactor | Yes | Yes | No | No |
| Channel Control | Yes | Yes | No | No |
| ColorBlend | Yes | No | No | No |
| Palette | Yes | No | No | No | id: The id attribute has three different meanings:

If the display is viewable, then the id corresponds to a value $0 \leq id < 8$. In this case it indicates the Z-plane level of the display.

If the display is a virtual display. then the $id \geq 8$.

If the display is a full screen MPEG display, then id value is not significant.

Note that a viewable decimated MPEG video display would have a value corresponding to its Z-plane.

Coordinates: The top left (x0,y0) and bottom corner (x1,y1) coordinates of the display. Due to hardware limitations there are a few constraints on where a display may be positioned. For all displays:

x0 must be an even pixel
    x1 must be an odd pixel
    x0<720
    y0<480
    x1−x0<720
    y1−y0<480

If the display is a decimated video display, then also:

y0 must start on an even pixel
    y1 will always be odd (because decimated display heights are always even).

fVisibility: Defines whether or not the display is viewable or not.

fTransparency: Indicates whether or not transparency is enabled for that display. The fTransparency attributes works for all bitmap and graphic displays.

fBlend: Indicates whether or not window blending is enabled for that display. The fBlend attribute works for all bitmap and graphic displays. It contains the two bits that identify the blending mode.

If blending and transparency are enabled, then when that display overlays a video image, 0 valued pixels will be transparent, and all other pixels will be blended with the video.

BlendFactor: Determines how much to blend the graphic or bitmap display with the video display (window blending). See Table 48.

TABLE 48

Blend Factors*

| Blend Factor | OSD Window Contribution | MPEG Video Contribution |
|---|---|---|
| 0 | *1/16* | *15/16* |
| 1 | 1/8 | 7/8 |
| 2 | *3/16* | *13/16* |
| 3 | 1/4 | 3/4 |
| 4 | *5/16* | *11/16* |
| 5 | 3/8 | 5/8 |
| 6 | *7/16* | *9/16* |
| 7 | 1/2 | 1/2 |
| 8 | *9/16* | *7/16* |
| 9 | 5/8 | 3/8 |
| 10 | *11/16* | *5/16* |
| 11 | 3/4 | 1/4 |
| 12 | *13/16* | *3/16* |
| 13 | 7/8 | 1/8 |
| 14 | *15/16* | *1/16* |
| 15 | 1 (Opaque) | 0 |

*the bold values corresponds to the main blending levels.
*the italics values are achieved by mixing the main levels.

ChannelControl: Every hardware display except for VIDEO displays have a ChannelControl attribute. This attribute defines which output ports the OSD information will be displayed. Table 49 defines the valid values for this attribute.

ColorBlend: Indicates whether or not color blending is enabled for that display. The ColorBlend attribute works for all bitmap displays.

If blending and transparency are enabled, then when that display overlays a video image, 0 valued pixels will be transparent, and all other pixels will be blended according to the LSBs of Cb and Cr.

TABLE 49

Channel Control Modes

| ChannelControl | | | Bit 1: Digital | Bit 0: NTSC/PAL |
|---|---|---|---|---|
| Value | Binary | | Video Output | Encoder |
| 0 | 0 | 0 | Disabled | Disabled |
| 1 | 0 | 1 | Disabled | Enabled |
| 2 | 1 | 0 | Enabled | Disabled |
| 3 | 1 | 1 | Enabled | Enabled |

Palette: The palette attribute is used by bitmap displays to define a set of 24-bit CbYCr color values for a set if bitmap index values.

OSD Memory Interface

TABLE 51 win_attr bit Layout

| Attribute | Number of Bits | Bit Position |
|---|---|---|
| win_mode | 5 | [4:0] |
| trans_en | 1 | [5] |
| disp_ch_cntl | 2 | [7:6] |
| blend_en | 2 | [9:8] |
| blend_factor | 4 | [13:10] |
| RESERVED | 5 | [15:14] |
| bm_baseaddr | 8 | [23:16] |

TABLE 50

OSD Memory Map

| Name | memtype | Width (bits) | Address Begin | Address End |
|---|---|---|---|---|
| OSD_Cursor | REG | 5 | 0000 | 0000 |
| OSD_BG_color | REG | 24 | 0001 | 0001 |
| OSD_Win_En_Mask | REG | 8 | 0002 | 0002 |
| OSD_mpegVideo_Enable | REG | 1 | 0003 | 0003 |
| OSD_Num_Sorted_X | REG | 4 | 0004 | 0004 |
| OSD_digv_444 | REG | 1 | 0005 | 0005 |
| OSD_Dec_Y1 | REG | 30 | 0006 | 0006 |
| OSD_Dec_YOY1 | REG | 30 | 0007 | 0007 |
| OSD_Dec_XOYOY1 | REG | 30 | 0008 | 0008 |
| OSD_XY | CAM | 11 | 0100 | 011F |
| Palette | SRAM | 24 | 0200 | 02FF |
| Window 0 Attributes | SRAM | | 0300 | 0303 |
| win_attr | | 24 | 0300 | 0300 |
| win_base_addr | | 21 | 0301 | 0301 |
| line_offset | | 20 | 0302 | 0302 |
| line_ptr | | 20 | 0303 | 0303 |
| Window 1 Attributes | SRAM | | 0304 | 0307 |
| Window 2 Attributes | SRAM | | 0308 | 030B |
| Window 3 Attributes | SRAM | | 030C | 030F |
| Window 4 Attributes | SRAM | | 0310 | 0313 |
| Window 5 Attributes | SRAM | | 0314 | 0317 |
| Window 6 Attributes | SRAM | | 0318 | 031B |
| Window 7 Attributes | SRAM | | 031C | 031F |
| OSD_addr_stk | SRAM | 21 | 0320 | 032F |
| osd_dsbs_stk | SRAM | 15 | 0330 | 033F |
| OSD_BG_color | SRAM | 24 | 034E | 034E |
| OSD_Wide_Id | SRAM | 24 | 034F | 034F |
| OSD_sorted_X | SRAM | 20 | 0350 | 0357 |
| OSD_FIFO | FIFO | 32 | 0400 | 043F |

TABLE 52 win_mode bit Layout

| Graphic Format [4:3] | | Resolution/Mode [2] | | Component/Video Size [1:0] | |
|---|---|---|---|---|---|
| 00 | Bitmap | 0 | Full Res | 00 | 1-Bit |
| 01 | 4:2:2 | 1 | Half Res | 01 | 2-bit |
| 10 | 4:4:4 | 0 | Dec_win | 10 | 4-bit |
| 11 | MPEG or cursor | 1 | Cursor | 11 | 8-bit |
| | | | | 00 | full |
| | | | | 01 | 1/2 |
| | | | | 10 | 1/4 |
| | | | | 11 | 1/8 |

TABLE 53

All Valid win_mode Displays

| Win_mode | Description |
|---|---|
| 00_0_00 | BM Full-Res 1-bit/pixel |
| 00_0_01 | BM Full-Res 2-bit/pixel |
| 00_0_10 | BM Full-Res 4-bit/pixel |
| 00_0_11 | BM Full-Res 8-bit/pixel |
| 00_1_00 | BM Half-Res 1-bit/pixel |
| 00_1_01 | BM Half-Res 2-bit/pixel |
| 00_1_10 | BM Half-Res 4-bit/pixel |
| 00_1_11 | BM Half-Res 8-bit/pixel |
| 01_0_11 | 422 Full-Res |
| 10_0_11 | 444 Full-Res |
| 10_1_11 | 444 Half-Res |
| 11_0_00 | MPEG Video - full size |
| 11_0_01 | MPEG Video - 1/2 Decimation |
| 11_0_10 | MPEG Video - 1/4 Decimation |
| 11_0_11 | MPEG Video - 1/8 Decimation (if supported) |
| 11_1_XX | Cursor |

Hardware Display Management API

All hardware window management API functions are prefixed with hdm. Table 54 describes the functionality of the API. In general, the API allows an application to create hardware windows, move them around on the screen a set their Z plane order.

TABLE 54

Hardware Display Management API

| Name | Description |
|---|---|
| hdmGetVideoCoords() | Determine what the coordinates are for a VIDEO display given the upper left corner x,y coordinates. |
| hdmQueryIntAPIStorageReq() | Determine how many words of memory are required for internal data storage required by hdmNewDisplay(). |
| hdmQueryDisplayBufferSize() | Returns how many words of memory are required to store the frame buffer for a given hardware display. |
| hdmNewDisplay() | Defines a new OSD display. |
| hdmDeleteDisplay() | Deletes display from firmware management, and returns pointers to allocated memory that may be freed by application. |
| hdmSetVisibility() | Sets the visibility of one display to be either on or off. |
| hdmGetVisibility() | Returns the current visibility status of all hardware displays. |
| hdmSet Coords() | Sets the position and size of a hardware window to a specified pair of coordinates. |
| hdmGetCoords () | Get the current coordinate pairs (top left and bottom right) of a specified hardware window. |
| hdmSetBlendEnable() | Set the window blending mode |
| hdmGetBlendEnable() | Get the current status of the window blending mode |
| hdmSetBlendFactor() | Set the blending factor |
| hdmGetBlendFactor() | get the current status of the blending factor |
| hdmSetTransparencyEnable() | Set the transparency mode on or off |
| hdmGetTransparencyEnable() | get the current status of the transparency mode |
| hdmSetChannelControl() | Set the channel control |
| hdmGetChannelControl() | get the current status of the channel control |
| hdmSetZOrder() | Set the Z plane order of a hardware window |
| hdmGetZOrder() | Determine the current Z plane order of a hardware window. |
| hdmInit() | Initializes hdm API. Among other things, this where the application informs the firmware how much SDRAM to use. |
| hdmSetBackGroundColor() | Sets the background color for NTSC/PAL screen |
| hdmGetBackGroundColor() | Gets the background color for NTSC/PAL screen |
| hdmVerifyCoords() | Verify the correctness of a set of coordinates |
| hdmSwapDisplay() | Swap the Z plane values of two displays |

The application software is required to manage the memory where the hardware displays are stored. Note that only displays that are in SDRAM may be actually rendered to the display.

Following are further explanations of some of the function above.

hdmGetVideoCoords( )

Syntax

STATUS status=hdmGetVideoCoords(disptype dtype, word pixX, word pixY,OSDCoords *pcoords)

where dtype The display type. Valid display types are VIDEO, VIDEOHSIZE, VIDEOQSIZE and VIDEOESIZE pixX The X coordinate of the upper left corner of the video, in pixels pixY The Y coordinate of the upper left corner of the video, in pixels.

pcoords The coordinate data structure that defines the upper left and bottom right corners of the video display.

Returns status The error condition. Possible return value are

E_NONE: no error

E_ERROR: invalid display type

E_HDM_ADJUSTED_VIDEO_DIM: the coordinates of the upper left corner have been changed by the routine.

Description hdmGetVideoCoords( ) determines what the upper left and bottom right x,y coordinate pairs are based upon the video display type, and the upper left corner x,y input parameters. If the dtype is VIDEOHSIZE, then the coordinates for a half resolution video display will be returned. If the dtype is VIDEOQSIZE, then the coordinates for a quarter resolution video display will be returned.

The value of pixX and pixY must be even. If disptype is VIDEO, pixX and pixY must be zero.

If the value of pixX1 or the value or pixY1 are greater than the screen size, the window is not cropped: in this case the return values of the coordinates are, respectively, the maximum X size or Y size of the screen: the coordinates of the upper-left corner are adjusted in order to verify the display width and height.

See Also hdmNewDisplay( )

hdmQueryIntAPIStorageReq( )

Syntax word cwDispBuffer=hdmQueryIntAPIStorageReq (disptype dtype);

where dtype The type of hardware display window as defined by disptype

Returns cwDispBuffer Number of words required for allocating internal memory for the hardware display indicated by dtype.

Description hdmQueryIntAPIStorageReq( ) returns back the number of words (32 bit) that are required for internal data structure storage to maintain a display context.

Example disptype dtype;

cwDisplayMemory=hdmQueryIntAPIStorageReq (YCRCB444);

See Also hdmNewDisplay( )

hdmQueryDisplayBufferSize( )

Syntax word cwDisplay=hdmQueryDisplayBufferSize (OSDCoords coords, disptype dtype);

where coordsThe coordinates of the hardware display.

dtype The type of display, as defined by the disptype type.

Returns cwdispay: Number of words required to allocate for the hardware display dtype.

If an error occurs, cwdisplay returns 0.

Description hdmQueryDisplayBufferSize( ) returns the number of words (32 bit) required to allocate a frame buffer for the hardware display indicated by dtype.

See Also hdmNewDisplay( )

hdmNewDisplay( )

Syntax
STATUS status=hdmNewDisplay(Buffer *pbufData, memtype mem, Buffer *pbufDisp,
DISPTYPE dtype, OSDCoords *plocation, word id, HDISPLAY *hDisplay);
where

| | |
|---|---|
| pbufDisp | Pointer to the buffer for the display frame buffer |
| mem | Type of memory that the frame buffer is located in, either SDRAM or EBIF DRAM |
| pbufData | A pointer to internal memory that is required to maintain this display by the firmware. |
| dtype | The type of hardware display being created |
| location | The coordinates specifying the size and location of the display. |
| id | The ID of the display. It is also is related to the Zplane ordering of the displays. an ID of 0–7 corresponds to the zplane of the display. |
| hDisplay | The returned display handler |

Returns status The error condition. Possible return value are

E_NONE: no error.

E_HDM_MAX_PHYSICAL_EXCEEDED: the application tried to create more than eight physical displays. A virtual display is created instead of a physical one.

E_MEMORY_TYPE_INCORRECT: the application tried to create a physical display with the display buffer stored in the external memory. A virtual display is created instead of a physical one.

E_HDM_DISPLAY_BUSY: the application tried to create a physical display with the same ID of another active display. A virtual display is created instead of a physical one.

E_HDM_VIDEO_DISPLAY_EXCEEDED: the application tried to create more than one video display (either decimated or full screen). A virtual display is created instead of a physical one.

Description

This function creates a new display of type dtype. For details on how to create different displays, see the examples below.

Note: No check is executed on the display coordinates: invalid parameters can cause strange artifacts on the screen.

If disptype is VIDEO, the display ID and the coordinates are ignored.

If disptype is CURSOR, the display ID is ignored: its value is automatically set to 0.

The display is created with the following default parameters:

Blending: DISABLED

Blending Level: 3

Transparency: DISABLED

Channel Control: 3 (ALL OUTPUT ENABLED)

Palette Handler: NULL (no palette)

Visibility: OFF

In order to reduce visible artifacts that may be caused by changing the OSD memory, this function should only take place during the vertical blanking interval.

Example 1, Creating a YCRCB444 Display

HDISPLAY hDisplay

OSDCoords coords;

Buffer bufdisp, bufapi;

STATUS status

/* Define the Size and location of the window by specifying the upper left and bottom right coordinates. */ coords.pixX0=50; /* Must be an even pixel */ coords.pixY0=100;

coords.pixX1=251;/* must be an odd pixel */ coords.pixY1=201;

/* Determine Size of Buffer and allocate memory for it. The malloc( ) routine would probably be replaced with some kind of dependent routine that would allocate memory in SDRAM or EBIF DRAM depending upon where the user wanted the frame buffer

*/ bufdisp.cwBuffer=hdmQueryDisplayBufferSize(coords, YCRCB444);

bufdisp.pBuffer=(word *) malloc(bufdisp.cwBuffer * sizeof(word));

/* Allocate internal memory needed for handling this hardware display */ bufapi.cwBuffer= hdmQueryIntAPIStorageReq(YCRCB444);

bufapi.pBuffer=(word *) malloc (bufapi.cwBuffer * sizeof(word));

```
status=hdmNewDisplay(&bufapi, SDRAM, &bufdisp,
    YCRCB444, coords, 1, &hDisplay);
```
Example 2, Creating an MPEG Video Display This next example shows how an MPEG video window is created using this API call.

```
HDISPLAY hDisplay;
OSDCoords coords;
Buffer bufapi;
/* get coordinates for half size MPEG video display *?
   coords=hdmGetVideoCoords(VIDEOHSIZE,10,10);
/* find out how much memory is required for internal
   storage        */     bufapi.cwBuffer=
   hdmQueryIntAPIStorageReq(VIDEOHSIZE);
/* allocate internal API memory */ bufapi.pBuffer=(word
   *) malloc (cwAPIMemory * sizeof(word));
/* Allocate Display */ status=hdmNewDisplay(&bufapi,
   SDRAM, NULL, VIDEOHSIZE, coords, 3,
   &hDisplay);
```
hdmDeleteDisplay( )

Syntax
FERROR  fError = hdmDeleteDisplay(HDISPLAY hDisplay, Buffer *pbufdisp, Buffer *pbufapi);
where
    hDisplay    Handle to a hardware display
    pbufdisp    A pointer to a Buffer data structure containing the pointer to the starting address of the display memory that was allocated by the user application, and the length of memory that was allocated.
    pbufapi    A pointer to a Buffer data structure containing the pointer to the starting address of the storage memory required by hdmNewDisplay( ), and the length of that buffer.

Returns
    fError=0, No Errors
    Possible error conditions are:
        1. invalid display handler
Description
    hdmDeleteDisplay( ) deletes the display indicated by hDisplay and returns the pointers to the memory that was originally created by the user application and passed to the firmware by the hdmNewDisplay( ) API call.
    In order to reduce visible artifacts that may be caused by changing the OSD memory, this function should only take place during the vertical blanking interval.
Example
    Buffer *pbufapi, *pbufdisp;
    hdmDeleteDisplay(hDisplay, pbufapi, pbufdisp);
    /* Now, use whatever memory management routines supplied by OS to delete * the memory.
    */
    free(pbufapi.pBuffer);
    free(pbufidsp.pBuffer);
See Also
    hdmNewDisplay( )
hdmSetVisibility( )
Syntax
    FERROR fError=hdmSetVisibility(HDISPLAY hDisplay, on_off switch);
where
    hDisplay Handle to a hardware display switch Either ON or OFF.

Returns
    fError=0, No Errors
    Possible error conditions are:
        invalid display handler
        the display type is VIDEO
        the display is virtual
Description
    hdmSetVisibility( ) controls the visibility of the hardware display indicated by hDisplay.
Example
    /* Enable */
    hdmSetVisibility(hDisplay, ON);
    /* Disable */
    hdmSetVisibility(hDisplay, OFF);
See Also
    hdmGetVisibility( )
hdmGetVisibility( )
Syntax
    on_off switch=hdmGetVisibility(HDISPLAY hDisplay);
Returns
    fStatus contains the visibility status of the display.
    Possible error conditions are:
        invalid display handler
        the display type is VIDEO
        the display is virtual
Description
    hdmGetVisibility( ) returns the current visibility status of the display indicated by hDisplay. This function is only meaningful for the top eight hardware displays, as all other displays are VIRTUAL, and cannot be visible.
See Also
    hdmSetVisibility( )
hdmSetCoords( )
Syntax
    FERROR fError=hdmSetCoords(HDISPLAY hDisplay, OSDCoords coord);
where
    hDisplayHandle to a hardware display coord the new coords of the hardware display.
Returns
    fError=0, No Errors
    Possible error conditions are:
        1. invalid display handler
Description
    hdmSetCoords ( ) changes the coordinates of the hardware display window. This function may be used to move a window around the screen, or to shrink or grow it. If the display type is VIDEO, the coordinates are ignored.
    In order to reduce visible artifacts that may be caused by changing the OSD memory, this function should only take place during the vertical blanking interval.
See Also
    hdmGetCoords
hdmGetCoords( )
Syntax
    OSDCoords coord=hdmGetCoords(HDISPLAY hDisplay);
where
    hDisplayHandle to a hardware display
Returns
    coord the coordinates to the hardware display indicated by hDisplay
Description
    Returns the coordinate pair for the hardware display indicated by hDisplay.

See Also
　hdmSetCoords( )
hdmSetBlendEnable( )
Syntax
　FERROR fError=hdmSetBlendEnable(HDISPLAY hDisplay, OSDBlendType blendmode);
where
　hDisplayHandle to a hardware display switch Set blending mode to ON or OFF
Returns
　fError=0, No Errors
　Possible error conditions are:
　　1. invalid display handler
Description
　Set a specific window blending mode for the display indicated by hDisplay. Window blending only works when a graphic 4:4:4, 4:2:2 or bitmap display is selected. Color blending only works for bitmap displays.
See Also
　hdmGetBlendEnable( )
hdmGetBlendEnable( )
Syntax
　OSDBlendType blendmode=hdmGetBlendEnable (HDISPLAY hDisplay);
where
　hDisplayHandle to a hardware display
Returns
　blendmode, the current blending mode for hDisplay.
Description
　hdmGetBlendEnable( ) returns the current window blending mode for the display indicated by hDisplay. Valid modes are indicated by the type OSDBlendType.
See Also
　hdmSetBlendEnable( )
hdmSetBlendFactor( )
Syntax
　FERROR fError=hdmSetBlendFactor(HDISPLAY hDisplay, word factor);
where
　hDisplayHandle to a hardware display factor blending factor for display.
Returns
　fError=0, No Errors
　Possible error conditions are:
　　1. invalid display handler
Description
　hdmSetBlendFactor( ) sets the blending factor for the display indicated by hDisplay. Valid blending factors are listed in Table 42.
See Also
　hdmSetBlendFactor( )
hdmGetBlendFactor( )
Syntax
　word factor=hdmGetBlendFactor(HDISPLAY hDisplay)
where
　hDisplayHandle to a hardware display
Returns
　factor blending factor for display.
Description
　hdmGetBlendFactor( ) returns the current blending factor for the display indicated by hDisplay. Valid blending factors are listed in Table 42: Blending Levels.
See Also
　hdmSetBlendFactor( )
hdmSetTransparencyEnable( )
Syntax
　FERROR fError=hdmSetTransparencyEnable (HDISPLAY hDisplay, on_off flag);
where
　hDisplayHandle to a hardware display flag transparency flag, either ON or OFF.
Returns
　fError=0, No Errors
　Possible error conditions are:
　　invalid display handler
Description
　hdmSetTransparencyEnable( ) sets the transparency mode of the display indicated by hdisplay to either ON or OFF. Transparency mode only works when a bitmap or graphic window is on top of an MPEG video window. It will not work between graphic or bitmap windows. The transparency color for a window is 0. This allows bitmaps or graphic displays with 0 in their image to allow the MPEG video image to show through at those pixel locations.
See Also
　hdmGetTransparencyEnable( )
hdmGetTransparencyEnable( )
Syntax
　on_off switch=hdmGetTransparencyEnable(HDISPLAY hDisplay);
where
　hDisplayHandle to a hardware display
Returns
　switch, the current transparency enable for hDisplay, either ON or OFF.
Description
　hdmGetTransparencyEnable( ) returns the current status of transparency mode for the hardware display indicated by hDisplay in switch, either ON or OFF.
See Also
　hdmSetTransparencyEnable( )
hdmSetChannelControl( )
Syntax
　FERROR fError=hdmSetChannelControl(HDISPLAY hDisplay, word wControl);
where
　hDisplayHandle to a hardware display wcontrol control word for the hardware display
Returns
　fError=0, No Errors
　Possible error conditions are:
　　invalid display handler
Description
　hdmSetchannelControl( ) sets the current out of the hardware display indicated by hDisplay to the output ports defined in Error! Reference source not found.
See Also
　hdmGetChannelControl( )
hdmGetChannelControl( )
Syntax
　word wControl=hdmGetChannelControl(HDISPLAY hDisplay);
where
　hDisplayHandle to a hardware display
Returns
　wControl, the output channel control word for the display hDisplay.

Description
    hdmGetChannelControl( ) returns the current output channel control word as defined in Error! Reference source not found.
See Also
    hdmSetChannelControl( )
hdmSetZOrder( )
Syntax
    FERROR fError=hdmSetZOrder(HDISPLAY hDisplay, uchar wNewOrder);
where
    hDisplay Handle to a hardware display wNewOrder The new Z plane order for the hardware display.
Returns
    fError=0, No Errors
    Possible error conditions are:
        invalid display handler
        the display type is VIDEO or CURSOR
        the display is virtual.
Description
    hdmSetZOrder( ) changes the Z order of the hardware display indicated by hDisplay to the new level in wNewOrder. If the new z-plane level is lower than the current one, then the displays at the new level are increased to fill the vacant slot left by the current level. For example, if the current display is at level 5 and it want to be changed to level 2, then displays 2–4 drop down by one. See Error! Reference source not found. for how this works. The function returns an error when the display is not a physical display or its type is either VIDEO or CURSOR.
    If the new z-plan level is higher than the current one, then the displays at the new level are decreased to fill the vacant slow left by the current level. See Error! Reference source not found. for how this works. hdmSetZorder( ) only works on real OSD hardware windows, not virtual ones.
    In order to reduce visible artifacts that may be caused by changing the OSD memory, this function should only take place during the vertical blanking interval or when the moved displays are not visible.
See Also
    hdmGetZOrder( )
hdmGetZOrder( )
Syntax
    uchar wOrder=hdmGetZOrder(HDISPLAY hDisplay);
where
    hDisplayHandle to a hardware display
Returns
    wOrder, the current Z-plane order of the hardware display, or the virtual display id., if it is a virtual display.
Description
    hdmGetZOrder( ) returns the Z-plane order of the hardware display indicated by hDisplay, or the id. of the display, if it is virtual.
See Also
    hdmSetZOrder( )
hdmInit( )
Syntax
    FERROR fError=hdmInit(void)
Returns
    fError=0, No Errors
Description
    hdmInit( ) initializes the on screen display hardware. It must be called before any hdm commands are called.
hdmSetBackGroundColor( )
Syntax
    FERROR fError=hdmSetBackGroundColor(word bgcolor);
where
    bgcolor background color for the display.
Returns
    error=0, No errors
Description
    hdmSetBackGroundColor( ) sets the background color for the NTSC/PAL display.
See Also
    hdmGetBackGroundColor( )
hdmGetBackGroundColor( )
Syntax
    word bgcolor=hdmGetBackGroundColor(void)
Returns
    bgcolor background color
Description
    hdmGetBackGroundColor( ) returns the current background color of the NTSC/PAL screen.
See Also
    hdmSetBackGroundColor( )
hdmVerifyCoords( )
Syntax
    STATUS status=hdmVerifyCoords(OSDCoords *pcoords, disptype dtype);
where
    dtype The display type.
        pcoords The coordinate data structure that defines the upper left and bottom right corners of the video display.
Returns
    status The error condition. Possible return value are
        E_NONE: no error
        E_HDM_ADJUSTED_VIDEO_DIM: the coordinates have been changed by the routine.
Description
    This function verifies that the coordinates in the pcoords structure is valid for the display type indicated by dtype. This routine will also adjust the coordinates to meet hardware requirements.
Rules
    pixX0 must always be an even pixel
    pixX1 must always be an odd pixel

| | |
|---|---|
| $0 \leq pixX0 <$ screen Xsize | (upper-left corner inside the screen) |
| pixX0 < pixX1 | (obviously) |
| pixX1 – pixX0 < screen X size than | (the display width must be shorter the screen size) |
| $0 \leq pixY0 <$ screen Ysize | (upper-left corner inside the screen) |
| pixY0 < pixY1 | (obviously) |
| pixY1 – pixY0 < screen Y size than | (the display height must be shorter the screen size) |

If dtype is VIDEOHSIZE, VIDEOQSIZE, or VIDEOESIZE, the following further conditions apply:
    pixY0 must be an even pixel
    pixY1 must be odd
    pixX1<screen Xsize
    pixY1<screen Ysize
    pixX1-pixX0 must be equal to the correct display X size (359 half size, 179 quarter size, 79 eighth size)
    pixY1-pixY0 must be equal to the correct display Y size (239 half size, 119 quarter size, 59 eighth size)

See Also
    hdmGetVideoCoords( )
hdmSwapDisplay( )
Syntax
    FERROR fError=hdmSwapDisplay(HDISPLAY hDisplay1, HDISPLAY hDisplay2);
where

| hDisplay1 | Handle to the first display |
| hDisplay2 | Handle to the second display. |

Returns
    fError=0, No Errors
    Possible error conditions are:
        invalid display handler
        one of the display type is VIDEO or CURSOR
Description
    hdmSwapDisplay( ) swaps the Z order of two displays. The function returns an error when the display type is either VIDEO or CURSOR. Unlike hdmSetZorder( ), the current routine works also on virtual windows: it is possible to exchange a virtual display with a physical display.
See Also
    hdmSetZOrder( )

Hardware Cursor Management API

The circuit 200 hardware cursor is really just a hardware display at the highest Z plane level. Because it is an extension of the OSD window management hardware, it must be rectangular in shape. Its size and color are configurable.

Table 55 describes the current API for handling the hardware cursor. Except for the two functions described below, the cursor is managed by using the same routines of the other display types: it is created by the function hdmNewDisplay( ), it is deleted by the function hdmDeleteDisplay( ) and the position can be changed by using hdmSetCoords( ). Also the visibility of the cursor display is set by the function hdmSetVisibility( ).

TABLE 55

Cursor Management API

| Name | Description |
| --- | --- |
| curSetColor( ) | Sets the color of the cursor. |
| curSetBlinkRate( ) | Sets the blinking frequency of the cursor. |
| curGetColor( ) | Gets the color of the cursor. |
| curGetBlinkRate( ) | Gets the blinking frequency of the cursor. | curSetColor( )
Syntax
    FERROR ferror=curSetColor(HDISPLAY hDisplay, word color);
where
    hDisplayHandle to a hardware display color the cursor color
Returns
    fError=0, No Errors
    Possible error conditions are:
        the display type is not CURSOR
Description
    curSetColor( ) sets the color of the cursor display.
See Also
    hdmSetBackGroundColor( )

curSetBlinkRate( )
Syntax
    FERROR ferror=curSetBlinkRate(HDISPLAY hDisplay, word level);
where
    hDisplayHandle to a hardware display level The cursor blink rate
Returns
    fError=0, No Errors
    Possible error conditions are:
        the display type is not CURSOR
Description
    curSetBlinkRate( ) sets the blink rate of the cursor display. Valid blink rate values are in the range between 0 and 15. They are outlined in Table 56.

TABLE 56

| Blinking Levels | | | |
| --- | --- | --- | --- |
| level | Blinking frequency | | Blinking period |
| 0 | No Blinking | | No Blinking |
| 1 | MAX | min | 1 field |
| N | | | N fields |
| 15 | min | MAX | 15 fields | curGetColor( )
Syntax
    word color=curGetColor(HDISPLAY hDisplay);
where
    hDisplay Handle to a hardware display
Returns
    color the cursor color
Description
    curGetColor( ) gets the color of the cursor display.
See Also
    hdmGetBackGroundColor( )

curGetBlinkRate( )
Syntax
    word level=curGetBlinkRate(HDISPLAY hDisplay);
where
    hDisplayHandle to a hardware display
Returns
    level The cursor blink rate
Description
    curGetBlinkRate( ) gets the blink rate of the cursor display.
See Also
    curSetBlinkRate( )

Graphics Acceleration

The graphics acceleration module provides the API interface with the firmware for high speed data transfer and translation. The translation feature allows the application software to generate a graphics screen in a bit-map mode and have the on-chip hardware translate the bit-map to graphics true-color data on the fly.

Detailed Module Description

The circuit 200 is capable of accelerating certain types of graphics functions, including:
    reading and writing pixel data
    rectangular block transfers
    horizontal line drawing
    vertical line drawing
All of the graphics acceleration functions are based upon the circuit 200 blitter module. The blitter module is responsible for moving two dimensional display memory from a source location to a destination location.

There are three major graphics formats: bitmap, 4:4:4 YCrCB, and 4:2:2 CbYCr. A bitmap display is sequence of 1,2,4,or 8 bits per pixel that represent an index value into a 24-bit palette. The OSD hardware will convert bitmap displays to 24 CbYCr when the graphic window is displayed. The last two formats are different types of "true color" or graphic formats. They specify the color component ratio of the format. In 4:4:4 mode, there is an equal number of bits used for Luminance, Chrominance Red, and Chrominance Blue. In 4:2:2 mode, there is only half of both Cr and Cb as related to Y.

Graphics data is stored in a linear packed format. Table 57 shows how 4:4:4 graphics data is stored. Each color component requires 8 bits, thus 4:4:4 mode is 24 bits/pixel. Note that pixels are not word aligned, and may span word boundaries.

TABLE 57

Linear Packed 4:4:4 Graphic Format

| Address | | |
|---|---|---|
| 0XFE000000 | 0XFE000001 | 0XFE000002 |

| Pixel | | | |
|---|---|---|---|
| P0 | P1 | P2 | P3 |

| Color Component | | | | | | | | | | | |
|---|---|---|---|---|---|---|---|---|---|---|---|
| Cb | Y | Cr | Cb | Y | Cr | Cb | Y | Cr | Cb | Y | Cr |

| Bit # | 31 24 | 23 16 | 15 08 | 07 00 | 31 24 | 23 16 | 15 08 | 07 00 | 31 24 | 23 16 | 15 08 | 07 00 |
|---|---|---|---|---|---|---|---|---|---|---|---|---|

Table 57 shows the 4:2:2 packed format. In this format, the chrominance information has been decimated by a factor of two over the luminance information. As the table shows, chrominance information is only supplied every other pixel.

TABLE 58

Graphic 4:2:2 Format

| Address | 0XFE0000 | | | | 0XFE00001 | | | | 0XFE00002 | | | |
|---|---|---|---|---|---|---|---|---|---|---|---|---|
| Color Components in memory | Cb | Y | Cr | Y | Cb | Y | Cr | Y | Cb | Y | Cr | Y |
| Pixel | P0 | | P1 | | P2 | | P3 | | P4 | | P5 | |
| Luminance | Y | | Y | | Y | | Y | | Y | | Y | |
| Chrominance, blue | Cb | | | | Cb | | | | Cb | | | |
| Chrominance, red | Cr | | | | Cr | | | | Cr | | | |
| Bit # | 31 24 | 23 16 | 15 08 | 07 00 | 31 24 | 23 16 | 15 08 | 07 00 | 31 24 | 23 16 | 15 08 | 07 00 | memory from one memory location to another. Table 59 shows the valid memory regions that the bitBLT hardware supports. SDRAM->SDRAM transfers will be used for moving block of memory around between hardware windows or within a hardware window. EBIF->SDRAM transfers may be used for moving graphics stored in external DRAM, such as fonts, to onscreen display memory. EBIF->EBIF transfers allow a software developer to move graphics data stored in memory on the EBIF. As Table 59 shows, all user DRAM accessible memory regions are a valid source or destination for a bitBLT transfer.

TABLE 59

Valid Source/Destination bitBLT Memory Regions

| From/To | SDRAM | EBIF DRAM[1] |
|---|---|---|
| SDRAM | Yes | Yes |
| EBIF DRAM | Yes | Yes |

[1]EBIF = Extension Bus Interface DRAM

[1]EBIF=Extension Bus Interface DRAM

Table 60 shows the valid bitBLT transfers across different display types. The most common types of displays have the most interactivity, i.e. Bitmap and 4:4:4. The 4:2:2 mode is more difficult to work with graphically because full color information is only present in half of the pixels stored in memory (refer to Table 58 Graphic 4:2:2 Format), so 4:2:2 images may only be hardware accelerated to displays that are also 4:2:2.

TABLE 60

Valid bitBLT Transfers Across Hardware Displays

| From/To | 4:4:4 | 4:4:4 HR[2] | 4:2:2 | Bitmap | Bitmap HR |
|---|---|---|---|---|---|
| 4:4:4 | Yes | Yes | No | No | No |
| 4:4:4 HR | Yes | Yes | No | No | No |
| 4:2:2 | No | No | Yes | No | No |

The circuit 200 employs a simple coordinate system. The origin of each hardware display window is at the top left corner of the window. The origin starts at x=0,y=0, up to the size of the window. Error! Reference source not found.
illustrates this system.

The blitter API is responsible for fill rectangular regions with a single color and copying rectangular regions of

TABLE 60-continued

Valid bitBLT Transfers Across Hardware Displays

| From/To | 4:4:4 | 4:4:4 HR$^2$ | 4:2:2 | Bitmap | Bitmap HR |
|---|---|---|---|---|---|
| Bitmap | Yes | Yes | No | Yes | Yes |
| Bitmap HR | Yes | Yes | No | Yes | Yes |

Table 61 shows whether relication or decimation occurs during a bitBLT transfer to or from a half resolution display. As defined for this table, replication means that that each pixel in the source display is replicated twice on the destination display on the horizontal axis. Decimation means that only every other pixel in the source display is copied to the destination display.

TABLE 61

Half Resolution Decimate/Replicate

| From/To | Bitmap | Bitmap HR | 4:4:4 | 4:4:4 HR |
|---|---|---|---|---|
| Bitmap | Copy | Decimate | Copy | Decimate |
| Bitmap HR | Replicate | Copy | Replicate | Copy |
| 4:4:4 | No | No | Copy | Decimate |
| 4:4:4 HR | No | No | Replicate | Copy |

In addition to decimation/replication due to transferring bitmaps to and from half resolution displays, bitBLT transfers from bitmaps of different pixel depths may occur. In this case, the following rules apply:

Bitmap x bit/pixel=>bitmap y bit/pixel, where x>y. The MSBs of x is truncated to equal y.

Bitmap x bit/pixel=>bitmap y bit/pixel, where x<y. x is padded on MSB with 0's, until x=y.

Graphics Data Structures

The following data structures may be used in the blitter API.

functype: functype describes all the hardware accelerated functions the bitblt module may perform. The bitblt hardware requires the firmware to tell it what function to perform when setting up its command registers.

```
typedef    enum {        SETPIXEL = 0,
                         GETPIXEL = 1,
                         HLINE = 2,
                         VLINE = 3,
                         FILLBLOCK = 4,
                         COPYBLOCK = 51}
           functype;
``` rw_dir: rw_dir specifies the read/write direction that the bitblt module will use to perform block copy operations. In any transfer the software is responsible for determining the appropriate direction.

```
typedef enum {
    TBLR=0, /* Top -->Bottom, Left -->Right */
    TBRL=1, /* Top -->Bottom, Right -->Left */
    BTLR=2} /* Bottom -->Top, Left -->Right */ rw_dir;
    /* Read/Write Direction */
```

The rw_dir variable is required for the bitBLT functions that copy a block of information. Error! Reference source not found. shows all of the possible directions the firmware must consider to determine the assigned of rw_dir.

The algorithm in Error! Reference source not found. describes the a method to use in determining how to set rw_dir. The worst case requires four conditionals.

bltblock: This data structure defines a rectangular block.

```
typedef struct {
    typedef struct {
        UINT pixX;       /* X coord. of upper left corner of block, in
                            pixels */
        UINT pixY;       /* Y coord. of upper left corner of block, in
                            pixels */
        UINT pixWidth;   /* X width of block in pixels */
        UINT pixLength;  /* Y length of block in pixels */
        UINT pixColor    /* color of pixels (if applicable) */
    } Bltblock;
```

Blitter API

Table 62 presents a summary of the blitter API. Following the table is a description of each function.

TABLE 62

Blitter API

| Function | Description |
|---|---|
| bltInit( ) | Initialize the blitter hardware module |
| bltSetPixel( ) | Sets a pixel color value. |
| bltGetPixel( ) | Gets a pixel color value. |
| bltDrawHLine( ) | Draws a horizontal line. |
| bltDrawVLine( ) | Draws a vertical line. |
| bltDrawBlock( ) | Creates a block in memory of a specific size and color |
| bltCopyBlock( ) | Copies a memory block from a source to destination. | bltInit( )

Syntax

FERROR fError=bltInit(void);

Returns fError=0, No errors

Description bltInit( ) initializes the bitBLT hardware and initializes the internal data structures required for the bitBLT API.

Hardware Requirements

The bltInit( ) function will initialize the hardware state machine.

bltSetPixel( )

Syntax

FERROR fError=bltSetPixel(HDISPLAY display, UINT pixX, UINT pixY, UINT wColor);

where display: display handle returned from osdCreateDisplay( )

pixX: X coordinate on current display in pixels pixY: Y coordinate on current display in pixels wColor: bitmap color value for bitmap displays, or a 24 bit CbYCr color value for graphic displays. For a 4:2:2 display the color value should be CbYCrY. The color information should be stored in the lower 24 (32 if 4:2:2) bits of the 32 bit value.

Returns fError=E_NONE, No errors

E_ERROR—Not defined.

Description bltSetPixel( ) will set the color of a pixel on any hardware display. If the display is bitmap, wColor should be the appropriate bitmap value. If the display is a graphic display, then wColor is a 24 (32 if 4:2:2)bit CbYCr value.

Special Considerations

In Graphics 4:2:2 mode, the firmware will have to set two pixels at a time. This is because the chrominance information is spread across two pixels in this mode. For example, if the user wants to change pixel P0 in Table 58, then the software will have to read a 32 bit value from address 0XFE0000, to obtain all of the color information for P0, It would then modify the Cb,Cr, and Y information based upon wColor and write back the 32 bit value, which would have an effect on P1, the adjacent pixel. In 4:2:2 mode, the hardware writes two pixels at a time.

If the disptype is one of the half resolutions displays, then pixX must be an even number. Software will provide the hardware with the proper half resolution base address, even though pixX and pixY will be the actual coordinates as if the display were not half resolution.

See Also
 bltGetPixel( )
bltGetPixel( )
Syntax
 FERROR fError=bltGetPixel(HDISPLAY display, UINT pixX, UINT pixY, UINT *pwColor);
where
 display: display handle returned from osdCreateDisplay( )
 pixX: X coordinate on current display in pixels
 pixY: Y coordinate on current display in pixels
 wColor: bitmap color value for bitmap displays, or a 24 bit CbYCr color value for graphic displays. For a 4:2:2 display the color value should be CbYCrY. The color information should be stored in the lower 24 (32 if 4:2:2) bits of the 32 bit value.
Returns
 fError=E_NONE, No errors
  E_ERROR Not defined
Description
 bltGetPixel( ) will get the color of a pixel on any hardware display. If the display is bitmap, value of *pwColor should be the appropriate bitmap value. If the display is a graphic display, then *pwColor is a 24 bit CbYCr value.
Hardware Requirements
 Software will provide the following parameters to the bitBLT hardware:
 Function type, as defined in functype
 Display Type, as defined in disptype
 Color Value=/* Get color value from wColor input parameter */
 Base Address of Pixel, and bit offset
 Memory Type=/* Get Memory type from hDisplay Context */
Special Considerations
 In Graphics 4:2:2 mode, the firmware will have to set get pixels at a time, however it will construct a 24 bit CbYCr value from the 32 bit value. This is because the chrominance information is spread across two pixels in this mode. For example, if the user wants to get pixel P0 in Table 58, then the software will have to read a 32 bit value from address 0XFE0000, to obtain all of the color information for P0, It would then modify the Cb,Cr, and Y information based upon pwColor, which would have an effect on P1, the adjacent pixel.

If the disptype is one of the half resolutions displays, then pixX must be an even number. Software will provide the hardware with the proper half resolution base address, even though pixX and pixY will be the actual coordinates as if the display were not half resolution.

See Also
 bltSetPixel( )
bltDrawHLine( )
Syntax
 FERROR fError=bltDrawHLine(HDISPLAY display, UINT pixX, UINT pixY, UINT cpixLength, UINT wColor)
where
 display: display handle returned from osdCreateDisplay( )
 pixX: X coordinate on current display in pixels
 pixY: Y coordinate on current display in pixels
 cpixLength: Length of line in pixels
 wColor: bitmap color value for bitmap displays, or a 24 bit CbYCr color value for graphic displays. For a 4:2:2 display the color value should be CbYCrY. The color information should be stored in the lower 24 (32 if 4:2:2) bits of the 32 bit value.
Returns
 fError=E_NONE, No errors
  E_ERROR Not defined
Description
 bltDrawHLine( ) will draw a one pixel wide horizontal line of length cpixLength starting at the coordinates specified by (pixX,pixY). The color of the line is specified by wColor.
Special Considerations
 In Graphics 4:2:2 mode, the firmware will provide the base address of even pixels only the hardware. The hardware will draw the line two pixels at a time because two pixels occupy 32 bits in 4:2:2 mode. In addition the length of the line must also be even.
 If the disptype is one of the half resolution displays, then cpixX must be an even number. In addition, the firmware will compute the real base address, taking into account the ½ resolution pixel decimation along the horizontal axis. For example,
 DrawHLine(10,20,36,BLUE); means to draw a blue horizontal line at location 10,20 on the full resolution display that is 36 pixels long.
 If any of the command would result in writes outside of the display, the X width is adjusted to stop at the display edge.
See Also
 bltDrawVLine( )
bltDrawVLine( )
Syntax
 FERROR fError=bltDrawVLine(HDISPLAY display, UINT cpixX, UINT cpixY, UINT cpixLength, UINT wColor)
where
 display: display handle returned from osdCreateDisplay( )
 cpixX: Number of pixels in the X direction
 cpixY: Number of pixels in the Y direction
 cpixLength: Length of line in pixels
 wColor: bitmap color value for bitmap displays, or a 24 bit CbYCr color value for graphic displays. For a 4:2:2 display the color value should be CbYCrY. The color information should be stored in the lower 24 (32 if 4:2:2) bits of the 32 bit value.
Returns
 fError=E_NONE, No errors
  E_ERROR Not defined
Description
 bltDrawVLine( ) will draw a one pixel wide vertical line of length cpixLength starting at the coordinates specified by (cpixX, cpixY). The color of the line is specified by wColor.

Special Considerations

In Graphics 4:2:2 mode, the firmware will provide the base address of even pixels only the hardware. The hardware will draw the line two pixels at a time because two pixels occupy 32 bits in 4:2:2 mode. There is no restriction on the length of a vertical line.

If the disptype is one of the half resolution displays, then cpixX must be an even number. In addition, the firmware will compute the real base address, taking into account the ½ resolution pixel decimation along the horizontal axis. For example, DrawVLine(10,20,36,BLUE); means to draw a blue horizontal line at location 10,20 on the full resolution display that is 36 pixels long. The user does not have to worry about the actual size of the display.

If any of the command would result in writes outside of the display, the Y length is adjusted to stop at the display edge.

See Also bltDrawHLine( )

bltDrawBlock( )

Syntax

ERROR fError=bltDrawBlock(HDISPLAY display, Bltblock *pblock)

where:

```
display: display handle returned from osdCreateDisplay( )
pblock:  pointer to a Bltblock data structure that defines a rectangular
         block.
typedef struct {
         uint  pixX;      /* x coord upper left in pixels */
         uint  pixY;      /* y coord upper left in pixels */
         uint  pixWidth;  /* x width of block in pixels   */
         uint  pixLength; /* y length of block in pixels  */
         uint  pixColor;  /* color of block               */
} BLTBLOCK;
Returns
fError = E_NONE, No errors
         E_ERROR Not defined.
```

Description bltDrawBlock( ) will draw a rectangular block on the current display set by bltSetCurrentDisplay( ). The values in pblock define the parameters of the rectangular block to be filled. The wColor value should be set appropriately to the display. If the display in bitmap, then wColor should be a bitmap color value, otherwise it should be a 24 bit CbYCr value. For a 4:2:2 display the color value should be CbYCrY. The color information should be stored in the lower 24 (32 if 4:2:2) bits of the 32 bit value.

Special Considerations

In Graphics 4:2:2 mode, the firmware will provide the base address of even pixels to the hardware. The hardware will draw the line two pixels at a time because two pixels occupy 32 bits in 4:2:2 mode. In addition the length of the box must also be even.

If the disptype is one of the half resolution displays, then pixX must be an even number. In addition, the firmware will compute the real base address, taking into account the ½ resolution pixel decimation along the horizontal axis.

If any of the command would result in writes outside of the display, the X width and Y length are adjusted to stop at the display edge.

bltCopyBlock( )

Syntax
ERROR fError = bltCopyBlock(HDISPLAY hdispSource, DISPLAY hdispDest,
                            Bltblock block, UINT pixXd, UINT pixYd, BOOLEAN fTransparency);
where:
    hdispSource: Handle to the display where the source block is located.
    hdispDest:   Handle to the display where the block is to be copied.
    block:       structure describing the block to be copied.
    pixXd:       X coordinate on the destination display where the
                 block is to
                 be copied.
    pixYd:       Y coordinate on the destination display where the
                 block is to
                 be copied.
    fTransparency: Transparency enable flag. 1=Enabled, 0=disabled.
Returns
fError = E_NONE, No errors
         E_ERROR Not defined.

Description bltCopyBlock will copy a rectangular region of memory, described by block, and copy it from one memory location to another. The block is located in the display indicated by hdispSource, and is to be copied into the display indicated by hdispDest, at the coordinates (pixXd, pixyD).

Transparency only works under the source and destination displays described in Table 63. The transparency color is defined as the first entry in the palette for the source display. If the fTransparency flag is set, and the source and destination displays are valid for transparency, then all palette color values of 0, are not copied to the destination display. Note that the color value referred to is the actual palette index, not the 24 bit YCRCB value that the palette color index references. This allows a palette to define any color to the be transparent color, as long as it stored at location 0 in the palette.

TABLE 63

| Valid Transparency Source/Destination Displays | |
|---|---|
| From | To |
| Bitmap Display Any Depth | Bitmap Display Any Depth |
| Bitmap Display Any Depth | Graphic 4:4:4 |

Special Considerations

The circuit 200 hardware will allow block copied from any user memory location to any other user memory location. The memory block may be in either SDRAM or EBIF DRAM. See Table 59: Valid Source/Destination bitBLT Memory Regions, for valid source and destinations.

The circuit 200 has many different types of hardware displays. Table 60: Valid bitBLT Transfers Across Hardware Displays, shows which block copies are valid.

For half resolution mode refer to Table 61: Half Resolution Decimate/Replicate, which indicates which shows how pixel expansion and reduction occurs through replication and decimation.

If any of the command would result in writes outside of the destination display, the X width and Y length are adjusted to stop at the display edge.

This function considers overlapping blocks when the source and destination displays are the same. The direction of the copy is adjusted to account for this.

What is claimed is:

1. A video and audio decoder system, comprising:
   a packet parser for receiving a digital data stream;
   a first memory for storing program instructions;
   a second memory for storing data;
   an address bus coupled to said first and second memory;
   a data bus coupled to said first and second memory;
   an audio decoder for decoding selected audio portions of said digital data stream and providing an audio output;
   a video decoder for decoding selected video portions of said digital data stream;
   an NTSC/PAL encoder coupled to said video decoder for providing a video output;
   a coprocessor coupled to said video decoder and NTSC/PAL encoder for processing selected OSD portions of said digital data stream;
   a controller coupled to said coprocessor, video decoder, audio decoder, address bus, data bus, and packet parser for moving selected portions of said data stream therebetween; and
   a central processing unit coupled to said address and data bus for processing selected portions of said data stream.

2. An integrated circuit, comprising:
   a transport packet parsing circuit for receiving a transport data packet stream,
   a central processing unit for initializing said integrated circuit and for processing portions of said data packet stream,
   a ROM circuit for storing data,
   a RAM circuit for storing data,
   an audio decoder circuit for decoding audio portions of said data packet stream,
   a video decoder circuit for decoding video portions of said data packet stream,
   an NTSC/PAL encoding circuit for encoding video portions of said data packet stream,
   an OSD coprocessor circuit for processing OSD portions of said data packets,
   a traffic controller circuit moving portions of said data packet stream between portions of said integrated circuit,
   an extension bus interface circuit,
   a P1394 interface circuit,
   a communication coprocessors circuit,
   an address bus connected to said circuits, and
   a data bus connected to said circuits.

3. A digital television signal receiver capable of receiving multiple signals, with each signal consisting of a set of digital data packets, comprising:
   decoding means for decoding the incoming digital signals, adapted to identify said data packets so they can be selected to form trains of packets of the same type and a means for processing said packets adapted so as to generate, from packets of the same type, corresponding analog signals and deliver these analog signals to a device for displaying the video signals and transmitting the audio signals, wherein that the decoding means comprises:
      circuitry for extracting a portion of data from each header signal, which is representative of the nature of the corresponding useful signal;
      memory for storing reference data, at addresses each corresponding to one packet type; and
      comparison circuitry for comparing the piece of data extracted from each header signal with said reference data stored in memory and delivering data representative of an address to a data processing unit indicating the type of packet, wherein said memory and said comparison circuitry consist of an associative memory adapted to ensure the simultaneous comparison of the piece of data extracted from each header signal with the reference data stored in memory.

4. The device of claim 3, wherein the associative memory comprises a network of rows and columns of memory cells each comprising a set of charge transistors for the storage of reference data, and control transistors controlled by an addressing row for the selective connection of said charge transistors to columns for the transmission of said data extracted from the header signal; each memory cell also comprising a set of transistors assembled as a comparator ensuring the comparison between the data present in the columns for the data transmission and the reference data stored in the charge transistors so as to deliver, when a reference byte stored in a memory cell row is identical to a byte present in the data transmission columns, a pairing signal to an address coding system connected to the data processing unit.

5. The device of claim 4, wherein the memory cells are MOS transistor memory cells.

6. The device of claim 3, wherein the associative memory is an associative memory with a storage capacity of 32 bytes of 14 bits.

7. The device of claim 3, further comprising a random-access memory controlled by the data processing unit for successive storage in said random-access memory of data packets of the same type, in a zone corresponding to a preselected packet type.

8. The device of claim 3, further comprising a means for extracting, from each header signal, bits used for the numbering of the packets of the same type, and for supplying these bits to the data processing unit for the selection of the packets.

9. The device of claim 8, wherein the means for extracting said data from each header signal and said bits used for the numbering of the packets consists of circuitry for decoding the header signal of each packet.

10. The device of claim 3, wherein at least one of the sets of digital data packets is a set of digital television signal packets which have been transmitted in series at a speed of approximately 60 Mbps.

11. The device of claim 3, wherein are at least one of the sets of digital data packets is a set of digital television signal packets which have been transmitted in parallel at a speed of approximately 7.5 Mbps.

12. A digital television signal receiver capable of receiving multiple signals, with each signal consisting of a set of digital data packets comprising:
   decoding circuitry for decoding the incoming digital signals, adapted to identify said data packets so they can be selected to form trains of packets of the same type and a means for processing said packets adapted so as to generate, from packets of the same type, corresponding analog signals and deliver these analog signals to a device for displaying the video signals and transmitting the audio signals, wherein that the decoding circuitry comprises:
      circuitry for extracting a portion of data from each header signal, which is representative of the nature of the corresponding useful signal;

memory for storing reference data, at addresses each corresponding to one packet type; and comparison circuitry for comparing the piece of data extracted from each header signal with said reference data stored in memory and delivering data representative of an address to a data processing unit indicating the type of packet, wherein said memory and said comparison circuitry comprise an associative memory adapted to ensure the simultaneous comparison of the piece of data extracted from each header signal with the reference data stored in memory.

* * * * *